United States Patent

Sudou et al.

[11] Patent Number: 5,579,231
[45] Date of Patent: Nov. 26, 1996

[54] MANAGEMENT SYSTEM FOR MANUFACTURE

[75] Inventors: Kouji Sudou; Masao Shukuya; Katsuo Okuyama; Masao Ishiwata, all of Kawasaki; Hidetoshi Uchibori; Toshinari Matsui, both of Oyama; Shigeru Kubo, Oyama; Michinori Matsubayashi, Oyama; Kazuhide Toyoda, Oyama; Eiko Takei, Oyama; Hidekazu Morihiro, Kawasaki; Masayoshi Suzuki, Utsunomiya; Hideo Ohata, Oyama, all of Japan

[73] Assignee: Fujitsu Limited, Kawasaki, Japan

[21] Appl. No.: 487,910

[22] Filed: Jun. 7, 1995

Related U.S. Application Data

[63] Continuation of Ser. No. 855,062, Mar. 19, 1992, abandoned.

[30] Foreign Application Priority Data

Mar. 19, 1991 [JP] Japan ................................ 3-054837
Mar. 20, 1991 [JP] Japan ................................ 3-057371

[51] Int. Cl.⁶ ............................................ G06F 17/60
[52] U.S. Cl. ............................. 364/468.01; 395/919
[58] Field of Search ........................ 364/468, 401, 364/512, 488–491; 395/904, 919, 921, 923

[56] References Cited

U.S. PATENT DOCUMENTS

| | | | |
|---|---|---|---|
| 4,591,983 | 5/1986 | Bennett et al. | 364/468 |
| 4,807,108 | 2/1989 | Ben-Arieh et al. | 364/468 |
| 4,870,591 | 9/1989 | Cicciarelli et al. | 364/468 |
| 5,089,970 | 2/1992 | Lee et al. | 364/468 |
| 5,119,307 | 6/1992 | Blaha et al. | 364/468 |
| 5,225,987 | 7/1993 | Thompson | 364/468 |

FOREIGN PATENT DOCUMENTS

| | | |
|---|---|---|
| 62-229444 | 10/1987 | Japan . |
| 1-162918 | 6/1989 | Japan . |
| 1-169663 | 7/1989 | Japan . |
| 1-217505 | 8/1989 | Japan . |

*Primary Examiner*—Roy N. Envall, Jr.
*Assistant Examiner*—Steven R. Garland
*Attorney, Agent, or Firm*—Staas & Halsey

[57] ABSTRACT

The present invention is to provide an equipment production management system, in which the electronic equipment is designed corresponding to an order from customers, which enables unified preparation from derivation of equipment corresponding to the customer conditions concerning equipment installation design, and construction associated drawing design. The system includes a terminal unit and a central control system, in which is provided a customer base order information file, design data file, a design know-how information file established by making a know-how library on the equipment installation design as input files. The central processing system includes an installation designing section corresponding to installation design for respective stages from overall layout to installation of the elementary parts. The installation design section prepares an installation design drawing adapting various conditions input using the design data file and design know-how information file in response to the input of customer order information.

27 Claims, 125 Drawing Sheets

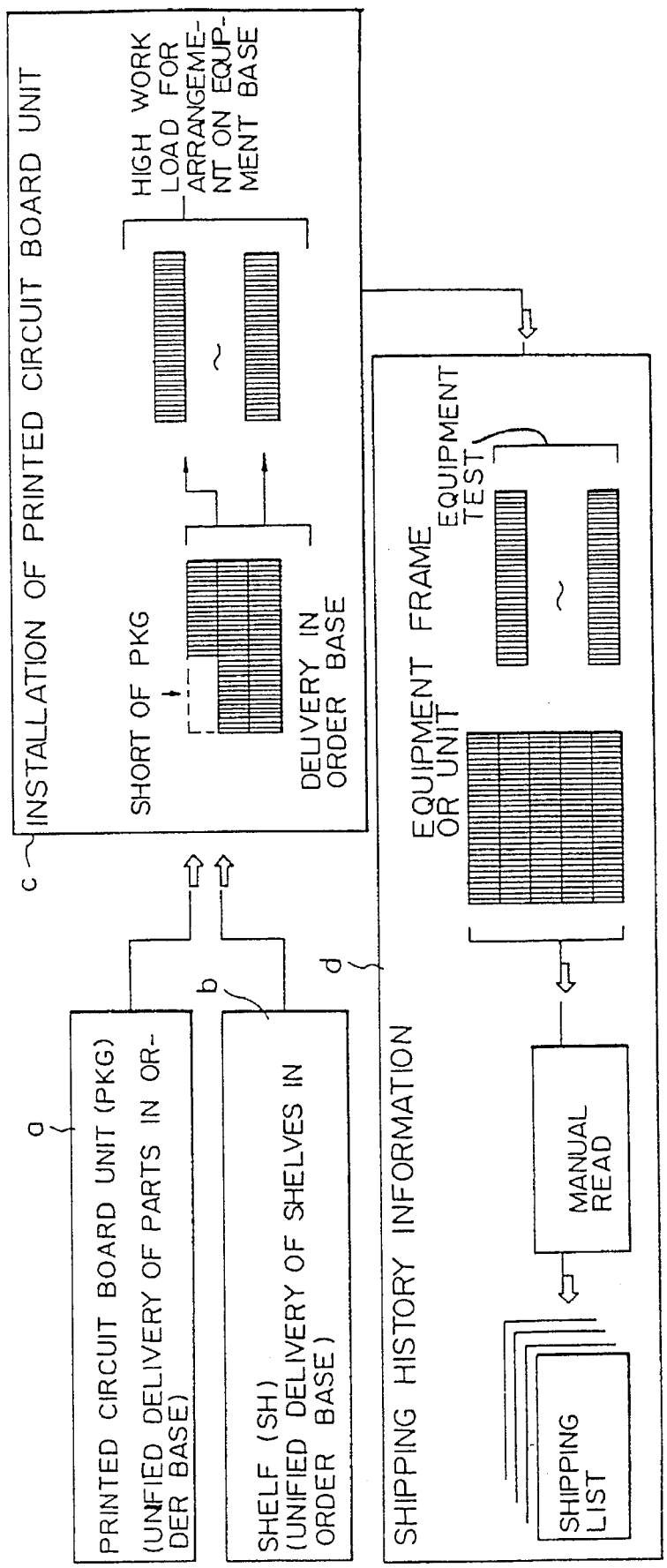

Fig. 7A
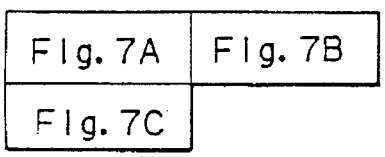
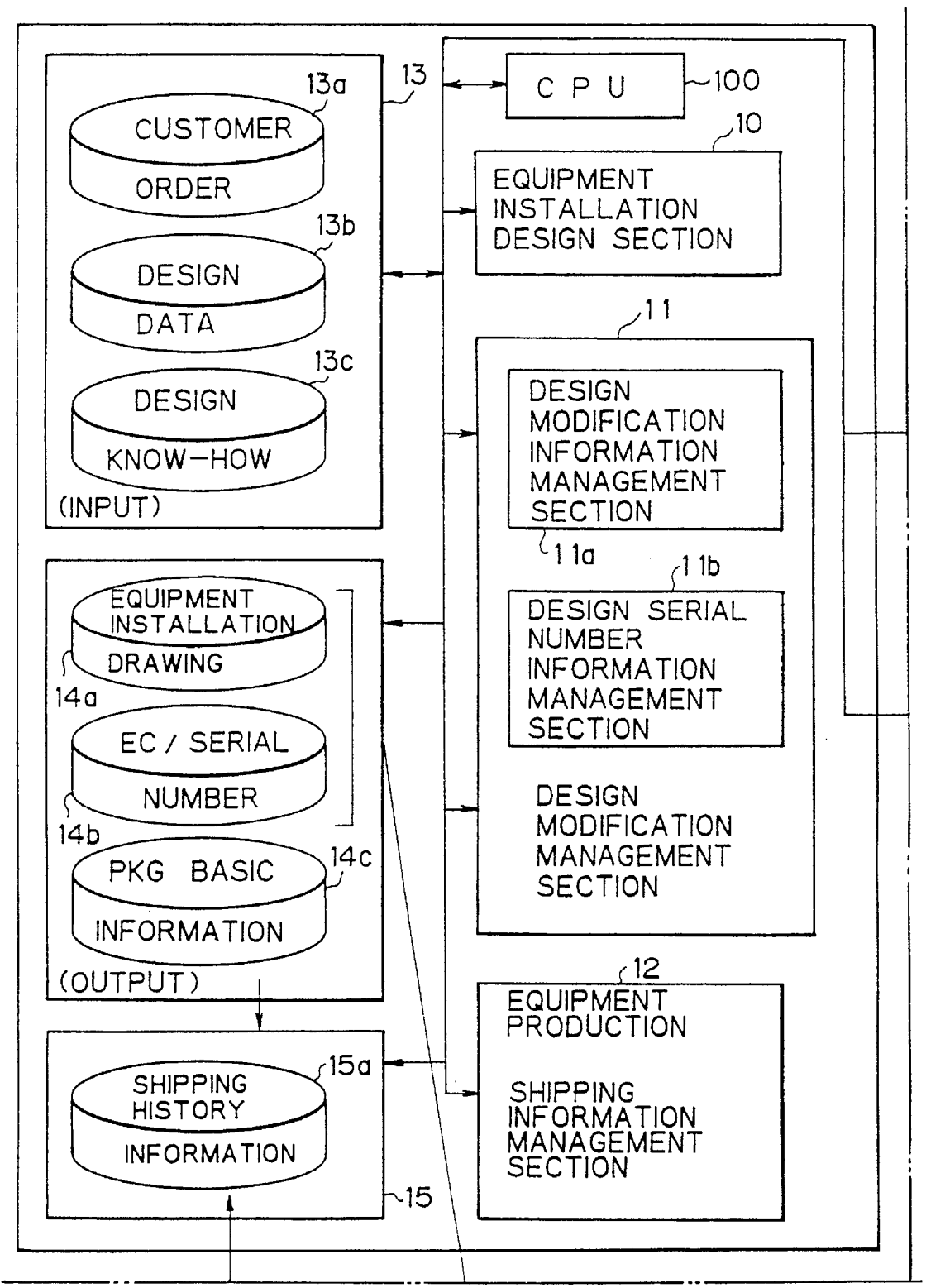

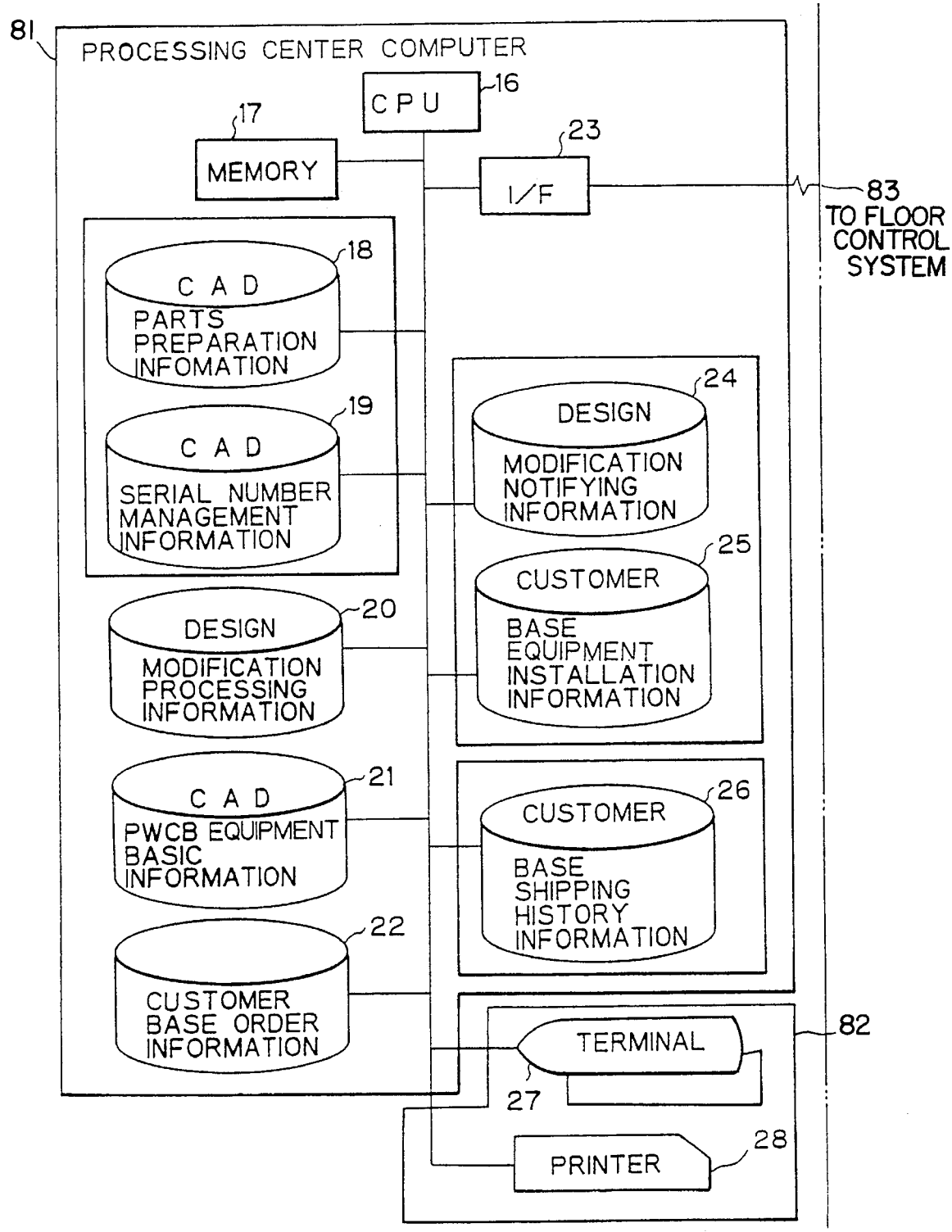

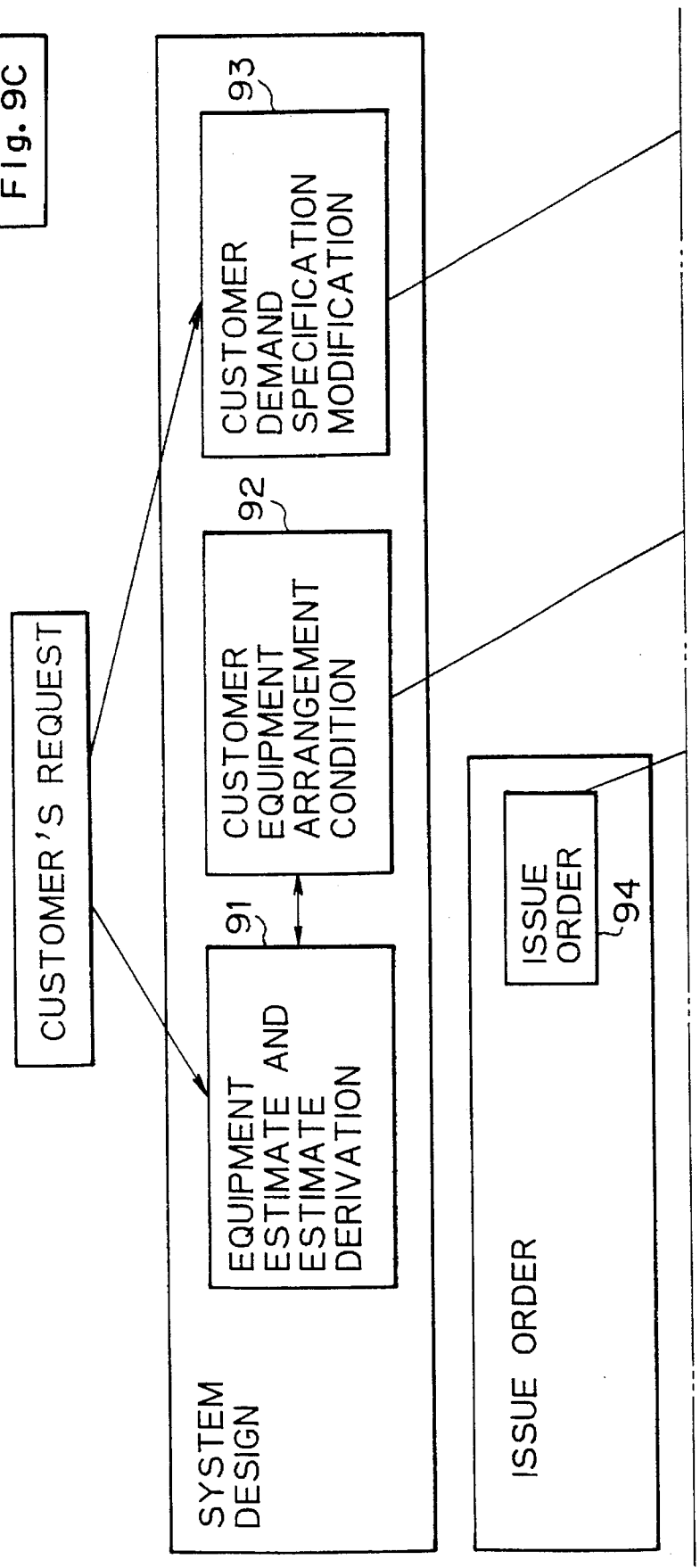

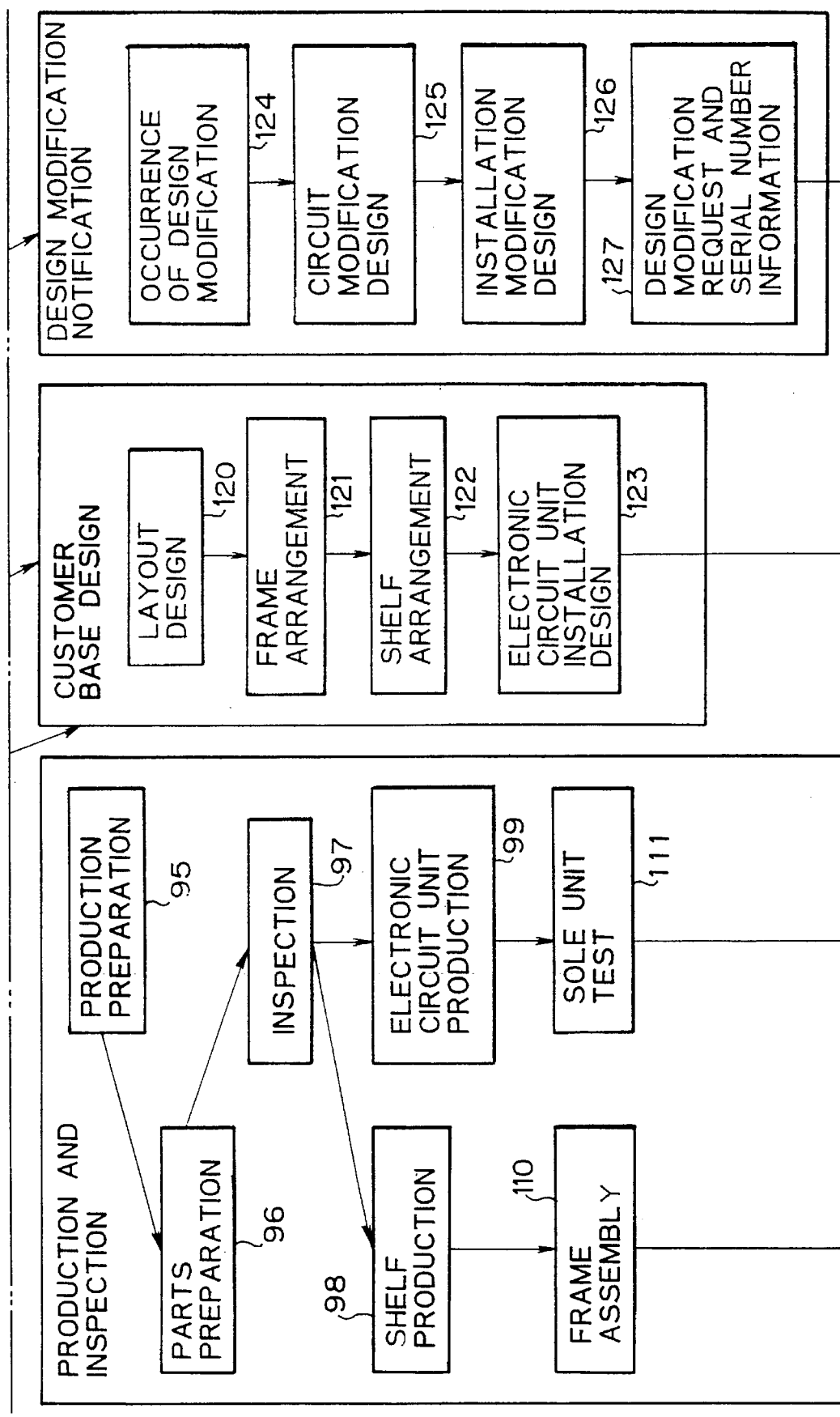

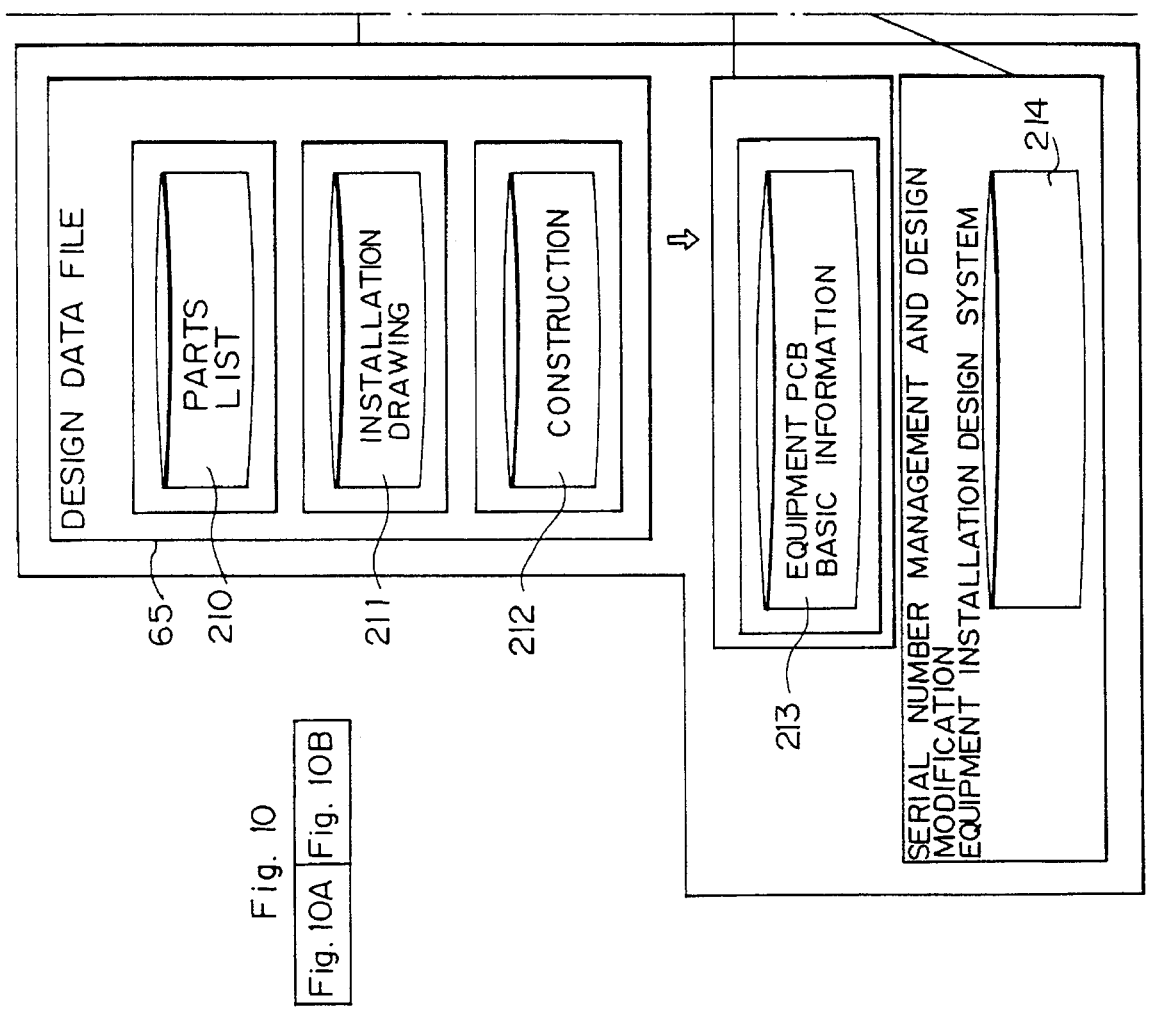

Fig. 11A

| CUSTOMER DATA | ● ORDER NO. D0 I I I I I NA |  |  |
|---|---|---|---|
|  | ● DESTINATION AA |  |  |
|  | ● PLACE TO INSTALL AA-001 |  |  |
| ORDERED EQUIPMENT DATA | PRODUCT NAME | SPECIFICATION | AMOUNT |
|  | SCF-A | E01B-XXX1-BXX1 | 18 |
|  | AASH-A | E04B-XXX2-CXX1 | 50 |
|  | ABSH-A | E04B-XXX3-CXX1 | 8 |
|  | LC-A | E20B-XXX1-BXX1 | 684 |
|  | LC-B | E20B-XXX2-BXX2 | 493 |
|  | ...... | ...... | ...... |

REMARKS:
- FRAME
- UNIT
- PCB
- PCB

Fig. 11B

PCB BASIC DESIGN INFORMATION

PRODUCT : LC-A   DRAWING NUMBER : E20B-XXX1-RXX1
NAME
· CONSTRUCTION AND INSTALLATION WIDTH : FC TYPE  0.6 INCH
· POWER CONSUMPTION : 0.5A
· HEAT GENERATION COEFFICIENT : 1.0W

PRODUCT : LC-B   DRAWING NUMBER : E20B-XXX2-RXX2
NAME
· CONSTRUCTION AND INSTALLATION WIDTH : FC TYPE  0.6 INCH
· POWER CONSUMPTION : 0.4A
· HEAT GENERATION COEFFICIENT : 0.8W

PRODUCT : PWOA   DRAWING NUMBER : E20B-XX00-RX00
NAME
· CONSTRUCTION AND INSTALLATION WIDTH : FC TYPE  0.6 INCH
· POWER CONSUMPTION : 0.3A
· HEAT GENERATION COEFFICIENT : 0.6W

Fig. 12A

| PRODUCT NAME | : LCSH-A | | DRAWING NUMBER | : E04B-XXX2-CXX1 | |
|---|---|---|---|---|---|

PCB INSTALLATION SLOT : 0.6 INCH × 33 (00~32)

| POSITION | PRODUCT NAME | SPECIFICATION | INSTALLATION WIDTH | INSTALLATION STATUS |
|---|---|---|---|---|
| 01 | PW0A | E20B-XX00-RX00 | 2 | FIXED |
| 03 | PW1B | E20B-XX01-RX01 | 2 | FIXED |
| 04 | XX11A | E20B-XX11-RX11 | | DESIGNATED |
| 05 ~ 26 | LC-A LC-B CBTA | E20B-XXX1-RXX1 E20B-XXX2-RXX2 E20B-XXX3-RXX3 | 1 | DESIGNATED NOTE |
| | REMARKS : CAN BE INSTALLED IN EITHER CASE | | | |
| 28 | XX11A | E20B-XX11-RX11 | 1 | DESIGNATED |
| 30 | PW0A | E20B-XX00-RX00 | 2 | FIXED |
| 32 | PW1B | E20B-XX01-RX01 | 2 | FIXED |

SHELF INFORMATION, FIXED PCB

Fig. 12

| Fig. 12A |
|---|
| Fig. 12B |

Fig. 12B

| PRODUCT NAME | AASH-A | DRAWING NUMBER | E04B-XXX3-CXX1 | | |
|---|---|---|---|---|---|
| PCB INSTALLATION SLOT : 0.6 INCH × 33 (00~32) | | | | | |
| POSITION | PRODUCT NAME | SPECIFICATION | INSTALLATION WIDTH | INSTALLATION STATUS | |
| 01 | PW0A | E20B-XX00-RX00 | 2 | FIXED | |
| 03 | PW1A | E20B-XX01-RX01 | 2 | FIXED | |
| 04 | XX11A | E20B-XX11-RX11 | | DESIGNATED | |
| 05 ⌇ 26 | LC-A LC-B CBTA | E20B-XXX1-RXX1 E20B-XXX2-RXX2 E20B-XXX3-RXX3 | 1 | DESIGNATED | NOTE |
| REMARKS | | | | | |

Fig. 13B

AASH-A    E04B-XXX2-CXXI

| 00 | 01 | 02 | 03 | 04 | 05 | 06 | 07 | 08 | 09 | 10 | 11 |
|----|----|----|----|----|----|----|----|----|----|----|----|
| P  | P  | P  | X  | L  | L  | L  | L  | L  | L  | L  | L  |
| W  | W  | W  | X  | C  | C  | C  | C  | C  | C  | C  | C  |
| O  | 1  | 1  | 1  | 1  | 1  | 1  | 1  | 1  | 1  | 1  | 1  |
| A  | A  | A  | A  | A  | A  | A  | A  | A  | A  | A  | B  |

INSTALLATION PATTERN
DESIGNATION (SELECT)

Fig. 13C

SCF-A   E01B-XXX1-BXX1

| | [P1] | [P2] | [P3] | [P4] |
|---|---|---|---|---|
| 5 | ACSH-C | | BCSH-C | CCSH-C |
| 4 | ACSH-B | ACSH-B | BCSH-B | CCSH-B |
| 3 | ACSH-A | ACSH-A | BCSH-A | CCSH-A |
| 2 | ABSH-A | ABSH-A | BBSH-A | CBSH-A |
| 1 | AASH-B | AASH-B | BASH-B | CASH-B |
| 0 | AASH-A | AASH-A | BASH-A | BASH-A |

STANDARD INSTALLATION PATTERN

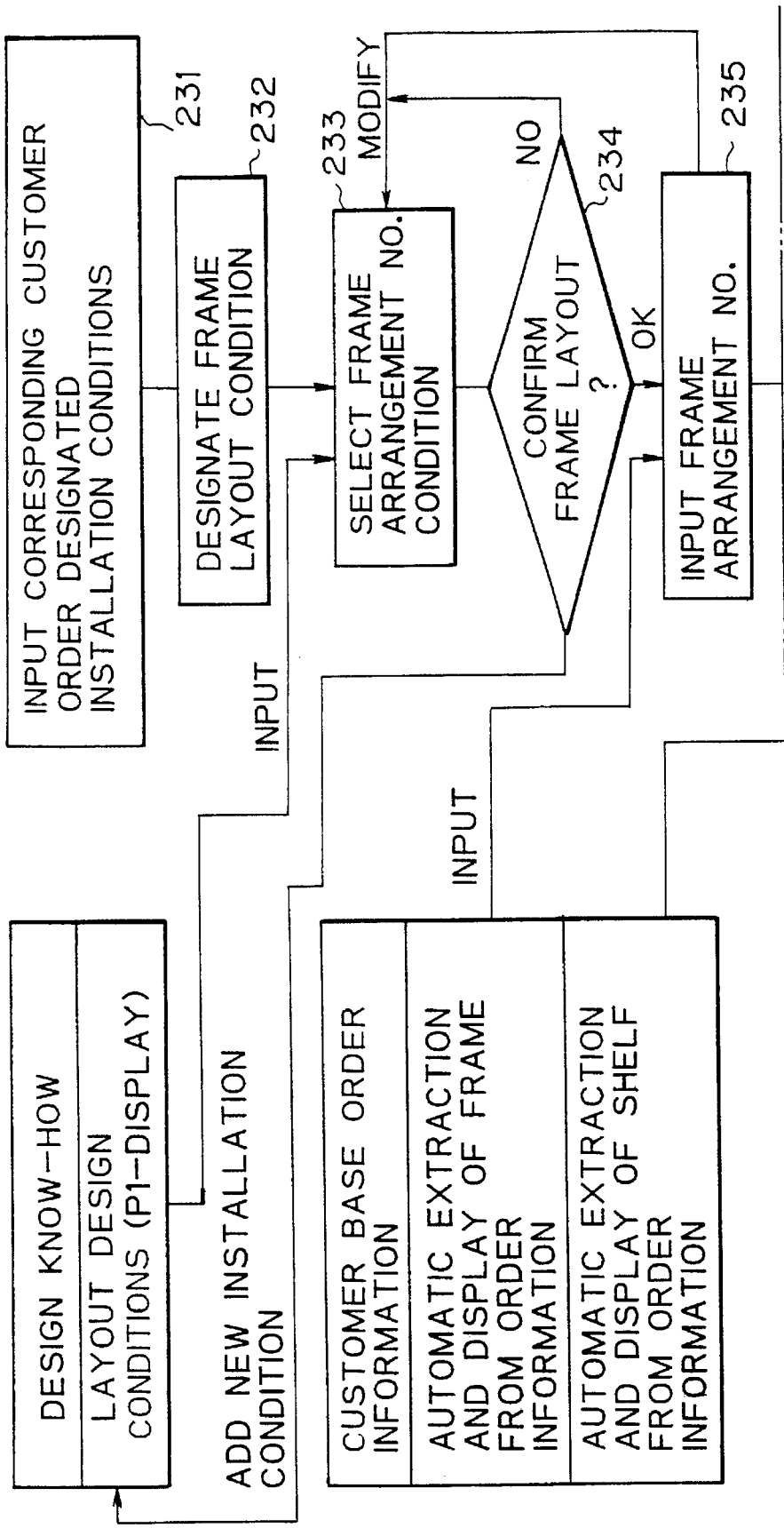

Fig. 15A

| Fig.15 |
|---|
| Fig.15A |
| Fig.15B |

| COMMON | CUSTOMER DESTINATION ORDER INFORMATION | | |
|---|---|---|---|
| | ORDER NO. : DO 11111NA | | |
| | DESTINATION : AA | | |
| | PLACE TO INSTALL : AA-001 | | |

EQUIPMENT INSTALLATION DRAWING FOR SHELF MOUNTING PCB

SLCSHA  E04B-3012-C002

```
                                    0101-1  0101-2
                                    0101-2  0103-1-2  ] — INSTALLING FRAME
                                    0101-1  0102-2-2
```

| FIG 01-01(×6) | | | | |
|---|---|---|---|---|
| 00 | | | | |
| 01 | PW0A | E20B-XX00-RX00 | K | ← FIXED INSTALLATION (DESIGN DATA) |
| 02 | | | | |
| 03 | PW1B | E20B-XX01-RX00 | K | |
| 04 | LC-A | E20B-XXX1-RXX1 | S | ← DESIGNATED INSTALLATION (ORDER DESIGNATION) |
| 05 | LC-A | E20B-XXX1-RXX1 | S | |
| 06 | LC-A | E20B-XXX1-RXX1 | S | |

PCB PRODUCT NAME, SPECIFICATION AND INSTALLATION POSITION

Fig. 15B

SHELF FRAME INSTALLATION INFORMATION

FRAME NAME AND SPECIFICATION SCF-A E01B-XXX1-DXX1
FRAME ARRANGEMENT NO.    0101

| INSTALLATION POSITION | : 0101-0 |
| SHELF PRODUCT NAME AND SPECIFICATION | : AASH-A E04B-XXX2-CXX1 |
| PCB INSTALLATION | : FIG01-01 |
| INSTALLATION POSITION | : 0101-1 |
| SHELF PRODUCT NAME AND SPECIFICATION | : AASH-B E04B-XXX2-CXX2 |
| PCB INSTALLATION | : FIG01-01 |
| INSTALLATION POSITION | : 0101-2 |
| SHELF PRODUCT NAME AND SPECIFICATION | : AASH-A E04B-XXX3-CXX1 |
| PCB INSTALLATION | : FIG02-01 |

INSTALLATION OF SHELF IN FRAME

Fig. 17A

BEFORE MODIFICATION

SERIAL NUMBER MANAGEMENT LIST  [XXIIA  E20B-XXII-RXIII]

REMARKS  B: PARTS PREPARATION LIST
C: CIRCUIT DIAGRAM
D: INSTALLATION DRAWING
G: JUMPER CABLE DIAGRAM
R: PATTERN CUT DRAWING

| SERIAL NUMBER | BASIC DRAWING | DRAWING SERIAL NUMBER (REMARKS) | | | | | PT SUBSTRATE E320-XXII-TII2 |
|---|---|---|---|---|---|---|---|
| | | B | C | D | G | R | PT SUBSTRATE |
| 01A | E20B-XXII-RXII | S-1 | S-1 | S-1 | | | 01 |
| 02B | E20B-XXII-RXII | S-2 | S-2 | S-2 | S-1 | S-1 | 01 |

AFTER MODIFICATION

SERIAL NUMBER MANAGEMENT LIST  [XXIIA  E20B-XXII-RXIII]

| SERIAL NUMBER | BASIC DRAWING | DRAWING SERIAL NUMBER (REMARKS) | | | | | PT SUBSTRATE E320-XXII-TII2 |
|---|---|---|---|---|---|---|---|
| | | B | C | D | G | R | PT SUBSTRATE |
| 01A | E20B-XXII-RXII | S-1 | S-1 | S-1 | -- | -- | 01 |
| 02B | E20B-XXII-RXII | S-2 | S-2 | S-2 | S-1 | S-1 | 01 |
| 03C | E20B-XXII-RXII | S-3 | S-3 | S-3 | S-2 | S-2 | 01 |
| 04C | E20B-XXII-RXII | T-1 | S-3 | T-1 | -- | -- | 01 |

(ADDED DATA: rows 03C and 04C)

Fig. 17B

| MANAGEMENT NO. | BC NO. 201625 (AUTOMATICALLY GENERATING MANAGEMENT IN SYSTEM) | | |
|---|---|---|---|
| REPRESENTATIVE EQUIPMENT | F-XXXA | | |
| OBJECTIVE EQUIPMENT | PRODUCT NAME: XXIIA | DRAWING NUMBER: E20B-XXII-RXII | APPLICATION: DELIVERED AFTER 90-12-20 |
| | UNIT SERIAL NUMBER (OLD & NEW) | | |
| | SUMMARY OF MODIFICATION | [PARTS MODIFICATION]<br>MB74LS178 +1<br>MB74LS00 +1 | [WIRING MODIFICATION]<br>JUMPER CABLE +5<br>PATTERN CUT +6 |
| | PRODUCT NAME: XXIIA | DRAWING NUMBER: E20B-XXII-RXII | APPLICATION: FROM NEWLY PREPARED PRODUCT |
| | UNIT SERIAL NUMBER (OLD/NEW) | | |
| | SUMMARY OF MODIFICATION | [PARTS MODIFICATION]<br>PT SUBSTRATE (E320-XXII-TII2)<br>MODIFY 01 VERSION TO 02 VERSION | |

Fig. 17C-(A)

XX11A E20B-XXII-RX11

| UNIT SERIAL NUMBER | BASIC DRAWING NUMBER | DRAWING SERIAL NUMBER REMARKS | | | | | | PT SUBSTRATE E320-4520-T152 | |
|---|---|---|---|---|---|---|---|---|---|
| | | B | C | D | G | R | ... | PT SUBSTRATE | APPLICATION |
| 01A | E20B-XXII-RXII | S-1 | S-1 | S-1 | ... | ... | ... | 01 | |
| 02B | E20B-XXII-RXII | S-2 | S-2 | S-2 | S-1 | S-1 | ... | 01 | DELIVERED AFTER 90-09-20 |
| 03C | E20B-XXII-RXII | S-3 | S-3 | S-3 | S-2 | S-2 | ... | 01 | DELIVERED AFTER 90-12-20 |
| 04C | E20B-XXII-RXII | T-1 | S-3 | T-3 | ... | ... | ... | 02 | FROM NEW PRODUCT |

DESIGN MODIFICATION NOTICE NECESSARY

Fig. 17C-(B)

XX11A E20B-XX11-RX11
DESIGN MODIFICATION NOTICE PREPARATION

APPROVAL

DESIGN MODIFICATION INFORMATION DATABASE

| DESIGN MODIFICATION REQUEST NO. ISSUE DATA | EQUIPMENT NAME, EQUIPMENT TYPE CODE | DRAWING NUMBER REMARKS | UNIT SERIAL NUMBER, OLD/NEW | PARTS MODIFICATION INFORMATION | SUMMARY OF MODIFICATION |
|---|---|---|---|---|---|
| ECNO. 201621 90-11-10 | SCP-A F-XXXA | E01B-XXX1-RXX1 DELIVERED AFTER 90-12-20 | 01A1 01A2 | E210-ZZZZ-XZZZ MODIFY 01 TO 02 | |
| ECNO. 201624 90-11-20 | FW01 F-XXXA | E20B-XX00-RX00 DELIVERED AFTER 91-01-20 | 04D 05E | 2SCZZZx2 DELETE 2SCYYYx2 ODD | J+2 C+1 |
| ECNO. 201626 90-11-03 | XX0A F-XXXA | E20B-XX00-RX10 DELIVERED AFTER 91-01-20 | 02B 03C | MB74LS178+1 MB74LS00+1 | J+5 C+6 |
| | XX1B F-XXXA | E20B-XX00-RX10 ? | --- 04C | | |

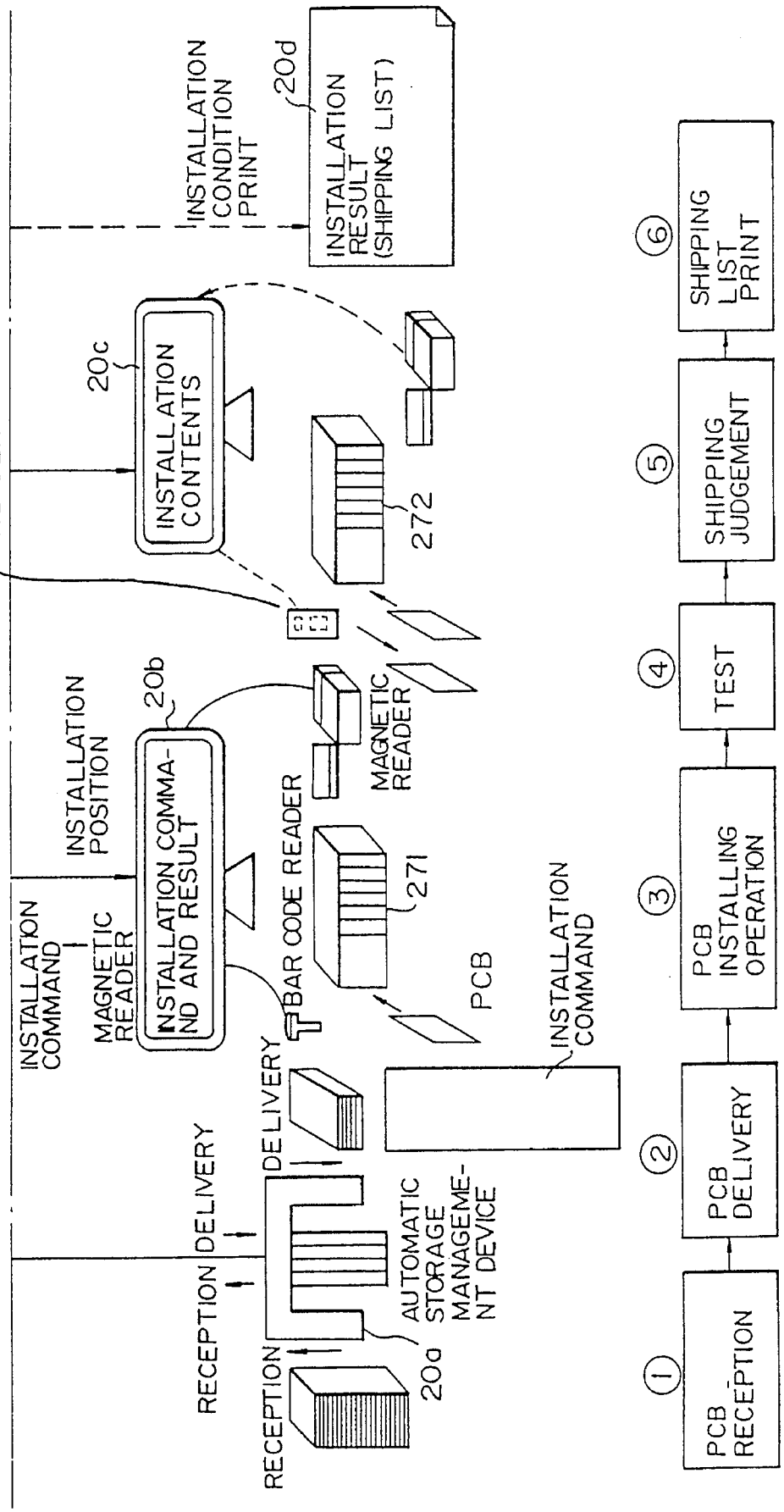

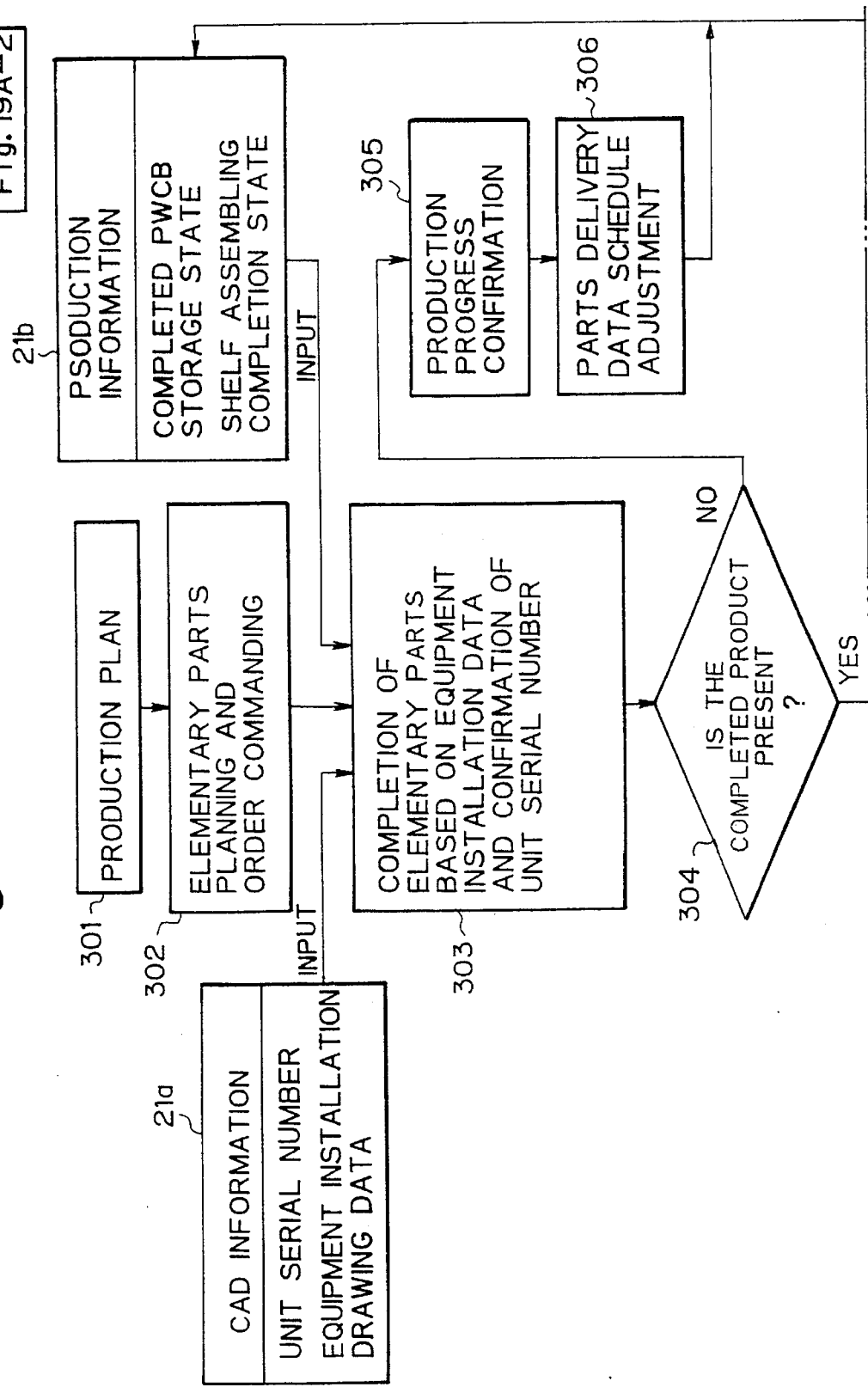

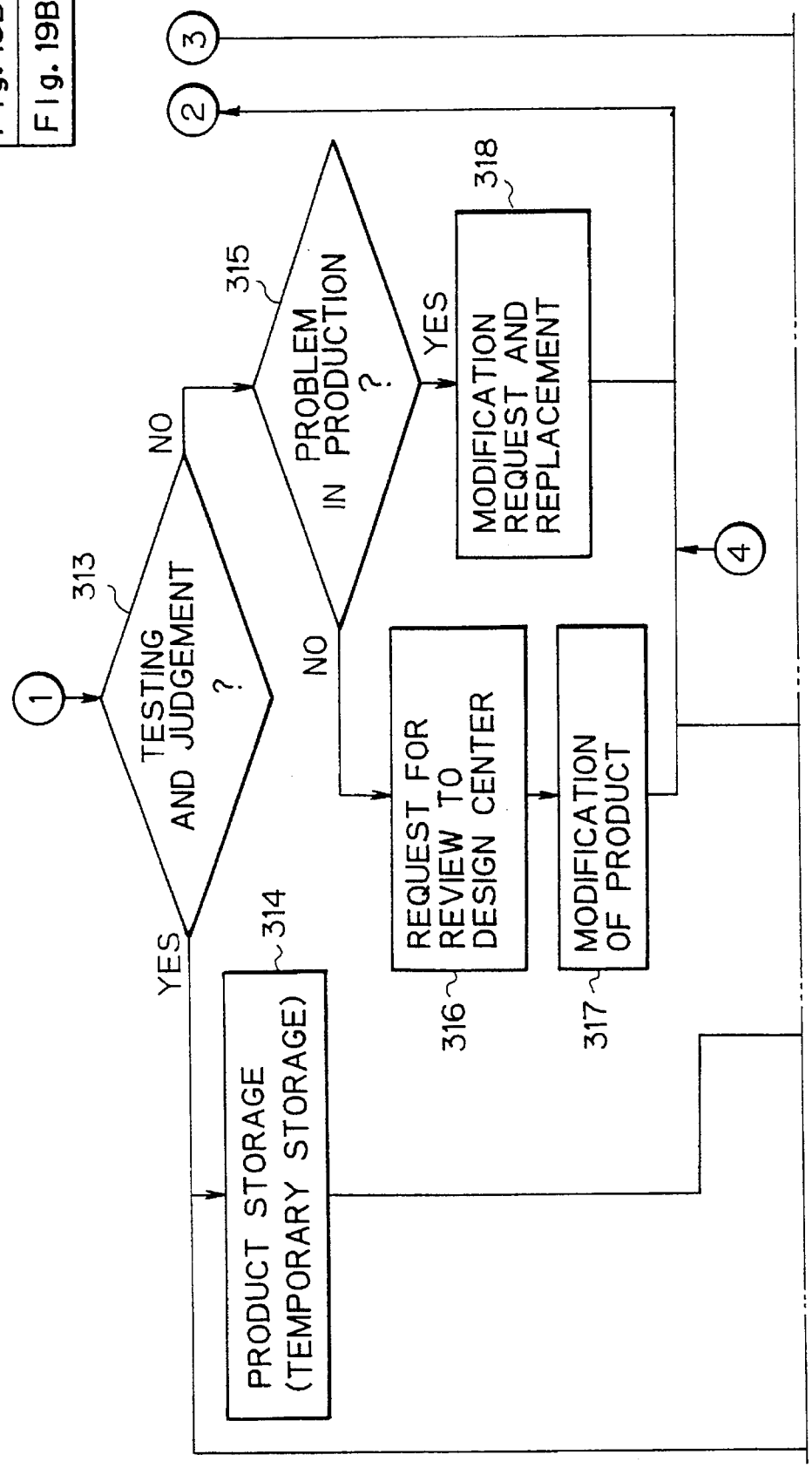

Fig. 20A-(A)

PCB AUTOMATIC STORAGE INFORMATION

| |
|---|
| PRODUCT NAME : PWOA |
| PRODUCT NUMBER : E20B-XX00-RX00 |
| UNIT SERIAL NUMBER : 05B |
| PRODUCTION YEAR AND MONTH : 90-12 |
| PRODUCTION YEAR AND MONTH PRODUCT NUMBER : 0001 |
| STORAGE SHELF NUMBER : 6-05-095 |
| PRODUCT NAME : PW1B |
| PRODUCT NUMBER : E20B-XX01-RX01 |
| UNIT SERIAL NUMBER : 05B |
| PRODUCTION YEAR AND MONTH : 90-12 |
| PRODUCTION YEAR AND MONTH PRODUCT NUMBER : 0002 |
| STORAGE SHELF NUMBER : 6-05-095 |

Fig. 20A-(B)

SHELF PRODUCTION INFORMATION

| |
|---|
| SHELF NAME : AASH-A |
| SHELF DRAWING NUMBER : E04B-XXX2-CXX1 |
| ORDER NO. : D01111NA |
| DESTINATION FOR DELIVERY : AA-001 |
| UNIT SERIAL NUMBER : 05B |
| PRODUCTION YEAR AND MONTH : 90-12 |
| PRODUCTION YEAR AND MONTH PRDUCT NUMBER : 0002 |
| SHELF NAME : AASH-A |
| SHELF DRAWING NUMBER : E04B-XXX2-CXX1 |
| ORDER NO. : D01111NA |
| DESTINATION FOR DELIVERY : AA-001 |
| UNIT SERIAL NUMBER : 05B |
| PRODUCTION YEAR AND MONTH : 90-12 |
| PRODUCTION YEAR AND MONTH PRODUCT NUMBER : 0003 |

Fig. 20B

| COMMON | CUSTOMER DELIVERY DESTINATION, ORDER INFORMATION | | | | | |
|---|---|---|---|---|---|---|
| | ORDER NO.: D0IIIIINA (PRIMARY ORDER ISSUE DATA 90.08.10 IN-SIDE MODIFICATION HISTORY<br>DESTINATION: AA<br>PLACE TO INSTALL: AA-001 | | | | | |
| SHELF AND INSTALLED PCB . AND SOLELY SHIPPED PRODUCTION/SHIPPING HISTORY INFORMATION | | | | | | |
| | PRODUCT NAME: LCSH-A | | UNIT SERIAL NUMBER: 02B | | | |
| | DRAWING NUMBER: E04B-XXX2-CXX1 | | PRODUCTION YEAR AND MONTH: 91-01<br>PRODUCT NUMBER: 30101 | | | |
| | EQUIPMENT INSTALLATION DRAWING(INPUT INFORMATION) | | PRODUCT/SHIPPING INFORMATION | PRODUCT/SHIPPING HISTORY | | IN-SIDE MODIFICATION HISTORY |
| INSTALLED POSITION | PRODUCT NAME | DRAWING NUMBER | UNIT SERIAL NUMBER | PRODUCTION YEAR AND MONTH | PRODUCT NUMBER | |
| 00 | | | | | | |
| 01 | PWOA | E20B-XX00-RX00 K | 05D | 91-01 | 0101 | |
| 02 | | | | | | |
| 03 | PW1A | E20B-XX01-RX01 K | 04D | 90-12 | 0201 | |
| 04 | LC-A | E20B-XXX1-RXX1 S | 04D | 91-12 | 3001 | |
| 28 | XX11A | E20B-XX11-RX11 K | 03C | 91-01 | 01507 | |
| 29 | | | | | | |
| 30 | PWOA | E20B-XX00-RX00 K | 05E | 91-01 | 0102 | |
| 31 | | | | | | |
| 32 | PW1B | E20B-XX01-RX01 K | 04D | 90-12 | 0202 | |

SHELF INSTALLING PCB

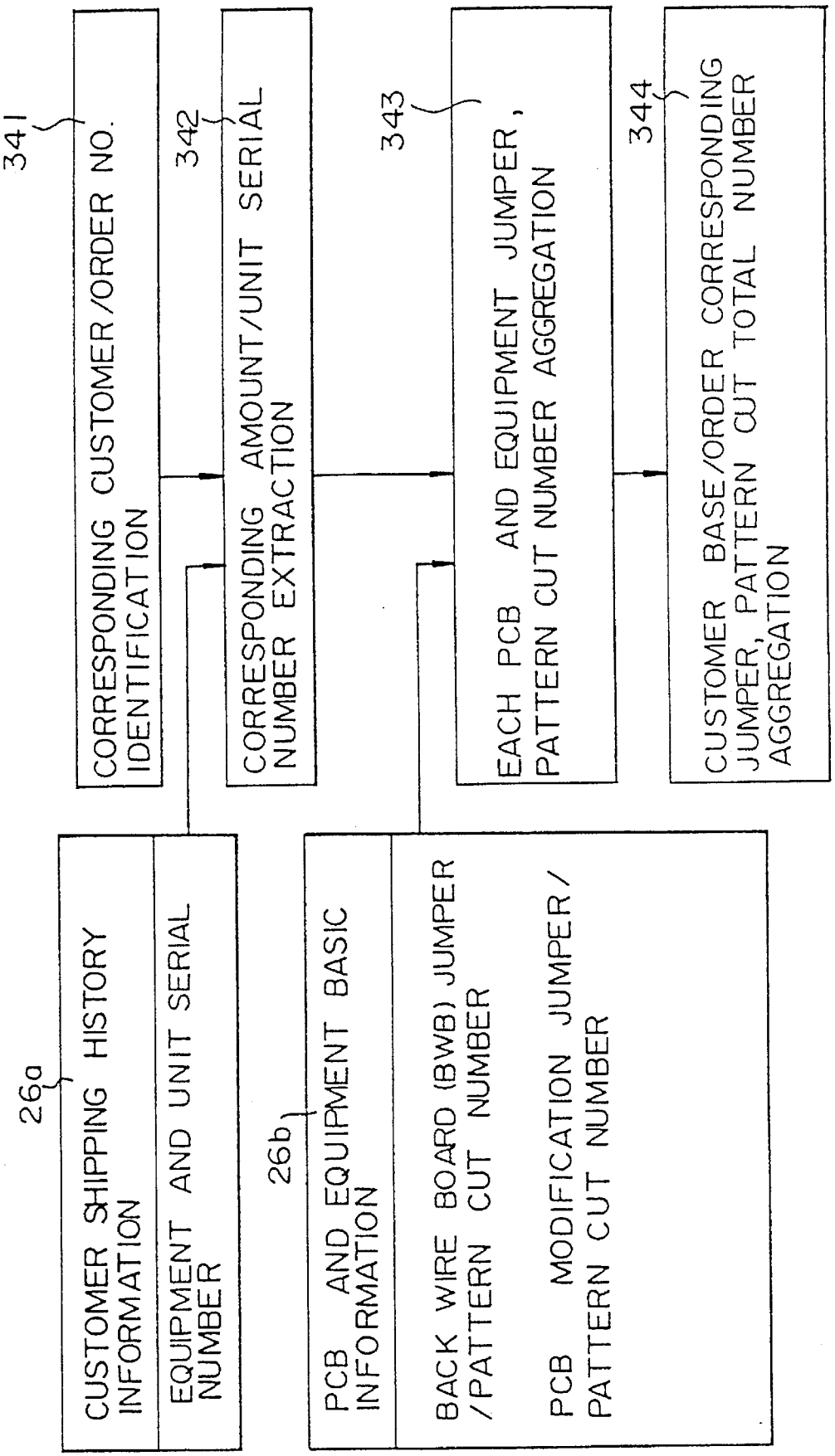

Fig. 23

EXAMPLE

| PRODUCT NAME : XX11A | DRAWING NUMBER : E 20B-XX11-RX11 | | | | |
|---|---|---|---|---|---|
| UNIT SERIAL NUMBER | MODIFICATION HISTORY INFORMATION (MODIFICATION MATERIAL NUMBER) | APPLICATION | MODIFICATION AMOUNT | | |
| | | | MODIFIED JUMPER NUMBER | MODIFIED PATTERN NUMBER | PATTERN CUT NUMBER |
| 01A | — | — | — | — | — |
| 02B | XXXXXXX FUNCTION INCLUSION, MODIFICATION | AFTER 90-10-20 | 5 UNITS | 6 UNITS | — |
| 03B | XXXXXXX FUNCTION INCLUSION, PT SUBSTRATE INCLUSION | FROM NEW PRODUCT | — | — | — |

Fig. 24A

EXAMPLE OF OUTPUT DATA OF CUSTOMER ORDER CORRESPONDING AGGREGATE

ORDER NO.: DO11111NA (PRIMARY ORDER ISSUE DATE 90-08-10)
DESIGNATION: AA
PLACE TO INSTALL: AA-001

CORRESPONDING EQUIPMENT

| PRODUCT NAME | DRAWING NUMBER | UNIT SERIAL NUMBER | AMOUNT | JUMPER NUMBER | PATTERN CUT NUMBER |
|---|---|---|---|---|---|
| LCSH-A | E04B-XXX2-CXXI | 02B | 20 | 5 x 20 = 100 | 3 x 20 = 60 |
| | | GROUND TOTAL | | 100 | 60 |

| PRODUCT NAME | DRAWING NUMBER | UNIT SERIAL NUMBER | AMOUNT | JUMPER NUMBER | PATTERN CUT NUMBER |
|---|---|---|---|---|---|
| PW0A | E20B-XX00-RX00 | 05E | 40 | 2 x 40 = 80 | 1 x 40 = 40 |
| PW1B | E20B-XX01-RX01 | 04D | 40 | 3 x 40 = 120 | 2 x 40 = 80 |
| XX11A | E20B-XX11-RX11 | 02C | 20 | 5 x 20 = 100 | 6 x 20 = 120 |
| ZZZ1A | E20B-X100-R100 | 04D | 10 | 2 x 10 = 20 | 2 x 10 = 20 |
| | | GROUND TOTAL | | 965 | 856 |

Fig. 24B

| DESIGN MODIFICATION PCB | | XX11A | E20B-XX11-RX11 | | | |
|---|---|---|---|---|---|---|
| MODIFICATION MATERIAL | | XX11A-0002 | | UNIT SERIAL NUMBER : 02B ⇨ 03C | | |
| XXXXXXX FUNCTION ADDED | | | | DESTINATION | | |
| INSTALLATION SITE | ORDER NUMBER | | UNIT SERIAL NUMBER | DELIVERED AMOUNT | INCLUSION NECESSITY DECISION | INCLUSION RESULT | COMMENT |
| AA-001 | D011276N 870620 | | 02B | 10 | ○ | | |
| | D012114N 880820 | | 02B | 8 | ○ | | |
| | D020025N 900120 | | 02B | 6 | | | |
| AA-002 | D011344N 880420 | | 02B | 10 | ○ | | |
| | D012654N 890820 | | 02B | 8 | ○ | | |
| AA-003 | D011054N 880520 | | 02B | 8 | ○ | | |
| | D013754N 891020 | | 02B | 8 | ○ | | |

EXAMPLE OF OUTPUT DATA OF MODIFICATION
INCLUSION REQUEST FOR FIELD SHIPPED PRODUCTS

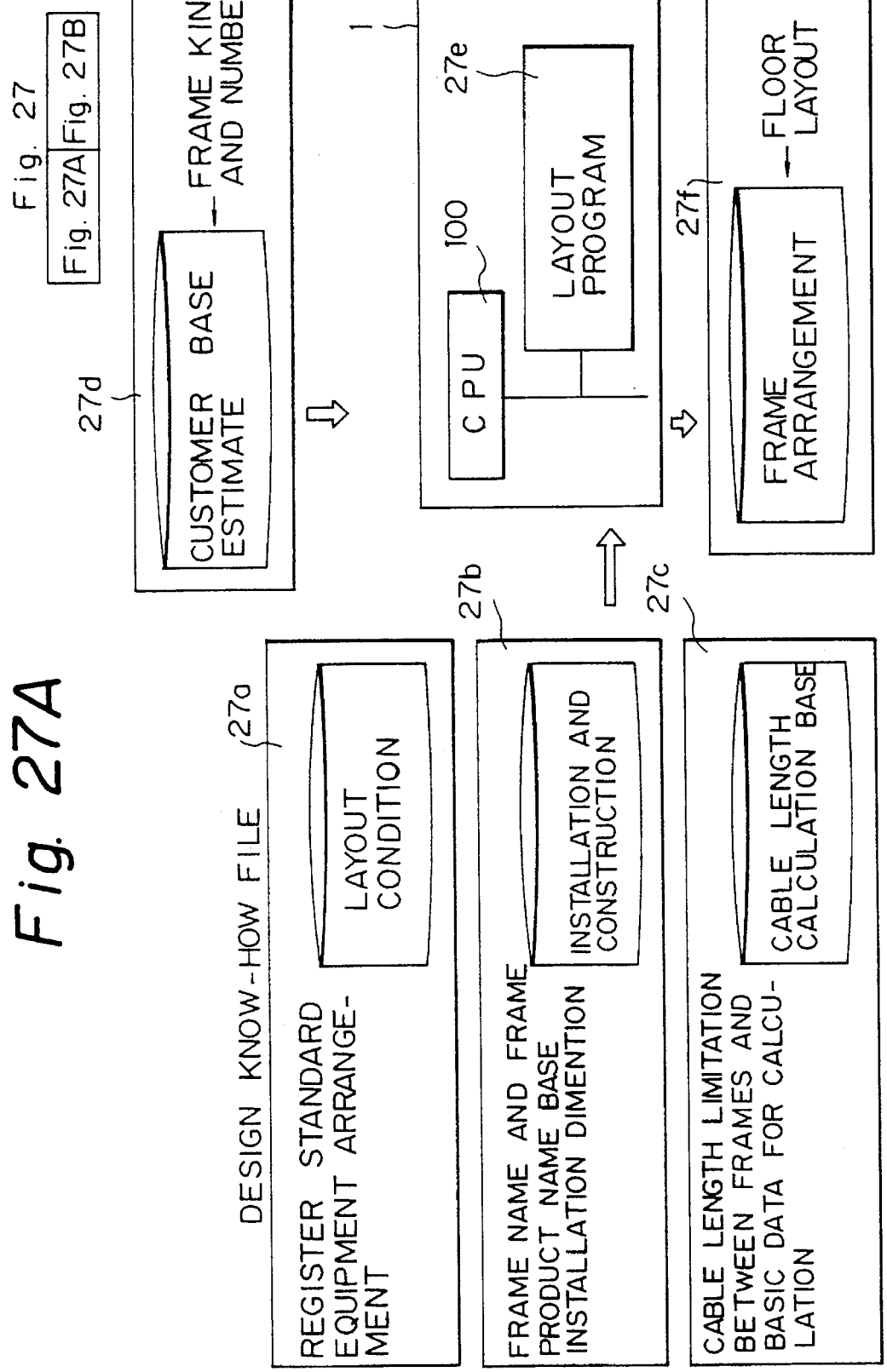

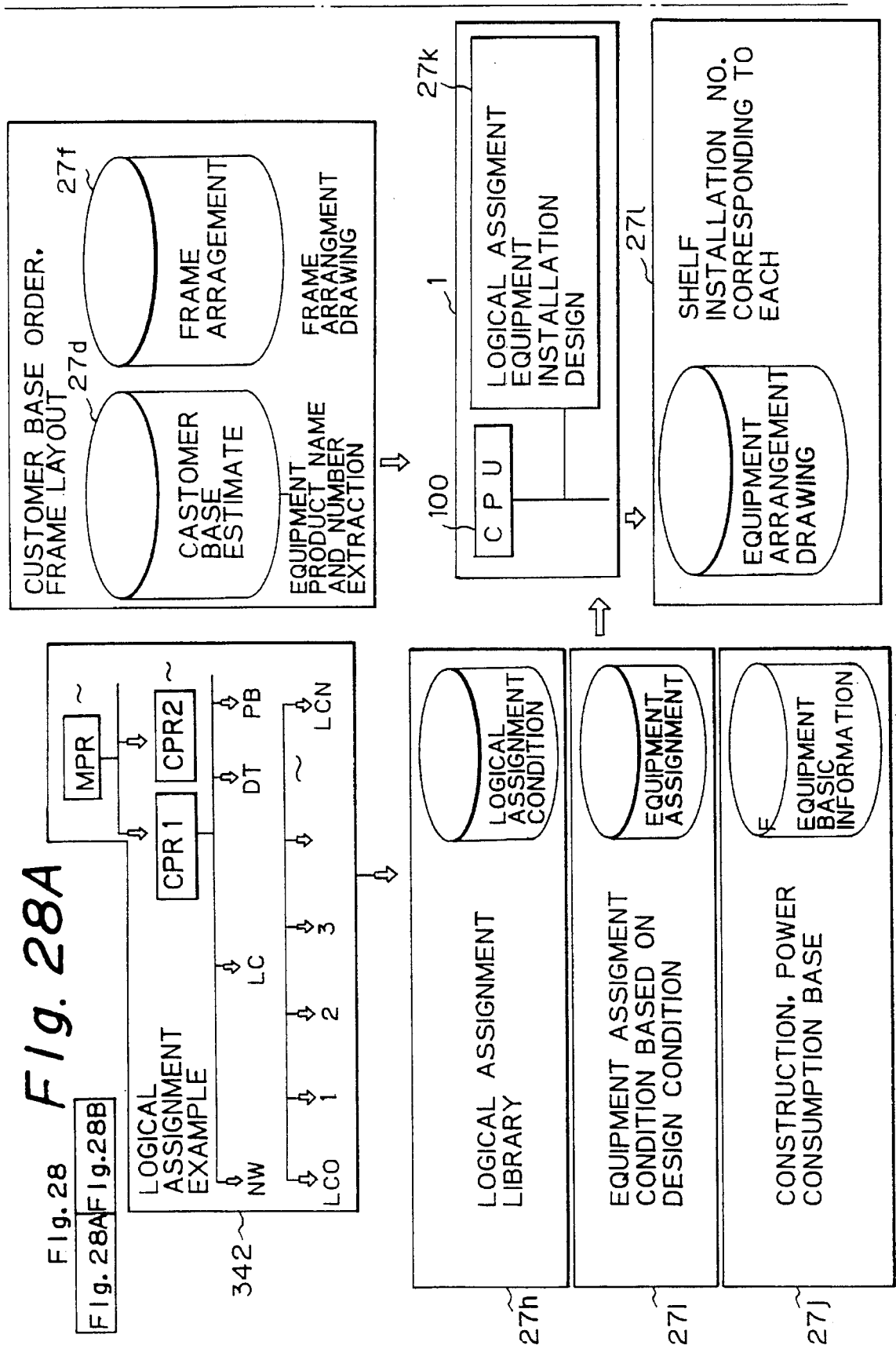

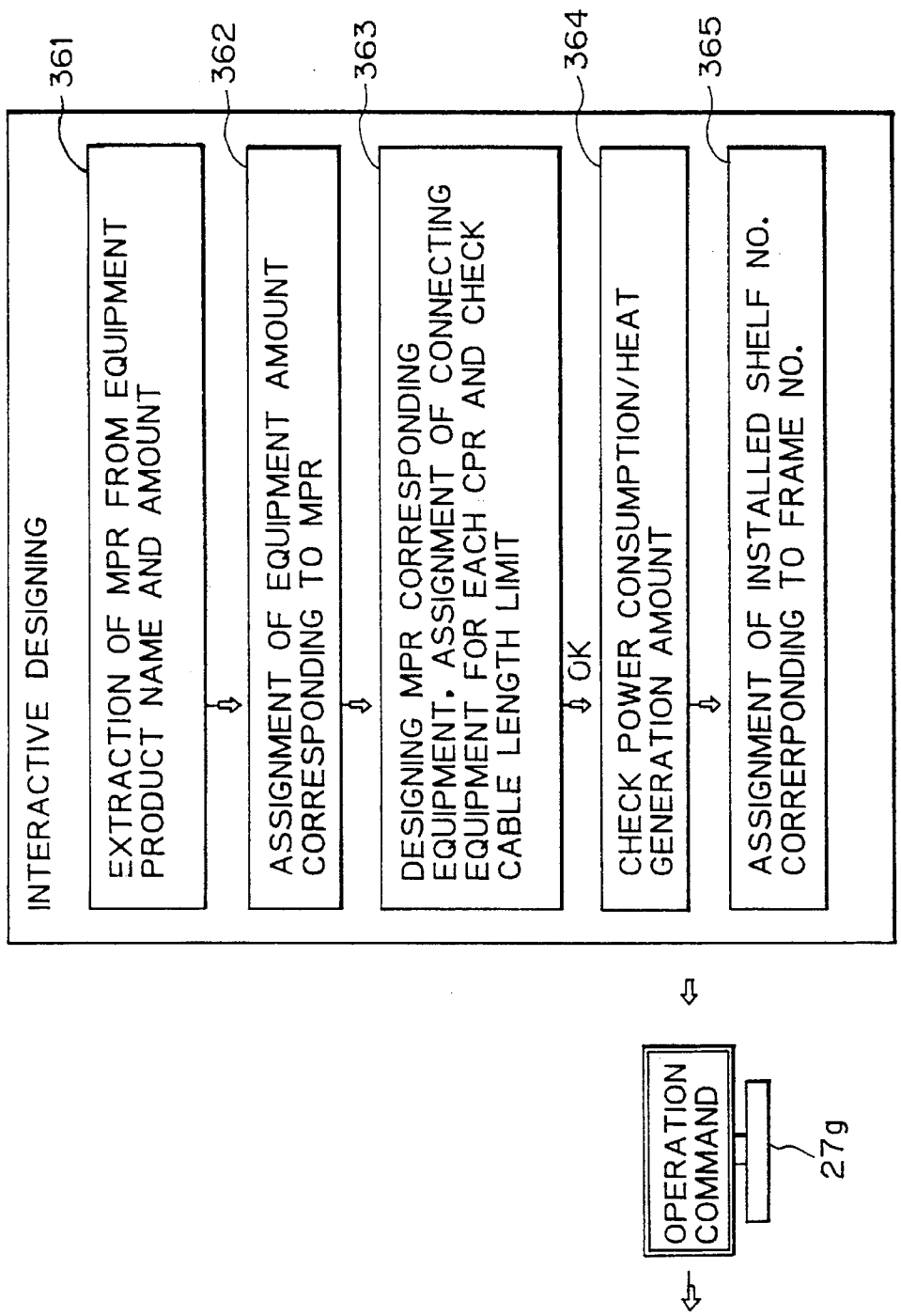

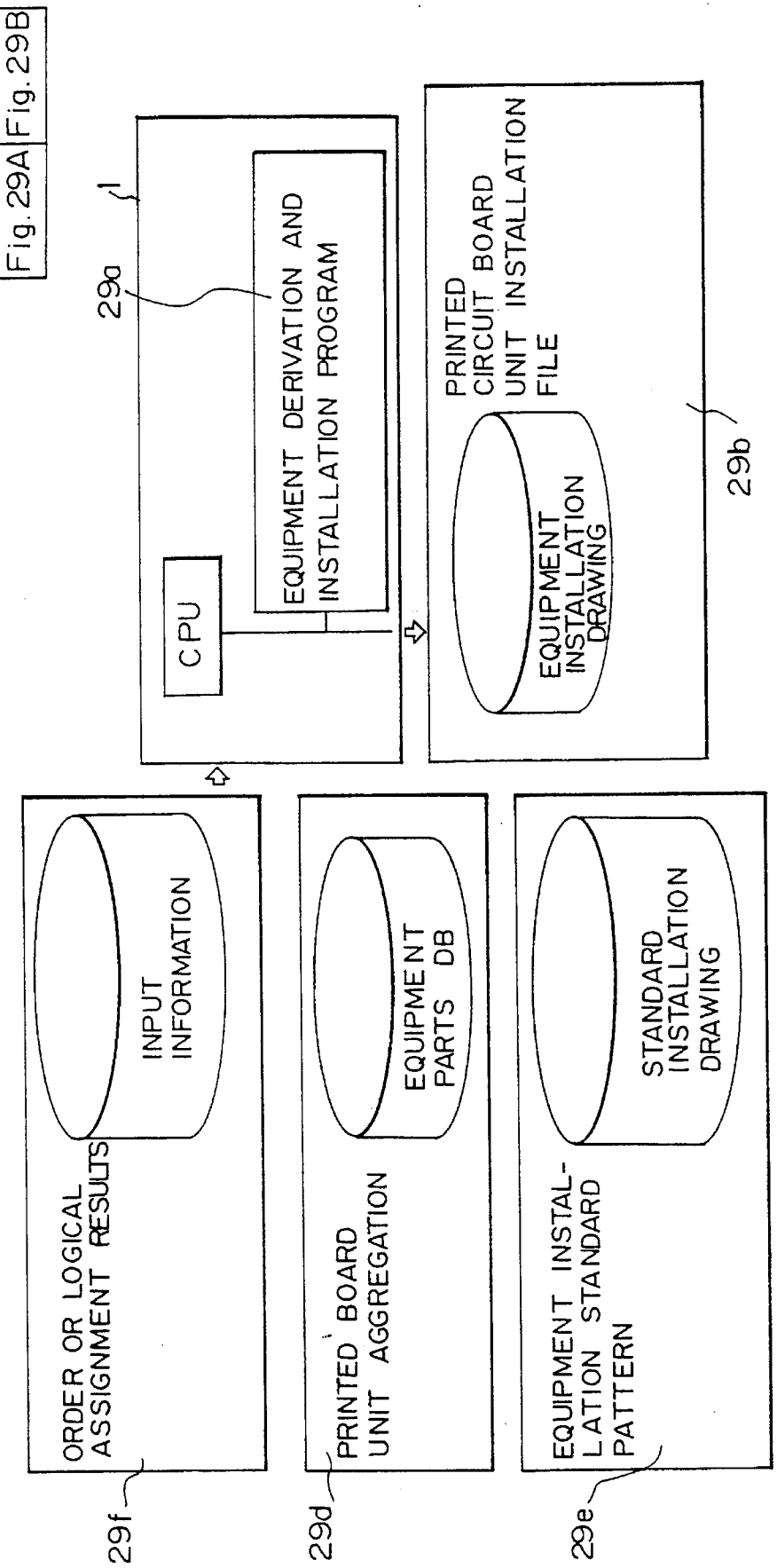

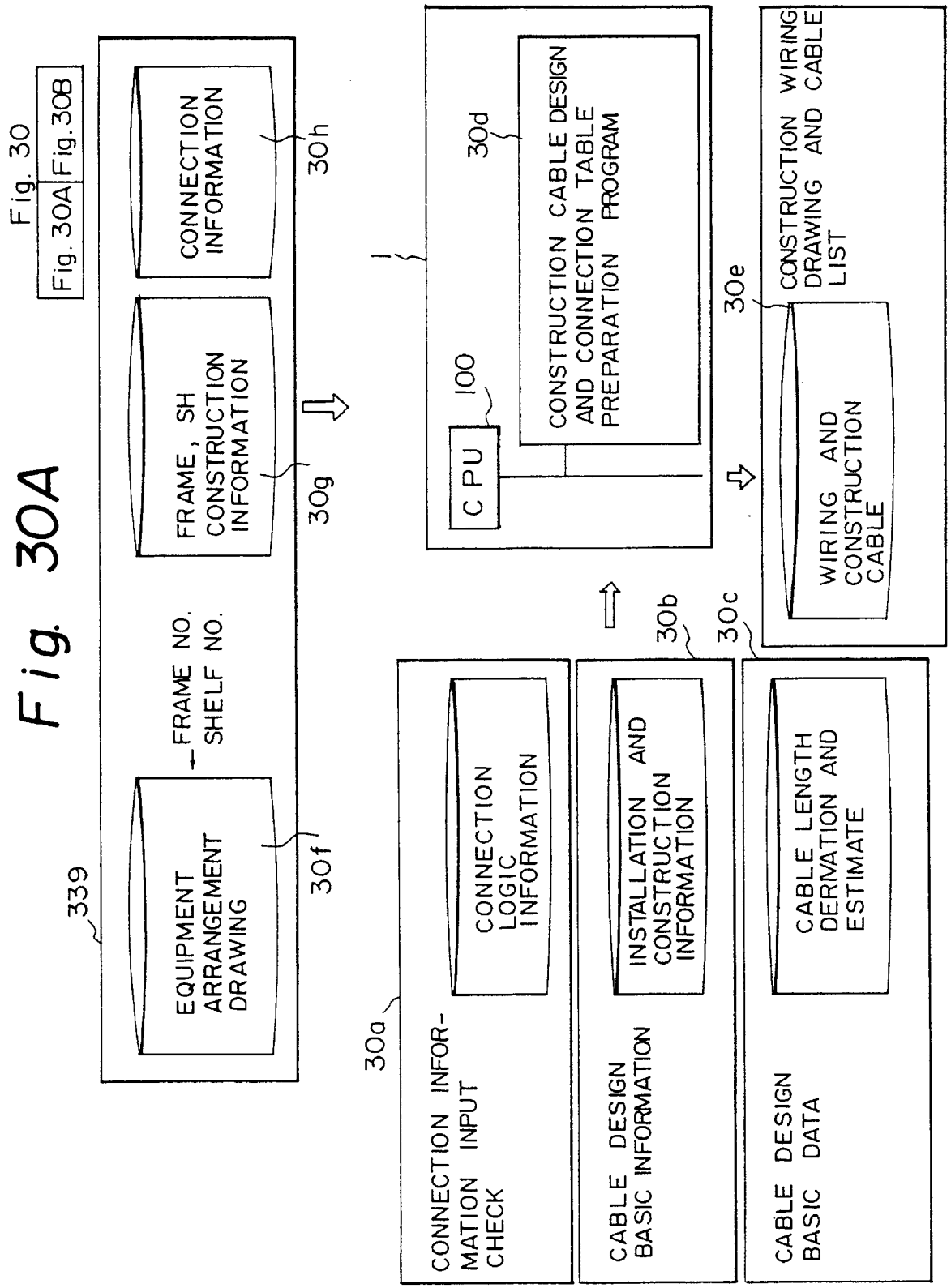

Fig. 31
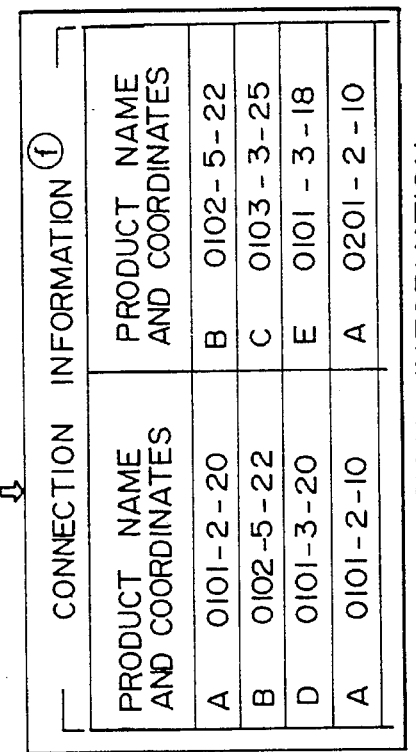
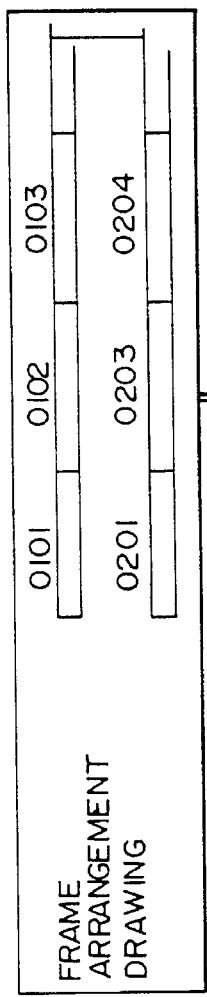
FRAME ARRANGEMENT DRAWING
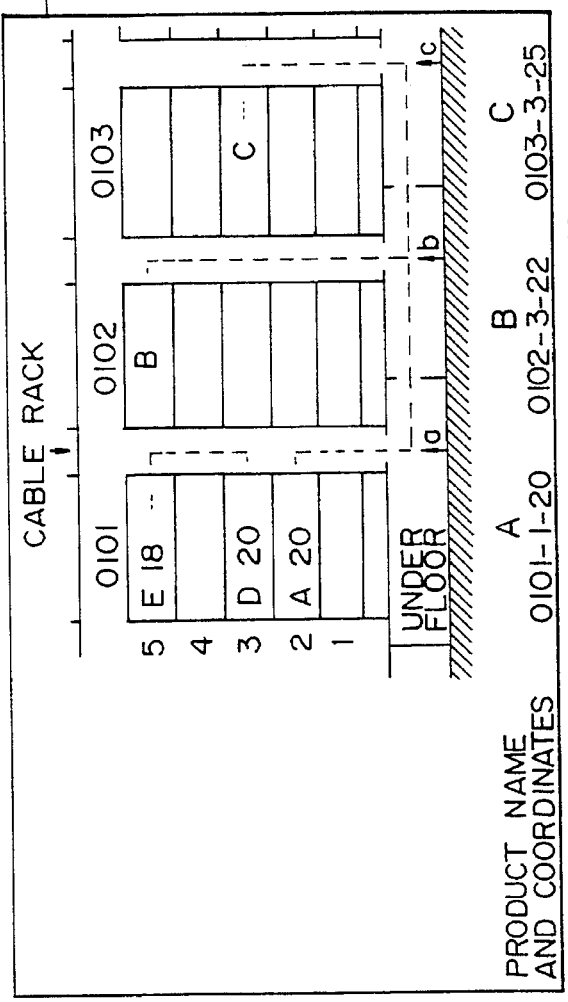
SHELF CONSTRUCTION DRAWING

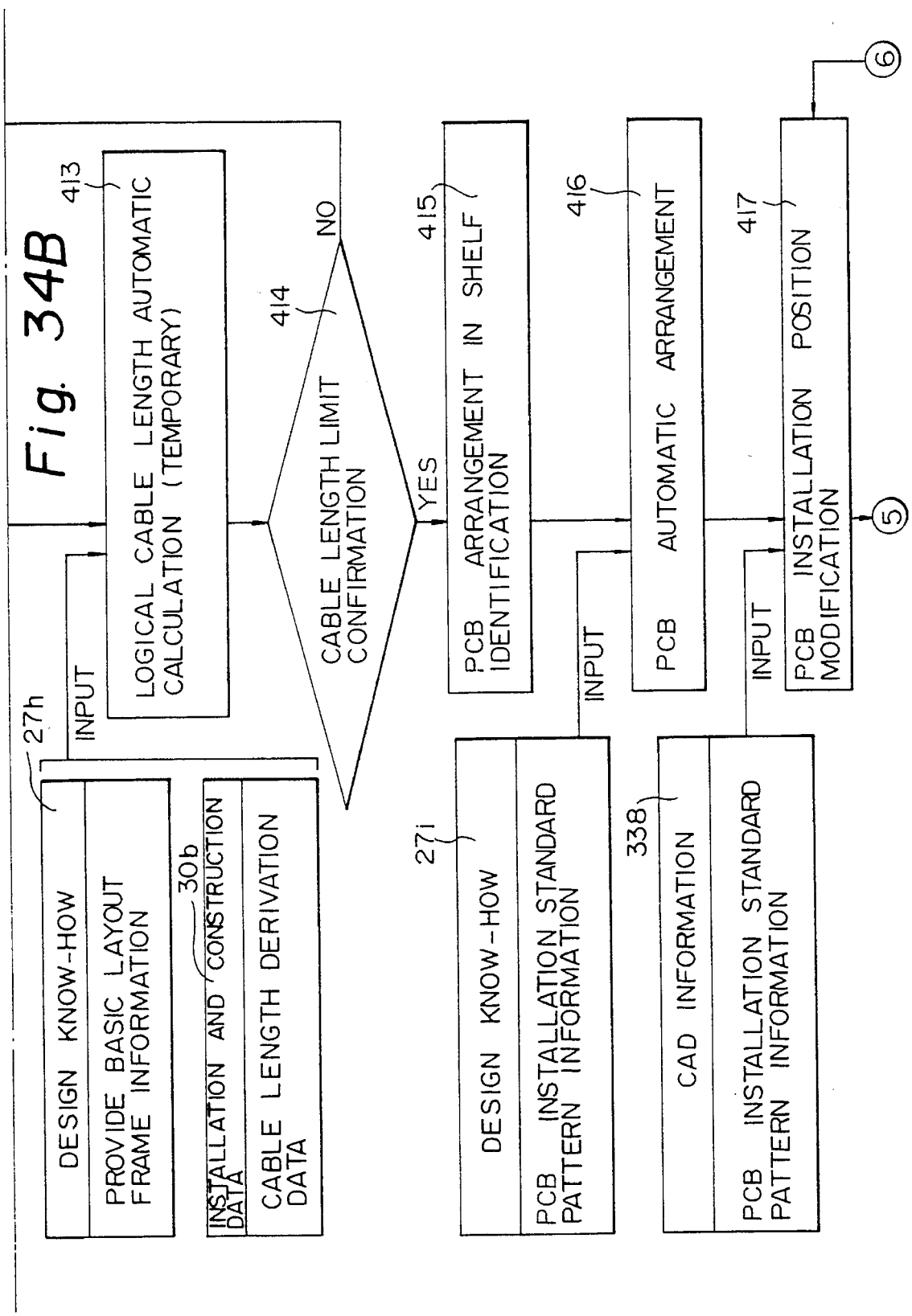

Fig. 36A

- CUSTOMER EQUIPMENT AMOUNT ROUGH ESTIMATE

① CUSTOMER NAME
- INSTALLATION SITE AND INSTALLATION CONDITION
- USE CONDITION AND SO FORTH

② EQUIPMENT ROUGH ESTIMATE

| PRODUCT NAME | SPECIFICATION | AMOUNT |
|---|---|---|
| # SCF | E04B-XXXX-BXX1 | 18 |
| # MPR | E01B-XXX1-CXX1 | 7 |
| # CPR | E01B-XXX2-CXX1 | 6 |
| # LPRSH | E04B-XXX3-CXX1 | 50 |
| # MXT | E20B-2XX1-RXX1 | 100 |
| LC-A | E20B-1XX1-RXX2 | 680 |
| LC-B | E20B-1XX2-RXX3 | 320 |

INDICATES ROUGH ESTIMATE AMOUNT

ROUGH ESTIMATE OF CUSTOMER EQUIPMENT AMOUNT

Fig. 37A

SHELF INFORMATION, FIXED PCB

- CAD INFORMATION

* AASH-A  E04B-XXX1-CXX1
PCB INSTALLATION SLOT 0.6' x 33 (00-32)
POWER CONSUMPTION: 5A
HEAT GENERATION AMOUNT:
(MAXIMUM VALUE)
FIXED PWCB INSTALLATION CONDITION    ─ INSTALLATION ─

| PRODUCT NAME | SPECIFICATION | AMOUNT | WIDTH | POSITION |
|---|---|---|---|---|
| PW0A | E20B-XXX1-RXX1 | 2 | 2 | 00, 29 |
| PW1B | E20B-XXX2-RXX2 | 2 | 2 | 02, 31 |

DESIGNATED INSTALLATION SCHEDULED ARTICLE

| OPTION INSTALLATION POSITION 05 ~ 26 | LC-A  E20B - 1XX1-RXX1 |
|---|---|
| | LC-B  E20B - 1XX2-RXX2 |
| | BCTA  E20B - 1XX3-RXX3 |
| | TRK   E20B - 1XNN-RXNN |
| 4 , 27 | MXT   E20B - 2XX1-RXX1 |

* ABSH-A  E04B-XXX2-CXX2
PCB INSTALLATION SLOT 0.6' x 33 (00-32)
POWER CONSUMPTION: 5A
HEAT GENERATION AMOUNT

FIXED PCB INSTALLATION CONDITION    ─ INSTALLATION ─

| PRODUCT NAME | SPECIFICATION | AMOUNT | WIDTH | POSITION |
|---|---|---|---|---|
| PW0A | E20B-XXX1-RXX1 | 2 | 2 | 00, 32 |
| PW1B | E20B-XXX2-RXX2 | 2 | 1 | 04, 21 |

DESIGNATED INSTALLATION SCHEDULED ARTICLE

| OPTION INSTALLATION POSITION 05 ~ 26 | LC-A  E20B - 1XX1-RXX1 |
|---|---|
| | LC-B  E20B - 1XX2-RXX2 |
| | BCTA  E20B - 1XX3-RXX3 |
| 4 , 27 | MXT   E20B - 2XX1-RXX1 |

Fig. 37B

| PWCB BASIC INFORMATION | *PWOA   E20B-XXX1-RXX1<br>· CONSTRUCTION AND INSTALLATION WIDTH: FC TYPE 0.6'<br>· POWER CONSUMPTION : 3A<br>· HEAT GENERATION AMOUNT : 20W |
|---|---|
| | *PWIB   E20B-XXX2-RXX2<br>· CONSTRUCTION AND INSTALLATION WIDTH: FC TYPE 0.6'<br>· POWER CONSUMPTION : 3A<br>· HEAT GENERATION AMOUNT : 20W |
| | *LC-A   E20B-1XX1-RXX1<br>· CONSTRUCTION AND INSTALLATION WIDTH : FC TYPE 0.6'<br>· POWER CONSUMPTION : 0.5W (USE FREQUENCY)<br>· HEAT GENERATION AMOUNT ┌ USE CONDITION 1  1.2W<br>                                       ├ USE CONDITION 2  0.8W<br>                                       └ USE CONDITION 3  0.6W |
| | *LC-B   E20B-1XX2-RXX2<br>· CONSTRUCTION AND INSTALLATION WIDTH : FC TYPE 0.6'<br>· POWER CONSUMPTION : 0.5W (USE FREQUENCY)<br>· HEAT GENERATION AMOUNT ┌ USE CONDITION 1  1.2W<br>                                       ├ USE CONDITION 2  0.8W<br>                                       └ USE CONDITION 3  0.6W |

Fig. 38

CUSTOMER NAME: FJT  DRAWING NUMBER: E00B-0001-A001

- EXAMPLE OF STATION EQUIPMENT ARRANGEMENT

|    | 01 | 02 | 03 | 04 | 05 |
|----|----|----|----|----|----|
| 01 |    |    |    |    |    |
| 02 |    |    |    |    |    |
| 03 |    |    |    |    |    |
| 04 |    |    |    |    |    |

- EXAMPLE OF FRAME INSTALLATION

SCF-A

| STAGE | 0101 | 0102 | 0103 | 0104 | 0105 |
|-------|--------|--------|--------|---------|--------|
| 5     | ACSH-B |        |        |         |        |
| 4     | ACSH-A | ABSH-B | ABSH-B | ACSH-B  | ACSH-B |
| 3     | LPRSH  | AASH-A | ABSH-A | ACSH-A  | LPCSHA |
| 2     | ABSH-B | LPRSH  | LPRSH  | LPCSHA  | ACSH-A |
| 1     | AASH-B | AASH-B | CPRSH  | ABSH-A  | AASH-B |
| 0     | AASH-A | AASH-A | AASH-B | AASH-B  | AASH-A |
|       |        |        | AASH-A | AASH-A  | AASH-A |

SIDE PLATE →

- EXAMPLE OF SHELF INSTALLATION  8S LCA  8S LCB

| 00 | 01 | 02 | 03 | 04 | 05 | 06 | 07 | 08 | 09 | 10 | 11 |
|----|----|----|----|----|----|----|----|----|----|----|----|
|    | PW56 | PW57 |  |  |  |  |  |  |  |  |  |
|    | MXT |  |  |  |  |  |  |  |  |  |  |

- LOGICAL CONNECTION INFORMATION

⟨EXAMPLE OF CONNECTION DATA BETWEEN FRAMES⟩

| MPR (MPRSH) | CPR(LPRSH) | LPRSH |
|-------------|------------|-------|
| 0203-3      | 0103-3     | 0101-3, 0102-3 |
|             |            | 0103-4, 0104-3 |
|             |            | 0105-3 |
|             | 0203-3     | 0101-3, 0102-3 |
|             |            | 0103-4, 0104-3 |
|             |            | 0105-3 |

FRAME ARRAY NO. IN ARRAY-SHELF INSTALLATION POSITION

⟨EXAMPLE OF CONNECTION DATA IN FRAME⟩

| LPRSH | CONNECTING PCB |
|-------|----------------|
| LPRH  | 0101-2-05, 0101-1-05, 0101-0-05 |
| 0101-3-06 | 0101-4-05, 0101-5-05 |
| LPRH  | 0102-2-05, 0102-1-05, 0102-0-05 |
| 0102-3-06 | 0102-4-05, 0102-5-05 |

FRAME ARRAY NO. IN ARRAY-SHELF INSTALLATION POSITION. PCB INSTALLATION POSITION

Fig. 39A

| CUSTOMER NAME : FJT | | |
|---|---|---|
| PRODUCT NAME | SPECIFICATION | PREPARATION AMOUNT |
| SCF | E04B-XXX1-BXX1 | 20 |
| SIDE PLATE | E210-0001-T001 | 10 |
| CONSTRUCTION | E210-111-T020 | 20 |
| MATERIAL FIXTURE | E250-2222-T120 | 40 |
| MPR | E01B-XXX1-CXX1 | 1 |
| CPR | E01B-XXX2-CXX1 | 8 |
| LPRSH | E04B-XXX3-CXX1 | 50 |
| MXT | E20B-2XX1-RXX1 | 110 |
| LC-A | E20B-1XX1-RXX1 | 680 |
| LC-B | E20B-1XX2-RXX2 | 320 |
| ⋮ | ⋮ | ⋮ |

A. EQUIPMENT PREPARATION AMOUNT

| PRODUCT NAME | DRAWING NUMBER | AMOUNT |
|---|---|---|
| CONNECTION CABLE A | E660-XXX1-T001 | 20 |
| CONNECTION CABLE B | E660-XX1-T010 | 15 |
| CONNECTION CABLE C | E660-2XX1-T005 | 130 |
| ⋮ | ⋮ | |

B. CONNECTION CABLE PREPARATION LIST

| PRODUCT NAME | AMOUNT | UNIT VALUE | COST |
|---|---|---|---|
| CONNECTION CABLE A | 2 | 25 000 | 50 000 |
| CONNECTION CABLE B | 15 | 20 000 | 400 000 |
| CONNECTION CABLE C | 130 | 5 000 | 650 000 |

C. CONNECTION CABLE ESTIMATE AMOUNT

Fig. 39B
| PRODUCT NAME | AMOUNT | WORK LOAD |
|---|---|---|
| CONNECTION CABLE A | 2 | 0.5 × 1 = 1.0 H |
| CONNECTION CABLE B | 15 | 0.5 × 15 = 7.5 H |
| CONNECTION CABLE C | 130 | 0.2 × 130 = 5.2 H |
| ⋮ | ⋮ | ⋮ |
D WIRING WORK LOAD ESTIMATE
| PRODUCT NAME | NO. | CONNECTING ESTIMATION |
|---|---|---|
| CONNECTION CABLE A | ① | 0203-3-06-0103-3-05 |
|  | ② | 0203-3-06-0303-5-05 |
E CABLE CONNECTION TABLE
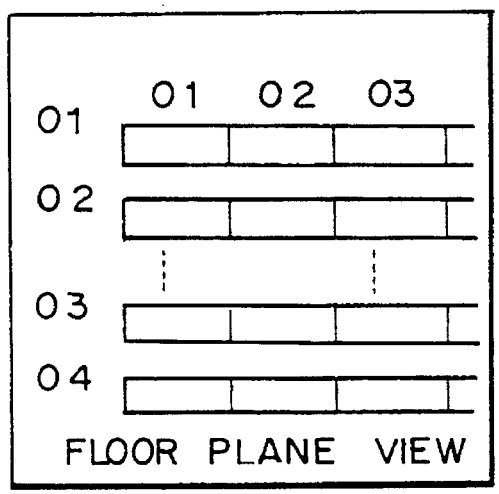
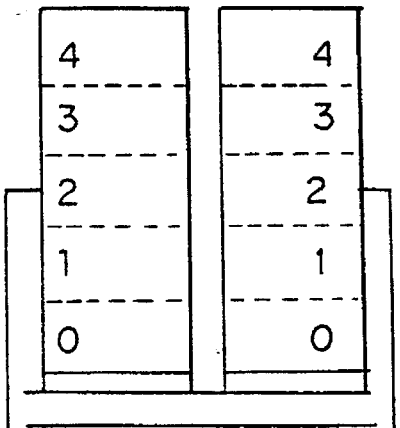
F EXAMPLE OF CONNECTION CABLE ROUTE DRAWING

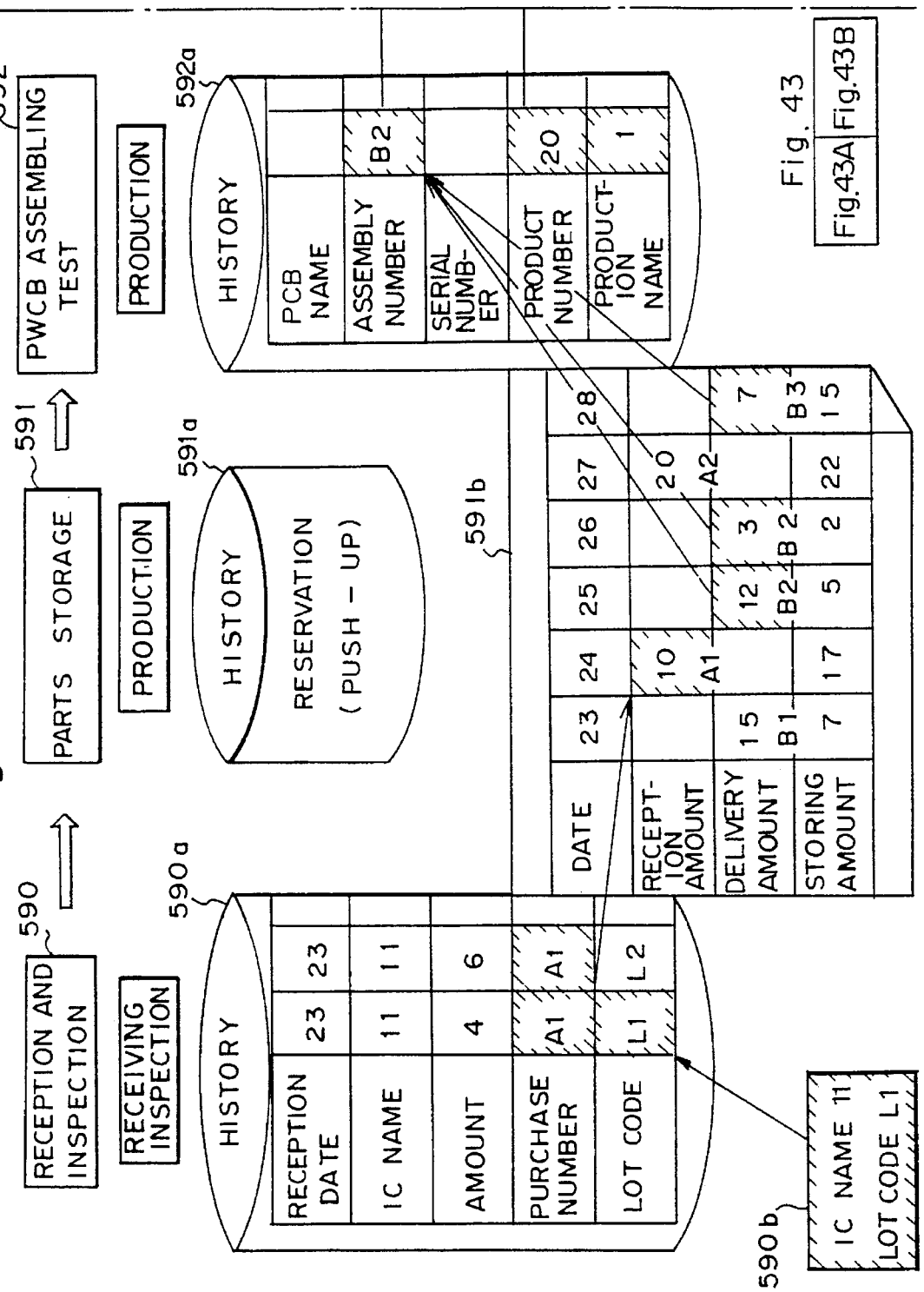

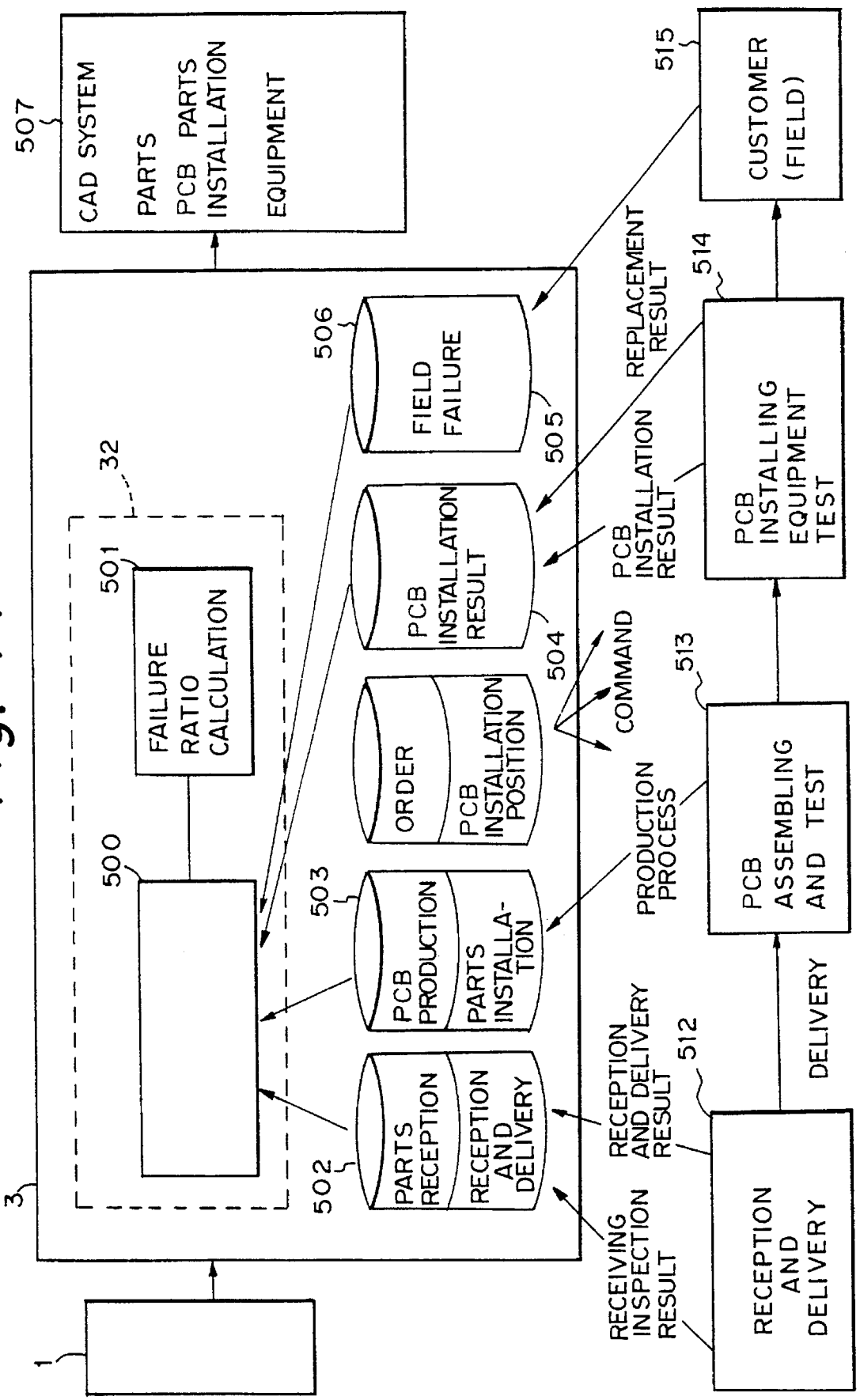

Fig. 48

| Field | Value |
|---|---|
| PARTS NAME | IC11 |
| LOT CODE | 901A00 |
| SHELF NAME | SLCSHA |
| SHELF DRAWING NUMBER | E04B-3012-C002 |
| PRODUCT NUMBER | D01111NA |
| DELIVERED CUSTOMER | XX TELEPHONE OFFICE |
| SHELF PRODUCTION YEAR AND MONTH | 90-12 |
| SHELF PRODUCT NUMBER | 1000 |
| SHELF SERIAL NUMBER | 01A |
| PCB INSTALLATION POSITION | FIRST ROW |
| PCB NAME | 8SLCB |
| PCB DRAWING NUMBER | E20B-4514-R000 |
| PCB SERIAL NUMBER | 05B |
| PCB PRODUCTION YEAR AND MONTH | 9012 |
| PCB PRDUCT NUMBER | 0001 |

Fig. 49(a)

| ITEM | SAMPLE |
|---|---|
| PARTS NAME | IC11 |
| RECEPTION DATE | 901121 |
| RECEPTION AMOUNT | 100 |
| PURCHASE NUMBER | PA01 |
| LOT CODE | 901A00 |

Fig. 49(b)

| ITEM | SAMPLE |
|---|---|
| PARTS NAME | IC11 |
| RECEPTION DATE | 901121 |
| RECEPTION AMOUNT | 1001 |
| PURCHASE NUMBER | PA01 |
| DELIVERY AMOUNT | 20 |
| ASSEMBLY NUMBER | NG0001NA |
| PCB NAME | 8SLCB |
| PCB DRAWING NUMBER | E20B-4514-R000 |
| PCB AMOUNT | 10 SHEETS |
| PCB SERIAL NUMBER | 05B |

Fig. 49(c)

|  |  |
|---|---|
| PCB NAME | 8SLCB |
| PCB DRAWING NUMBER | E20B-4514-R000 |
| PCB SERIAL NUMBER | 05B |
| PCB PRODUCTION YEAR AND MONTH | 9012 |
| PCB PRODUCT NUMBER | 0001 |
| SHELF NAME | SLCSHA |
| SHELF DRAWING NUMBER | E04B-3012-C002 |
| PRODUCT NUMBER | D011111NA |
| DELIVERED CUSTOMER | XX TELEPHONE OFFICE |
| SHELF PRODUCTION YEAR AND MONTH | 90-12 |
| SHELF PRODUCT NUMBER | 1000 |
| SHELF SERIAL NUMBER | 01A |
| PCB NSTALLATION POSITION | FIRST ROW |

Fig. 49(d)

| ITEM | SAMPLE |
|---|---|
| ASSEMBLY NUMBER | N G00001NA |
| PCB NAME | 8SLCB |
| PCB DRAWING NUMBER | E20B-4514-R000 |
| PCB SERIAL NUMBER | 05B |
| PCB PRODUCTION YEAR AND MONTH | 9012 |
| PCB PRODUCT NUMBER | 0001 |
| PRODUCTION DATE | 901215 |
| PRODUCTION SITE | A5 |

PARTS FAILURE AGGREGATION PROCESS FLOWCHART

Fig. 53(a)

| ITEM | SAMPLE |
|---|---|
| PCB NAME | 8SLCB |
| PCB DRAWING NUMBER | E20B-4514-R000 |
| PCB SERIAL NUMBER | 05B |
| PCB PRODUCTION YEAR AND MONTH | 9012 |
| PCB PRODUCT NUMBER | 0001 |
| SHELF NAME | SLCSHA |
| SHELF DRAWING NUMBER | E04B-3012-C002 |
| PRODUCT NUMBER | D01111NA |
| DELIVERED CUSTOMER | XX TELEPHONE OFFICE |
| SHELF PRODUCTION YEAR AND MONTH | 90-12 |
| SHELF PRODUCT NUMBER | 1000 |
| SHELF SERIAL NUMBER | 01A |
| PCB INSTALLATION POSITION | FIRST ROW |
| PARTS NAME | IC11 |
| LOT CODE | 901A00 |

Fig. 53(b)

| ITEM | SAMPLE |
|---|---|
| PCB NAME | 8SLCB |
| PCB DRAWING NUMBER | E20B-4514-R000 |
| PCB SERIAL NUMBER | 05B |
| PCB PRODUCTION YEAR AND MONTH | 9012 |
| PCB PRODUCT NUMBER | 0001 |
| SHELF NAME | SLCSHA |
| SHELF DRAWING NUMBER | E04B-3012-C002 |
| PRODUCT NUMBER | D01111NA |
| DELIVERED CUSTOMER | XX TELEPHONE OFFICE |
| DELIVERY DATE | 901215 |
| SHELF PRODUCTION YEAR AND MONTH | 90-12 |
| SHELF SERIAL NUMBER | 1000 |
| SHELF SERIAL NUMBER | 01A |
| PCB INSTALLATION POSITION | FIRST ROW |

Fig. 53(c)

| ITEM | SAMPLE |
|---|---|
| PCB DRAWING NUMBER | E20B-4514-R000 |
| PCB SERIAL NUMBER | 05B |
| PARTS NAME | IC11 |
| USED AMOUNT | 51 |

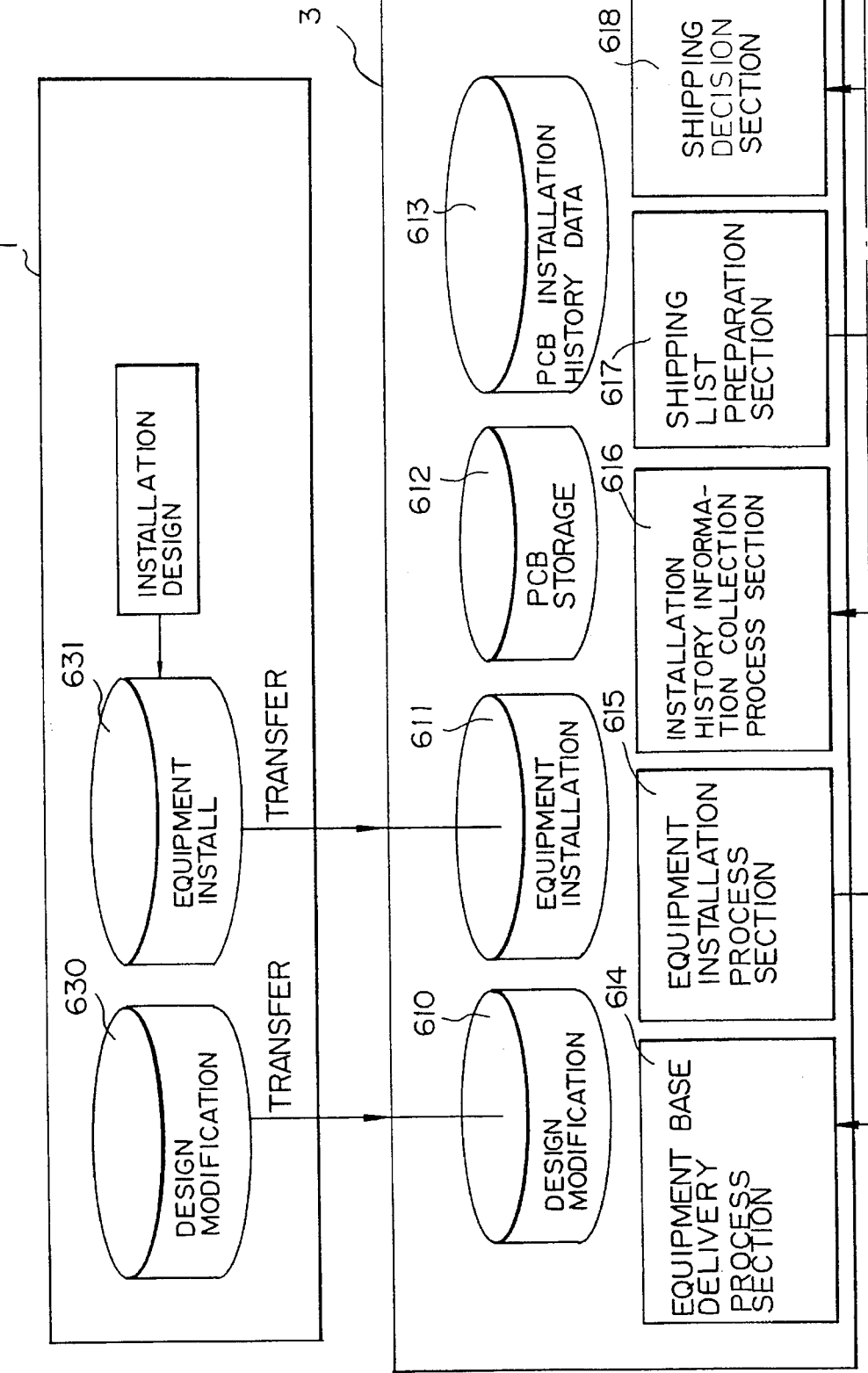

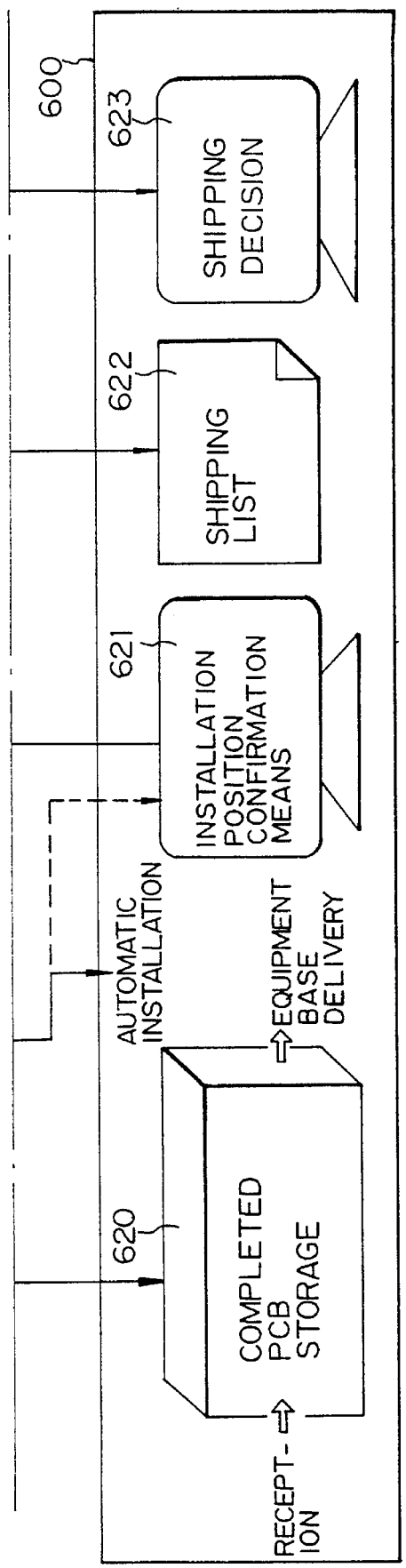

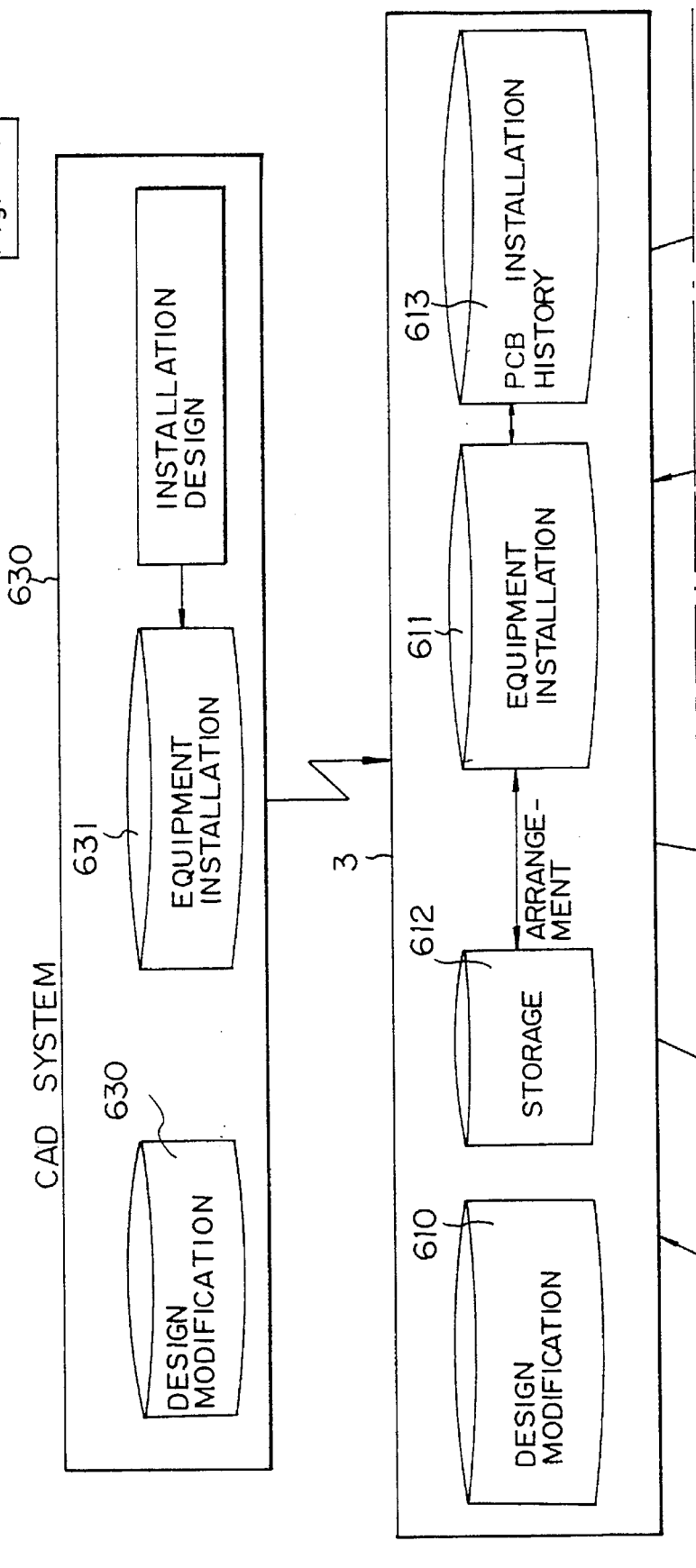

Fig. 59(A)

| ITEM | SAMPLE |
|---|---|
| SHELF NAME | SLCSHA |
| SHELF DRAWING NUMBER | E04B-3012-C002 |
| SHELF PRODUCTION YEAR AND MONTH | 90-12 |
| SHELF PRODUCT NUMBER | 1000 |

Fig. 59(B)

| ITEM | SAMPLE |
|---|---|
| PCB NAME | PW56 |
| PCB DRAWING NUMBER | E20B-4514-R660 |
| PCB PRODUCTION YEAR AND MONTH | 90-12 |
| PCB PRODUCT NUMBER | 0001 |
| PCB INSTALLATION POSITION | FIRST ROW |

Fig. 60(a)

| ITEM | SAMPLE |
|---|---|
| PCB NAME | PW56 |
| PCB DRAWING NUMBER | E20B-4514-R660 |
| PCB PRODUCTION YEAR AND MONTH | 90-12 |
| PCB PRODUCT NUMBER | 0001 |
| PCB SERIAL NUMBER | 05B |
| STORAGE SHELF NUMBER | 6-05-095 |
| RECEPTION DATE | 901201 |

Fig. 60(b)

| ITEM | SAMPLE |
|---|---|
| SHELF NAME | SLCSHA |
| SHELF DRAWING NUMBER | E04B-3012-C002 |
| PRODUCT NUMBER | D01111NA |
| DELIVERED CUSTOMER | XX TELEPHONE OFFICE |
| PCB INSTALLATION POSITION 1 | FIRST ROW |
| PCB NAME 1 | RW56 |
| PCB DRAWING NUMBER 1 | E20B-4514-R660 |
| ⋮ | ⋮ |
| PCB INSTALLATION POSITION n | nTH ROW |
| PCB NAME n | 8SLCB |
| PCB DRAWING NUMBER n | E20B-4514-R000 |

Fig 60(c)

| ITEM | SAMPLE |
|---|---|
| SHELF NAME | SLCSHA |
| SHELF DRAWING NUMBER | E04B-3012-C002 |
| PRODUCT NUMBER | D01111NA |
| DELIVERY DATE | 910120 |
| SHELF PRODUCTION YEAR AND MONTH | 90-12 |
| SHELF PRODUCT NUMBER | 1000 |
| SHELF SERIAL NUMBER | 01A |

Fig. 62(A)

| | |
|---|---|
| PCB NAME | PW56 |
| PCB PRODUCTION YEAR AND MONTH | 90-12 |
| PCB PRODUCT NUMBER | 001 |
| PCB SERIAL NUMBER | 05B |
| SHELF NAME | SLCSHA |
| SHELF DRAWING NUMBER | E04B-3012-C002 |
| SHELF PRODUCTION YEAR AND MONTH | 90-12 |
| SHELF PRODUCT NUMBER | 1000 |
| SHELF SERIAL NUMBER | 01A |
| SHELF INSTALLATION POSITION | FIRST ROW |

Fig. 62 (B)

| ITEM | SAMPLE |
|---|---|
| PCB NAME | PW56 |
| PCB DRAWING NUMBER | E20B-4514-R660 |
| PCB PRODUCTION YEAR AND MONTH | 90-12 |
| PCB PRODUCT NUMBER | 0001 |
| PCB SERIAL NUMBER | 05B |
| SHELF NAME | SLCSHA |
| SHELF DRAWING NUMBER | E04B-3012-C002 |
| PRODUCT NUMBER | D01111NA |
| DELIVERED CUSTOMER | XX TELEPHONE OFFICE |
| SHELF PRODUCTION YEAR AND MONTH | 90-12 |
| SHELF PRODUCT NUMBER | 1000 |
| SHELF SERIAL NUMBER | 01A |
| PCB INSTALLATION POSITION | FIRST ROW |

Fig. 63(a)

| ITEM | SAMPLE |
|---|---|
| PCB NAME | PW56 |
| PCB DRAWING NUMBER | E20B-4514-R660 |
| PCB PRODUCTION YEAR AND MONTH | 90-12 |
| PCB PRODUCT NUMBER | 0001 |
| PCB SERIAL NUMBER | 05B |
| STORAGE SHELF NUMBER | 6-05-095 |
| RECEPTION DATE | 901201 |

Fig. 63(b)

| ITEM | SAMPLE |
|---|---|
| SHELF NAME | SLCSHA |
| SHELF DRAWING NUMBER | E04B-3012-C002 |
| PRODUCT NUMBER | D0111INA |
| DELIVERRED CUSTOMER | XX TELEPHONE OFFICE |
| PCB INSTALLATION POSITION 1 | FIRST ROW |
| PCB NAME 1 | PW56 |
| PCB DRAWING NUMBER 1 | E20B-4514-R660 |
| ... | ... |
| PCB INSTALLATION POSITION n | nTH ROW |
| PCB NAME n | 8SLCB |
| PCB DRAWING NUMBER n | E20B-4514-R000 |

Fig. 63(c)

| ITEM | | SAMPLE |
|---|---|---|
| OLD PCB | DRAWING NUMBER | E20B-4514-R660 |
| OLD PCB | PRODUCTION YEAR AND MOTH | 90-12 |
| OLD PCB | PRODUCT NUMBER | 0001 |
| OLD PCB | SERIAL NUMBER | 05B |
| NEW PCB | DRAWING NUMBER | E20B-4514-R900 |
| NEW PCB | PRODUCTION YEAR AND MONTH | 90-12 |
| NEW PCB | PRODUCT NUMBER | 0111 |
| NEW PCB | SERIAL NUMBER | 06B |

Fig. 63(d)

| ITEM | SAMPLE |
|---|---|
| SHELF NAME | SLCSHA |
| SHELF DRAWING NUMBER | E04B-3012-C002 |
| PRODUCT NUMBER | D01111NA |
| DELIVERY DATE | 910120 |
| SHELF PRODUCTION YEAR AND MONTH | 90-12 |
| SHELF PRODUCTION NUMBER | 1000 |
| SHELF SERIAL NUMBER | 01A |

Fig. 65

| SHELF NAME | SLCSHA | RRODUCT NUMBER | D01111NA |
|---|---|---|---|
| SHELF DRAWING NUMBER | E04B-3012-C002 | DELIVERED CUSTOMER | XX TELEPHONE OFFICE |
| SHELF PRODUCTION YEAR AND MONTH | 90-12 | SERIAL NUMBER | 01A |
| SHELF PRODUCT NUMBER | 1000 | | |

| SLOT NUMBER | PWCB NAME | YEAR. MONTH | NO. | SERIAL NUMBER |
|---|---|---|---|---|
| 1 | PW55 | 90-11 | 0030 | 02 A |
| 2 | PW56 | 90-12 | 0001 | 01 A |
| 3 | 8SLCA | 90-12 | 0100 | 05 B |
| 4 | 8SLCA | 90-12 | 0101 | 05 B |
| 5 | 8SLCA | 90-12 | 0102 | 05 B |
| 6 | 8SLCA | 90-12 | 0103 | 05 B |
| 7 | 8SLCB | 90-12 | 0301 | 08 B |
| 8 | 8SLCB | 90-12 | 0302 | 08 B |
| 9 | 8SLCB | 90-12 | 0303 | 08 B |
| ⋮ | ⋮ | | | |
| 30 | 8SLCB | 90-12 | 0400 | 08 B |
| 31 | PW56 | 90-12 | 0003 | 01 A |
| 32 | PW55 | 90-11 | 0031 | 02 A |

Fig. 66

| ITEM | SAMPLE |
|---|---|
| PCB NAME | PW56 |
| PCB DRAWING NUMBER | E20B-4514-R660 |
| PCB PRODUCTION YEAR AND MONTH | 90-12 |
| PCB PRODUCT NUMBER | 0001 |
| PCB SERIAL NUMBER | 05B |
| SHELF NAME | SLCSHA |
| SHELF DRAWING NUMBER | E04B-3012-C002 |
| PRODUCT NUMBER | D01111NA |
| DELIVERED CUSTOMER | XX TELEPHONE OFFICE |
| SHELF PRODUCTION YEAR AND MONTH | 90-12 |
| SHELF PRODUCT NUMBER | 1000 |
| SHELF SERIAAL NUMBER | 01A |
| PCB INSTALLATION POSITION | FIRST ROW |

Fig. 68

| | |
|---|---|
| PCB NAME | PW56 |
| PCB PRODUCTION YEAR AND MONTH | 90-12 |
| PCB PRODUCT NUMBER | 0001 |
| PCB OLD SERIAL NUMBER | 05B |
| PCB NEW SERIAL NUMBER | 06C |
| SHELF NAME | SLCSHA |
| SHELF DRAWING NUMBER | E04B-3012-C002 |
| SHELF PRODUCTION YEAR AND MONTH | 90-12 |
| SHELF PRODUCT NUMBER | 1000 |
| PCB INSTALLATION POSITION | FIRST ROW |

Fig. 69(a)

| ITEM | SAMLE |
|---|---|
| PCB NAME | PW56 |
| PCB DRAWING NUMBER | E20B-4514-R660 |
| PCB PRODUCTION YEAR AN MONTH | 90-12 |
| PCB PRODUCT NUMBER | 0001 |
| PCB SERIAL NUMBER | 05B |
| SHELF NAME | SLCSHA |
| SHELF DRAWING NAME | E04B-3012-C002 |
| PRODUCT NUMBER | D01111NA |
| DELIVERED CUSTOMER | XX TELEPHONE OFFICE |
| SHELF PRODUCTION YEAR AND MONTH | 90-12 |
| SHELF PRODUCT NUMBER | 1000 |
| SHELF SERIAL NUMBER | 01A |
| PCB · INSTALLATION POSITION | FIRST ROW |
| EQUIRMENT TEST COMPLETION DATE | 901222 |

Fig. 69(b)

| ITEM | SAMPLE |
|---|---|
| PCB NAME | PW56 |
| PCB DRAWING NUMBER | E20B-4514-R660 |
| PCB OLD SERIAL NUMBER | 05B |
| PCB NEW SERIAL NUMBER | 06C |
| APPLICABLE PRODUCT NUMBER | D01111NA |
| REASON OF MODIFICATION | CUSTOMERS SPECIFICATION MODIFICATION |

MANAGEMENT SYSTEM FOR MANUFACTURE

This application is a continuation, of application Ser. No. 07/855,062, filed Mar. 19, 1992, now abandoned.

BACKGROUND OF THE INVENTION

1. Field of the Invention

The present invention relates to a system for managing and controlling manufacturing products. More specifically, the invention relates to a management system for the manufacture of products assembled using a plurality of component parts, which concentrically controls production processes and allows automated production in a unified manner.

2. Description of the Related Art

The present invention is directed to production including intermediate components, called "parts", assembled with a plurality of elementary parts, elements and so forth, semi-final products and completed final products composed of a plurality of parts, such as exchanges or switchboards and so forth, or components of the final products, such as shelves, frames of the exchanges and so forth.

It should be noted that the application of management of manufacturing according to the invention is not limited to the field listed above but can be applied to a variety of fields. However, the present invention is particularly applicable for manufacturing lines, in which parts or arrangement of parts and so forth are frequently changed owing to demand of the customer, and for the production processes having complicated production line constructions causing problems in overall management.

One of the typical fields involved in such fields is the field of communication equipment or facilities. Therefore, the following discussion will concern the field of communication principally related to exchanges.

In the manufacturing industry of communication equipment and facilities, there are a number of combinations of components and installation conditions depending upon the difference in communication systems in various countries and/or of demanded options of the customers. Therefore, it is necessary to make installation designs corresponding to orders from different customers. On the other hand, it is sometimes necessary to add a function or increase the number of channels and so forth in response to demands from the customers, even after shipping the products. For appropriately responding to such requests from the customers, it is necessary to maintain accurate hysteresis information on the respective equipment and/or facilities. For this, it is highly desirable to establish a production management system to facilitate the management of hysteresis information on the respective communication equipment and/or facilities.

For example, a discussion will be given on the production of printed circuit boards (PCBs) of electronic circuits means on each of which a plurality of parts are installed, and for the production of shelves installing a variety of the electronic circuit printed boards (PCB), i.e., a printed circuit board, and the construction of exchanges forming device frames consisting of shelves assembled in different construction.

FIG. 1 is an explanatory illustration showing a process for installation designing for respective customers in the prior art, FIG. 2 is an explanatory illustration showing a method of collection of information of production, inspection and production history of the prior art, and FIG. 3 is an explanatory illustration showing the conventional method for managing information related to already installed equipment.

As shown in FIG. 1, during installation designing for equipment adapting to demands from customers in the prior art, order sheets (b) are prepared based on information of estimate and order. Also, by a CAD system (computer aided designing system), hardcopy output containing a parts preparation list, installation drawings and constructional information (d) based on parts preparation information, basic installation information (c), and so forth. According to order sheet b and the parts preparation list, installation drawings and constructional information (d), designers manually perform a designing operation f by confirming each item and checking conditions (h) using their own knowledge as know-how and/or manuals and thus prepare drawings g for components installation, including production processes, facility designs and so forth. For such operation, it is required to perform a comparative check of a number of components or equipment, checking against the installation drawings. Therefore, a substantial number of designing steps is required to make said operation a cost and labor intensive operation.

As shown in FIG. 2, in the prior art, a production process is performed by delivering electronic circuit printed board units (PKGs) (a) and/or shelves (SH: components to be installed in the unit) (b) for a unit of equipment ordered the customer, and by distributing the delivered electronic circuit board units and/or the shelves for installation on respective electronic circuit printed board units of the equipment. In such a conventional process, it is substantially time-consuming work to align the edges of the electronic circuit printed board units. Furthermore, to obtaining shipping information, the total number of boards is manually mounted and then the number thereof is written on a shipping list.

In addition, as shown in FIG. 3, the conventional way of management of information of installed equipment and/or facilities is performed by establishing a data base (f) for the shipping equipment information control by manually adding data formed in sheets (b)–(d) based upon informations of orders, designs, design modifications to total board number information of the electronic circuit printed board collected through the shipping list (a) output from an inspection station. Such operation requires a substantial work load.

As set forth above, the conventional process requires different installation designs for respective customers and for respective orders. In addition, management of production of electronic equipments for which the management of delivery history is required, has been performed independently at respective stations causing a substantial work load. Furthermore, since each station performs an operation unrelated to other stations, a firm co-relation between the stations does not exist thereby causing problems in controlling the quality of information from delivered equipment histories.

In another way, as shown in FIG. 4, an equipment derivation chart (c') is prepared by performing derivation (b') for an estimate and equipment depending upon customer conditions (a'), such as communication traffic condition, terminal layout condition, power supply condition, line capacity condition and so forth. Using the derived equipment information, a designing operation is performed manually with designing know-how (in a form of designer's knowledge and/or written instructions). Initially, a floor layout d' is designed to obtain a drawing showing floor layout (arrangement of frames on the floor) as shown by encircled FIG. 1. Then, an arrangement design (e') for the equipment frame is performed to obtain an arrangement of shelves as shown by encircled FIG. 2. Finally, an electronic unit arrangement design f' is performed to obtain an arrangement of drawings as shown by the encircled FIG. 3 for the arrangement of the electronic circuit units.

In the latter process, a designing process for equipment installation drawings (g) for determining the installation arrangement of electronic circuit printed boards is substantially the same as that illustrated in FIG. 1 but differs in the following points.

First of all, in view of the conditions for installation of the equipment, equipment installation design (f) for a specific customer is manually performed. At this time, confirmation of parts lists with respect to drawing number information on the order, a comparative check of the installation drawings and equipment installation drawings for checking installation position, a check of the installation width of the printed board unit and so forth, limitation on cable lines and a check of the installation position, for the same check conditions as those of FIG. 1, are performed (h). As a result, respective equipment installation drawings (g) for a customer, for construction and for installation are prepared.

Next, the conventional process for designing the constructed related drawings will be discussed with reference to FIG. 6. A reference is made to the construction and construction work manuals (Ka), drawings (equipment installation drawings, connecting condition drawings, construction information and so forth) (Kb) provided from a design center, know-how information (Kc) for construction designing, conditions for construction work design and design information (Kd), as input information. In the construction designing center, equipment installation design (Ke) for a specific customer is performed manually. During this process, preparation of drawings adapting to in-site installation of the equipment based on the designing drawings, designing of connecting cables and so forth on the basis of the connecting condition, designing and preparation for constructional equipment on the basis of an arrangement of the equipment are performed (Kf). By this process, the drawings for construction (Kg) are prepared.

As set forth above, in the prior art, if an order-made design for a specific client, is required, necessary operations including a calculation for a number of equipments to be prepared to comply with the customer's order, and for designing equipment installation, and construction design are performed manually. Therefore, it requires a substantial labor work load. In addition, because of manual work, there is the possibility of human error resulting in poor design quality.

Therefore, it is an object of the present invention to provide a management system that allows concentrated management for a process for equipment installation designing for respective customers and respective orders concerning production, inspection and shifting and thus allows a concentration of information throughout the process.

SUMMARY OF THE INVENTION

In order to accomplish the above-mentioned object, the present invention provides an equipment production management system for assembling parts units from a plurality of mutually different types of elementary parts and selectively combining a plurality of types of parts units to form equipment as a final product through a production process, which comprises: the production process at least including steps of producing the parts units selecting a variety of elementary parts, storing the part units in storage, selecting necessary parts units stored for assembling the equipment; and shipping the completed equipment, wherein the system including a central control unit for managing at least part of the processes in an unified manner and an information inputting and outputting terminal for exchanging information with the central control means; the central control means at least including a design data file and a design know-how data file, an equipment installation designing means and an arithmetic processing unit; the equipment installation means generates an equipment installation data file from the design data file and the design know-how data file for transferring necessary information of the equipment installation data file to the processes so that at least one operation in the process is performed automatically.

In another aspect of the invention, in the basic construction as set forth above, a customer base order data file is employed for providing more effective and detailed management.

In the equipment production management system, according to the present invention, is particularly applicable to the field of communication equipment. However, the application of the present invention is not limited to the field as filed but can be used in a variety of fields in which a variety of products are to be produced in response to orders from a variety of customers.

Accordingly, in the present invention, the equipment production management system may be applied to the process of delivering selected parts among a plurality of types of parts in an appropriate storage by an appropriate means after confirmation of availability of the selected parts, and automatically or manually assembling the selected parts to a predetermined substrate, frame or box and so forth to form a predetermined unit, parts or completed equipment. As an alternative, the invention is applied to the process of further storing assembled parts, units and so forth in different storage areas, and is responsive to other instructions, concerning delivering the parts or units from the storage after checking availability thereof, and automatically or manually assembling the delivered parts or units into the completed equipment or part of the equipment.

In particular, in the equipment production management system according to the present invention, since the design information, design know-how information, design modification information, customer order information, and production and shipping history information, storage information, failure information and so forth necessary for production of the parts, units or final equipment, it is possible to realize a process from a selection of the parts to the production of the final equipment, partially or fully automated. Therefore, effective production process management can be realized. Also, upon the occurrence of a failure, quick service for restoration or maintenance is possible for the equipment in the factory and also for the field equipment.

It should be noted that the following discussion will concern the embodiments in which the customer base order data file is employed. However, some of the embodiment discussed herebelow will not require the customer base order data file.

BRIEF DESCRIPTION OF THE DRAWINGS

The present invention will be more fully understood from the detailed description given below and from the accompanying drawings of the preferred embodiments of the invention, which, however, should not be taken to be limitative, but are for explanation and understanding only.

In the drawings:

FIGS. 11A and 11B are illustrations showing one example of customized order information according to the present invention;

FIG. 12 is a diagram illustrating connected drawings including FIGS. 12A and 12B which are illustrations showing one example of customized order information according to the present invention;

FIGS. 13A, 13B and 13C are explanatory illustrations showing one example of data in a design know-how file according to the present invention;

FIG. 15 is a diagram illustrating connected drawings including FIGS. 15A and 15B which are explanatory illustrations showing one example of information for equipment installation designing according to the present invention;

FIG. 17A is an explanatory illustration showing an example of PCB serial number management information;

FIG. 17B is an explanatory illustration showing an example of design modification information;

FIGS. 17C(A) and 17C(B) are explanatory illustrations showing an example of output data due to design modification according to the present invention;

FIGS. 20A(A) and 20A(B) are explanatory illustrations showing one example of data representative of stock condition of completed PCB and status of assembling completion of shelf according to the present invention;

FIG. 20B is an explanatory illustration showing one example of data obtained through a collection of production history and delivery history information according to the present invention;

FIGS. 22A and 22B are flowcharts showing a process for processing field information, in which 22A is a flowchart for aggregating a process of a number of modified jumper cables in response to a customized order, and 22B is a flowchart showing a modification inclusion process with respect to already delivered products according to the present invention;

FIG. 23 is an explanatory illustration showing one example of basic information of PCB according to the present invention;

FIGS. 24A and 24B are examples of output data through the process of FIGS. 22A and 22B, in which 24A shows an example of output data of an aggregate corresponding to a customer's order, and 24B shows an example of output data for a modification inclusion request with respect to field delivery products according to the present invention;

FIG. 28 is a diagram illustrating connected drawings including FIGS. 28A and 28B which are explanatory block diagrams showing a construction of equipment mounting design and operation of the terminals in the second embodiment according to the present invention;

FIG. 31 is an explanatory illustration showing a practical example of equipment arrangement drawings as an object of designing constructing operation drawings;

FIGS. 32, 33, 33A, 33B, 34, 34A, 34B, 35, 35A and 35B are flowcharts showing an example of a process of designing equipment installation in the second embodiment;

FIGS. 36A, 36B and 36C show an example of input data for designing equipment installation, in which 36A shows rough estimate information of a number of customer's equipment, 36B shows basic information of a logical assignment condition, and 36C is basic data of installation and construction according to the present invention;

FIGS. 37A and 37B are explanatory illustrations of an example of data of CAD information file as input data according to the present invention;

FIG. 38 is an explanatory illustration of equipment installation drawing data as output data;

FIGS. 39A and 39B are explanatory illustrations of an example of equipment preparation number as output data according to the present invention;

FIG. 44 is a schematic block diagram showing the third embodiment of the management system according to the present invention;

FIG. 48 is an explanatory illustration showing an example of data display of lot failure wave and range investigation;

FIGS. 49(a), 49(b), 49(c) and 49(d) are explanatory illustrations showing an input data structure to be used for processing lot failure wave and range investigation according to the present invention;

FIGS. 53(a), 53(b) and 53(c) are explanatory illustrations showing examples of respective input data to be used for derivation of the actual failure according to the present invention;

FIG. 55 is a drawing illustrating connected drawings including FIGS. 55A and 55B which are schematic block diagrams showing the fourth embodiment of the management system according to the present invention;

FIGS. 59(A) and 59(B) are explanatory illustrations showing an example of output data in a parts delivery process according to the present invention;

FIGS. 60(a), 60(b) and 60(c) are explanatory illustrations of respective input data used in the process of FIG. 58;

FIGS. 62(A) and 62(B) are explanatory illustrations of an example of input data to be used in the process of FIG. 61;

FIGS. 63(a), 63(b), 63(c) and 63(d) are explanatory illustrations of storage information;

FIG. 65 is an explanatory illustration of an example of the shipping list in the fourth embodiment;

FIG. 66 is an explanatory illustration of an example of input data to be used in preparation of the shipping list in the fourth embodiment;

FIG. 68 is an explanatory illustration showing an example of output display content upon the updating of a board serial number in the fourth embodiment;

FIGS. 69(a) and 69(b) are explanatory illustrations showing an example of input data to be used for shipping judgement process in the fourth embodiment according to the present invention;

DESCRIPTION OF THE PREFERRED EMBODIMENTS

The practical embodiment of the present invention will be discussed in detail herebelow with reference to the accompanying drawings.

FIG. 7 shows a schematic block diagram showing a principle of the first embodiment of an equipment production management system according to the present invention.

Figure 7B:
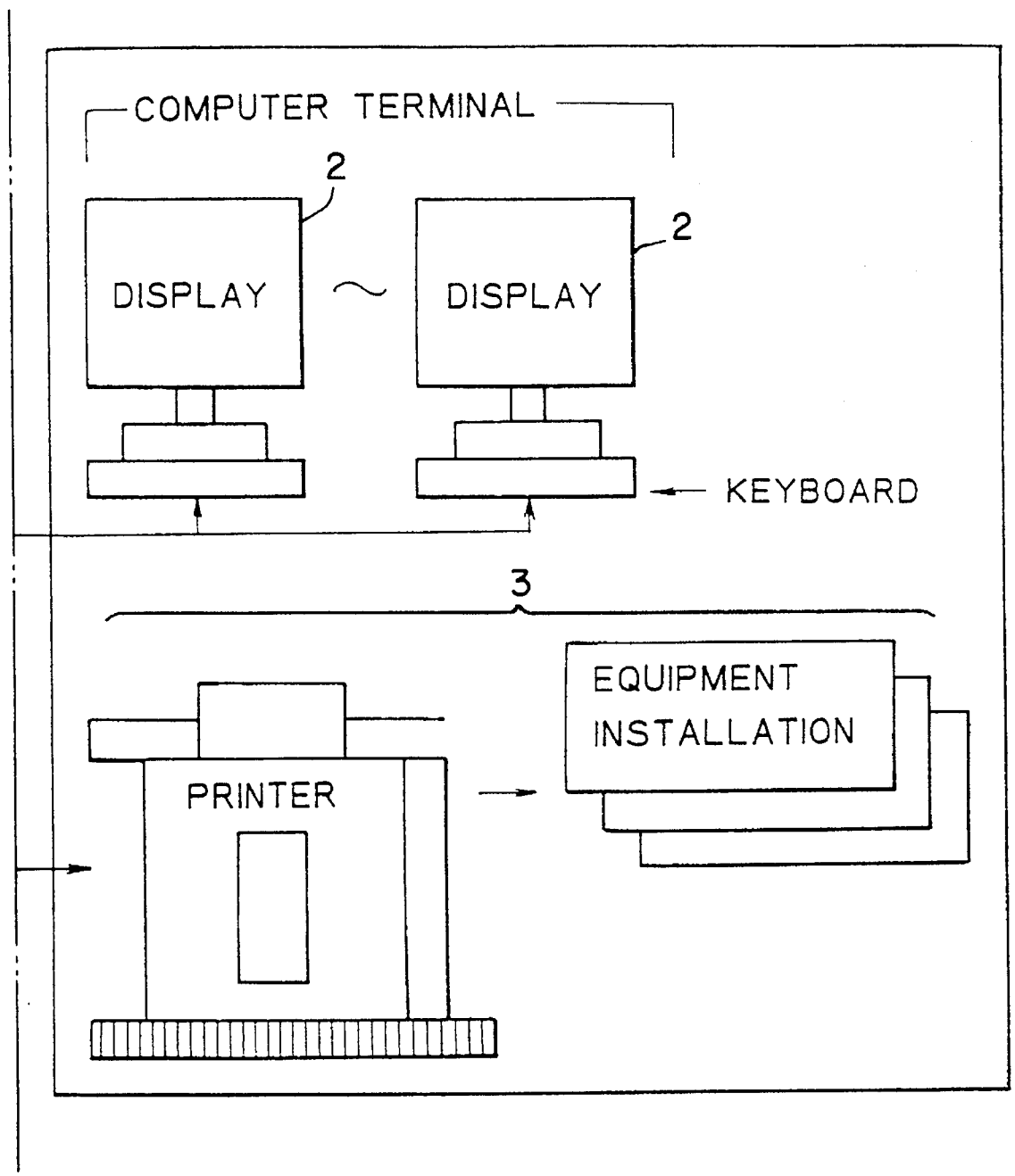
FIG. 7 is a diagram illustrating connected drawings including FIGS. 7A, 7B and 7C which are explanatory illustrations showing a principle of an equipment production management system according to the present invention.
Figure 7C:
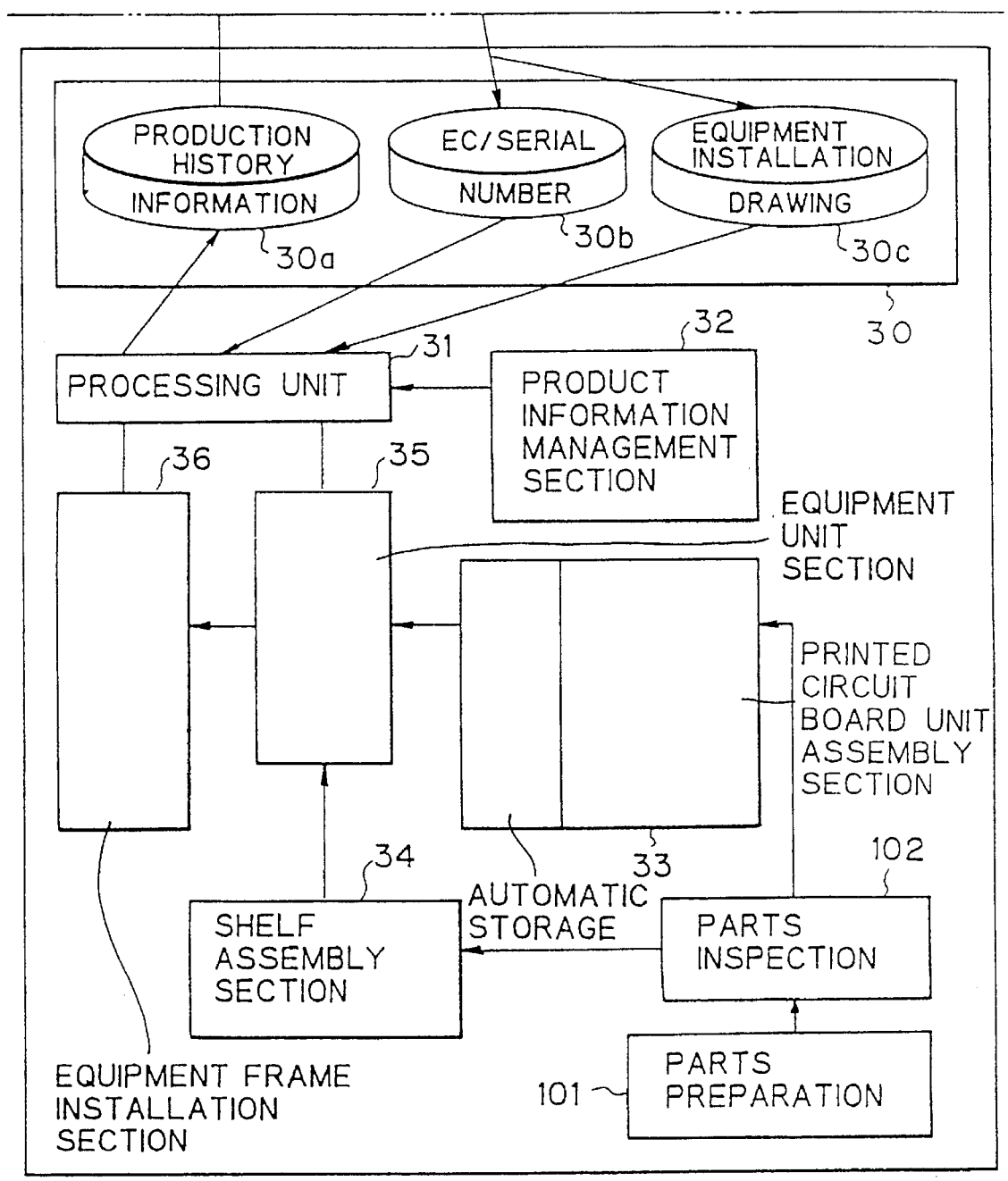

In FIGS. 7A–7C the reference numeral 1 denotes a central control unit including for example, cpu for performing management of design information and process thereof, 2 denotes a terminal device that performs operations of designing and management, and 3 denotes a floor control section provided in a production station for performing parts management, production management, control and process for mounting history management and so forth.

In the central control unit 1, the reference numeral 100 denotes a computer for arithmetic operation, 10 denotes an equipment installation designing means for performing a process for equipment installation designing and so forth on the basis of file data 13 including a customer order 13a, design data 13b and design know-how 13c, 11 denotes managing means associated with design modification, which includes a design modification information managing means 11a for managing design modification information, and a designed board serial number information managing means 11b for managing designed board serial number information, 13 denotes the design data file including data files 13a to 13c respectively for customer order data, design data and design know-how, 14 denotes a production data file including data files 14a to 14c respectively for equipment installation drawings designed by the equipment installation designing means 10, information of design modification (labeled as EC), number of boards and printed boards formed by the design modification managing means 11, and basic package (PKG) information constituted of information relating to the parts to be installed. The reference numeral 15 denotes an interface section of a center apparatus side, which includes a data file 15a for delivery history information provided from an equipment production center, such as factories.

The terminal device includes a display section, keyboard, printer for outputting a variety of material, such as equipment installation drawings and so forth and an input and output section (I/O part) for other necessary information, for designing in an interactive manner.

In the factory side floor control system 3, 30 denotes an interface section for interfacing with the central control unit 1, which includes various information, such as a production history file 30a (same as the above-mentioned 15a) for storing information on all printed circuit boards mounted on the completed equipment, a design modification (EC) and board serial number information file 30b (same as the above-mentioned 14b) for storing information of design modification, serial number of boards and so forth, and an equipment installation drawing file 30c (same as the above-mentioned 14a), 31 denotes a processing means for performing a processing of all information in the factory and controlling facilities therein, and 32 denotes a product information managing means for controlling the management of product information in the processing means 31.

The reference numeral 33 denotes an electronic circuit printed board unit assembling section for withdrawing parts supplied from a production management system via a parts delivery means 101, checking the withdrawn parts by a parts checking means 102 and assembling the supplied parts for forming packages, 34 denotes a shelf assembling section for assembling packages delivered from the parts delivery section 101 for forming shelves, 35 denotes an equipment unit assembling section for mounting the package onto the shelves, and 36 denotes an equipment frame installation section for installing the shelves on equipment frames.

The present invention is designed for an unified management of the equipment production information from an installation design of electronic equipment on which electronic circuit printed boards are mounted as an option, in terms of respective customers, to assembling experiments and field shipping products.

The equipment installation designing means 10 in the central control unit 1 performs a function of designing an arrangement of equipment, checking a variety of respective design conditions on the basis of the order information from the customer order file 13a and estimates. At this time, the design data file 13b and the design know-how file 13c are also used. By this, the equipment installation drawing file 14a is prepared. On the other hand, when the content of the design data file 13b is modified, the design modification and board serial number file 14b are established on the basis of the design modification information in the design modification managing means 11a and the designed board's serial number information managing means 11b of the design modification managing means 11. On the other hand, from this information, basic information (Hysteresis information) for a respective electronic printed circuit board unit is prepared into the PKG basic information file 14c. Accordingly, a system can be established for unified management of the design modification and board serial number management, at the same time as design modification.

In the floor control system 3 in the factory, respective parts withdrawn by the parts delivery means 101 from a well known production management system (not shown), are supplied to the printed circuit board unit section 33 and the shelf assembling section 34 so that they are assembled into individual printed boards and shelves. The processing means 31 uses the equipment installation drawing supplied from the central control unit 1 and stored in the equipment installation drawing file 30c in the interface section 30 and takes the printed circuit board units, for which a unit test is completed, out from the automated storage of the printed circuit board unit assembling section 33 in order of mounting, under the control of the product information managing section 32. The processing means 31 controls a robot in the equipment unit assembling section 35 to automatically assemble the removed printed circuit board unit onto the assembled shelf from the shelf assembling section 34.

Thus, installation of the printed circuit board unit and so forth is performed to form the equipment unit in the equipment unit assembling section 35. Thereafter, respective equipment units are mounted on the equipment frame in the equipment frame installation section 36.

During the foregoing installing operation, the installation history information generated in the equipment unit assembling section 35 and the equipment frame installation section 36 are collected by the processing means 31. With the collected information, the production history file 30a is generated. The content of the production history file 30a is then transferred to the central control unit 1 to generate the delivery history information file 15a.

If design modification is performed after generation of the production history information file 30a, mounting history information is again read out and the production history information file 30a is then updated. From the production history information file 30a and the board serial number history information (stored in the file 30b) of the printed circuit board unit, various aggregated information with respect to the equipment already delivered and put in use (hereafter referred to as "field product"), can be obtained. On the other hand, based on failure information occurring in the field, performance record aggregation, such as failure ratio (FIT number) can be derived. This result can be used for the selection of parts or inspection of parts.

Figure 8B:
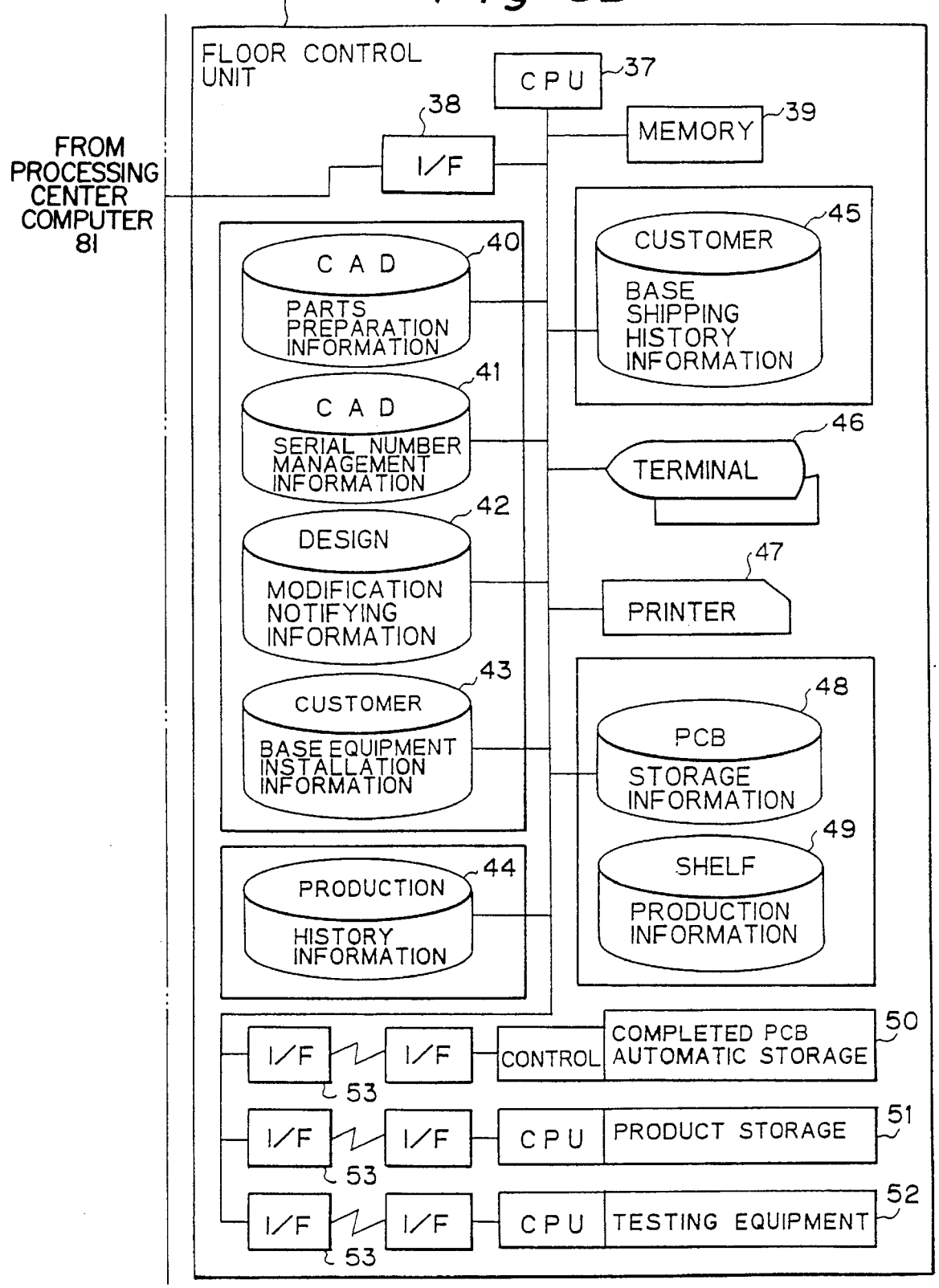
FIG. 8 is a diagram illustrating connected drawings including FIGS. 8A and 8B which are diagrams showing the preferred embodiment of the equipment production management system according to the present invention.

FIGS. 8A and 8B show a further detail of the foregoing first embodiment of the invention.

In FIG. 8, the reference numeral 81 denotes a processing center side computer (corresponding to the central control unit 1, for example, CPU or the like of FIG. 7B), 82 denotes a terminal device corresponding to the terminal device 2 of FIG. 7, 83 denotes a floor control system provided in a factory for producing a equipment (equivalent to the floor control section 3 in FIG. 7B).

The center side computer 81 includes a CPU 16, a memory 17, various information files 18 to 22 and 24 to 26 for storing and managing design information, production, delivery, histories and so forth. The terminal device 82 includes a terminal unit 27 for designing and management and a printer 28. Between the processing center side computer 81 and the factory floor control unit at the factory side, on-line data transmission can be performed through an interface (I/F) 23.

In the information files, the reference numeral 18 denotes a CAD parts preparation information file (not included in FIG. 7) to be generated in designing for preparation of necessary parts on the basis of the design information, 19 denotes a CAD board serial number management information file (partially corresponding to 14*b* of FIGS. 7A–7C) for storing board serial number information corresponding to modification of the printed board or the equipment, 20 denotes a design modification data file (partially corresponding to 14*b* of FIGS. 7A–7C), 21 denotes a CAD printed circuit board (PCB: Print Wired Circuit Board) and equipment basic information file (corresponding to 14*c* of FIGS. 7A–7C), 22 denotes a customer order information file (corresponding to 13*a* of FIGS. 7A–7C), 23 denotes an interface for communication with the factory side (floor control system 3), 24 denotes a design modification notifying information file (partially corresponding to 14*b* of FIGS. 7A–7C) to be imported to the factory side, 25 denotes a customized equipment installation information file (corresponding to 14*a* of FIGS. 7A–7C), 26 denotes a customer delivery history information file (corresponding to 15*a* of FIGS. 7A–7C).

The center side computer 1 is connected to the factory side floor control system 3 through the interface (I/F) 23, communication line and an interface (I/F) 38 for on-line communication. The floor control system 3 includes a CPU 37, a memory 39, a terminal unit 46, a printer 47, similarly to the computer 1 provided in the processing center side. Also, the floor control system 3 also includes information files having contents similar to those in the center computer 1. Namely, the floor control system 3 includes a CAD parts preparation information file 40 (corresponding to 18), a CAD board serial number management information file 41 (corresponding to 19), a design modification notifying information file 42 (corresponding to 24), a customized equipment installation information file 43 (corresponding to 25), a customer delivery history information file 45 (corresponding to 26).

On the other hand, the production history information file 44 also stores information associated with respective equipment units and equipment frames produced. PCB storage information file 48 stores storage information of PCB in a completed PCB automatic storage 50 (discussed later) for the printed circuit board. In the present invention, a storage includes a warehousing and a stock room. A shelf production information file 49 stores production information of the shelf. The completed PCB automatic storage 50, a product storage 51 for storing final products and testing facilities 52 are connected to a CPU 37 through an interface 53. Communication is thus established between the control sections of respective storages 50 and 51 and the facilities 52 and the CPU so that reference can be made for related files and the related files can be updated.

Figure 9C:
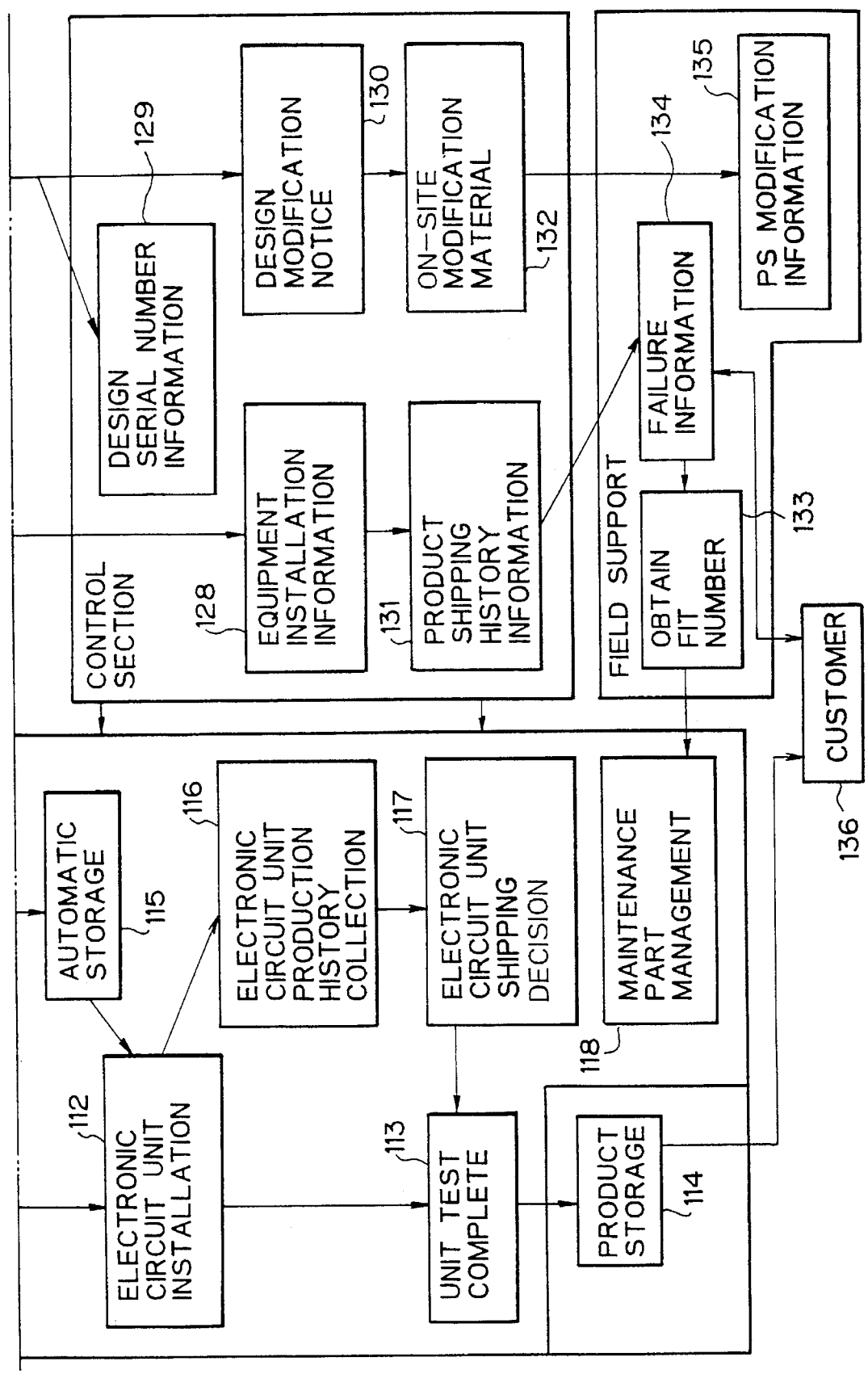
FIG. 9 is a diagram illustrating connected drawings including FIGS. 9A, 9B and 9C which are flowcharts showing an overall system operation of the entire management system according to the present invention.

FIGS. 9A–9B show flowcharts showing the operation of overall construction of the first embodiment management system of the invention.

Initially, upon reception of a customers order A, a system design B performs an equipment estimation and equipment numbers to be prepared 91. When a customer demands a modification for specification later on, then a customer demands modified specification 93 is prepared. Also, equipment number 92 for deriving the necessary number of the equipment and so forth is performed. Based on the equipment estimate, an order 94 is issued in an order issuing stage C. Subsequently, for factory side production and inspection D, production preparation 95 is issued. Then, via parts preparation 96 and a check of reception of the parts, shelf production 98 and electronic circuit unit production 99 are initiated. In the case of the shelf, after shelf frame assembling, the electronic circuit units (unit test 111 is completed) are taken out from the automated storage 115 to perform an installation of the electronic circuit units to the shelf. The completed shelf is stored in a product storage 114 after completion of unit test 113. When the electronic circuit unit is installed on the shelf, collection 116 for the electronic circuit unit production history is performed. Upon shipping of the equipment, in which the shelf if installed, a check is performed to determine whether the number of boards of the electronic circuit units is proper or not against the information file to determine 117 whether the equipment can be shipped.

On the other hand, in the system design B. with the equipment derivation and customer's equipment arranging condition 92, layout design 120, frame arrangement 121 and shelf arrangement 122 and electronic circuit unit installation design information (filed 25 of FIG. 8) are prepared in a customized design E. The information thus prepared is fed to the factory side as equipment installation information 129 (file 43 of FIG. 8). On the other hand, similar, to the system design B, the customer demand specification modification 93 is obtained, circuit modification design 125 corresponding to modification generated in a design modification generation 124 in a design modification notice F. Then, installation design 126 and design modification request and board serial number information (file 24 of FIG. 8) are generated. This information is output to the factor side as the designed board serial number information 129 (file 41 of FIG. 8) and design modification notifying information 130.

The factory side control section G (floor control system 3) prepares the equipment installation information 128 (file 43 of FIG. 8) and product shipping history information 131 based on the electronic circuit shipping judgement results 117 from the production and inspection D. Also, by receiving the design modification information 130*m*, a file 132 (file 42 of FIG. 8) is established. The product shipping history information 131 and in-site modification material 132 are supplied to a filed support H for supporting the equipment at the destination of shipping. Files of failure information 134 and the modification information 134 are thus formed. The failure information 134 is collected in a FIT number (failure ratio) holding section 133 together with failure information noticed by the customer after delivery. The failure information is then transferred to the maintenance parts management 118 of the production and inspection D. The customer imports failure information that occurred during use, with respect to the shipped products.

Hereafter, discussion will involve an individual system included in the operation of the overall management system of FIG. 9.

Initially, discussion will involve the construction of the embodiment of the customized equipment installation design with reference to FIG. 10.

Figure 10B:
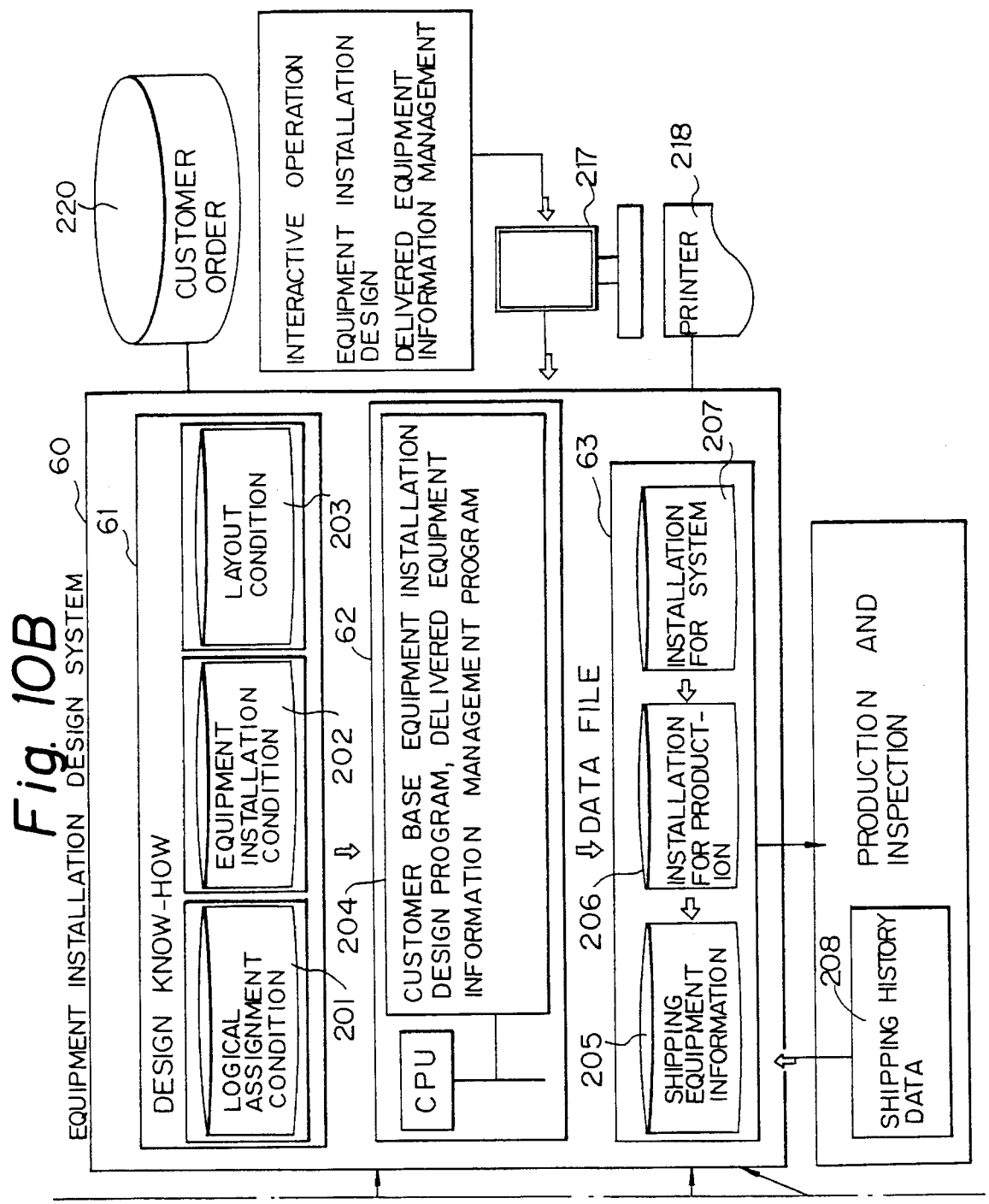
FIG. 10 is a diagram illustrating connected drawings including FIGS. 10A and 10B which are block diagrams showing an embodiment for customized equipment installation designing according to the present invention.

FIGS. 10A–10B shows the equipment installation design system. The equipment installation design system includes a design know-how file 61, a computer 62 and a data file 63. The design know-how file 61 is a design know-how file including a logical assignment condition 201, an equipment installation condition 202 and a layout condition 203. These are data established and based on the knowledge of design in a conventional manual operation. The design know-how file can be used for PCB (printed board) and installation designing, structure designing and so forth by CAD.

The computer (in the construction including a CPU and memory containing programs) 62 contains a customized equipment installation design program and a delivered equipment information management program.

Design data (CAD) file 62 includes known CAD data files including parts list 210, installation drawings 211, structure 212. Installation design for PCB mounting equipment (exchange or so forth) corresponding to the customer order information 220 (see FIG. 8) performed in an interactive manner through the computer 62 and the terminal 217. At this time, the equipment and PCB basic information file 213 is used.

FIGS. 11 and 12 show examples of customer order information (file 22 to 220 in FIG. 8 or 10). FIG. 11-A includes an order number, a destination and an installing place are set as customer data, name of products (frame, unit, PCB etc.), specification, number and so forth are included as ordered equipment data.

FIGS. 11A–B and 12A–B show examples of input data of CAD data. FIG. 11-B shows the example of PCB based design information stored in the PCB basic information file 213. With respect to each PCB, respective structure, installation width, consuming power, heat generation coefficient and other numeric data are stored. FIG. 12 shows the shelf information and fixedly and optionally installed PCB data. In this case, with respect to each shelf to install the PCB, the product name, specification, installation width, installation distinction (fixed and option) and so forth of the PCBs to be installed at respective slots.

Figure 13A:
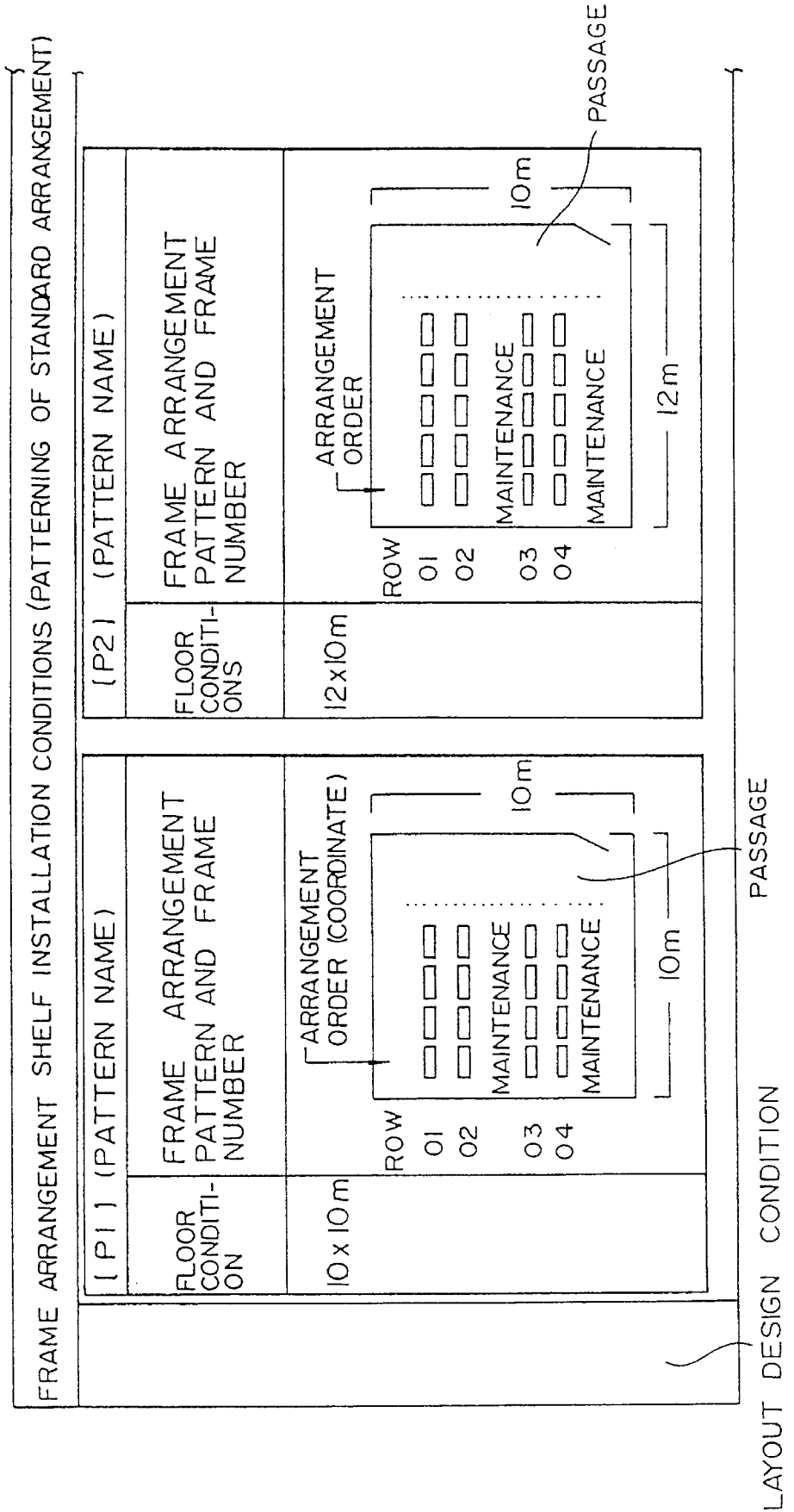

FIGS. 13A–B show an example of data in the design know-how file (file 61 of FIG. 10). FIG. 13-A shows and example of floor layout information that includes examples of a plurality of arrangement patterns P1, P2, . . . for each layout design condition for standard patterning of a frame arrangement condition. FIG. 13-B shows the standard pattern of installation for the designated PCBs., which includes a variety of patterns for arrangements of PCBs in the shelf so that one of the patterns to be adapted to the given condition can be selected. Furthermore, FIG. 13-C shows standard installation patterns for the shelves (6 stage construction including slots numbers 0 to 5) in the equipment frame.

Figure 14B:
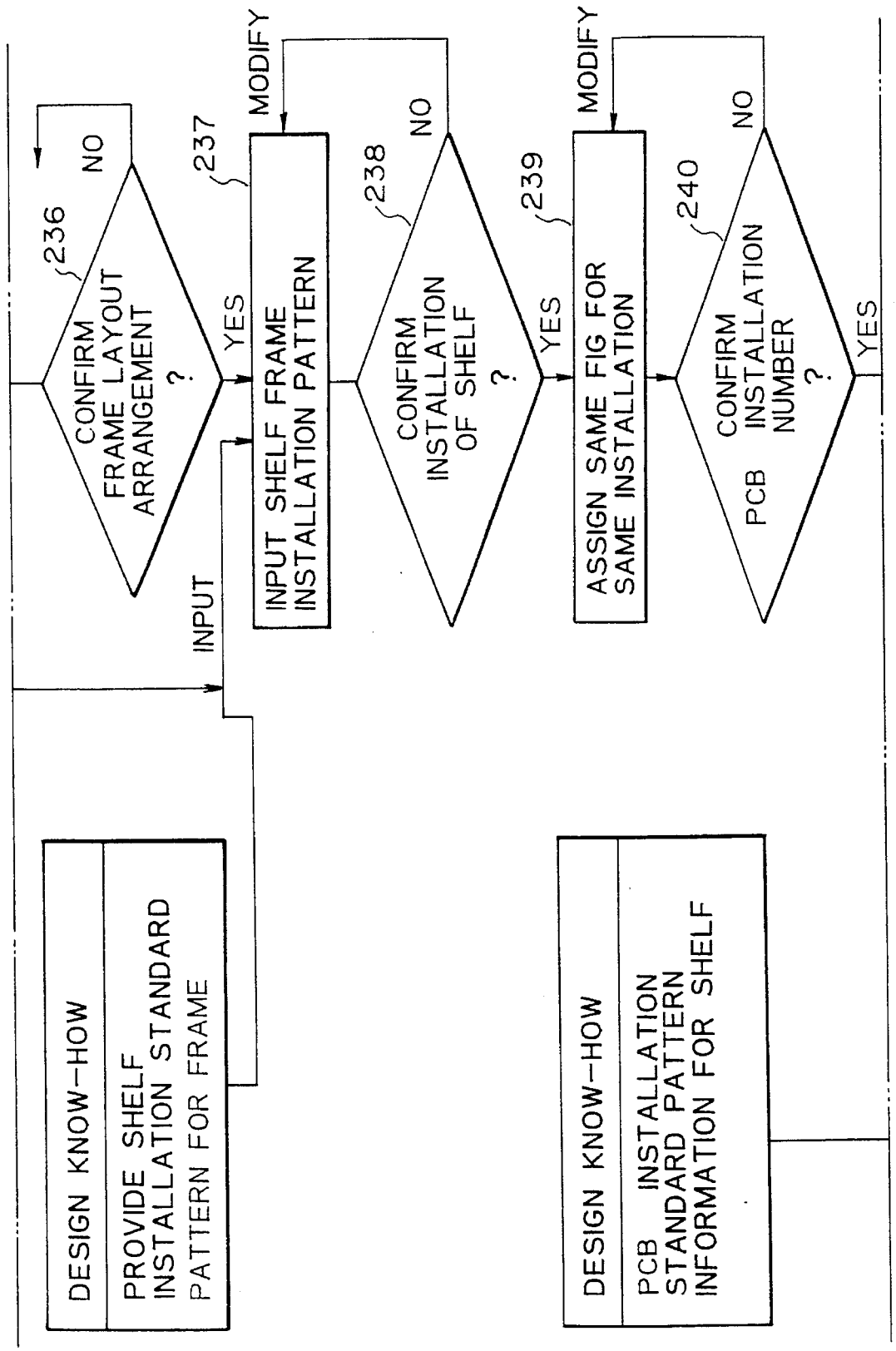
FIG. 14 is a diagram illustrating connected drawings including FIGS. 14A, 14B and 14C which are flowcharts showing a process of equipment installation design process according to the present invention.
Figure 14C:
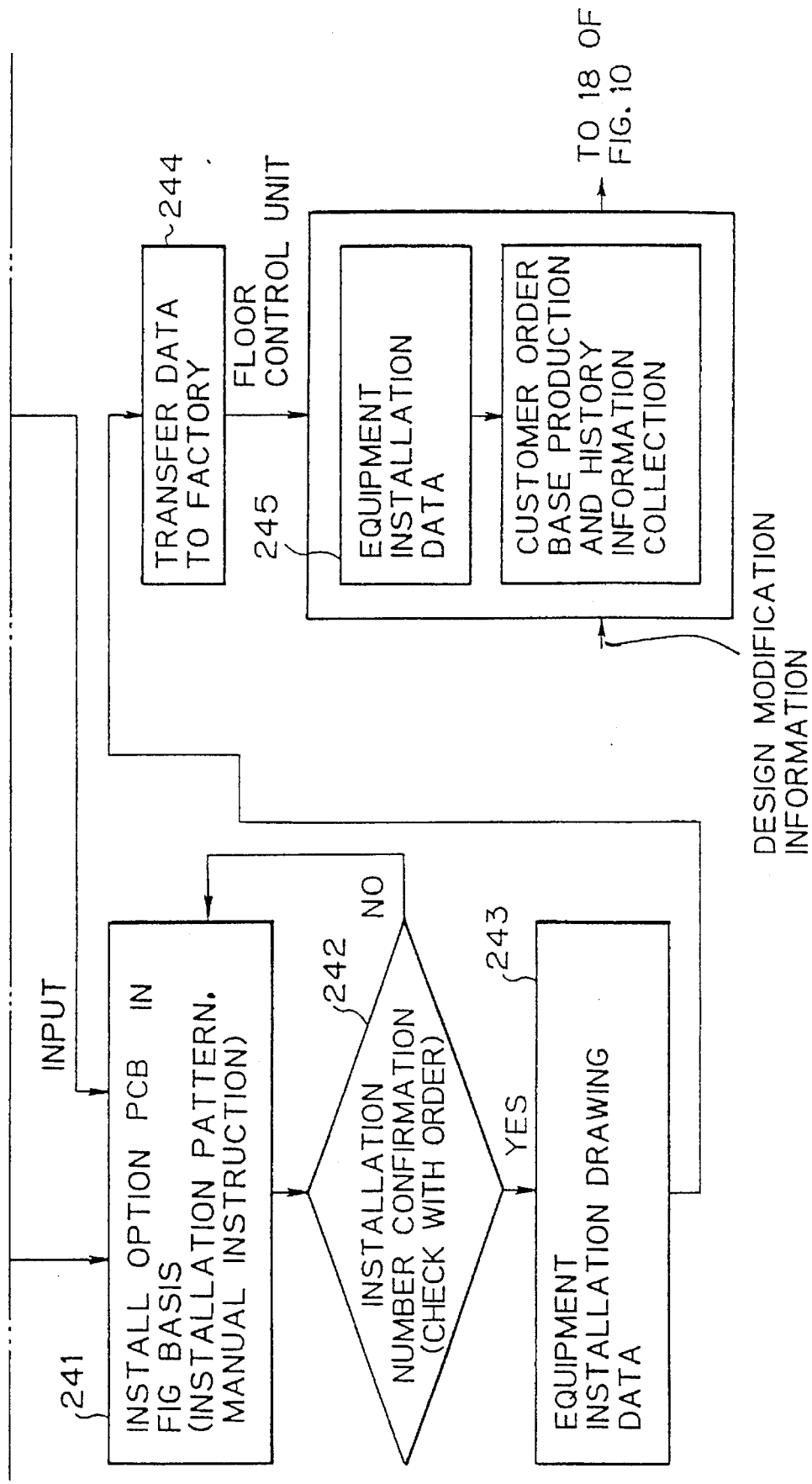

FIGS. 14A–C are flowcharts showing a process of the equipment installation design. Through the terminal unit 27 and 217 of FIGS. 8 and 10, The systemized equipment installation design program of FIG. 14 is executed in an interactive manner.

In FIG. 14, the installation condition designated by an order from the customer is entered (taking the example of FIG. 11), and the layout condition for the equipment frame is designated. Then, the equipment frame arrangement number and the shelf installation condition are selected using the layout design condition (exemplified in FIG. 13-A) in the design know-how, and the equipment frame layout is verified (231 to 234 of FIG. 14). Thereafter, with respect to the equipment frame layout, the equipment frames are extracted from the customer's order information and displayed. With reference to the display, the equipment frame arrangement numbers are entered (235).

In response to this, the displayed equipment frame layout arrangement numbers are verified (236). If the layout is not appropriate, then another frame arrangement number is selected. When verification is made that the selected equipment frame selection number is correct, then the information for the shelves are extracted from the order information and displayed. At the same time, the shelf installation standard pattern is output from the design know-how file for installation of the sheltes onto the equipment frame. With respect to this, the shelves installation pattern is selected and input (237). Subsequently, the shelf installation pattern is verified (238) to determine whether the selected shelf installation pattern is proper or not. When the selected installation pattern is verified, if the installation is to be performed in the same term, the drawing number (FIG. NO) is assigned (239). Also, the number of PCB to be installed is confirmed.

After confirmation, the PCB installation standard pattern information in the design know-how for installation of the PCBs onto the shelf is entered so that a command for installation of the optional PCBs is issued with respect to each drawing number (241). Then, a check is performed whether the installing number of PCBs is consistent with the order (242). When consistency is confirmed, the equipment installation drawing data is output (243). The output data is transferred to the factory side (244). The factory side floor control system 3 stores the transferred equipment installation drawing data as the customized order-corresponding equipment installation drawing information (245). Through this, the installation for the PCBs is performed. At the same time, the production history information can be collected.

FIGS. 15A–B show an example of equipment installation design information (files 25 and 206 of FIGS. 8 and 10). FIG. 15-A shows an example of the shelf installation drawings (PCB product name, specification and installation position) for installation of the shelves that mount the PCBs, on the equipment frame, corresponding to the customer's order information of a design for installation in the customer's facility. FIG. 15-B shows an example of the frame installation information (equipment frame name, specification and frame arrangement number and so forth).

Figure 16A:
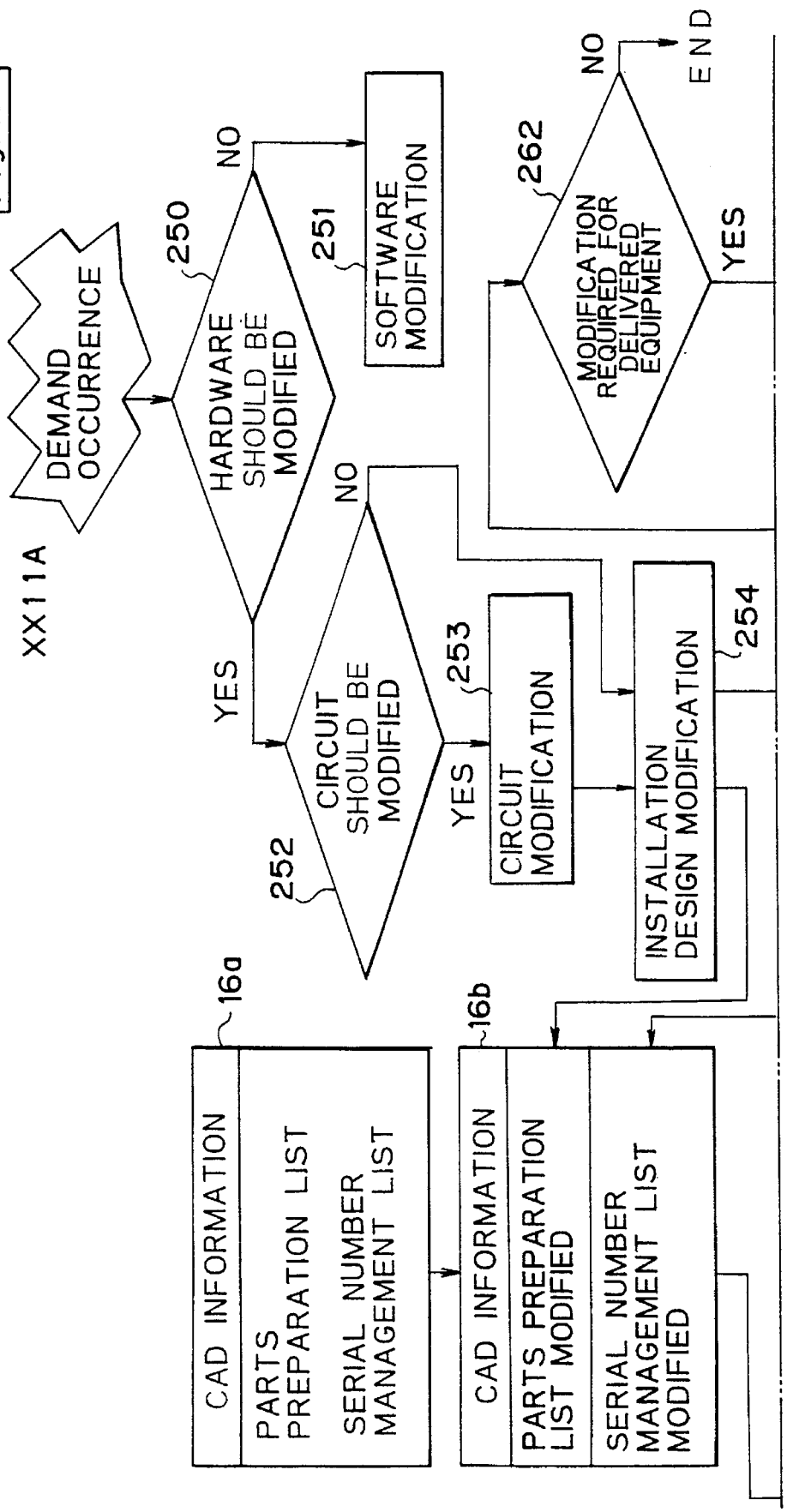
FIG. 16 is a diagram illustrating connected drawings including FIGS. 16A, 16B and 16C which are flowcharts showing a process for processing design modification information according to the present invention.
Figure 16B:
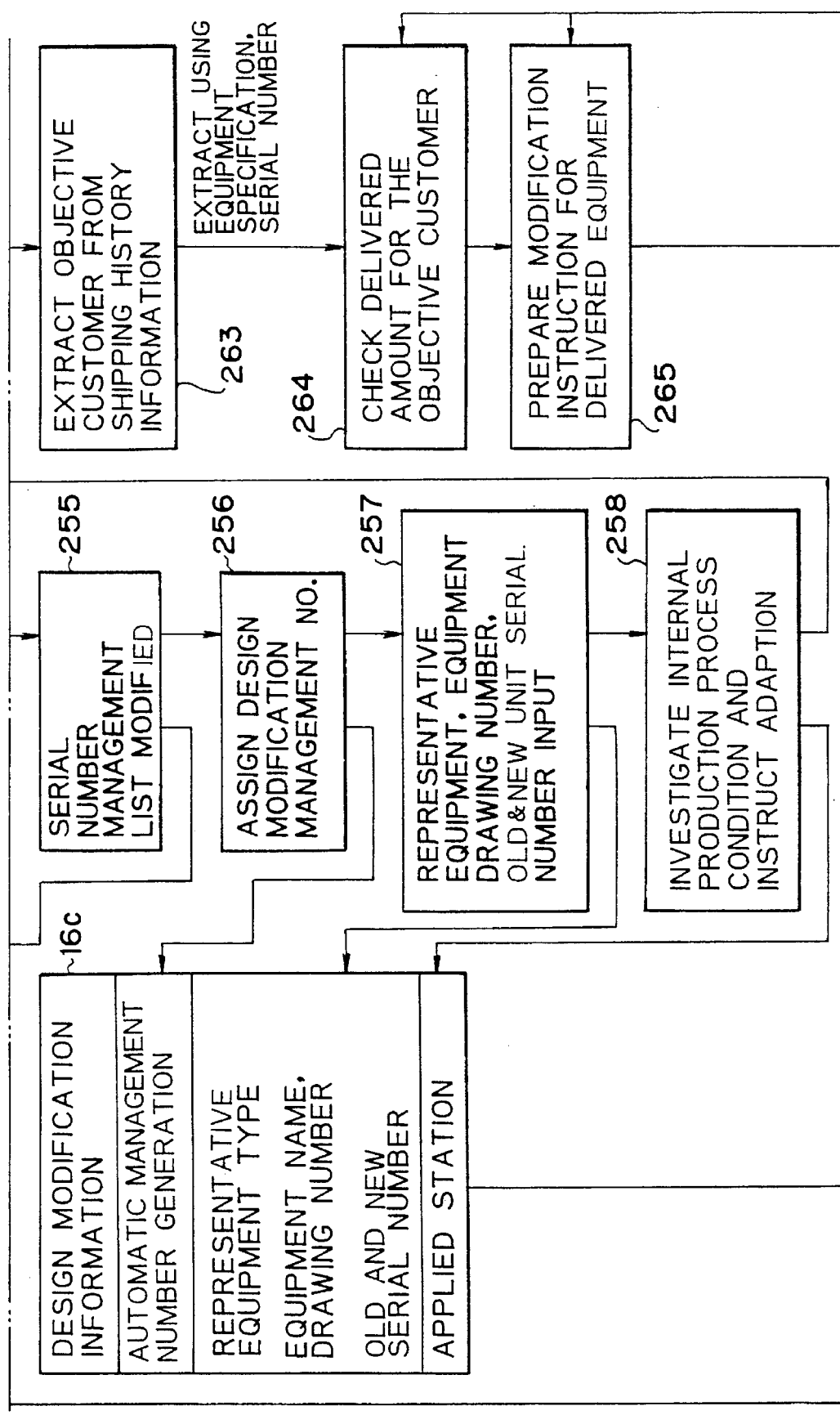
Figure 16C:
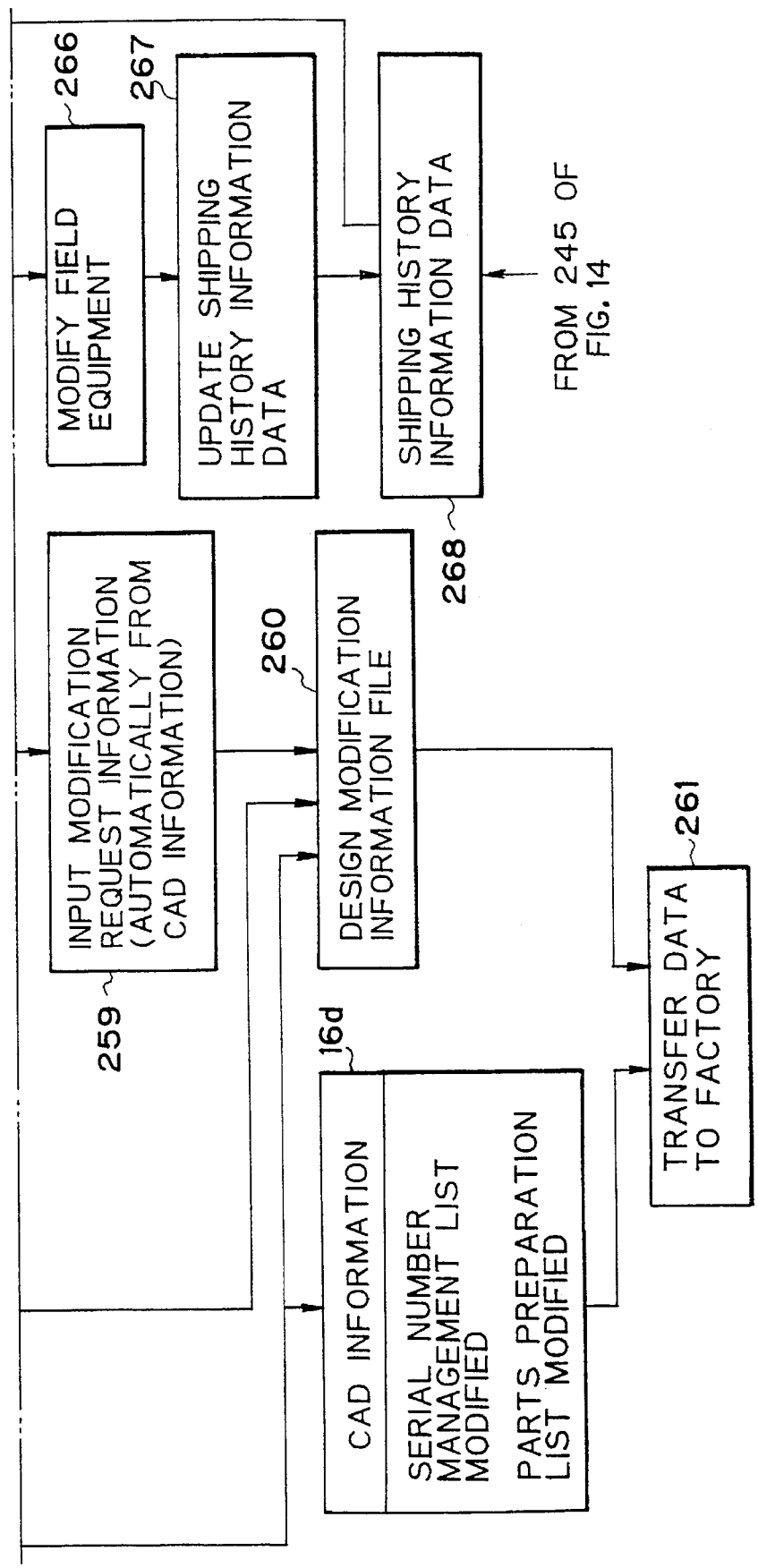

FIGS. 16A–C show flowcharts of the process for processing design modification information. FIG. 17-a shows an example of a board serial number management information, FIG. 17-B shows an example of the design modification information and FIG. 17-C shows an example of an output data depending upon the design modification.

In FIG. 16, when a failure occurs in the equipment, such as a printed circuit board, when a demand for the addition of a function arises for a level-up, or, when a demand is issued by the user, a decision is made to determine whether the hardware has to be modified or not (250). If it is determined that modification on the hardware is not necessary, the modification is performed by modifying the software (251). On the other hand, when it is determined that modification of the hardware is necessary, further decision is made to determine whether another circuit must be designed (252). If it is determined that the circuit design is necessary, then designing of the new circuit is performed (253). On the other hand, when it is determined that circuit design is unnecessary but circuit design modification is to be performed, then modification for the installation design is to be performed (254). At this time, modifications of the parts preparation list in the CAD information, and of the board serial number management list, are performed (255) to update the CAD information (16*a* and 16*b*).

An example of the board serial number management information is shown in FIG. 17-A. The example is illustrated to include the board serial number list before modification and the board serial number list (including additional data) after modification. With reference to the serial numbers, it becomes possible to determine whether the equipment before and after the modification are compatible with each other or not.

At the steps 256 to 258 of FIG. 16, assignment of a design modification management number, entry of representative equipment type, equipment drawing number and old and new unit serial number, and entry of design modification information 16c of an internal investigation of a production process condition, instructions for application and so forth, are performed. When a modification request information is input (259), the necessary information is automatically read out from the serial number list and parts preparation list information in the CAD information file and stored in the design modification data file 260 (corresponding to 24 of FIG. 8). One example of the design modification information is shown in FIG. 17-B. In FIG. 17-B, the design modification management number (EC No. 201625), which is automatically generated in the system and managed therein, and the detailed information including the representative equipment type to be the subject of modification, product name of the objective equipment, the drawing number, operation start date, serial number, summary of modification and so forth, are entered. The design modification information file 260 and the CAD information 16d (modified serial number management list, modified parts preparation list) are transferred to the factory side (261).

At the step 258, when a command for modification is given to the production process, a decision is made to determine whether modification is applicable for the shipped products. If not applicable, the process is terminated. On the other hand, if applicable, based on the shipping history information, objective customers are extracted therefrom (263). Then, a equipment numbers are checked (264) and modification instructions are prepared for the shipped products. Thereafter, the modification is performed for the field products (already delivered products) (266). At the same time, the shipping history information data (45 of FIG. 8) are updated (267).

(A) of FIG. 17-C shows an example of a modified version of a drawing serial number management list (corresponding to file 19 of FIG. 8), in which the unit serial number data of CAD is generated by design modification (EC). In (A) of FIG. 17-C, it is indicated that the drawing serial numbers and PT (printed circuit board) substrate corresponding to the unit serial number "03C" and "04C" are modified from the specified date or from the new version. (B) of FIG. 17-C shows an example of output data of a design modification notice. The notice is prepared in response to modification of the drawing serial number management list of (A) and stored in the design modification information database (corresponding to file 24 of FIG. 8) The content thereof is also transferred to the factory side floor control system 3 and stored therein.

Here, discussion will be given for system construction of the production history information collection and confirmation of inclusion of design modification.

Figure 18A:
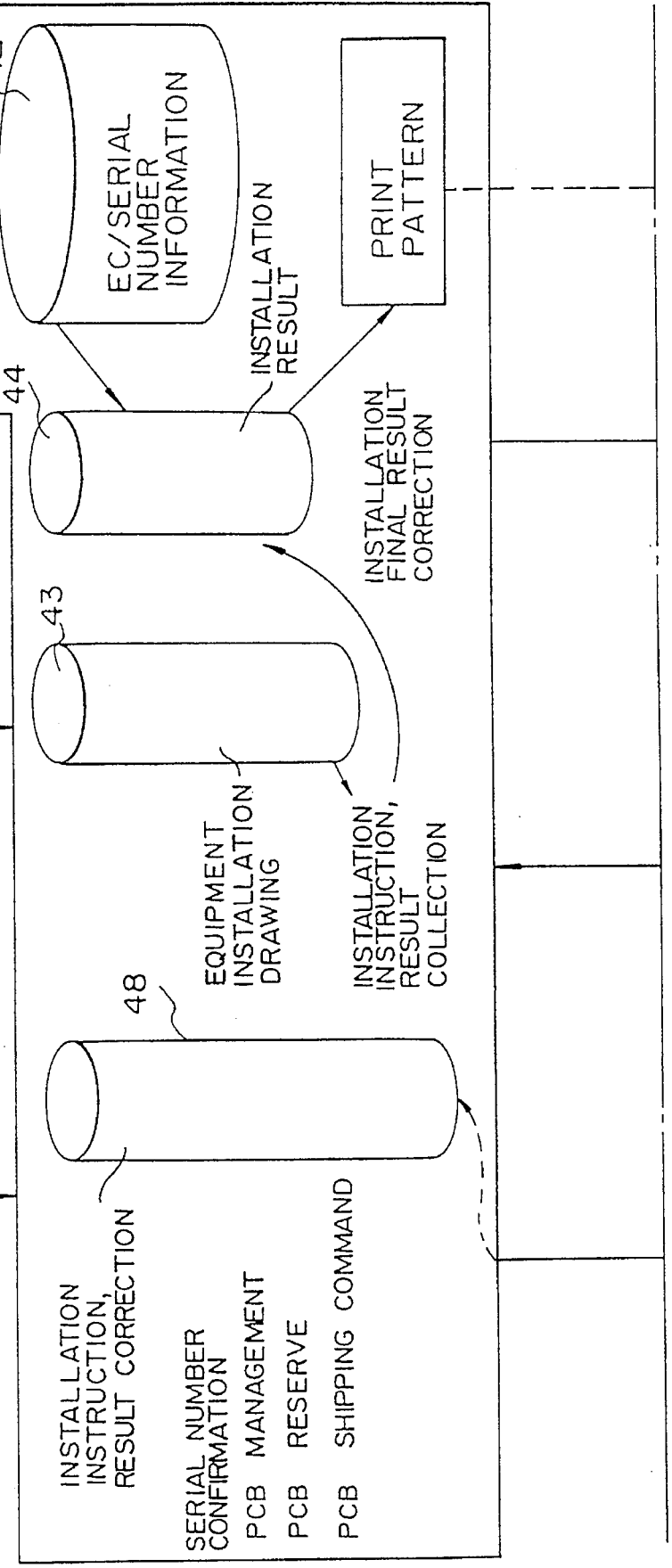
FIG. 18 is a diagram illustrating connected drawings including FIGS. 18A and 18B which are diagrammatic illustrations showing system construction and operation for realizing the collection of production history information and confirmation of the inclusion of design modification.

FIG. 18 shows system construction and operation of a collection of the production history information and confirmation of inclusion of the design modification, to be principally performed by the factory side floor control system 3.

At the center side computer, the equipment installation drawings 25 (the equipment installation drawing file 14a of FIGS. 7) areprepared on the basis of the customer's order (22 of FIG. 8). The equipment installation drawings 25 are then stored in the equipment installation information (equipment installation drawing) file 43 of the factory side floor control system 3. With the management unit 20a of an automatic storage 270 (corresponding to 50 of FIG. 8) of the floor control system 3, reception and delivery of the storage is controlled for the printed circuit board (PCB). When the reception 273 and delivery 274 of the PCBs are thus performed, the information of reception from and delivery to the storage is supplied to the PCB storage information file 48 of the floor control system 3 to update the content thereof.

Preparation of the PCBs to be assembled into the equipment is detected from the PCB storage information file 48, a command is given for the automatic storage 270 for delivery of the necessary PCBs. The PCBs thus delivered are transported to the installation station 275. A bar-code reader provided in the installation station 275 reads information (contained in the bar-code label attached on respective printed circuit board) representative of the content of the printed circuit board. The read information is transferred to the floor control system 3. The floor control system 3 derives the installation position of the PCBs within the shelf with reference to the equipment installation drawing (information) and sends a command representative of the installation positions to a terminal unit (or an automatic installation device) 20b at the installation station 275. Once installation is completed, the results of the installation (the installation position of the PCBs and so forth) are entered by means of a magnetic card or so forth.

The floor control system 3 is responsive to the results of the installation to store it in the installation result (production history information) file 44. Then, the installed equipment is fed to a testing station 276. If a faulty PCB 20d is found through tests, replacement 276 is performed. The result of the replacement (information of new and old PCBs) are read by the bar-code reader in the terminal unit 20c in the testing station and transferred to the floor control system 3. The floor control system 3 then stores the transferred information in the file 44.

After completion of the test, the process is moved to the shipping decision station. In this station, the design modification information (corresponding to 24 of FIG. 8) supplied from the center side computer system is stored in the design modification (EC) and serial number information files 42 and 43 (see FIG. 8). This information in the files 42 and 43 is checked against the installation result information (file 44) of the equipment so that decision is made to determine whether the PCBs corresponds to the subsequently occurring modification of the board or design modification for determining whether the equipment can be shipped or not. If it can be shipped, shipping is performed after printing the shipping list. When the equipment does not correspond to the modification, replacement and so forth are performed for adapting the equipment to the modified version.

The installation result file 44 stores the installation condition information input corresponding to the condition of the production lines, and the final results of installation corresponding to the results of replacement and so forth. Upon shipping of the equipment, the installation condition at that time is stored as the shipping history information file (45 of FIG. 8). The shipping history information file is used as field information for the addition of a function in response to a demand from the customer.

The practical construction of the system for the collection of the production history (installation results) and for confirmation of inclusion of the design modification as generally discussed with reference to FIG. 18 will be discussed more fully in terms of an embodiment in FIGS. 19-A, 19-B and 20-A, 20-B.

Figures 2, 19A:
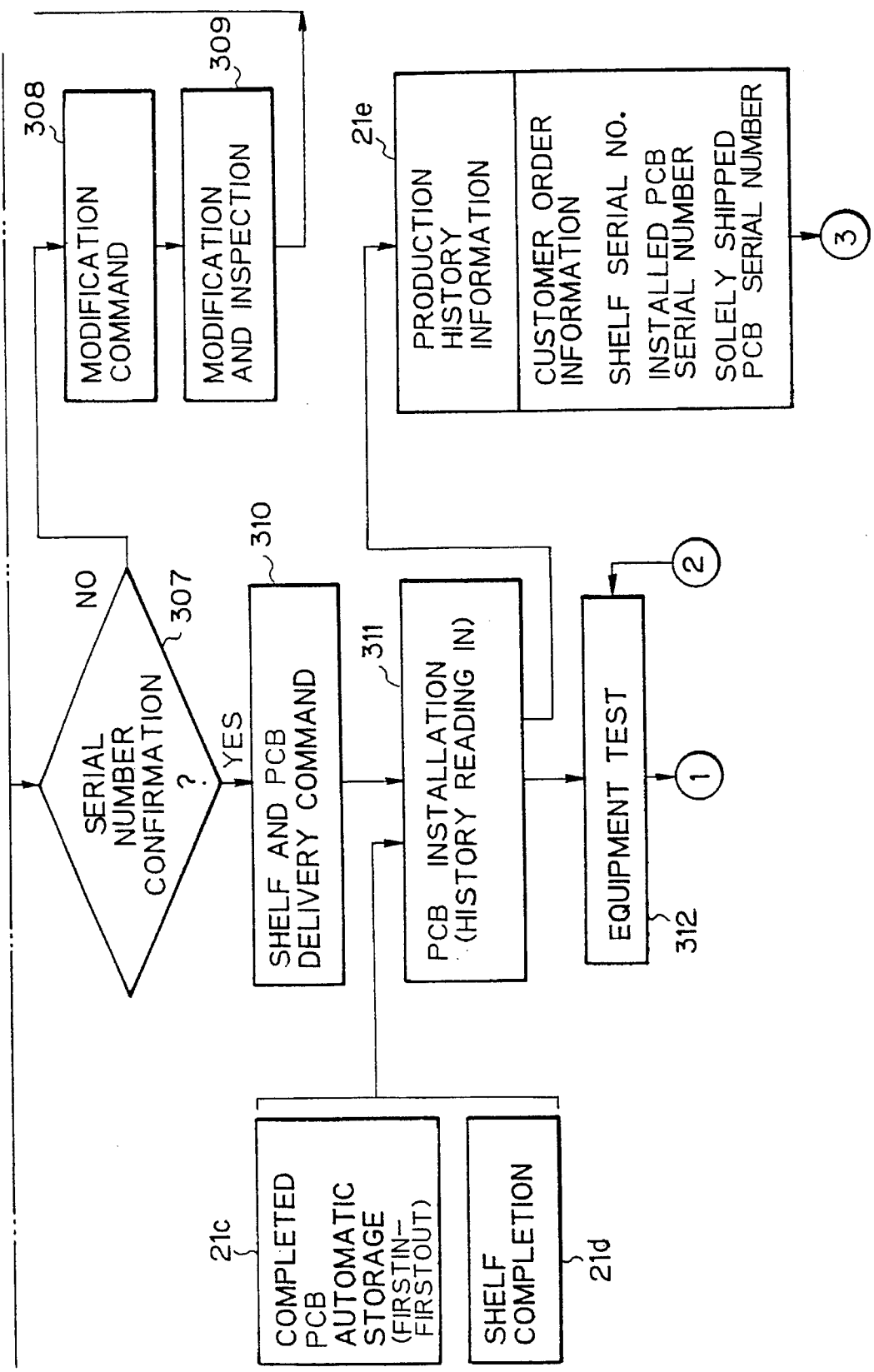
FIG. 2 is an explanatory illustration showing a process for collecting information on the production of equipment, inspection and production history in the prior art.
FIGS. 19A and 19B are diagrams illustrating connected drawings including FIGS. 19A-1, 19A-2 and 19B-1, 19B-2 and 19B-3 which are flowcharts showing a process of removal of PCB and shelf, collection of hysteresis information and conformation of the inclusion of design modification according to the present invention.
Figures 2, 19B:
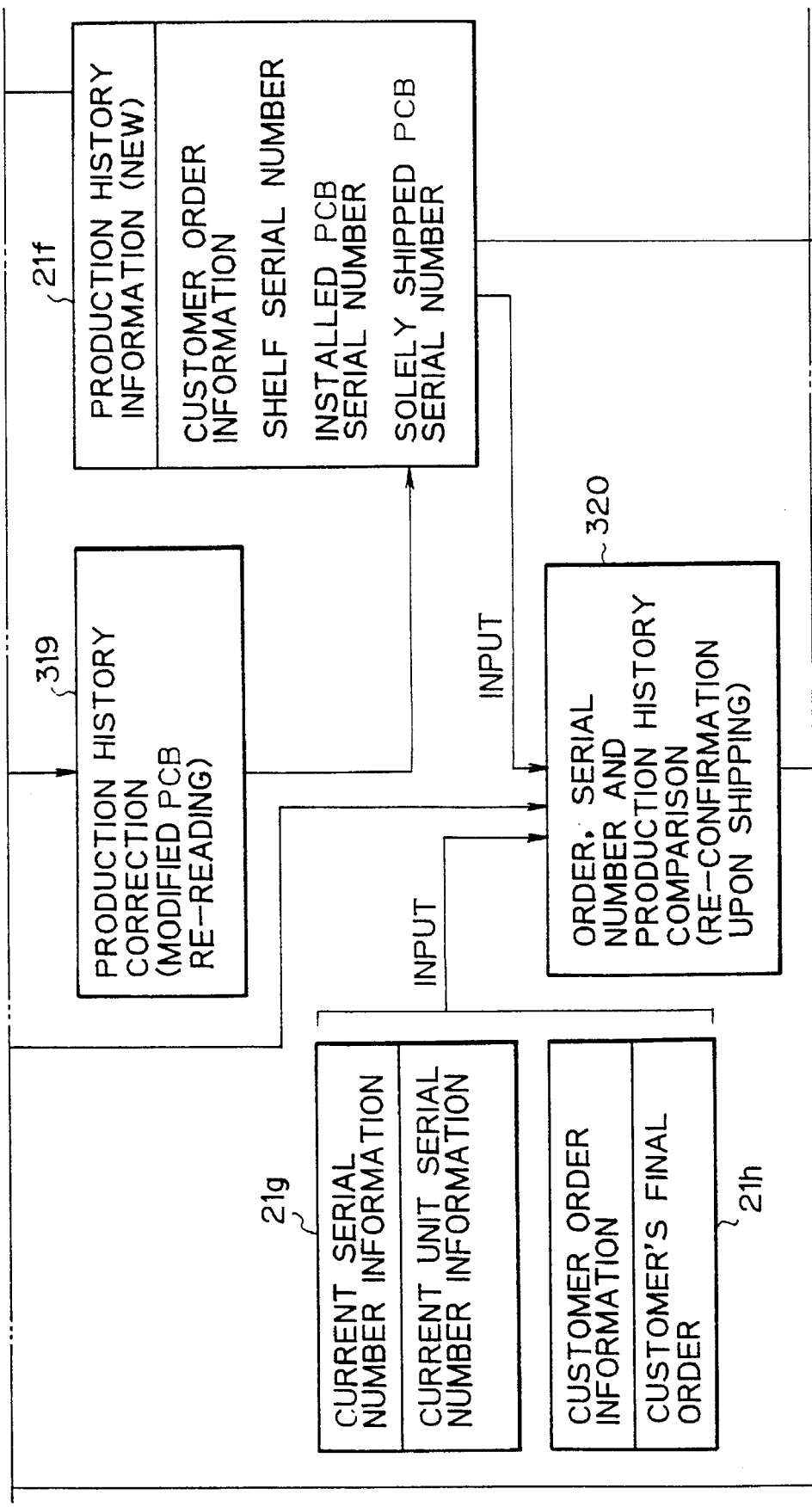
Figures 3, 19B:
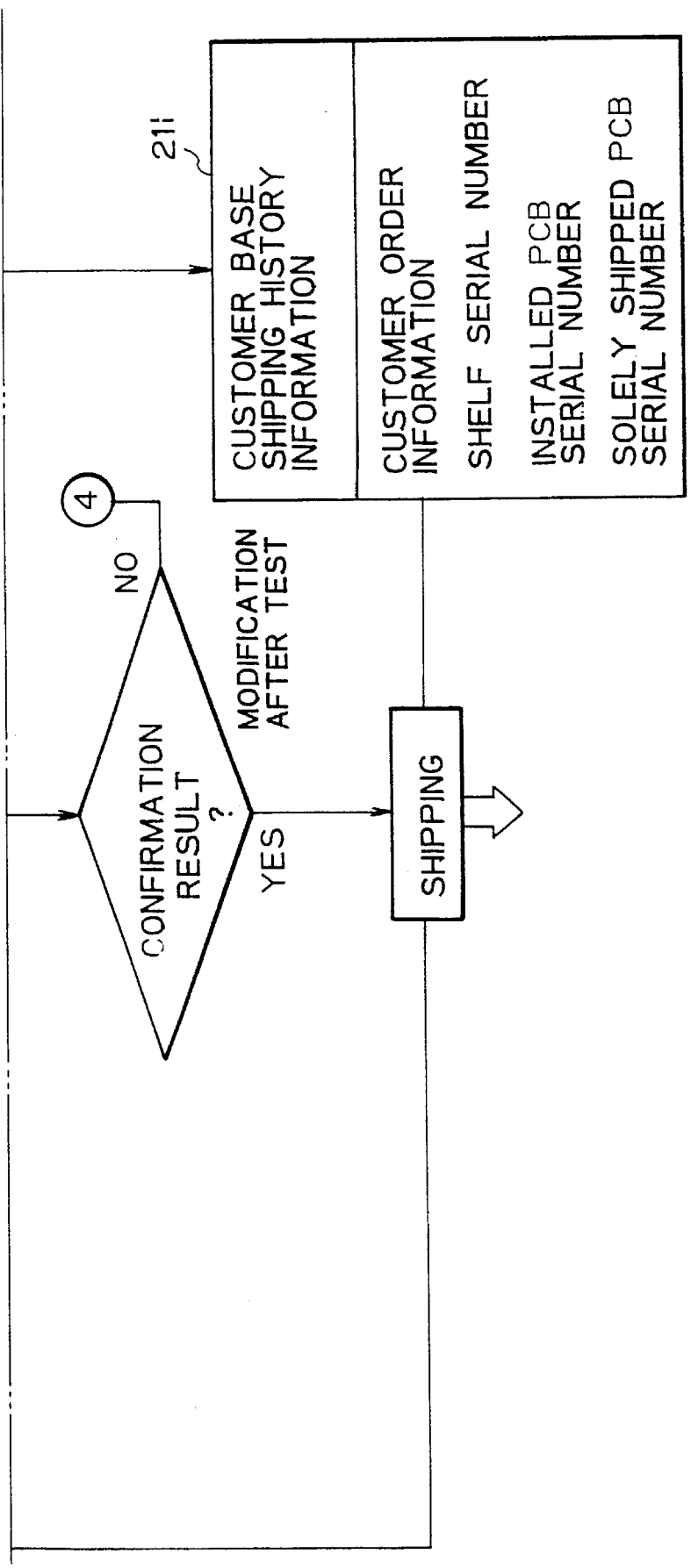

FIGS. 19-A and 19-B show flowcharts showing processes of delivery of the PCBs and shelves, collection of history information, and confirmation of inclusion of design modification, which are executed by the floor control system 3. FIG. 20-A is an example of input data to be used and FIG. 20-B shows an example of output data as a result of a process.

In FIG. 19-A, when production planning is done and a material delivery plan and order instructions are generated (301 and 302 of FIG. 19-A), confirmation of completion of the material products and confirmation of the unit serial number are performed on the basis of equipment installation data (303). For this, the unit serial number data (see (A) of FIG. 17-C) and the equipment installation drawing data (see FIG. 15) as the CAD information 21a are input. As well, from the factory side, the PCB finished products storage state and the shelves assembling completing state are input as production information 21b. The examples of data of a PCB finished product storage state and the shelves assembling completion state are shown in (A) and (B) of FIG. 20-A, and respectively contain product name, drawing number, unit serial number, production year and month, and machine number in the production year and date and so forth.

Decision is made to determine whether necessary components (PCBs and shelf) for completing the equipment are ready or not (304). If not ready (some of the components are not yet prepared), the production state is checked, a material delivery schedule is adjusted, and the system is placed in the stand-by state. If ready, the serial number is confirmed (307). If the serial number is not consistent, re-modifying operation is commanded and remodification inspection is performed (308, 309). If the serial number is consistent, commands for delivery of the shelf and PCBs are generated (310).

In response to the commands, the PCB finished product is delivered from the storage 21c and the completed shelf at the shelf assembling station are delivered from the station 21d. Then, installation of the PCBs is performed. Thereafter, history information (installation result) is read (311). Subsequently, the equipment test is performed (312). The read history information is stored in the production history information 21e (file 44 of FIG. 8, the example of data is shown in FIG. 20-B).

Figure 1:
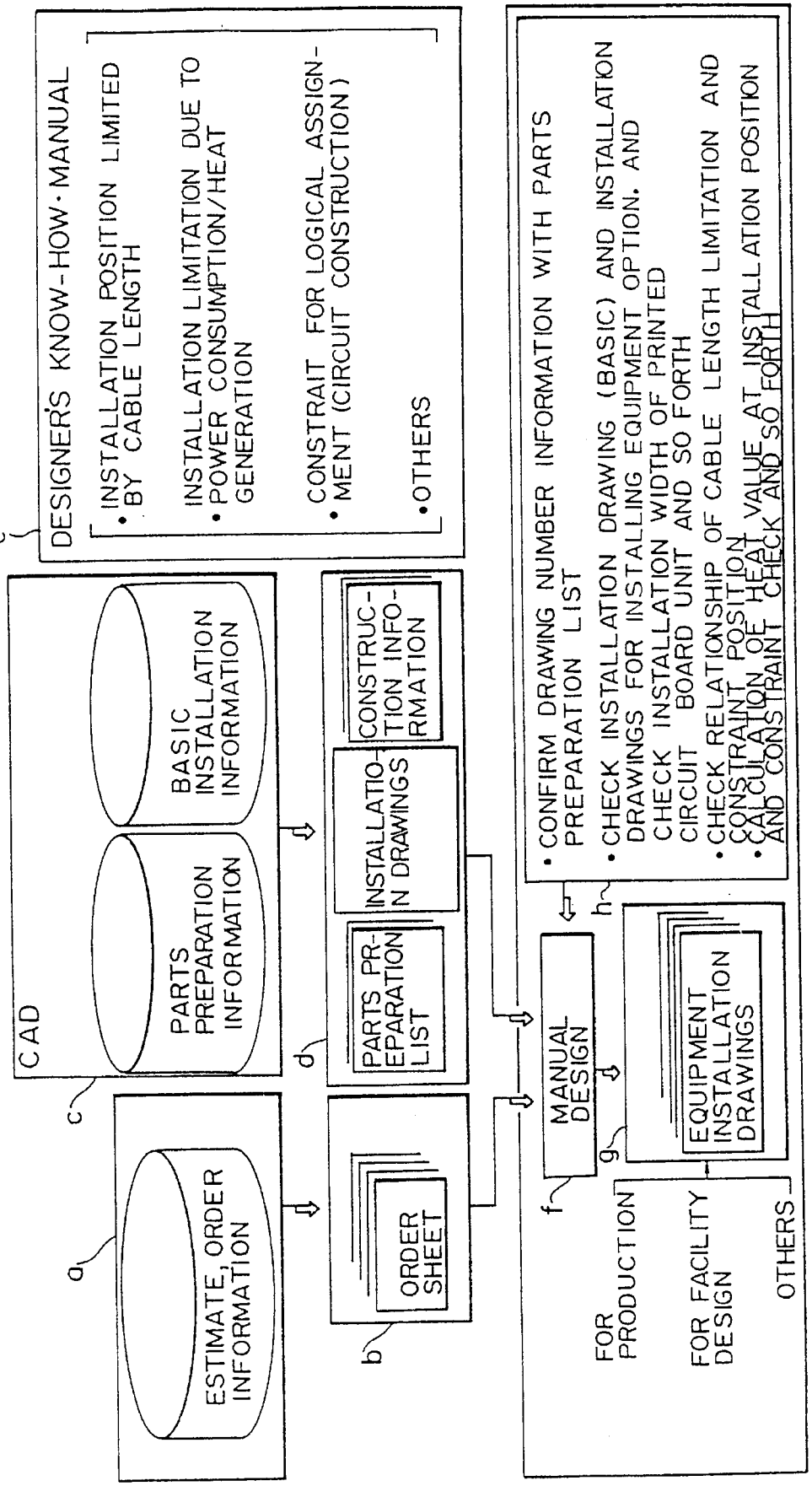
FIG. 1 is an explanatory illustration showing a process of customized equipment installation design in the prior art.

After the equipment test, the process is merged with the process of FIG. 19-B through the merge point indicated by the encircled FIG. 1, and then the result of the test is checked (313 of FIG. 19-B). When the result indicates that the produced equipment is good, the equipment is-shipped or, alternatively stored in the product storage 314). If the result of test indicates that the produced equipment is no good, the production process is reviewed to check and determine whether the problem is caused in the production process or not (315). If no problem is found in the production process, re-construction is performed via review of design (316, 317). If the problem is found in the production process, a re-construction request is issued and replacement with the re-constructed product is performed (318). After step 317 or 318, correction of the production history information 21e (reading out of information is again performed for obtaining information of the replaced PCBs) is performed for updating to the new production history information 215 (319). Then, the process returns to step 312 through the merge point indicated by the encircled FIG. 2. When the result of test at the step 312 indicates that the equipment is good, then the equipment is shipped or stored in the product storage.

With respect to the products in the product storage, a check of the orders, serial numbers and production history is performed (320). At this time, a check is performed based on the most current serial number informationn21g (see (A) of FIG. 17-C), the customer's final order information 21h (similar to FIG. 11), and most current production history information 21f. When it is determined that the equipment corresponds to the order and also corresponds to the modified serial number, the equipment is shipped. At the same time, the information associated herewith is stored as the customer base shipping history information 21i (file 45 of FIG. 8). If inconsistent, the process returns to the process for correcting the production history through the merge point indicated by the encircled FIG. 4 (319 of FIG. 19-B)

FIGS. 24A–B show an example of data obtained by a collection of the production history information and the shipping history information. Namely, the data includes the destination of delivery in the customer and order information and production and history information including data of the shelf of the product, the installed PCBs, and unit shipping, the installation drawings and production and shipping history information (unit serial number, production year and month and machine number) for each PCB installed on the shelf.

Field information management performs management for information generated by a change of construction or modification for the equipment already delivered to the customer.

Figure 21:
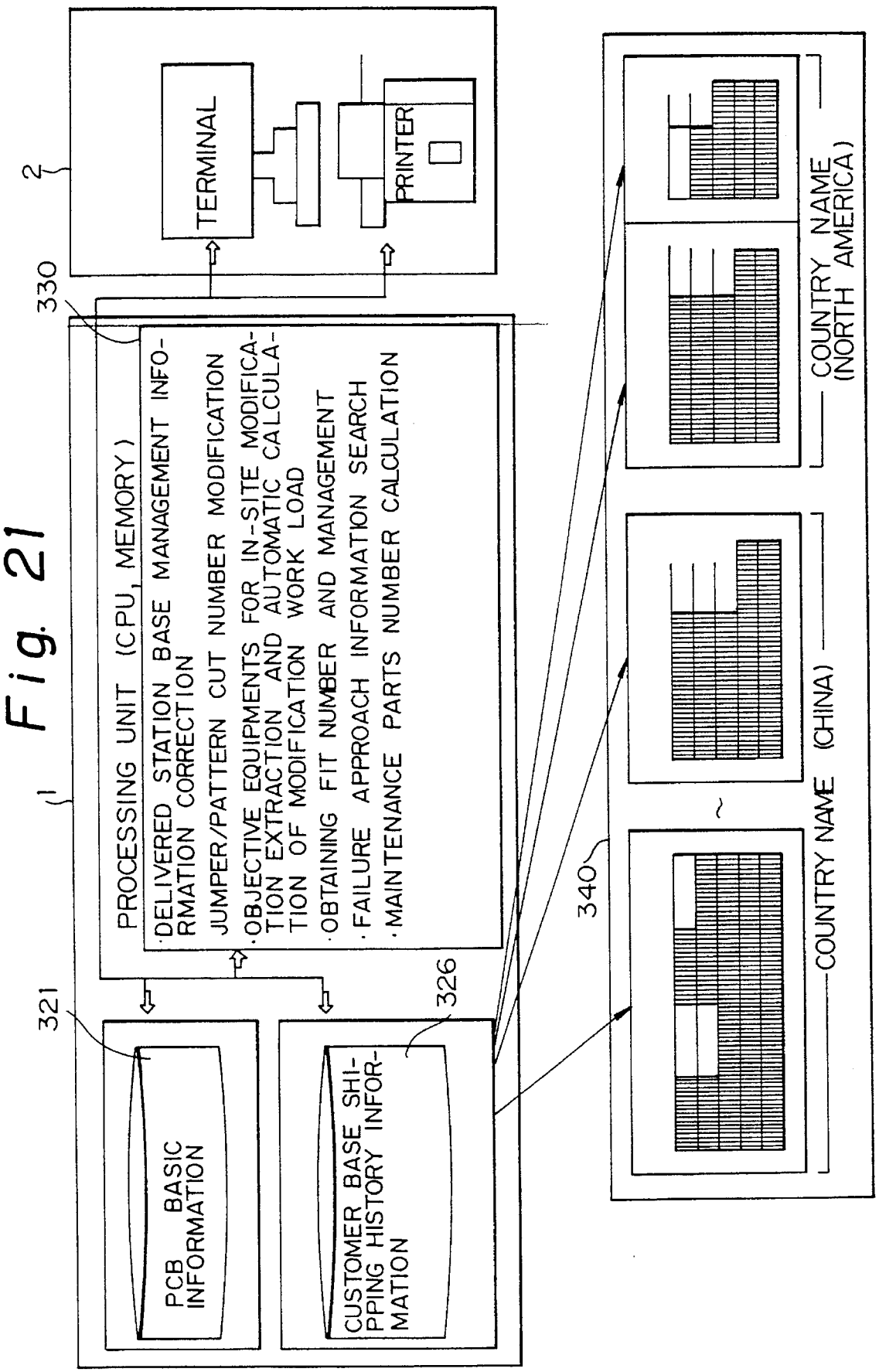
FIG. 21 is a schematic block diagram showing a construction for field information management according to the present invention.

FIG. 21 shows a construction of the field information management. In the central control means 1, a processing is performed by the program in the processing unit (CPU and memory 330) using the PCB basic information file 321 and the customer base shipping history information 326. As shown in FIG. 21, the installed contents of the field equipments 340 that have been already delivered (exchanges delivered to stations in various countries) are stored in the shipping history information file 326. This file is used as field information for the addition of a function in response to a demand from the customer.

Figure 22B:
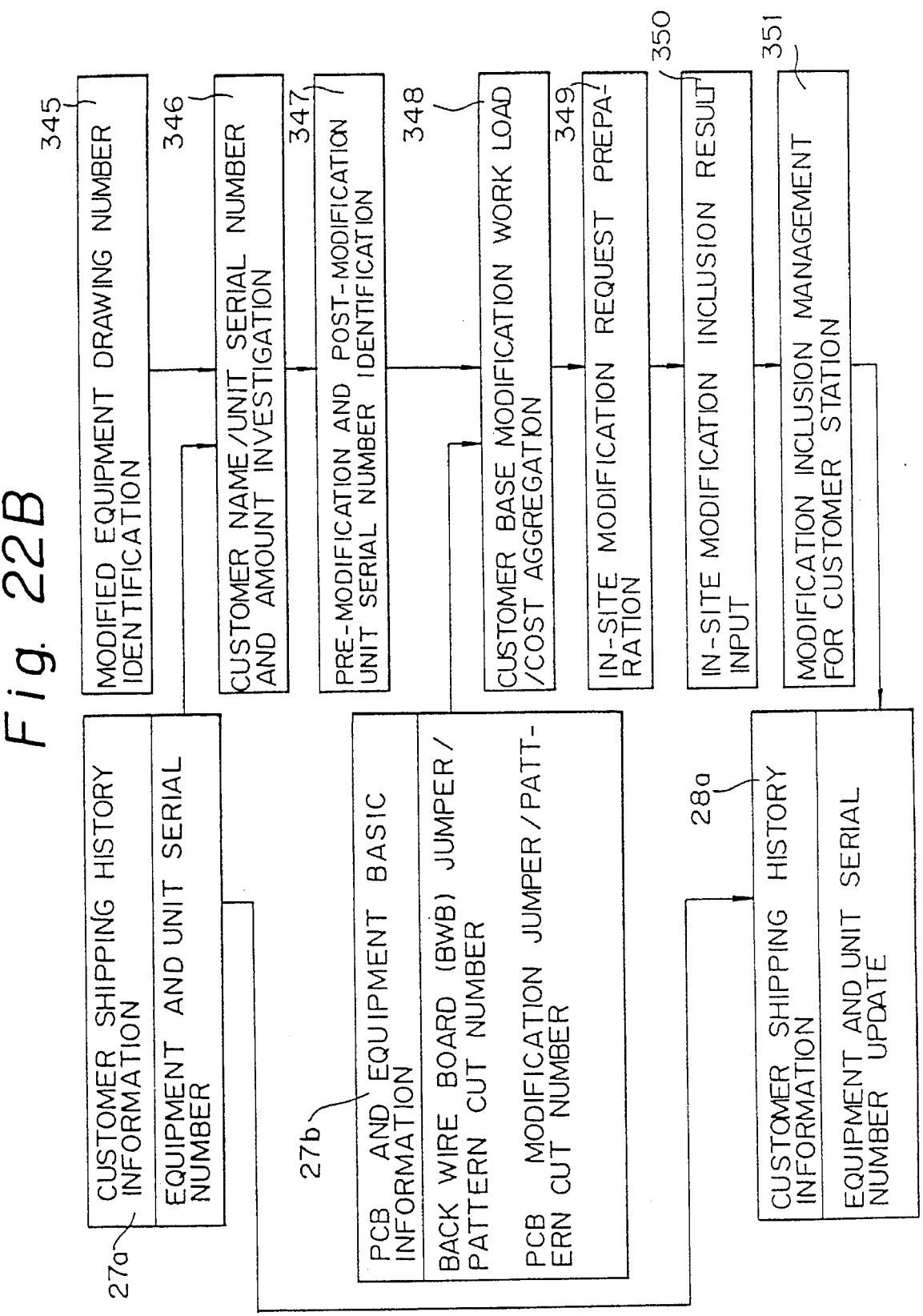

FIGS. 22A–B show flowcharts for processing field information. (A) shows a flowchart for an aggregation process for a number of re-constructed jumper cables upon order from the customer, and (B) shows a flowchart for managing an inclusion of modification for the shipped products. These processes are performed by the central control means 1. FIG. 23 shows an example of PCB basic information to be used for the process of FIG. 22. FIGS. 24A–B show examples of output data of the process of FIG. 22, in which (A) shows output data of aggregation corresponding to the customer's order, and (B) shows the output data of a modification inclusion request with respect to the field products.

In (A), when the order number designated by the customer (341 of FIG. 22), the corresponding number of equipment and unit serial number are extracted (342) from the customer base shipping history information 20a. With the extracted number of equipment and unit serial number and the PCB basic information 21b (file 21 of FIG. 8, and the example thereof is shown in FIG. 23), the jumper pattern cable, pattern cut number are aggregated with respect to each of the PCBs or the equipment (343).

FIG. 23 shows the example of the PCB basic information. This is the information of the aggregated output data, such as design modification data and so forth, aggregated on a PCB basis or an equipment basis. In the shown example, it contains a unit serial number; the modification history information or re-construction amount (re-constructed jumper cable number, pattern cut number and so forth) corresponding to the product name and drawing number, are included. With reference to this information, aggregation of the total amount of jumper cables and pattern cuts on a customer basis and corresponding to an order is performed on the basis of the aggregating results of each PCB (344 of FIG. 22) (A) of FIG. 24 shows an example of an output of the total amount of jumper cables and pattern cuts corresponding to the customer's order. In this case, with respect to the order information including the order number, the destination and so forth, the output contains the number of the corresponding equipment, the number of each PCBs installed in that equipment, and the total.

(B) of FIG. 22 shows the flowchart of the process of modification inclusion management. Initially, when the drawing number of the modified equipment is identified (315), the equipment and the unit serial number in the customer base shipping history 27a (see FIG. 20-B) are entered to search the name of the customer, and the unit serial number and amount (346) to command the unit serial number before and after modification 347. Next, using the PCB basic information 27b, calculation of the customer base re-construction work load and cost is performed (348). Then, an in-site re-construction request is prepared and the result of in-site re-construction inclusion is entered to perform management of the modification inclusion information with respect to the station at the site (349 to 351).

An example of the output of the modification inclusion request (step 349) with respect to the field product is shown in (B) of FIG. 24. Namely, PCB of design modification, modification material number, unit serial number, content of additional function and so forth are included together with the place where the equipment holding the subject PCB is installed, order number and other information.

For field information management, another function for the aggregation of a FIT number (failure occurrence ratio) of the PCBs and so forth on the basis of the result of analysis of the failure information generated during an operation. Such information can be used as feedback for parts selection and for inspection.

As set forth above, according to the present invention, the equipment installation design operation for respective customers and respective orders can be made effective with enhanced quality by establishing a library of know-how of the customer base equipment installation design, which has been conventionally in the manual operation, by establishing a system using the customer's order file and design data file (CAD).

Also, in response to the occurrence of design modification or change of serial number, an associated data file can be updated so that they may exactly reflect the state at the production stage, shipping stage and so forth.

Furthermore, by providing the equipment installation information to the factory, an operation in the production process can be formed efficiently and a collection of shipping history information, a checking of serial numbers upon shipping to determine that the equipment can be shipped or not, can be automated. By this, unified management from equipment installation designing to the collection of the shipping history information can be possible to make the designing operation effective, to reduce the work load in production and effect information management for the shipped product effectively with high quality.

Next, another embodiment of the present invention will be discussed. Although, in the former embodiment of FIG. 7, the internal construction of the equipment installation means 10 has not been illustrated, the construction set out herebelow is applicable for the former embodiment.

Figure 25:
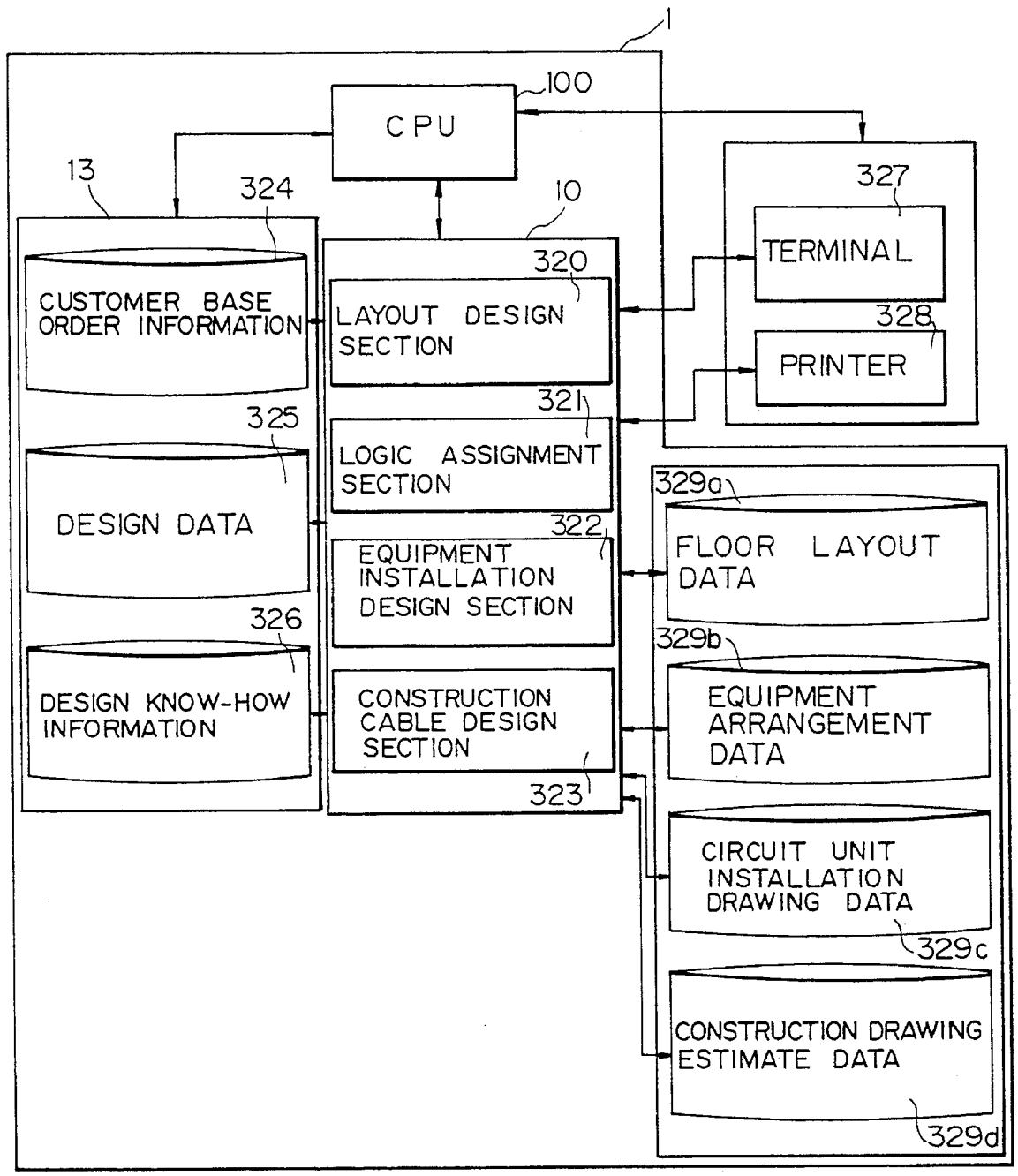
FIG. 25 is a schematic block diagram of the second embodiment of the management system according to the present invention.

FIG. 25 shows the second embodiment of the present invention. The second embodiment of the production management system according to the present invention includes the central control means 1, a terminal means 2 including a terminal unit 327 forming the data input and output section and a printer 326. The central control means 1 includes CPU 100 as an arithmetic means for performing various arithmetic operation, the equipment installation designing means 10, the data file section 13 and the equipment installation design data file section 14. In the shown embodiment, the equipment installation designing means 10 includes at least one equipment mounting designing section 322, a construction drawing designing section 323, a layout designing section and a logic assigning section 321, for example.

On the other hand, the data file section 13 includes the customer's order information file 324, the design data file 325 and the design know-how file 326, as in the former embodiment. Furthermore, in the shown embodiment, the equipment installation data file section 14 includes at least one of a floor layout data file 329a, the equipment arrangement data file 329b, a circuit unit installation drawing data file 329c, construction drawings and estimate data file 329d, for example.

In the shown embodiment, the manual and design know-how in the conventional designing method are registered in a library so that designing operation is performed through a terminal of an information processing unit in unified manner from system equipment installation drawings to construction designing. In practice, in the customer base order information file 324, the conditions, such as functions required by the customer and scale and so forth, are stored. The design data file 325 stores various CAD data including the standard information of the parts, installation drawings, structure drawings, electronic circuit printed board (PCB) and so forth. Also, in the design know-how information file 326 is a file registering system and installation know-how (logic assignment condition, equipment mounting condition, layout condition and so forth) in a sorted manner with respect to each condition, as well as a layout condition of station building, equipment arrangement and installation condition, equipment connection logical condition and so forth.

In response to the command through the terminal unit 327, part of or all of the sections 320 to 323 of the central control means 1 starts an operation to perform equipment installation design for communication equipment, for example. The layout design section 320 performs, as activated, the designing of a floor layout (arrangement of the equipment frames on an installing floor and arrangement of shelves in the equipment frame) of the communication equipment corresponding to the customer's order using the customer's order information file 324, the design data file 325 and design know-how information file 326. The result of the design of the floor layout is stored in the floor layout file 329a. This data can be printed by the printer 328.

When the logic assignment designing section 321 is activated, based on the arrangement of the equipment frame in a floor layout (stored in 329a) produced by the floor layout designing section, and the customer's order information 324, assignment of number of shelves to be installed in each equipment. assignment of installation positions, assignment for connections and so forth are performed using the customer's order information file, the design data file 325, and the design know-how information file 326. The result is stored in the equipment arrangement data file 329b.

Thereafter, when the equipment installation designing section 322 is activated, the equipment installation designing section 322 performs automatic assignment of installation positions and type of the installed electronic circuit units (PCBs) in the shelves in each equipment, for example, by designating one of a plurality of preliminary set reference connection patters using the equipment arrangement data (stored in 329b) produced b the logic assignment designing section, and using the customer's order information file 324, the design data file 325 and the design know-how information file 326 with respect to the arranged equipment.

This assignment is performed with respect to each equipment to derive the installation number for each equipment, and to check installation capability (whether the component, i.e. PCB or shelf, is assigned to a position other than the designated position, whether it is consistent with a limit of length of the connection cables, or a limit of heat generation amount or not). If appropriate, a current condition input is made for designing the installation adapted to the conditions. The result obtained through this installation design is stored in the circuit unit installation drawings data file 329c.

Next, a construction cable designing section 323 is activated. With respect to the equipment installation data (stored in 329c) of the objective communication equipment, cable length is automatically calculated corresponding to the connection information corresponding to respective conditions (over frame, cable rack, under floor) using basic data of cable design registered in the design know-how information file 326. Based on this, construction drawing and estimate data file 329d including cable estimate, cable connection data, work load, number of necessary parts, is established.

Figure 26:
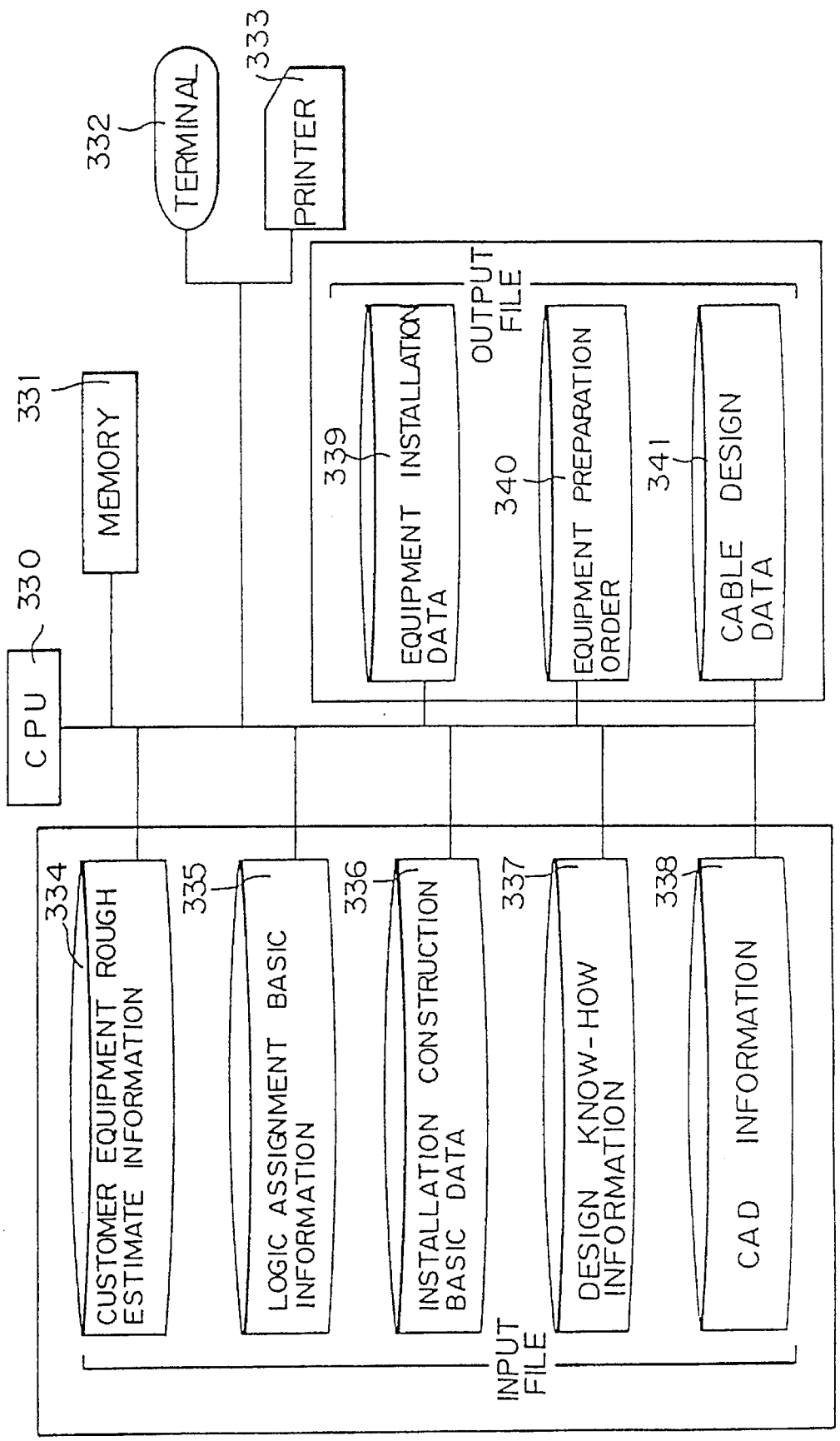
FIG. 26 is a schematic diagram showing system construction of the second embodiment of the management system.

FIG. 26 shows the construction of the second embodiment of the production management system according to the present invention.

In FIG. 26, the reference numeral 330 denotes CPU (central control means), 331 denotes a memory, 332 denotes a terminal unit, and 333 denotes a printer. The reference numerals 334 to 338 denote input files, in which 334 is a customer base equipment number rough estimate information file (corresponding to 324 of FIG. 25) established by the estimated number of equipment to form the communication equipment having a specification ordered in the customer's order, 335 is a logic assignment basic information file (corresponding to 326 of FIG. 25), 336 is an installation and construction basic data (included in 326 of FIG. 25), 337 is design know-how information, and 338 is the CAD information file (corresponding to 325 of FIG. 25). The reference numeral 339 to 341 denote output files for storing resultant data of design, in which 339 is the equipment installation data file, 340 is an equipment preparation order file and 341 is a cable design data file.

FIGS. 27 to 30 respectively show the construction and terminal operation in a floor layout design for the equipment, installation design for equipment by logical assignment, equipment mounting design, construction drawing design, performed in the system construction set forth above.

Figure 27B:
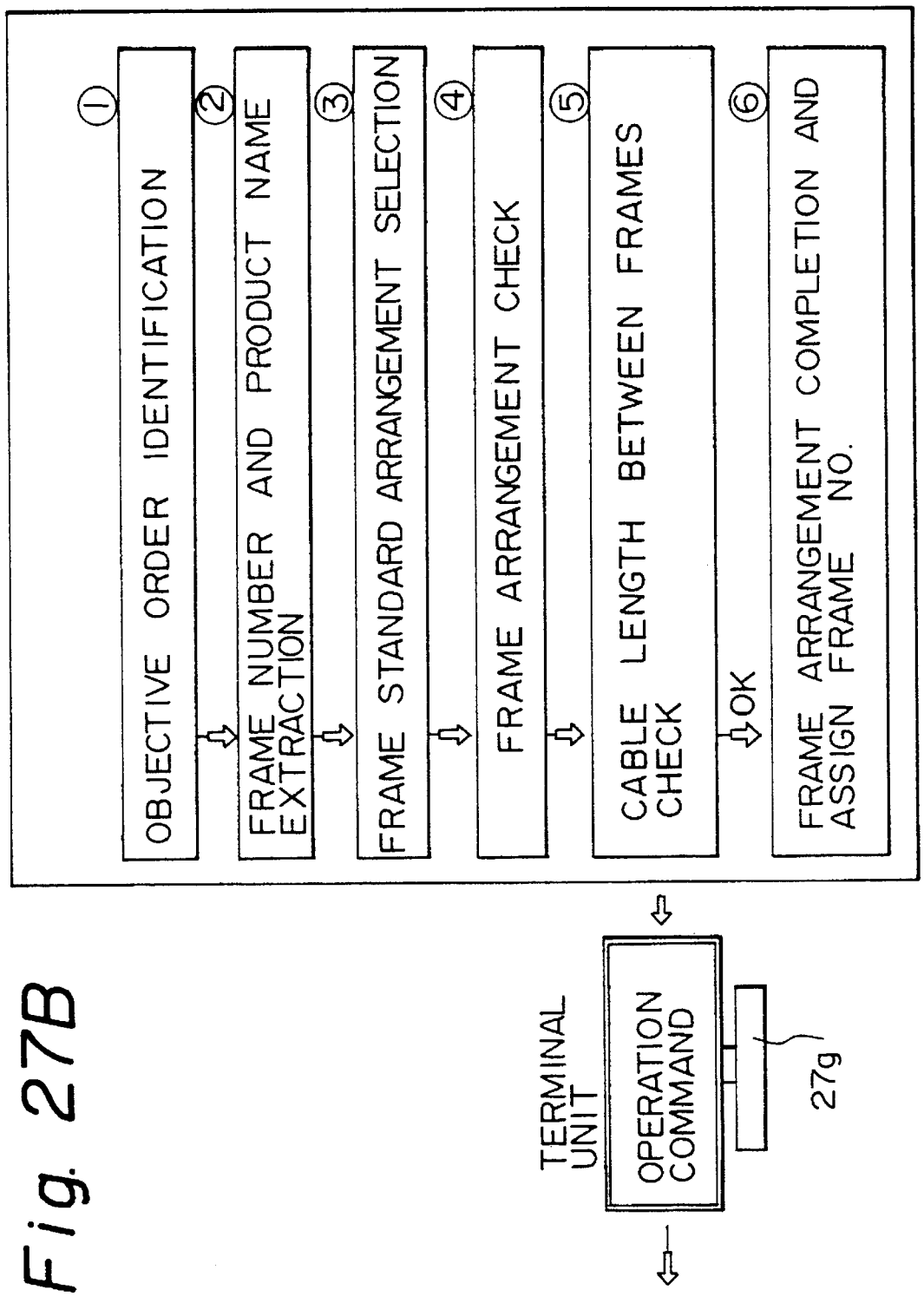
FIG. 27 is a diagram illustrating connected drawings including FIGS. 27A and 27B which are explanatory block diagrams showing construction of equipment installation designing with logical assignment and operation of terminals in the second embodiment according to the present invention.

FIGS. 27A-B show the explanatory illustration showing the construction and terminal operation of the floor layout design.

In FIGS. 27A-B, for designing of floor layout, the customer base estimate file 27d (included in the customer base equipment number rough estimate information file 334 of FIG. 26) storing equipment frame types and numbers produced on the basis of the customer base order is used together with a layout condition file 27a registering standard equipment arrangement, the installation and construction file 27b registering the product name of the equipment frame, installing dimension on a frame name basis, and the line length calculation basic data file 27c registering inter-frame cable length limitation and gnostic data for calculation, included the design know-how information file 337.

The layout program 27e provided in the center control means 1 (stored in the memory 331 of FIG. 26) is executed in the interactive manner to display the necessary information for promoting the entry of a command through the terminal unit 278, for performing designing of the floor layout. Process steps 351, 352, . . . 356 are shown on the right side FIG. 27.

Initially, the objective order is designated among the layout condition file 27a (351). Then, the number of equipment frames and the product names are extracted among those displayed and entered (352). By this, the installing dimensions on the equipment frame name basis can be obtained from the installation and construction file 27b. Next, the standard arrangement of the equipment frame is selected from the layout condition file 27a (353). Then, a check is performed with respect to the arrangement of the equipment frame so as to know whether the standard arrangement can be used or a modification is required (354). With respect to the arrangement thus obtained, a check is performed for the length of the interconnection cable between the equipment frames (deriving the cable length and checking with respect to the standard condition) (355). When the result of the check is good, arrangement of the equipment frame is terminated and the equipment number is assigned (356). The result of designing the floor layout is stored in the frame arrangement file 27f.

Next, the construction and the terminal operation in the equipment installation design by logicassignment will be discussed with reference to FIGS. 28A-B.

In this logic assignment, the construction of an electronic exchange is illustrated as an example of logic assignment in the left upper block 341 of FIG. 28. In the shown construction, a plurality of CPR (call processor) for communication path control are provided for MPR (main processor). For each of the CPR, NW (network), LC (subscriber lines), DT (dial toning device), PB (PB signal receiver) are provided. For such exchange, the logic assignment condition file 27h (logic assignment basic information file 325 of FIG. 26) formed by a library of logic assignment condition, an equipment assignment file 27i storing an equipment assignment condition depending upon design conditions, and an equipment basic information file 27f storing construction, power consumption and so forth, are used.

On the other hand, as an object for assignment, the customer base estimate file 27d and an equipment frame arrangement file 27f as the result of a design in FIG. 27 are entered. A design operation is then performed in an interactive manner with the logic assignment equipment installation design program in the central control means 1 and the terminal unit 278. Initially, the number of the MPR of the electronic exchange as the objective for designing is extracted from the equipment name and number in the data of the customer based estimate file (3761 of FIG. 28). Subsequently, assignment of respective equipment corresponding to the MPR is performed using the logic assignment condition file 27h (362).

Next, with respect to each MPR corresponding equipment, assignment for connecting equipment is performed on a CPR unit basis using the equipment assignment file 27i, and then a check is performed to determine that the length of the cable is not excessively long 363). If the result is good, a check is performed for power consumption and amount of heat to be generated using the equipment basic information file 27j (364). Thereafter, assignment of a shelf number for the shelves to be installed in the equipment frame is performed (365). Then, the equipment arrangement drawing file 27l (including a respective equipment frame corresponding to a shelf installation number, number of printed board unit) as a result of this logic assignment is obtained.

Figure 29B:
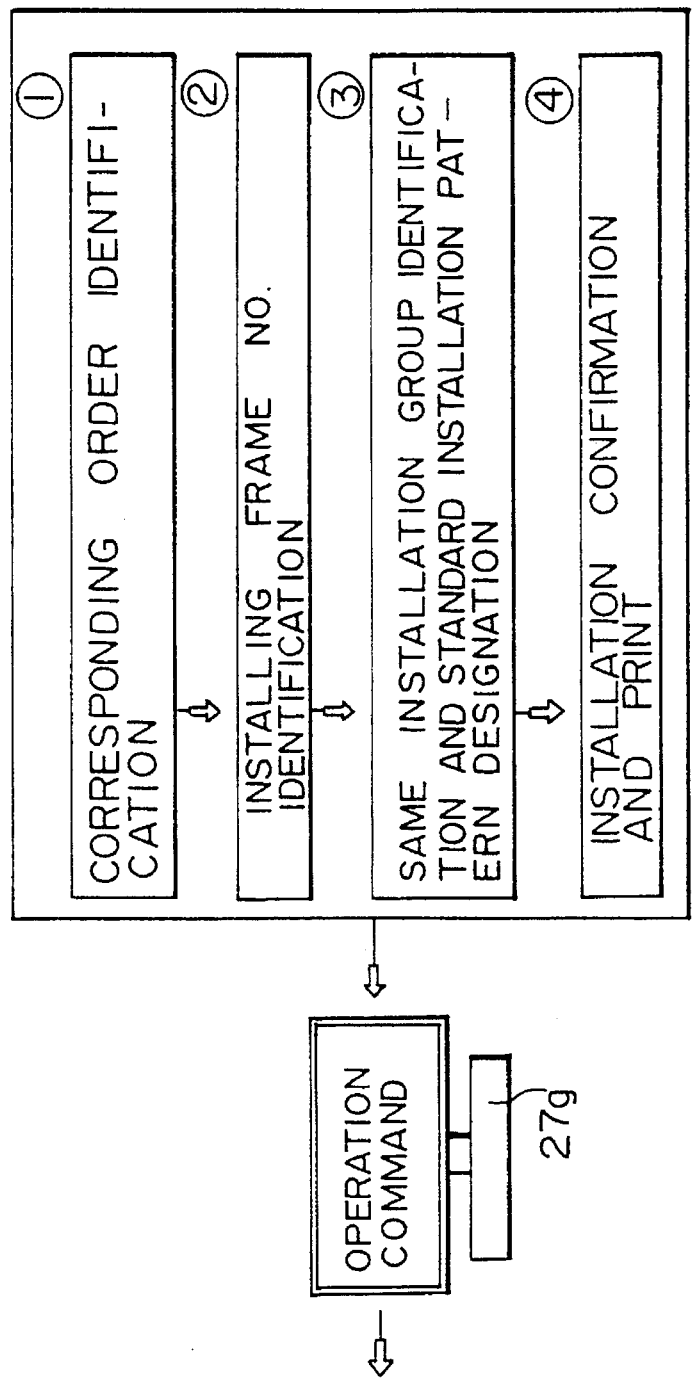
FIG. 29 is a diagram illustrating connected drawings including FIGS. 29A and 29B which are explanatory block diagrams showing construction of floor layout designing and operation of the terminals in the second embodiment according to the present invention.

Next, the construction and terminal operation of the equipment installation design of FIGS. 29A–B will be discussed.

In the installation design of FIG. 29, the customer's order and the result of logic assignment (equipment arrangement drawing file 27l) are used as an input information file, Furthermore, the equipment parts database 29d (included in the construction basic data file 336 of FIG. 26)) for aggregation of the printed board unit, the standard installation drawing (included in the design know-how information file 337 of FIG. 26) storing the standard pattern of equipment installation is entered.

The central control means 1 contains an equipment derivation and installation program 29a. With the instruction through the terminal unit 278 in an interactive manner, design for the equipment frame arrangement and shelf arrangement is performed.

Initially, the objective order (electronic circuit printed board unit) is designated (371). Then, the installing frame number of the corresponding equipment is designated (372). Subsequently, the frame numbers having the same installation contents are designated as a group and the standard installation pattern therefor is designated (373), Through this, for the equipment having a common installation content, installation design for the electronic circuit units is performed according to the standard installation pattern (stored in the file 336). The installation content is verified through the display and then printed (374). At the same time, the equipment installation drawing is stored in the installation file 29b of the electronic circuit printed board unit.

Figure 30B:
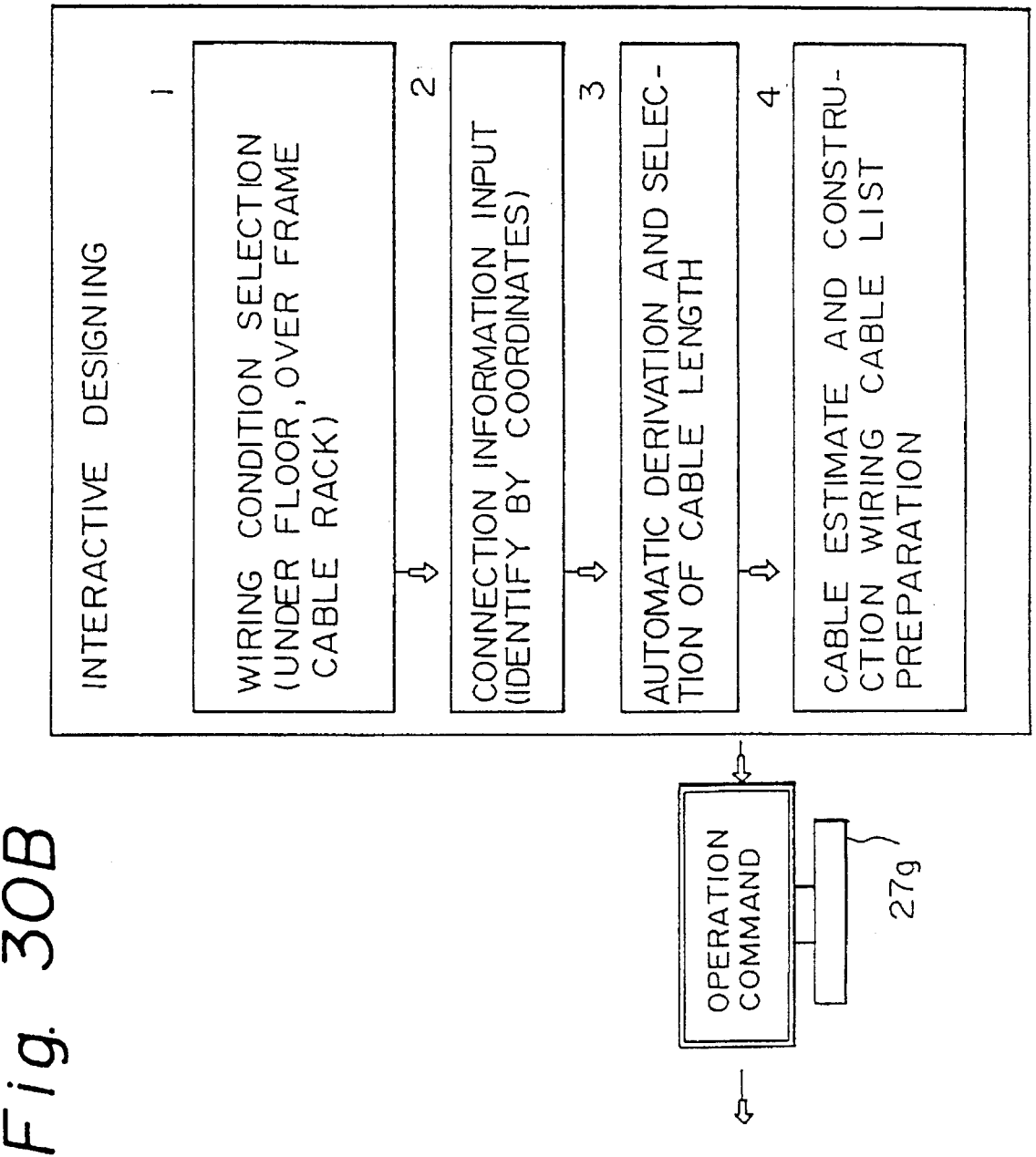
FIG. 30 is a diagram illustrating connected drawings including FIGS. 30A and 30B which are explanatory block diagrams showing construction of designing constructing operation drawings and operation of the terminals in the second embodiment according to the present invention.

FIGS. 30A–B show the construction and terminal operation of the construction drawing design.

In FIGS. 30A–B, the connection logic information file 30a for performing an input check of the connection information, the installation and construction information file 30b storing the basic information for cable design and the cable length derivation and estimate file 30c storing the cable design basic data file are used as input files. As input data for design, the equipment installation drawing file (equipment arrangement drawing 30f, the shelf construction information file 30g and the connection information file 30h are entered.

A practical example of the equipment arrangement drawing as the objective of the construction drawing design is illustrated in FIG. 31. (A) of FIG. 31 is a frame arrangement drawing. In the shown example, a plurality of equipment frames are arranged on the floor in two rows. (B) of FIG. 31 shows the shelf structure drawings, in which three frames (0101, 0102, 0103) are arranged and respective frames include five shelves. (C) of FIG. 31 shows connection information that sets coordinates (frame number, shelf number, slot number) of respective two points to be connected.

In FIG. 30, the central control means 1 contains the construction cable design and connection table preparation program 30d. The central control means 1 executes the program in response to a command from the terminal unit 278.

In the terminal unit 278 of FIGS. 30A–B, the wiring condition is selected among under floor, over frame and cable rack (see (B) of FIG. 31) (381). Then, entry of the connection information is performed by designating the product name and coordinate in the right column of the connection information C with respect to the product name and the coordinate in the left column of the connection information C (382). At this time, a check is performed to determine whether the connection is proper or not with the connection logic information file 30a. If a connection is possible, a connection is permitted and then automatic calculation and selection of the cable length using the cable length derivation and estimate information file, is performed (383). Then, a wiring list for an estimate of the cable and construction wiring is prepared and the process is terminated (384). The result is stored in the wiring and construction cable information file 30e including the construction wiring drawings and cable list.

Next, the process to be performed by the computer forming the central control means 1 (CPU 320 and memory 331 of FIG. 26) executed in response to the inputs from the terminal unit and/or respective files for realizing the equipment installation design system according to the present invention, will be discussed with the data structure to be used for respective processes.

Figure 40:
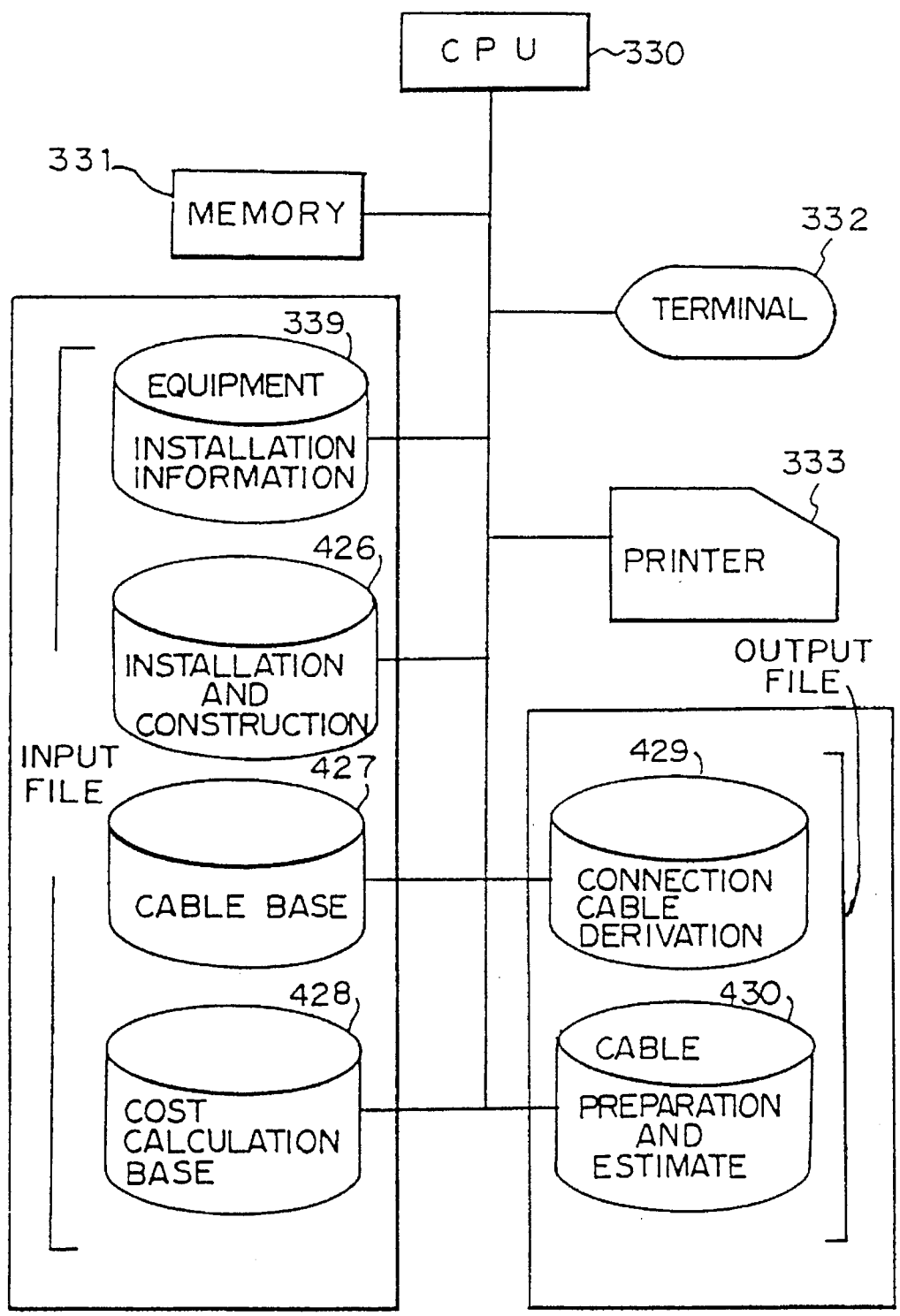
FIG. 40 is a schematic block diagram showing a construction of a system for processing construction cable designing and so forth according to the present invention.

FIGS. 32 to 35B are flowcharts of the equipment installation design. FIGS. 36 to 38 show examples of the input data therefrom and FIGS. 39 and 40 show examples of output data. It should be noted that the shown process will be discussed in terms of an example for communication equipment, especially for installation of the electronic exchange. The input data (file) to be used for the processes are provided from the input files 334 to 338 shown in FIG. 26, and the output data are stored in the output files 339 and 340.

Figure 32:
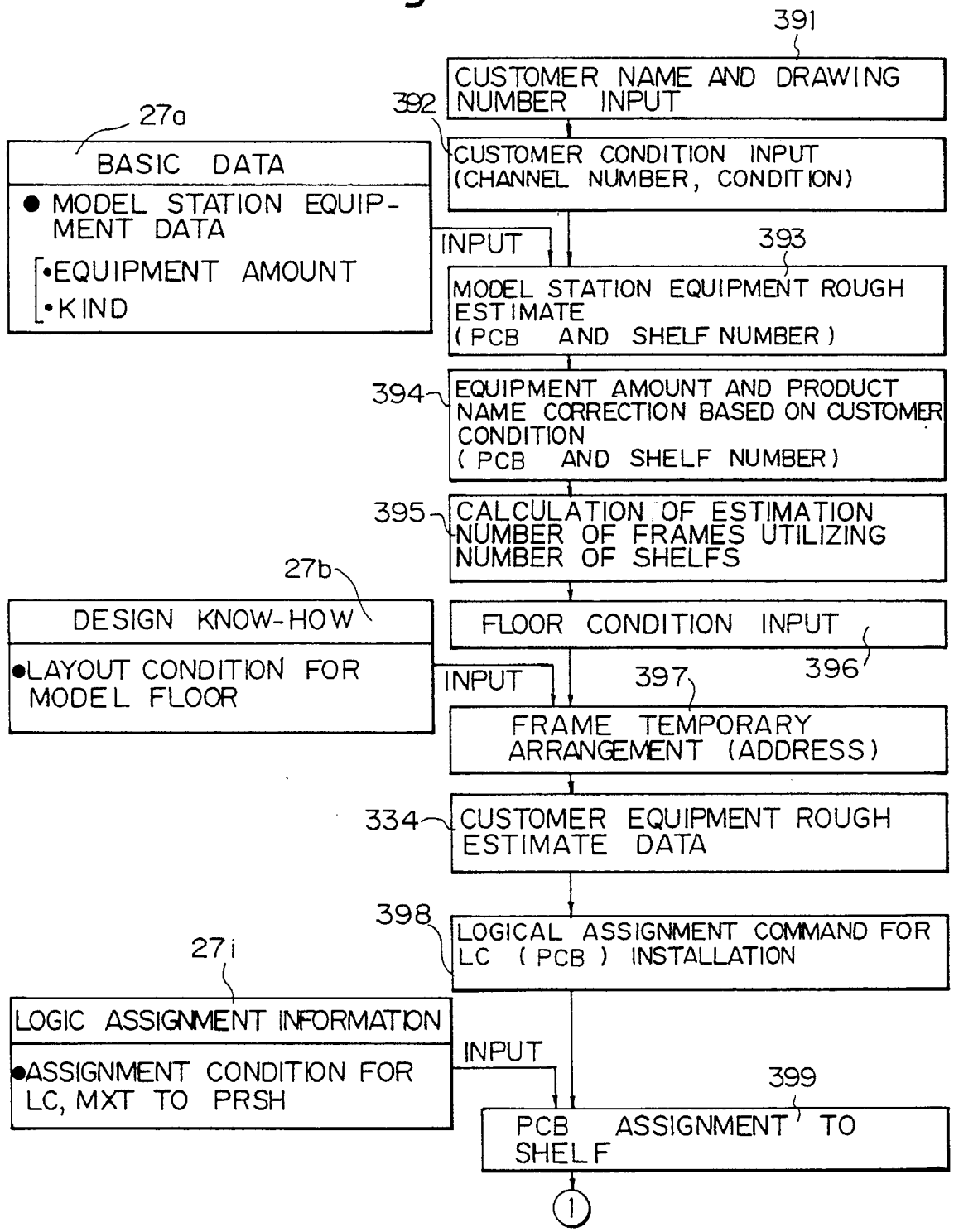

In FIG. 32, the name of customer and drawing number are initially entered through the terminal unit (332 of FIG. 26), and the number of channels, installation condition and other customer conditions are entered. Also, among the basic data 27a (included in the design know-how file 337 of FIG. 26) holding the model station equipment data, a model station (exchange station) construction corresponding to the customer's condition is selected. With respect to the selected model station construction, a rough estimate of the number of electronic circuit printed board units (PCB) and the number of the shelves is performed (391 to 393 of FIG. 32). Subsequently, depending upon the customer's condition, correction of the equipment number and product name is performed. Based on the number of shelves, a rough estimate of the number of equipment frames is performed (394 and 395). Thereafter, the floor condition of the customer is entered. In response to this, a temporary arrangement of the frames is obtained from a corresponding model from the model floor layout condition 27b of the design know-how. The temporary arrangement of the frame thus obtained is output as the customer base equipment rough estimate data (file 334 of FIG. 26).

The layout condition of the model floors to be entered in the step 393 is exemplified as an example of layout design standard pattern data in A of the design know-how file shown in FIG. 13. The data contains an arrangement of the frames and the standard arrangement pattern corresponding to the shelf installation condition. In this example, patterns P1 and P2 are shown. On the other hand, the customer base equipment rough estimate data is exemplified in A of FIG. 36, in which the customer name, place to install, installation condition, operating condition, as well as the specification and numbers (including estimate) of the equipment are included.

By taking the customer base equipment rough estimate data (file 334) as input data, logical assignment for PCBs of LC (subscriber lines forming part of the electronic exchange) is commanded through the terminal unit. In response to this, an assignment condition for assigning LC and MXT to LPRSH (line processor shelf) is entered from the logic assignment information file 335 and 27i. Then automatic assignment of PCBs for the shelves is performed (399). An example of the logic assignment information is shown in B of FIG. 30. In this example, with respect to the MPR (main processor) of the electronic exchange, a plurality of CPRs (call processors) are provided, and for each CPR a plurality of LPRs (line processors) are connected. Furthermore, for each of LPRs, LC (subscriber line: line circuit) formed by a plurality of PCBs, and so forth, are arranged.

Figure 33A:
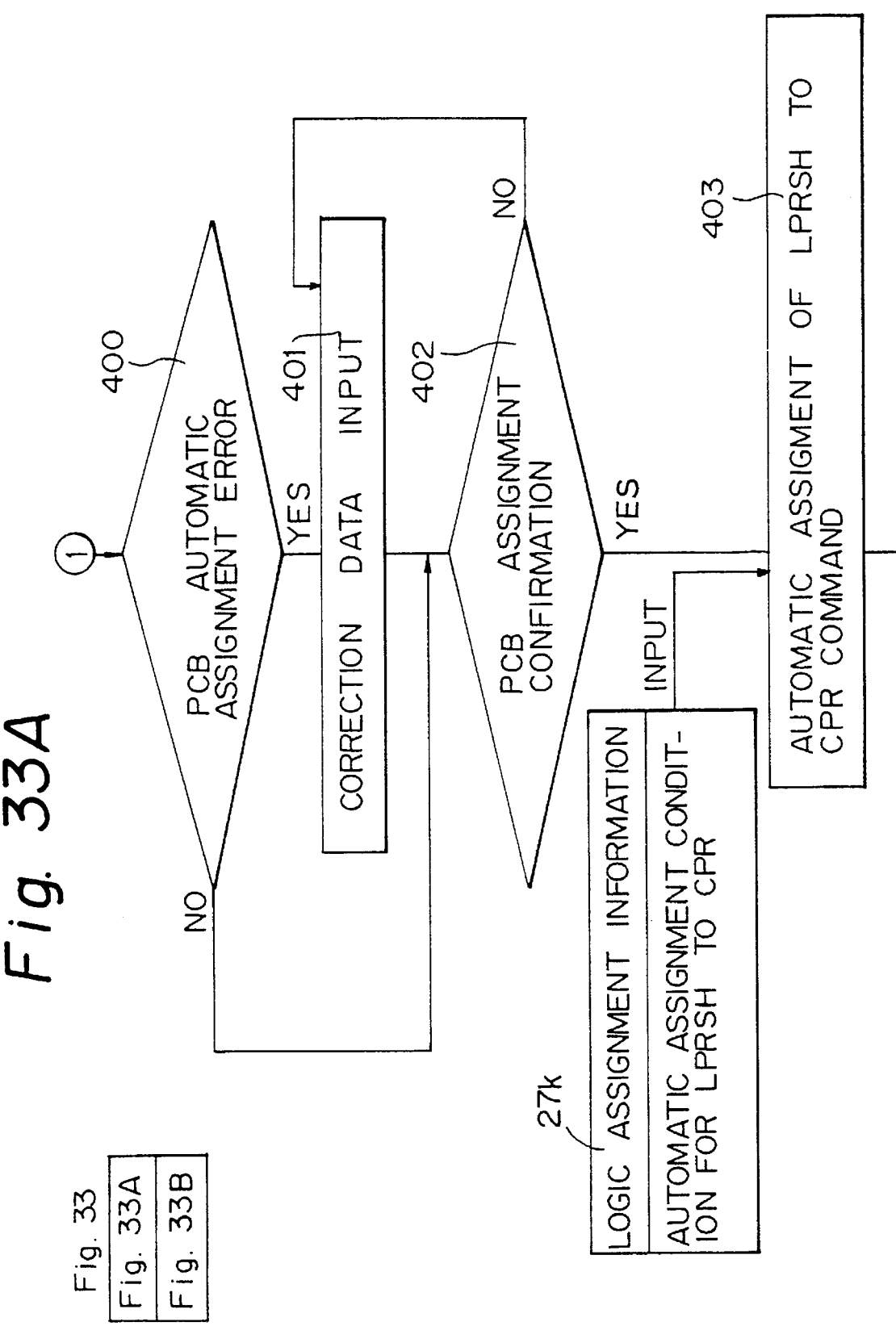
Figure 33B:
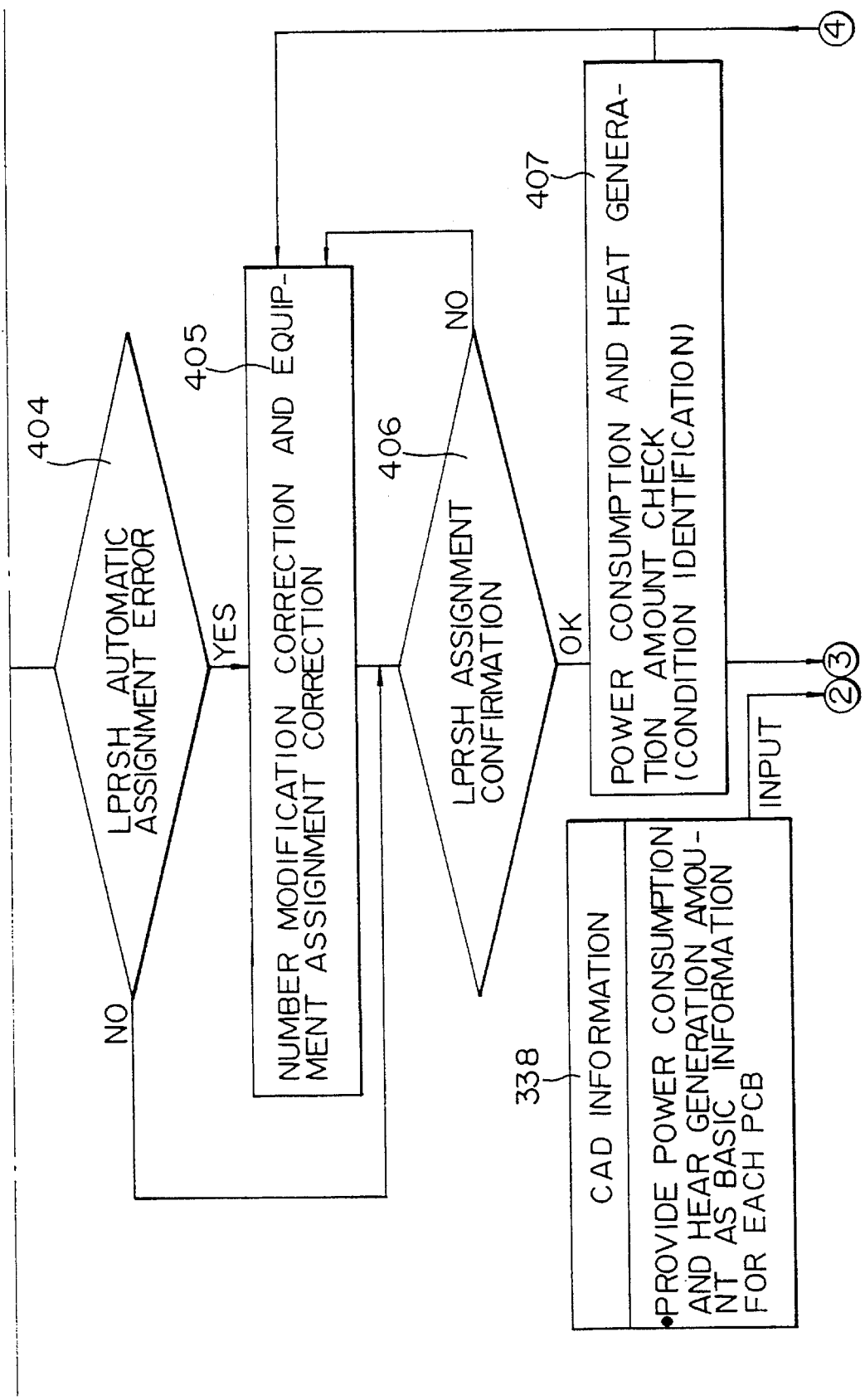

Moving the process to FIG. 33, a check is performed to determine whether an error has occurred in the automatic assignment of PCBs. If an error is found, entry of correction data is performed, and otherwise a check is performed to determine whether the PCBs are properly assigned (400 to 402). When proper assignment is confirmed, and by taking the automatic assignment condition of the logic assignment information file 27k for automatically assigning LPRSH to CPR as the input data, automatic assignment of LPRSH for the CPR is performed (403, 404). If an error occurs in the assignment, number and/or equipment assignment is corrected and then proper assignment is confirmed. Thereafter, checking of power consumption and heat generation are checked (condition designation) is commanded (405, 406, 407).

Figure 34A:
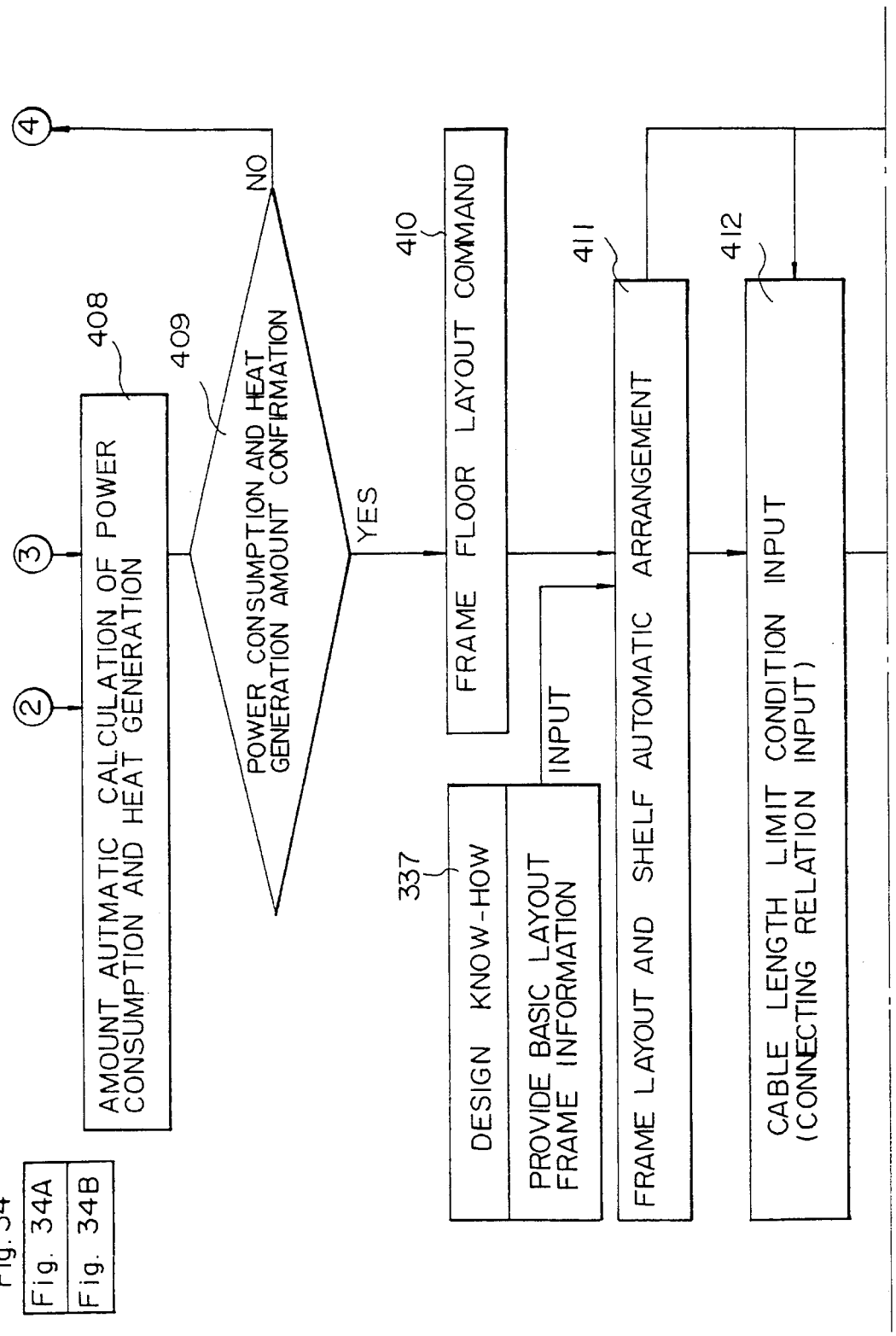

At this time, the information of power consumption and amount of heat generation in the basic information of each PCB is provided from the CAD information file 338, then in FIG. 34, automatic calculation of the power consumption and gnat generation amount and a check therefor are performed to confir the power consumption and heat generation amount (408, 309 of FIG. 34). An example of the PCB basic information of the CAD information 338 used at this time is shown in B of FIG. 13. The power consumptions and heat generation amounts corresponding to the types of PCBs are stored depending upon the conditions of use.

Figure 3:
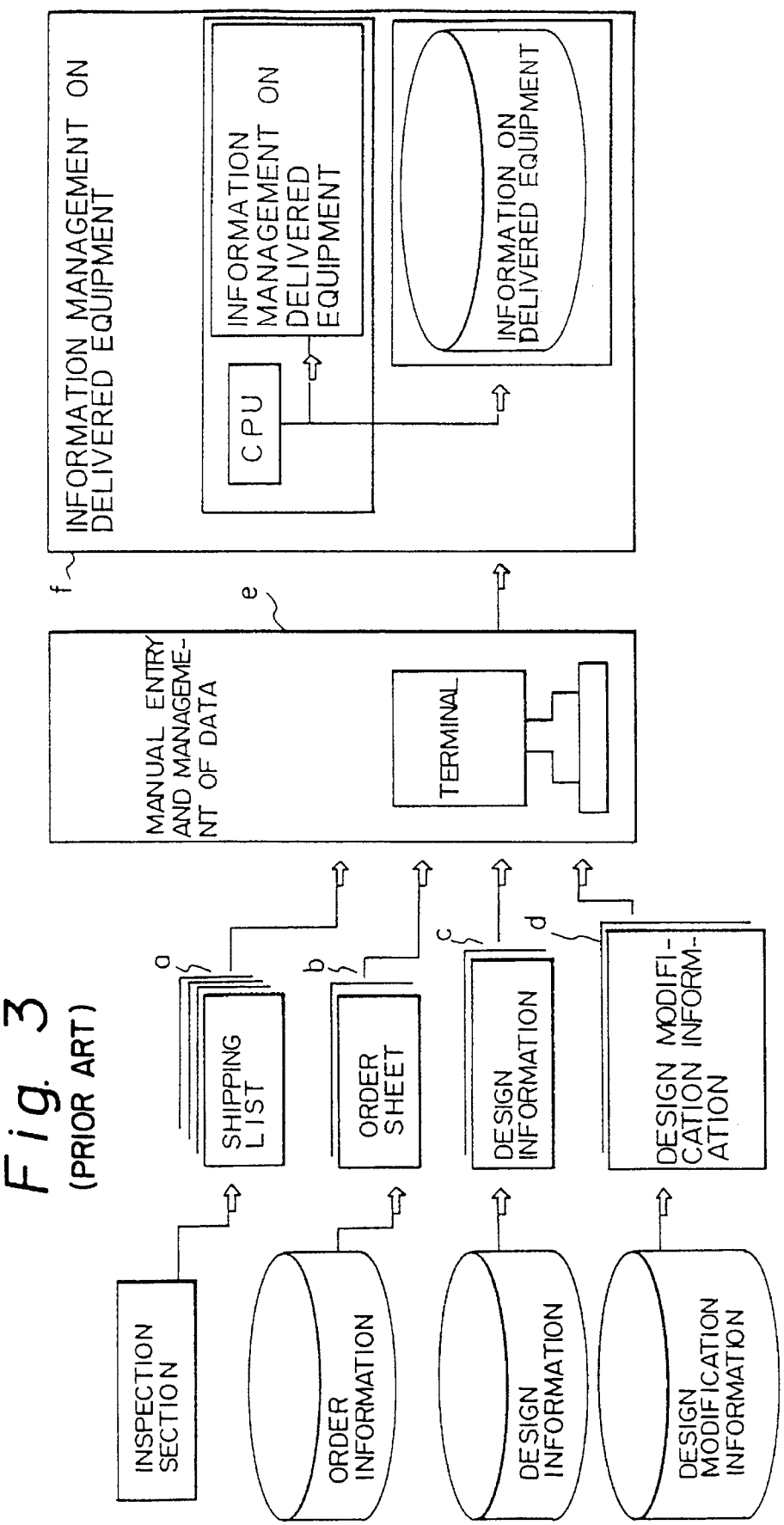
FIG. 3 is an explanatory illustration showing a process for management of delivery information of the equipment in the prior art.

Next, the equipment frame layout is designated (410 of FIG. 34). Then, the information of basic layout frame is entered from the design know-how file 337. Using the entered information, the frame layout and shelf automatic arrangement are performed (411). An example of the information of the basic layout frame and shelf is shown in A of FIG. 3 (used in step 397 of FIG. 32). Thereafter, when the cable length limit condition (connecting relationship) is entered, automatic calculation of a temporary logical cable length is performed using the cable length calculation data of the cable length limit condition and the installation and construction data 30b (413). An example of the cable length calculation data of the installation and construction data is shown in FIG. 36.

With respect to the calculated cable length, a check is performed to determine whether it satisfies the limiting condition. If so, an arrangement of PCBs within the shelf is commanded (414, 415 of FIG. 34). In response to this, automatic arrangement of the PCBs is performed using a design know-how information file 27i (416). An example of the PCB installation standard pattern information to be used at this time is shown in B of FIG. 13. As can be seen, corresponding to respective installation patterns, the slot number (position) to install each PCB is defined. Next, with respect to the results of automatic arrangement, a correction of PCBs installation position is performed using the installation standard pattern information of the CAD information file 338 (417). An example of this CAD information is shown in A of FIG. 37, in which the PCB installation positions are designated corresponding to respective types.

Figure 35A:
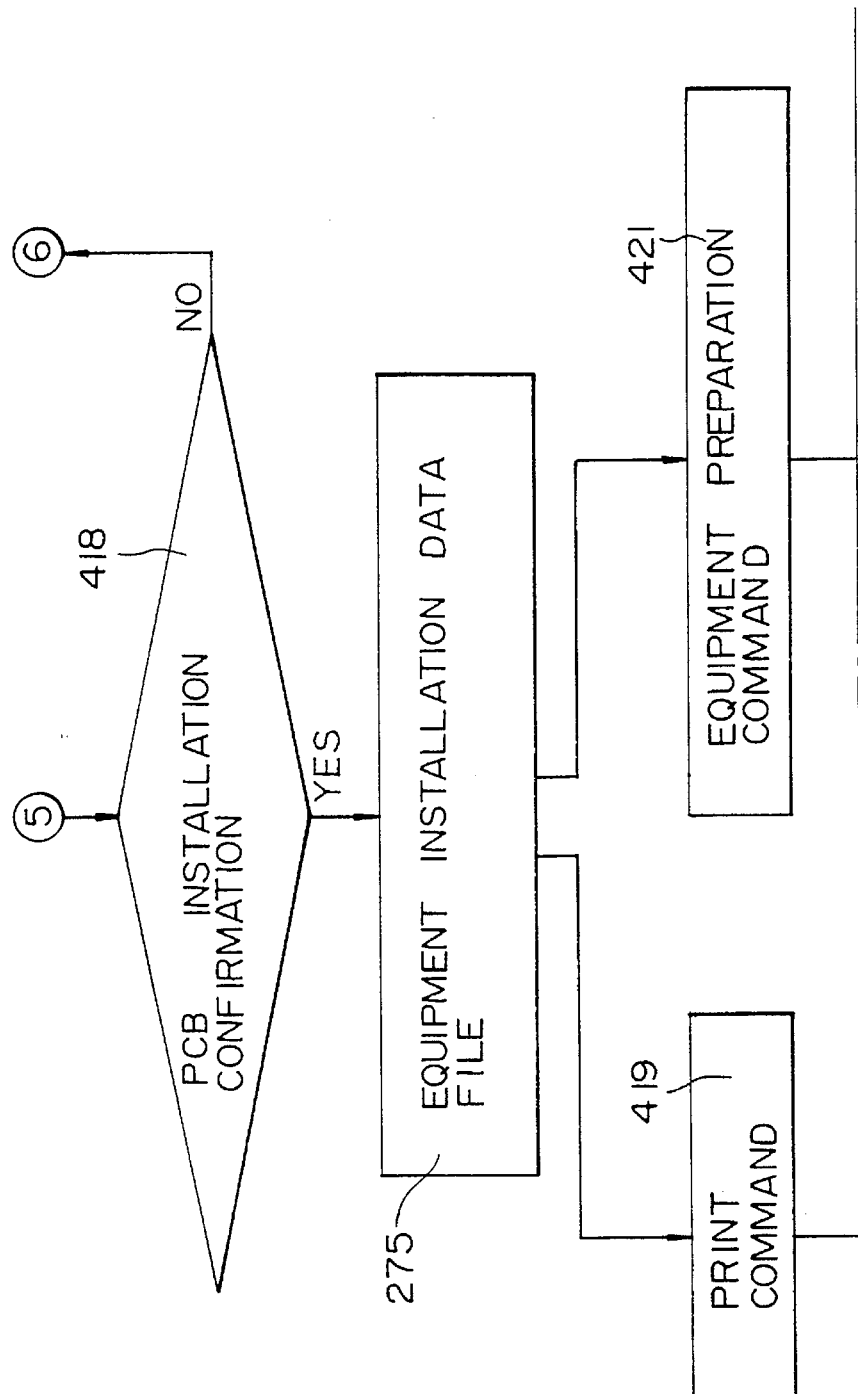
Figure 35B:
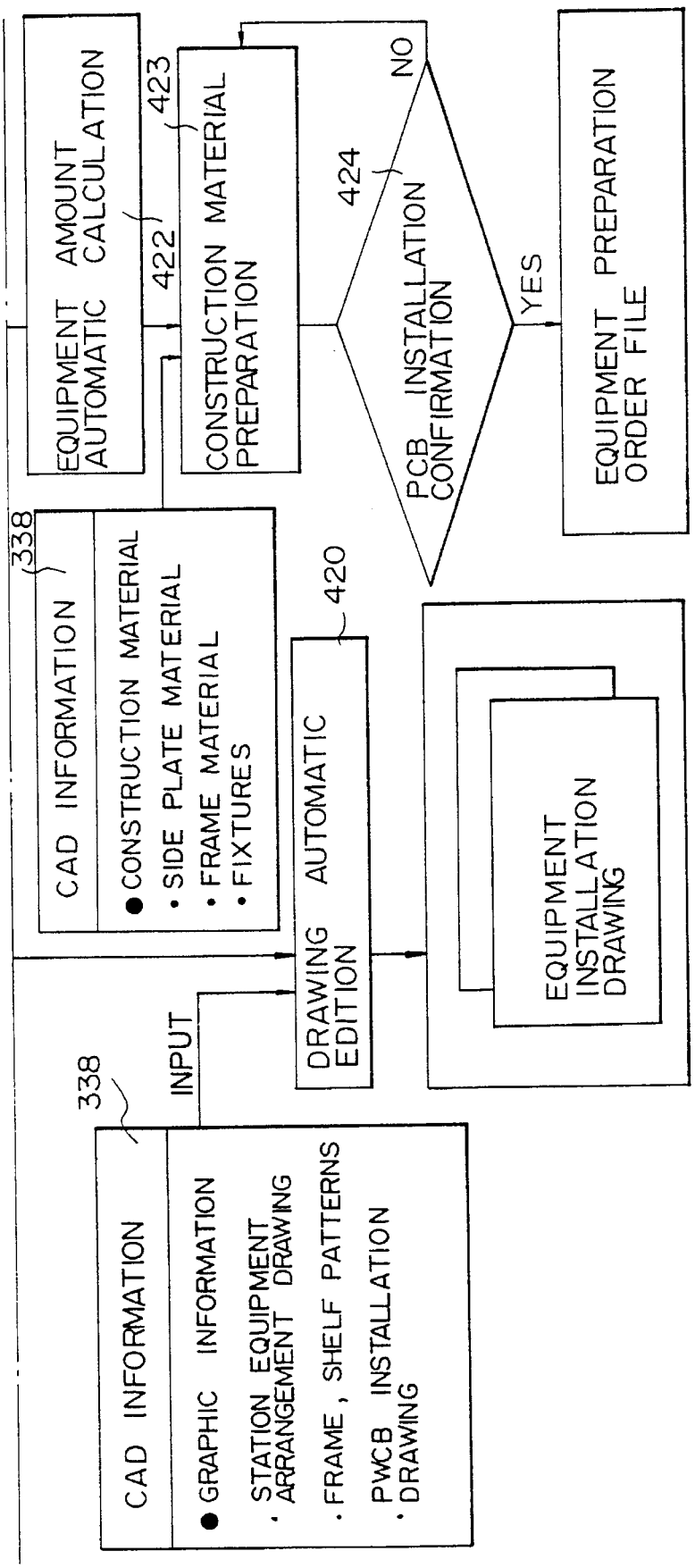
Figure 36B:
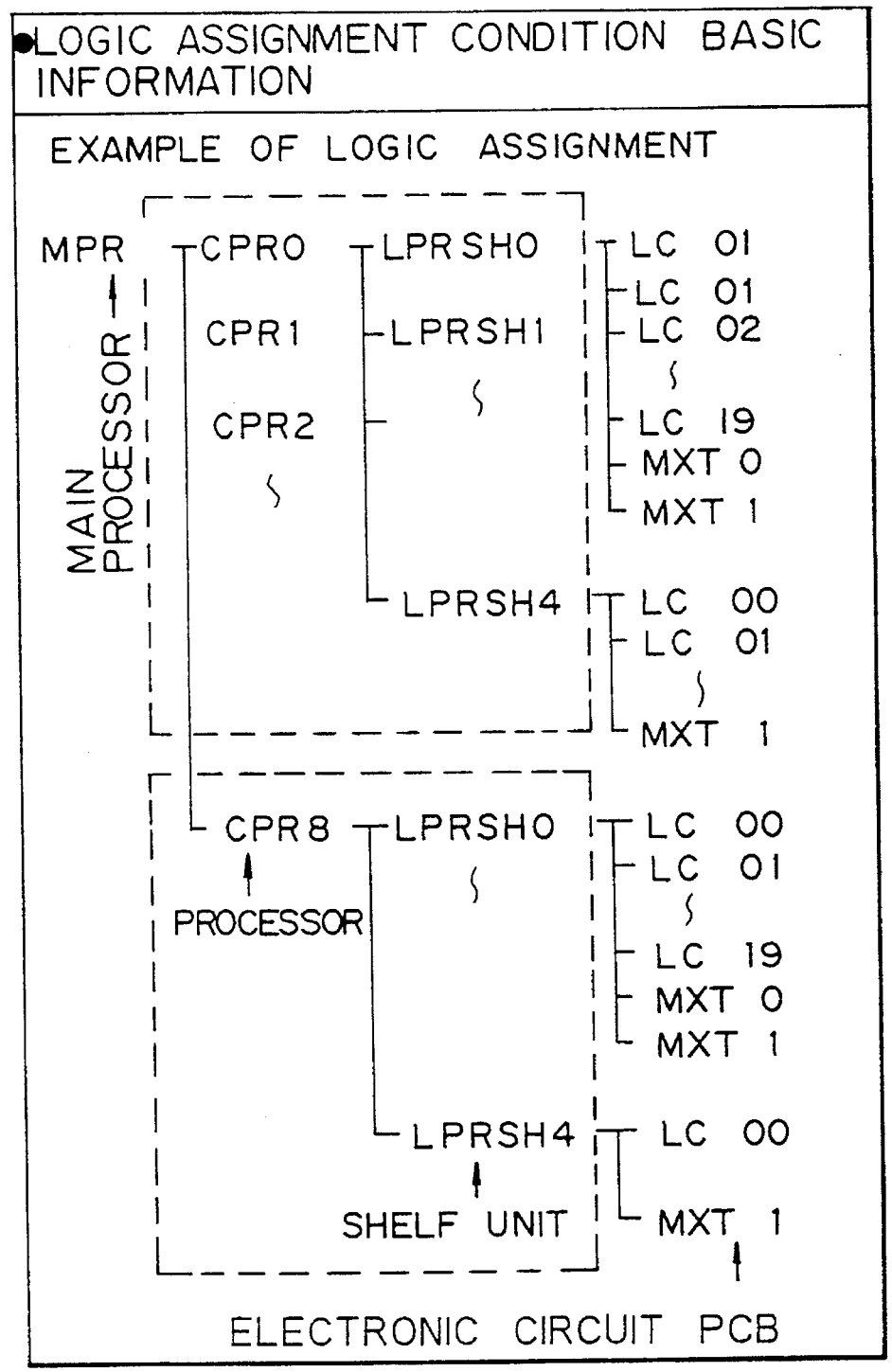
Figure 36C:
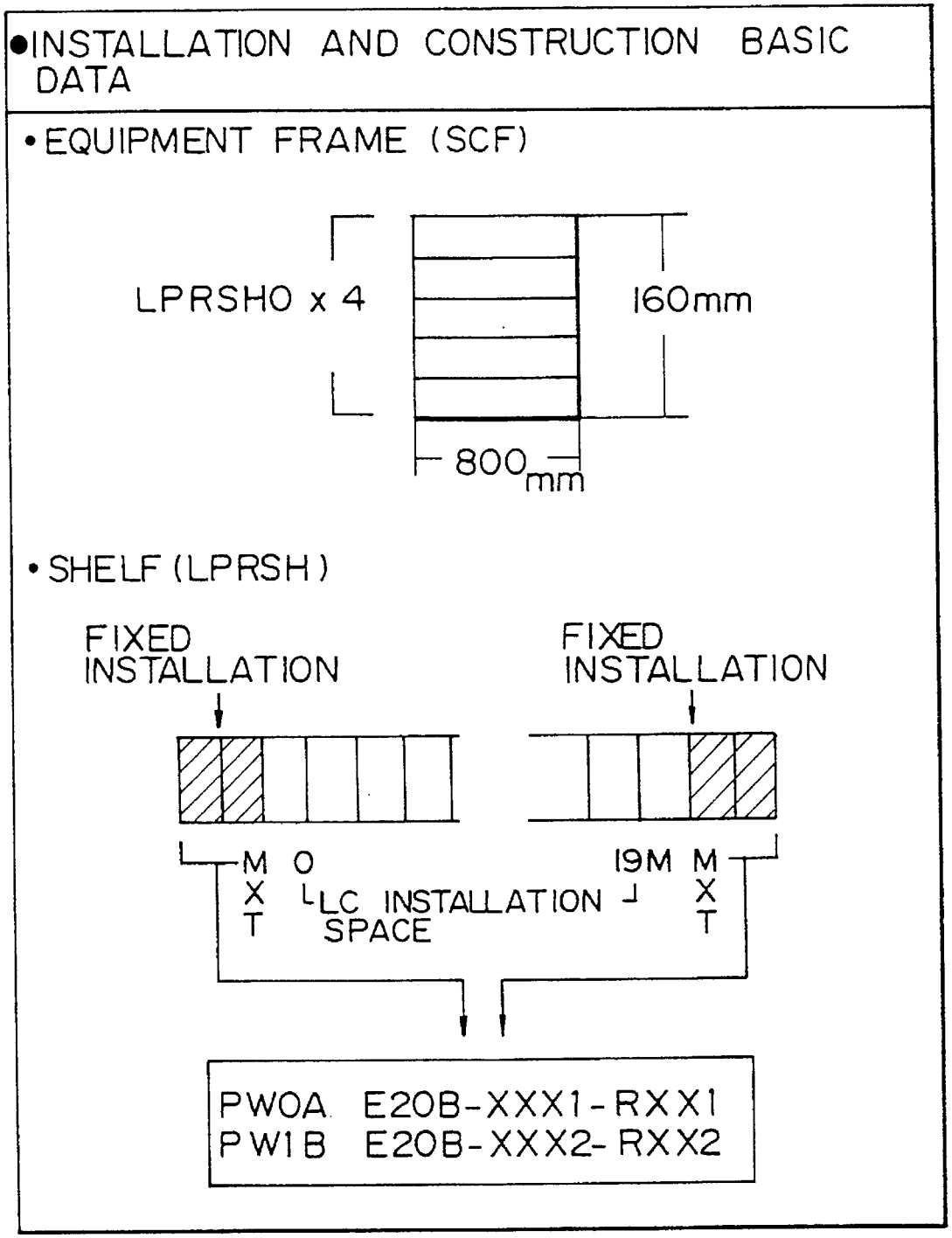

Then, the process moved to FIG. 35, in which when proper PCBs installation positions are confirmed, the equipment installation data file is output (418 of FIG. 35). An example of the content of the equipment installation file is shown in FIG. 38, the equipment installation file of which is formed with the station equipment arrangement, the equipment frame installation, shelf installation drawing, logical connection information and so forth. When printing of the contents is commanded, the drawing information (station equipment arrangement drawing, frame and shelf drawings and PCB installation drawings and so forth) stored in the CAD information file 338 are entered, and then a hard-copy edition of the equipment installation drawings. (419, 420) is printed.

On the other hand, when the equipment preparation is commanded with respect to the equipment installation data file (421), automatic calculation of the number of equipment is performed (422). At this time, from the CAD information file 338, side wall parts, frame parts, fixture and so forth are input for the calculation of the construction preparation (423). Then, confirmation is made to determine whether the PCBs can be installed (424). If possible, the equipment preparation order file is output. An example of the equipment preparation order file is shown in A of FIG. 39. As can be seen, the equipment preparation order file is composed of preparation numbers aggregated with respect to the product names of the equipment and specification corresponding to the customer's name.

Next, discussion will be given for a process of construction cable design, preparation and calculation of cost with reference to the flowcharts of FIGS. 41 and 42. This process is executed by the system construction having the input and output files shown in FIG. 40.

In the system construction of FIG. 40, in addition to the CPU 330, the memory 331, the terminal unit 332, the printer 333, the equipment installation information file 339, the installation construction file 426, which are common to the system construction of FIG. 26, the cable basic information 427, and the cost calculation basic file 428 included in the design know-how information file are used. As output files, the connection cable calculation file 429 and the cable preparation estimate file 430 included in the cable design data 341 are provided.

Figure 41:
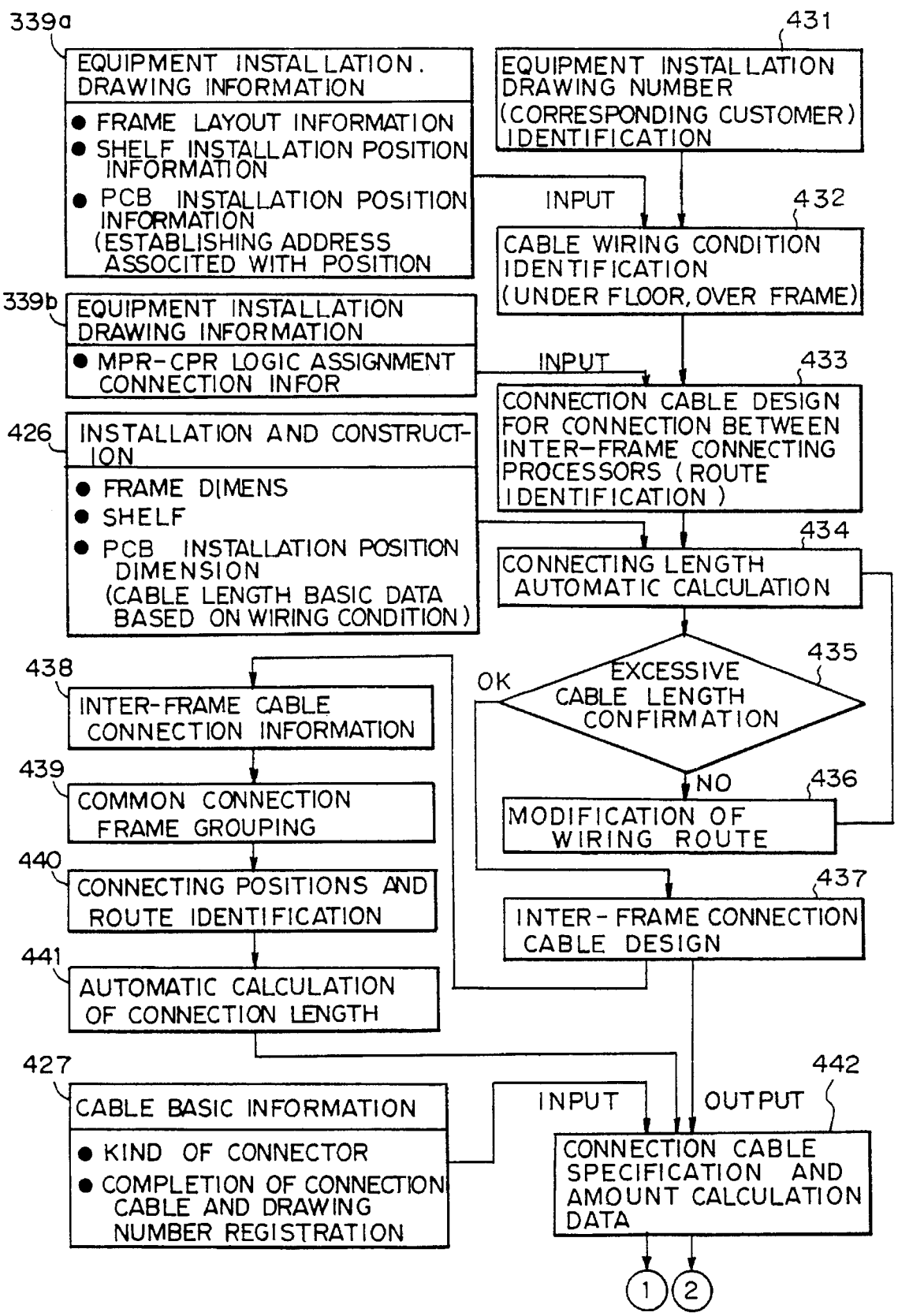
FIGS. 41 and 42 are flowcharts showing another example of a production management process for equipment and so forth in the prior art.

In FIG. 41, data (see A and B of FIG. 38) of the equipment installation information file 339 prepared through the above-mentioned equipment installation drawing designing process (FIGS. 32 to 35) is entered, and the corresponding equipment installation drawing number of the customer is designated (431 of FIG. 41). The respective information of the corresponding drawing number is then input. With respect to the input information, the cable wiring condition (under floor, over frame and so forth) is commanded (432). Subsequently, a route between the processors (MPR, CPR and so forth in the electronic exchange as the object for design) connecting the frames are designated to perform a connection cable design using the MPR-CPR logic assignment and connection information of the equipment installation drawing file 339 (433).

Next, the frame dimension, shelf dimension PCB installation position dimension and so forth stored in the installation and construction information file 426 are entered to perform an automatic calculation of the connection length (434). Then, a check is performed to determine whether the calculated connection length exceeds the cable length limit or not. If exceeded, the wiring route is modified. Thereafter, a connection cable design between the equipment frames is terminated (434 to 437). Furthermore, with respect to the cables within the frame, the connection information is reviewed so as to group the same connection frames, to designate the connection positions and route for performing automatic calculation of the connection length (438 to 441).

After completion of design and calculation for the connection cable, by inputting the types of connectors and connection cable finished drawings number registration of the cable basic information file 427 are input to output the connection cable specification and amount calculation data (442).

Figure 42:
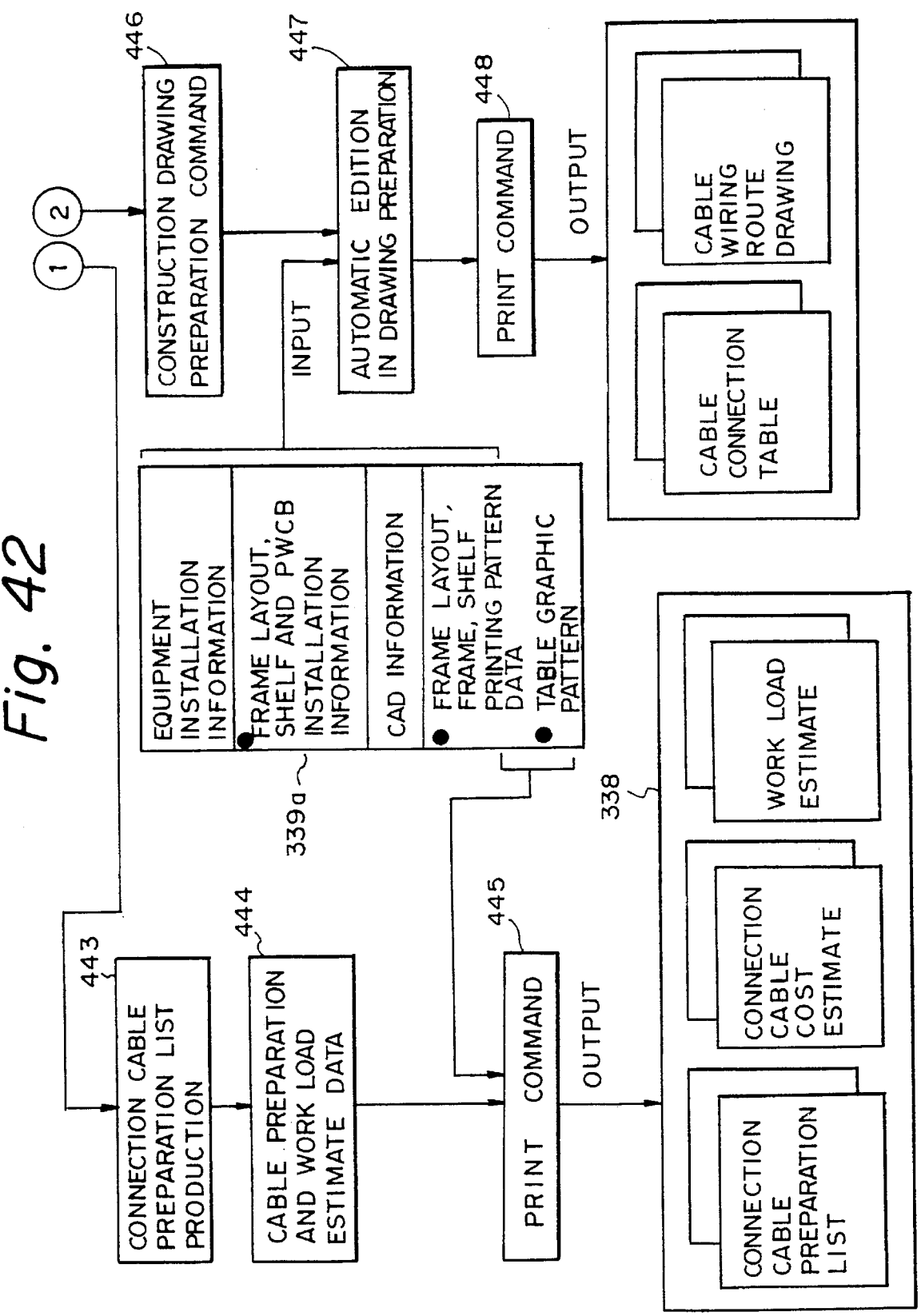

Then, in FIG. 42, using the above-mentioned output data, preparation of the connection cable preparation list is commanded (443 of FIG. 42). In response to this, the cable preparation and construction estimate data is prepared (444). In response to a command for printing (445), by inputting slip graphic data of the CAD information file 338 of FIG. 26, output prints of the connection cable preparation list, connection cable price estimate, and work load estimate are obtained. Examples of these print outputs are shown in B to D of FIG. 39.

When the preparation of the construction drawings using the connection cable specification and amount calculation data output through the process of FIG. 41 (442 of FIG. 41) (446 of FIG. 42), the frame layout, the shelf and PCB installation information of the equipment installation drawing information file 339 and the frame layout, frame and shelf printing patterns of the CAD information file 338 of FIG. 26) are input to perform automatic edition for preparation of the drawings (447). Then, in response to the print command (448), the cable connection table and the cable wiring routing drawing are printed out by the printer 333 (FIG. 26). Examples of the cable connection indication and cable wiring routing drawings are shown in E and F of FIG. 39.

According to the embodiment of the present invention as set forth above, the customer base equipment installation design, which has been conventionally performed manually and independently at various sections, can be automated throughout the processes from respective equipment installation designing to designing associated with construction by establishing data files for the equipment derivation information (CAD information, customer's order) and the design know-how information. This significantly reduces work load and makes it standardization possible. Furthermore, it becomes unnecessary to perform a posting operation at respective stations and enables automatic checking with the design know-how file to realize improvement of quality. Furthermore, the data in the equipment installation drawings can also be used as automation and delivery history management.

Next, a further embodiment of an equipment production management system according to the present invention will be discussed. The shown embodiment is established for improvement in maintenance and repair services by determining the failure ratio using the history data file associated with production history used for the production of the parts, units and equipment and so forth, feeding back the determined failure ratio to the production process and using the determined information for troubleshooting and restoring operation to make the repair operation quicker.

Accordingly, in the shown embodiment, the customer base order file is not always required. However, the customer base order file may be used for enhancement of the services.

The following discussion will be given for an example of a printed board as an arts. However, the present invention is not specified to the specific application discussed herebelow.

In the prior art, when the frame is constructed by an assembling equipment unit formed by assembling the printed boards of the communication equipment or information processing equipment, the design condition of the equipment becomes different in function and capacity depending upon the order (demand) of the customer and presence of variety of options. Furthermore, modification of the circuit design and so forth has been very cumbersome work. Conventionally, since the shipping history showing the types of printed boards (kinds and serial numbers) that are mounted in a variety of respective electronic equipment, cannot be left as data, a substantial work load has been required for checking failure ratio with respect to the printed boards for the purpose of quality control, and for tracing and locating the positions of respective parts in the equipment when replacing faulty parts.

Figure 43B:
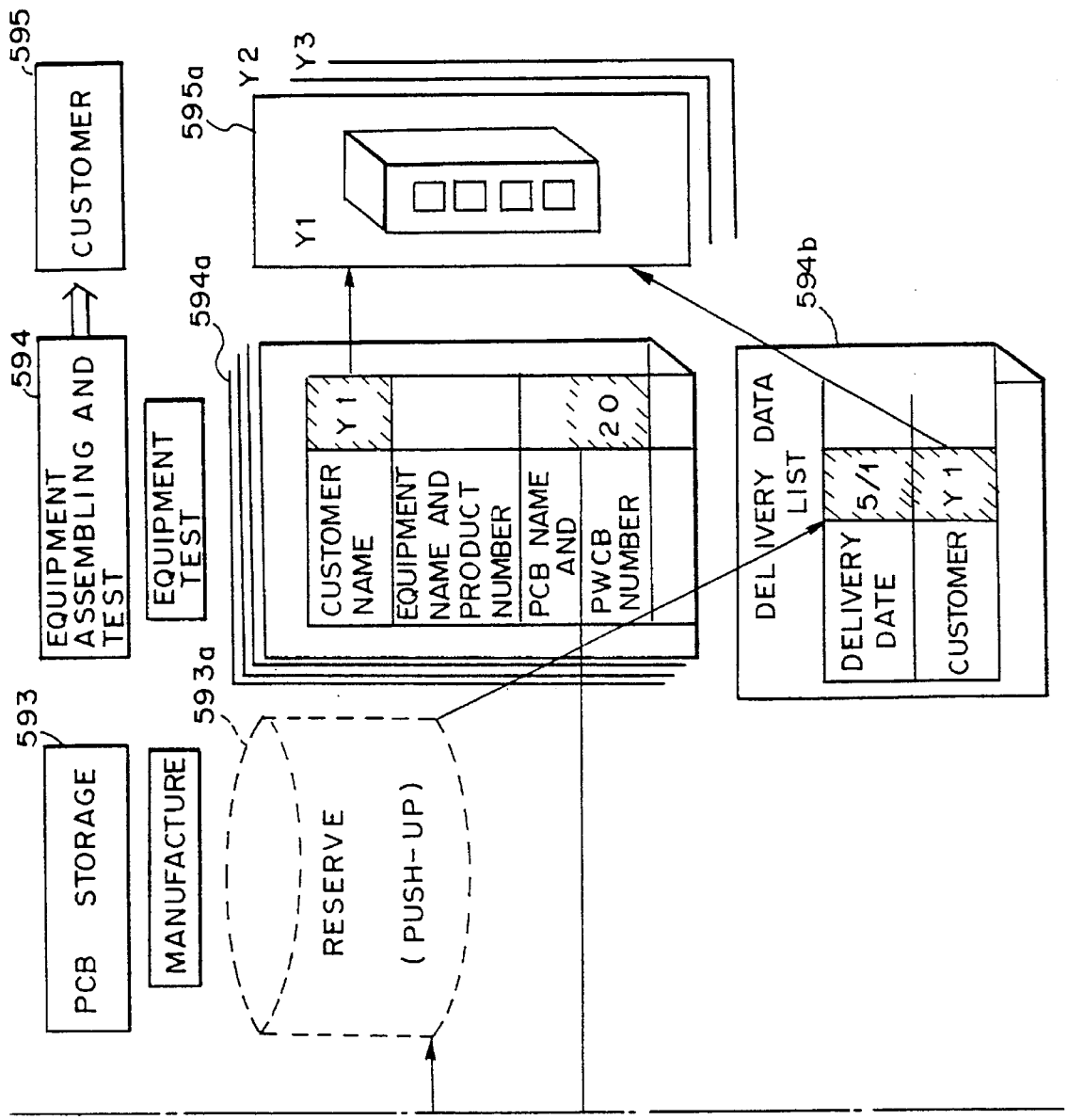
FIG. 43 is a diagram illustrating connected drawings including FIGS. 43A and 43B which are schematic block diagrams showing another example of a production management process for equipment and so forth in the prior art.

FIGS. 43A–B are explanatory illustrations of the prior art. In this example, with respect to the integrated circuit (IC), a production process and handling of information is illustrated.

Initially, when the IC is delivered, a process for reception and checking 590 is performed. At this time, with respect to each IC, data of the IC name, rod code are entered 590b and stored in the history information file 590a together with the delivery date, delivered amount and so forth. Next, respective ICs are transported to a parts storage 591 in the production station. At this time, a history information file 591a for managing the parts in a pushup manner, is prepared. In this file 591a, date, receiving number, delivery number, storage number and so forth for each kind of IS are recorded with respect to respective data and output in a form of a hard-copy.

Then, in the printed board assembly test process 592 in the production station, the ICs are delivered from the parts storage 591 and installed on the printed board and then a test is performed. At this time, the history information file 592a in the production station is produced. Then, the printed board on which the parts are installed are stored in the parts storage 593 in the manufacture station. At this time, as reserve information, a file (or paper ledger) 593a is produced in a pushup manner. (The content of the file stores the assembly production numbers of each of the printed boards.)

Next, from the parts storage 593, the printed boards are delivered to an equipment assembling and testing station 594. In this station, an equipment assembling and testing operation is performed. At this station, a unit is produced by installing the printed boards on the shelves, and installs the shelves on the equipment frame. Also, in this station, a testing is performed for the assembled unit or the equipment. At this time, instruction is given so that the functions demanded by each customer can be provided. According to said instructions, respective printed boards are mounted on predetermined installation positions to establish the assembly with the instructed specification. The assembly is ten subject testing. At this time, a slip 594a indicating the equipment content for respective customers is prepared. Simultaneously, a list of delivery dates 594b is also prepared. These slips and documents are delivered to the customer together with the delivered equipments.

As set forth above, in the prior art system, the unified shipping history data has not been produced. Therefore, when an actual failure ratio in the field with respect to each equipment type and with respect to each customer (failure ratio during actual use) is to be obtained for the purpose of quality control of the parts, it becomes necessary to visit the customer (the destination of the delivery of the equipment) to perform an investigation for the delivered equipment and to obtain a number of parts by developing (disabling) the parts used in the equipment. From the number of parts, running hours and number of occurrence of failure, a failure ratio can be derived. However, in reality, the investigation of the delivered equipment in the field and development into the parts requires a significant work load and thus is practically impossible. Therefore, it has been impossible to know the failure ratio with respect to each of the individual parts and or individual equipment.

On the other hand, if lot failure of the parts (failure occurring on parts production lot) to production lot failure (failure occurring upon assembly of the printed board) is found later after shipping the product equipments and action has to be take for the field products for replacing parts or so forth, since the shipping history of the printed board is not held in a form of data (left only in a form of hard-copy slip or so forth), accuracy of investigation should be low. Typically, inspection and replacement is performed by predicting the destination of delivery from the parts reception date, and assembling date of the printed board. Therefore, the recovery ratio of the faulty parts cannot be 100%.

In contrast to this, the preferred embodiment of the present invention intends to provide a production management system for electronic equipment employing printed boards, which enables the acquisition of a failure ratio of the parts or components of the electronic equipment principally employing printed boards or the failure ratio of individual printed boards, and also to determine the propagation range of the products when a failure occurs on the parts or so forth.

The production management system, according to the present invention, includes the floor control unit which receives information occurring in respective stages of the reception of parts, storing parts, assembling printed boards and assembling the printed board into the equipment on-line and stores the received information in the corresponding data file. The floor control system includes a means for deriving an actual failure ratio of respective product types, printed boards and parts using the field failure data occurring at the customers and data file in the production process and ouputting the derived failure ratio.

As the data file in the production process, the floor control unit includes the installation history data file containing information of installed contents of respective equipment upon shipping and component lists indicating parts included in respective equipment.

Furthermore, the equipment production management system further includes a data file storing the reception data occurring upon reception of the parts, reception and delivery data of the parts storage, production process data occurring during assembling of the parts to the printed board, installation history data occurring upon installation of the printed board into the equipment. The system also includes a means for searching the propagation range including the destination of delivery of the faulty parts or faulty printed boards and the positions thereof with the equipment using a respective data file upon lot failure of the parts or printed board and outputs the results of the search.

The basic construction of the instant embodiment is the construction formed by adding a failure ratio derivation means to the product information management means 32 provided in the floor control system 3 of FIG. 7.

FIG. 44 is an illustration showing the major part of the embodiment of the production management system according to the present invention. In general, the construction illustration in FIG. 44 corresponding to the product information management means 32 of the floor control unit 3 in FIG. 7. The product information management means 32 includes a tracking processing section 500 and a failure ratio derivation section 501. Also, the product information managing means 32 includes the parts reception and storage reception and delivery file 502, the printed circuit board and parts installation file 503, the order and printed circuit board installation position file 504, the printed circuit board installation results file 505 and the filed failure file 506.

In FIG. 44, the reference numerals 512 to 514 are designed for transfer data in on-line manner with the floor control unit 3. The reference numeral 512 denotes the storage reception and delivery section, 513 denotes the printed board assembling and testing section, 514 denotes the printed board installation and testing section, 515 denotes the customer's facility to which the product is to be delivered, and 517 denotes a CAD system for forming a design of installation of parts, printed boards and equipment.

In the shown embodiment, in obtaining the field failure data by providing the printed board installation history and component lists of the printed boards, a failure ratio with respect to respective equipment type or with respect to respective parts can be determined using this information. On the other hand, upon occurrence of lot failure, by managing the history during a production process and shipping history of the printed boards in an unified fashion, the propagation range can be easily found.

For the floor control system 3 in this embodiment, data of order and demand from a production management system (not shown), design data of parts, parts installation for the printed board, equipment installation from the CAD system 517 are supplied. From these, the order and printed circuit board installation position file 504 is generated. This information are supplied to respective stations in the factory as command information.

In the storage reception and delivery section 512 accepts the parts corresponding to the preparatory order and is received in the parts storage through inspection. From this section, the parts are delivered to the printed circuit board assembling and testing station 513. The storage reception and delivery section 512 supplies the data indicative of the reception and checking and the results of reception and delivery, to the floor control unit 3. The floor control unit 3 stores the received data in the parts reception and reception and delivery file 502.

The printed circuit board assembling and testing station 513 installs the delivered parts to the printed circuit board and then performs a test. After testing, the assembled printed circuit boards are stored in the printed circuit board storage. Next, at the printed circuit board installation and equipment testing station 514, the printed circuit boards are installed in the shelf and thereafter a test is performed therefor. At this time, if the faulty product is found or the printed circuit board is installed at a wrong position, or the wrong printed circuit board is installed, a correction, such as replacement of the printed circuit board or so forth, is performed. From the printed circuit board installation and testing station, the data of the results of installation of the printed circuit board and the result of replacement is supplied to the floor control unit and then stored in the printed circuit board installation result file 505.

In the customer's facility 415, when a failure occurs during an operation, an output is fed to the floor control unit 3 as field failure information. This information is stored in the field failure file 506.

The tracking processing section 500 in the floor control unit 3 is provided a capability of re-constructing respective files, i.e. the parts reception and reception of delivery file 502, the printed circuit board production and parts installation file 503, the printed circuit board installation result file 505, the field failure file 506, and a search for necessary data is performed.

Namely, when lot failure occurs in the parts or production failure occurs, the propagation investigation is performed by the tracking processing section 500. Namely, by performing a tracking using the files 502, 503 and 505, the contents, i.e. parts, printed boards and so forth, of respective field equipment can be investigated and output. Furthermore, on the basis of the information of the field failure stored in the field failure file 506, an actual failure ratio with respect to each of the product types and failure ratio of respective printed boards can be derived by the failure ratio derivation section 501 using respective files of 502 to 505.

Figure 45:
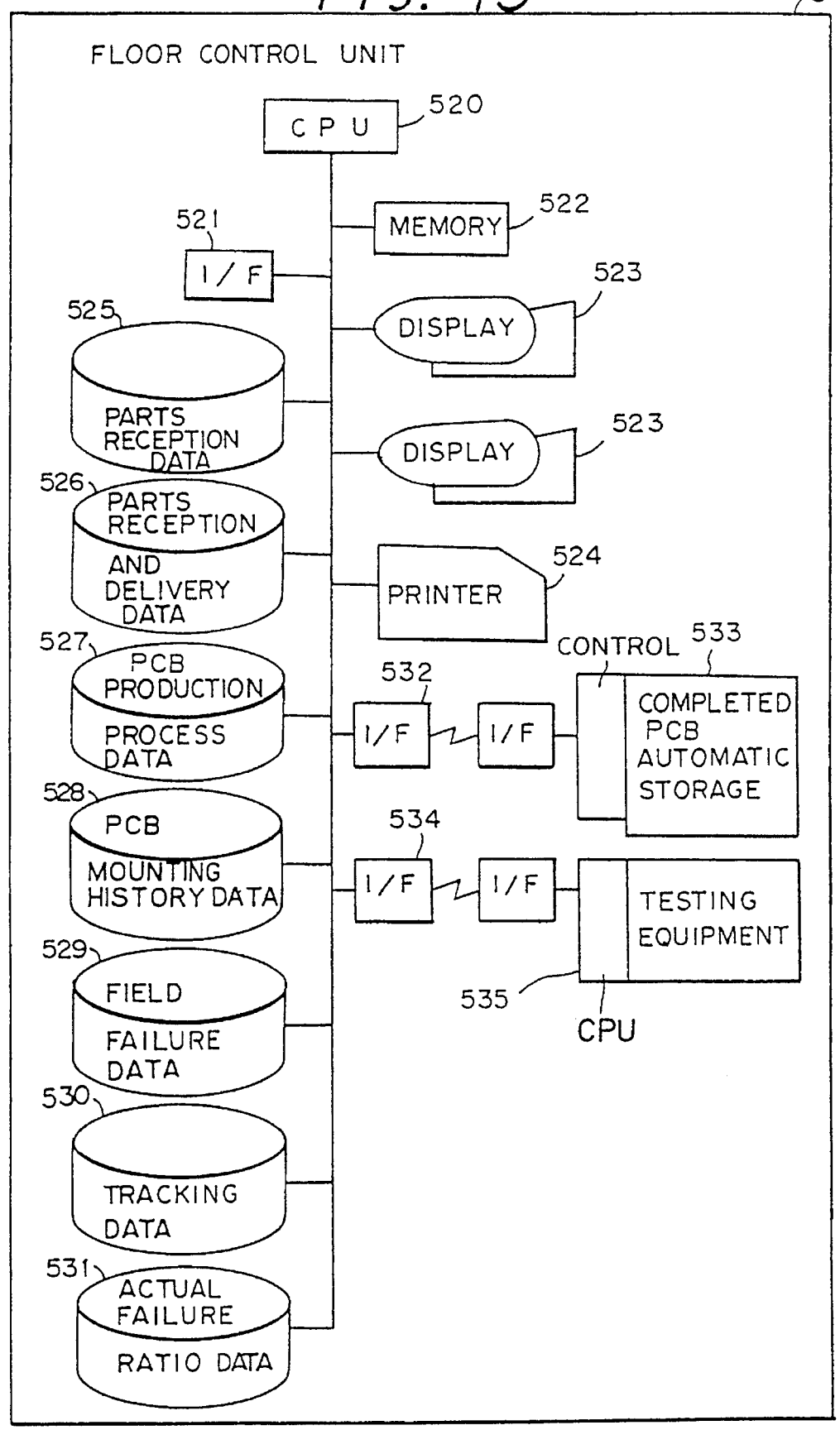
FIG. 45 is a schematic block diagram showing a floor control system in the third embodiment.

FIG. 45 shows a practical construction of the floor control unit 3 in the embodiment of the production management system according to the present invention. FIG. 46 shows the embodiment of construction for unified management and investigation of information in the tracking process.

In the floor control unit 3 of FIG. 45, the reference numeral 520 denotes a central processing unit (CPU), 521 denotes an interface (I/F) for communication with the external computer or so forth, 522 denotes a memory (for storing program and so forth), 523 is a terminal unit including a display unit, 524 denotes a printer for printing search data and investigation results and so forth, 525 denotes a parts reception file, 526 denotes a parts reception and delivery file, 527 denotes a printed circuit board production process data file, 528 denotes a printed circuit board installation history data file 529 denotes a filed failure data file, 530 denotes a tracking data file, 531 denotes an actual failure ratio file, 532 denotes an interface (I/F) for communication with a printed circuit board fined product automatic storage, (its control section), and 534 denotes an interface (I/F) for communication with the CPU of testing equipment 535.

The floor control unit 3 has the tracking processing section for realizing a quality information management system of the electronic equipment including the printed circuit board. The construction for Unified management and investigation for information in the tracking process will be discussed with reference to FIGS. 46A–B.

Figure 46A:
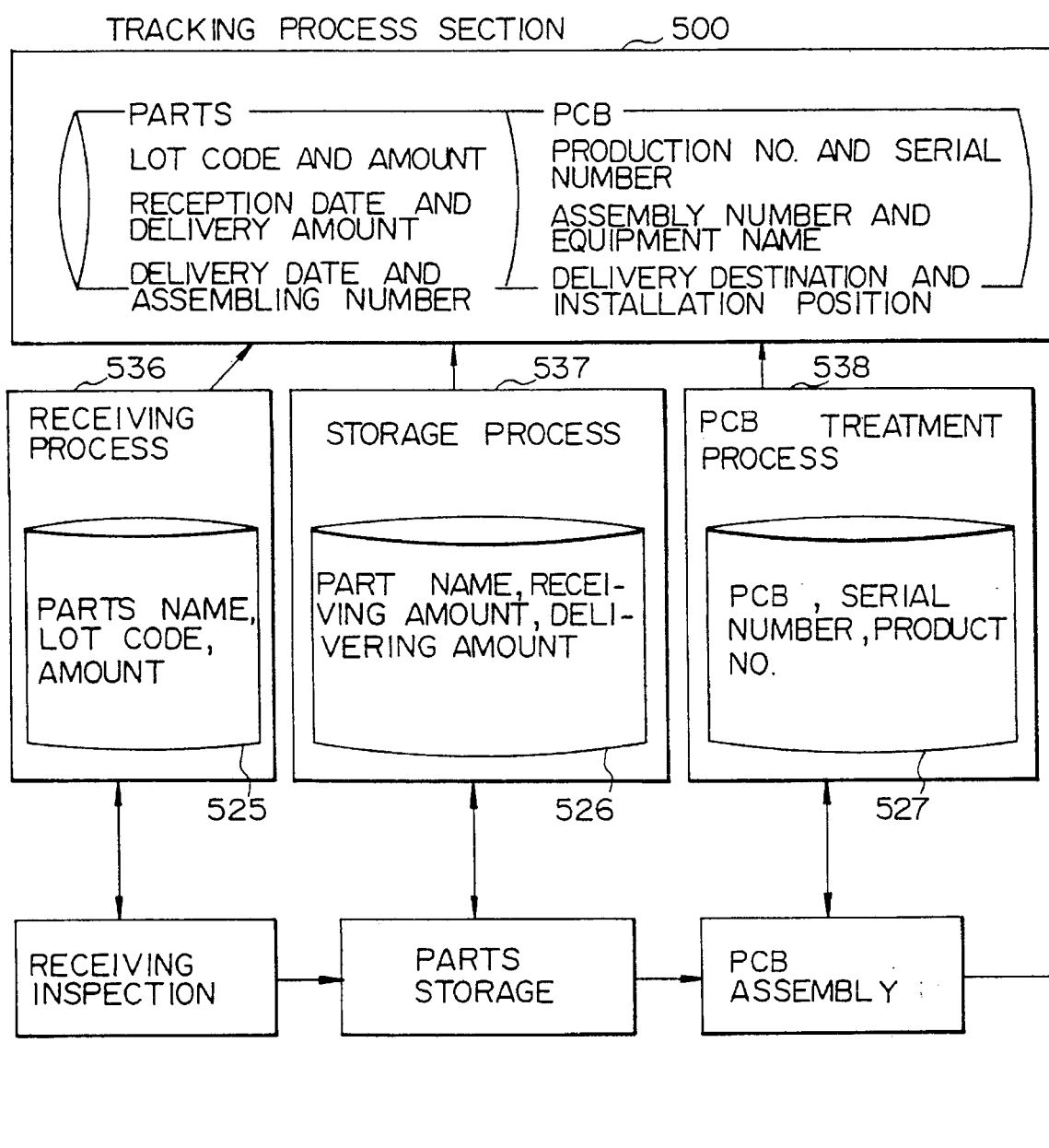
FIG. 46 is a diagram illustrating connected drawings including FIGS. 46A and 46B which are schematic block diagrams showing a system for unified management information and for searching in a tracking process.
Figure 46B:
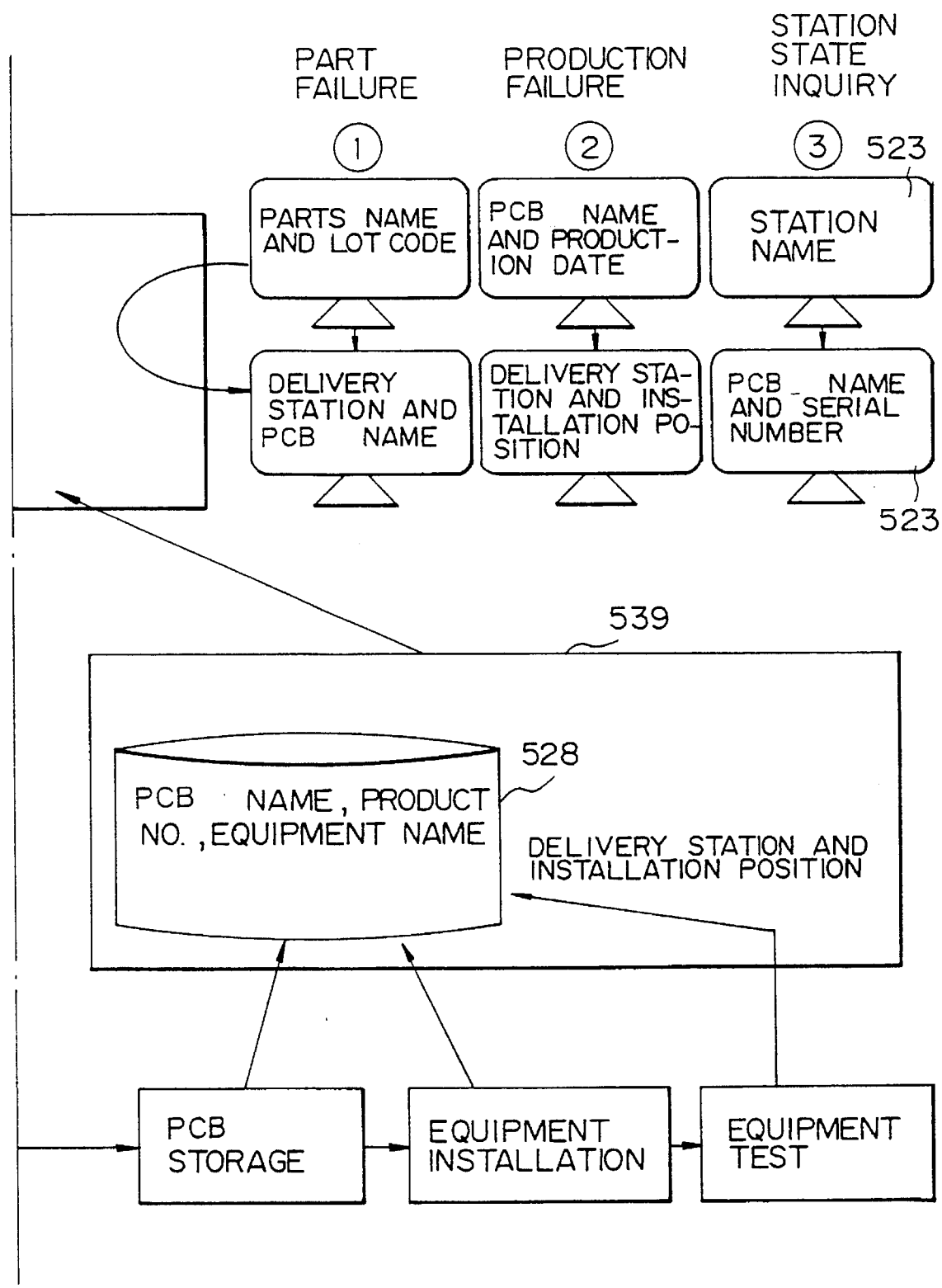

In FIGS. 46A–B, the information including the parts name, rod code, amount and so forth, generated upon reception and inspection of the parts (performed in the reception and reception and delivery section 512 of FIG. 44), is input to the floor control system. The information is then stored in the parts reception data file 525 by the reception process 536 (FIG. 45). In the parts storage (provided in the reception and reception and delivery section 512), when the parts an received or delivered, the reception and delivery data is fed to the floor control unit 3. Then a storage process 537 is performed to store the reception and delivery data in the parts reception and delivery data file 526.

Furthermore, when the printed circuit board assembly (performed by the printed circuit board assembling and testing 513 of FIG. 44) is performed, the assembling data is generated. The generated assembling data is fed to the floor control unit 3. Then, the printed circuit board treatment process 538 is performed to store the printed circuit board production process data file 527. Subsequently, by reception and delivery of the printed circuit board in and from the printed circuit board storage (provided in 513 of FIG. 44), the printed circuit board reception and delivery data is generated.

Figure 4:
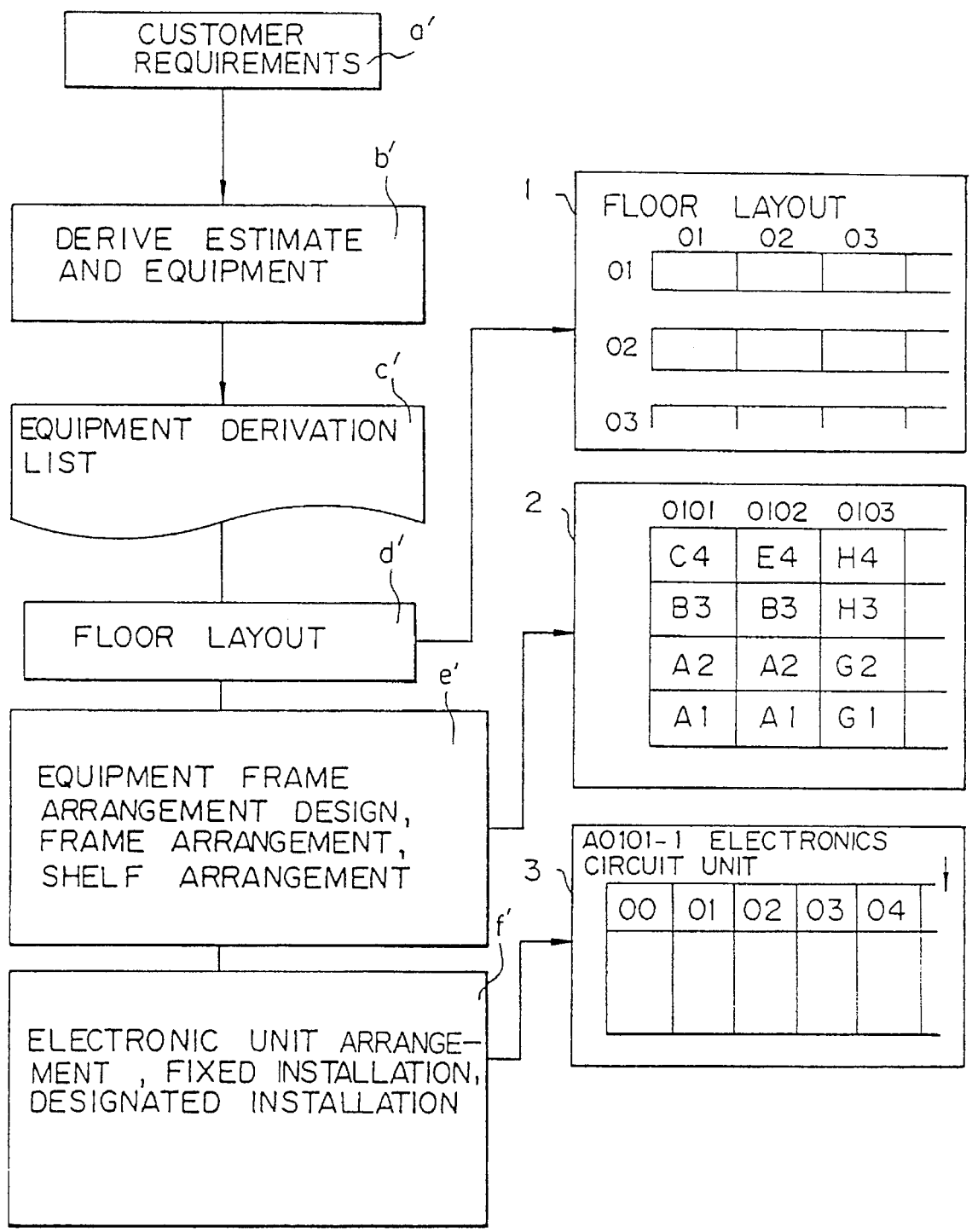
FIG. 4 is an explanatory illustration showing a process of designing an entire communication apparatus in the prior art.
Figure 5:
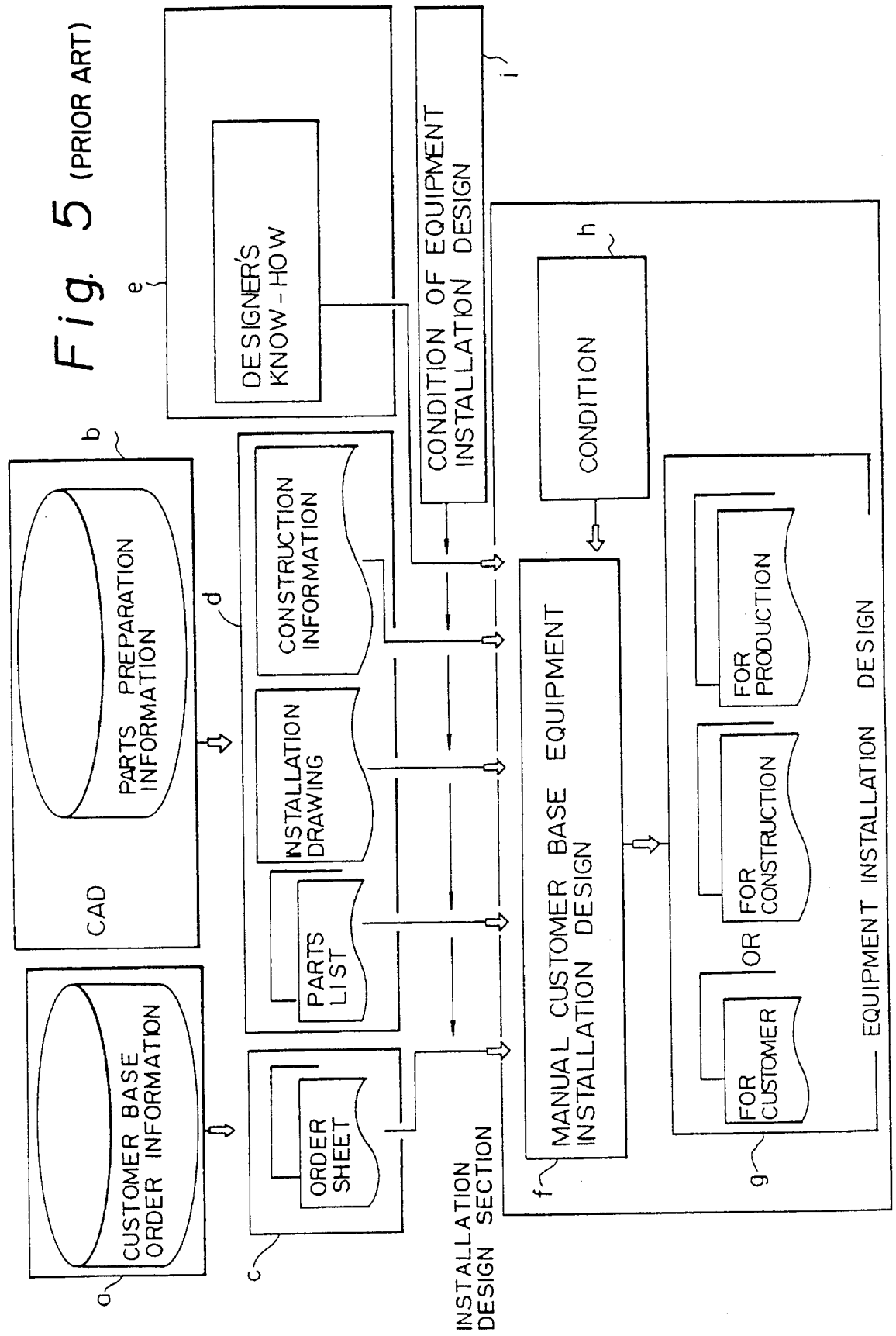
FIG. 5 is an explanatory illustration showing a process for designing equipment installation in the prior art.
Figure 6:
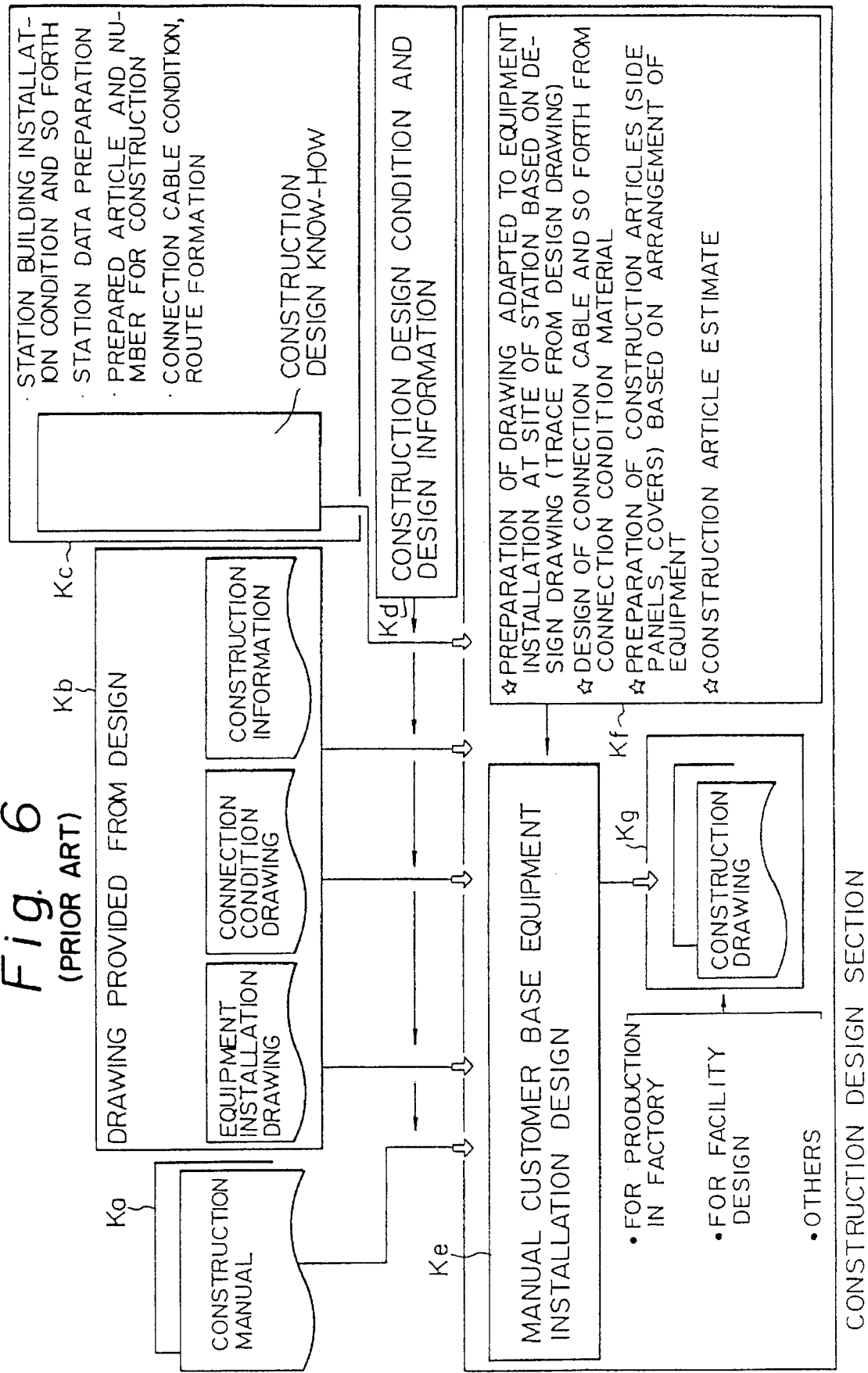
FIG. 6 is an explanatory illustration showing a process for designing construction work and establishing an estimate in the prior art.

On the other hand, in the equipment installation (performed by the printed circuit board installation and equipment testing section 514 of FIG. 4\514), the installation result data is generated. When replacement f the printed circuit boards is performed in the equipment testing (similarly in the printed circuit board installation and equipment testing section 514), the printed circuit board replacement data (information of the withdrawn printed circuit board and newly inserted printed circuit board) is generated. This data, except for the reception and delivery data (which is used for printed circuit board storage management), i.e., the installation result data and replacement data, are stored in the printed circuit board installation history data file 528 by equipment process 539.

For the tracking processing section 500 of FIG. 46, necessary data is output by performing a search for necessary associated information using respective data files 525, 526, 527 and 528 according to the process demanded through the terminal unit 523. Namely, as shown in (!) of FIG. 46, when the parts name and lot code are input upon occurrence of parts failure A through the terminal unit 523, a search is performed for the printed circuit board name including the faulty parts and the derived station of the equipment in which the faulty parts are installed, with respect to the associated data files. The result of the search is displayed on the display of the terminal unit (or, in the alternative, output to the printer 524). In this case, in the tracking processing section 500, the amount, reception date, delivery amount, delivery date, assembly product number and so forth of the parts having the corresponding parts name and corresponding lot code are extracted from the associated data file. Then, for the printed circuit board production process data file 527, the printed circuit board installation history data file 528, the production number, serial number, production date, assembly product number, equipment name, delivery destination and installation position and so forth of the printed circuit board mounting the faulty parts are searched for respective printed circuit boards and the name of the printed circuit board mounting the faulty parts and the delivery destination, i.e. customer station, to which the equipment, including the faulty parts, are delivered and output.

Similarly, as shown by (2) of FIG. 46, when printed circuit board name and production date for the product failure are entered, the delivery destinations and installation positions are searched and output. Furthermore, when an inquiry for a specific station (when serial numbers of respective printed circuit boards used in the equipment derived from the specific station is need to be known), as shown by (3) a search is performed based on the name of the station and the serial numbers of all of the printed circuit boards delivered to the specific station and output as the results of the search.

Figure 47:
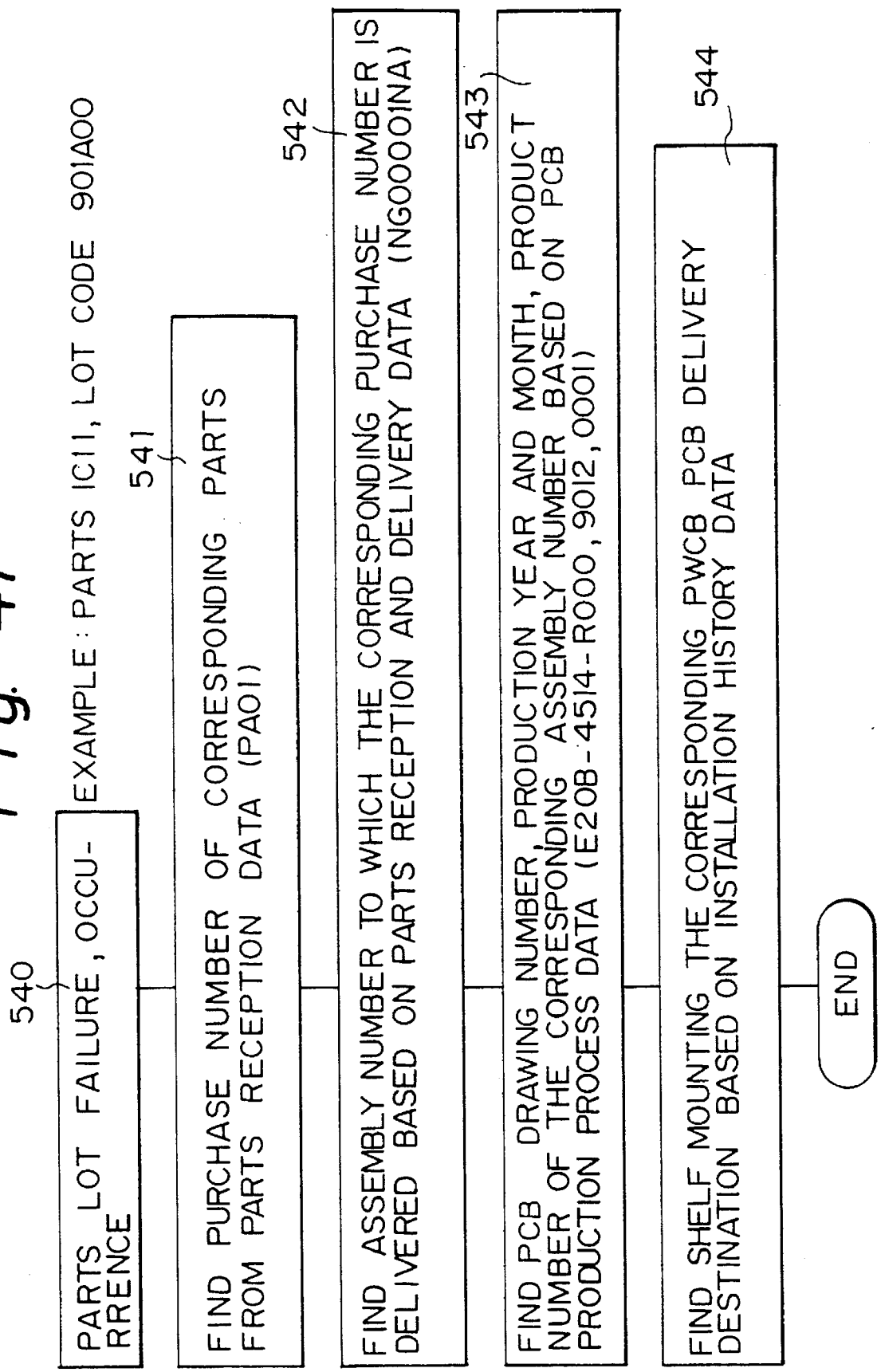
FIG. 47 is a flowchart showing a process for investigation of lot failure wave and range thereof according to the present invention.

Next, FIG. 47 shows a flowchart showing a process of investigation of propagation range of lot failure, FIG. 48 shows an example of the data as the result of investigation and FIG. 49 is an example of construction of the input data to be used for the process.

In FIG. 47, as a practical example, when the parts lot failure occurs for the parts code IC11 and the lot code 901A00 (540 of FIG. 47, on the parts reception data, the purchased product number of the corresponding parts is searched (541). The example of the parts reception data (see 525 of FIG. 45) is shown in (a) of FIG. 49, in which is contained separate data of the parts name, reception date, reception amount, purchased product number, lot code and so forth. In the shown example, the purchased product number can be seen as "PA01".

Next, from the parts reception and delivery data '526 of FIG. 45), the assembling product numbers for which the parts having the corresponding purchased product number, is found (542). The example of the parts reception and delivery data is shown in (b) of FIG. 49, data of which contains the parts name, reception and delivery dates, reception and delivery amount and so forth, together with the purchased product number and the assembly product number. As can be seen from (b) of FIG. 49, it can be seen that the parts having the purchased product number "PA01" has the assembly product number "NG00001NA". Next, with the printed circuit board production process data 527 of FIG. 45, the printed circuit board drawing number, the production year and month and production machine number (order of the corresponding equipment among the same type of equipment produced in the same year and month) of the printed circuit board having the corresponding assembly product number. The example of the printed circuit board production process data is shown in (d) of FIG. 49. As can be seen, the assembly product number "NG00001NA" is included therein and can be seen on the printed circuit board drawing number (E20B-4514-R000), production year and month (9012) and the production machine number (0001).

Next, based on the installation history data (528 of FIG. 45), the shelf installing the faulty printed circuit board and the delivery destination are found (544). An example of the installation history data is shown in FIG. 49(c), which includes installation history data, the information about the shelf installing the printed circuit board that has the printed circuit board drawing number, the production year and month and machine number, found in the step 543, and the delivery destination (XX telephone office). The result of the search thus obtained is stored in the tracking data file (530 of FIG. 47) and, at the same time, is displayed on the display shown in FIG. 48 of the terminal unit (523 of FIG. 45). Therefore, when lot failure occurs, the investigation of the propagation range can be done in on-line (in case of the parts lot failure, the parts name, lot code, and in case of the product failure, the printed circuit board name and the production year and month).

Figure 50A:
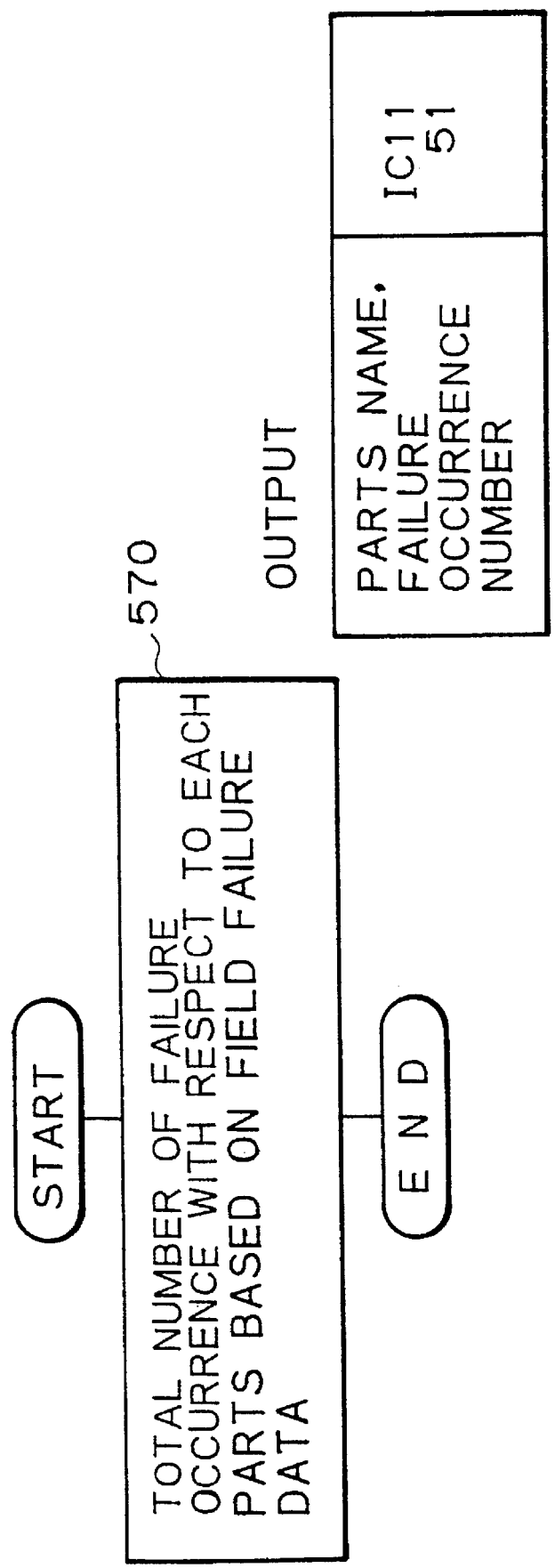
FIGS. 50(A) and 50(B) show flowcharts of a process for derivation of an actual failure ratio, in which 50(A) is a flowchart showing aggregation process of parts failure, and 50(B) is a flowchart showing an aggregation process for active time of parts according to the present invention.
Figure 50B:
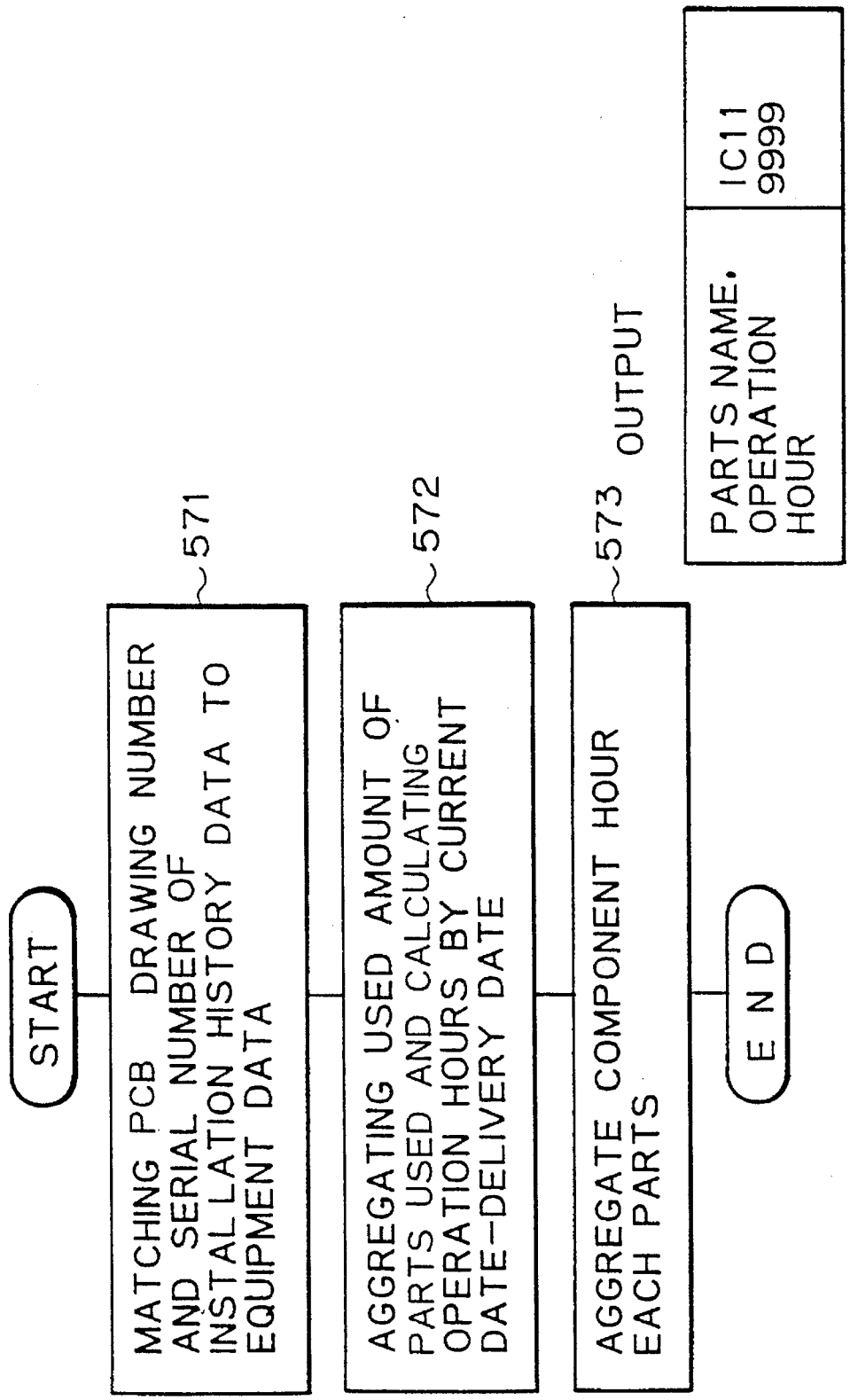
Figures 51, 52:
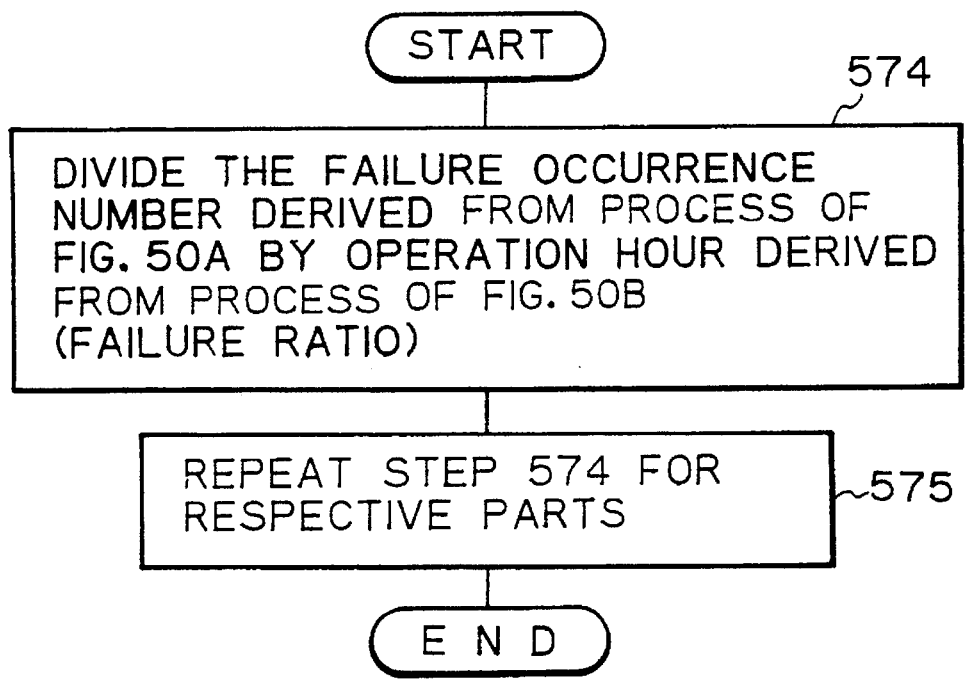
FIG. 51 is a flowchart showing a process of derivation of actual failure ratio.
FIG. 52 is an explanatory illustration showing an example of a display of the results of derivation of an actual failure ratio.

FIGS. 50 and 51 shows a flowchart showing a process for aggregating the actual failure, FIG. 52 shows an example of the display of the results of aggregation, and FIG. 53 shows examples of respective input data to be used for the data aggregation.

The process for deriving the actual failure ratio is shown in two flowcharts of FIGS. 50A and 50B and the flowchart of FIG. 51.

FIG. 50A shows the process for aggregation of occurrences of the parts failure. After starting execution, occurrence of failure is aggregated with respect to each part based on the field failure data (529 of FIG. 45) (570 of FIG. 50) and then the process is terminated. An example of the field failure data is shown in (a) of FIG. 53. The field failure data is the data of failure noticed by the customer and contains the faulty printed circuit board name, the drawing number, serial number and so forth as well as the delivered customer, the shelf information, the parts name and so forth. In the shown example, the faulty parts are assumed as "IC11".

From respective field failure data, the occurrence of failure of the corresponding parts is totaled and thus the failure occurrence (M), i.e. 51 in the shown case, can be obtained.

Next, FIG. 50B shows the process for aggregation of the operation time of the subject parts. Initially, matching is established between the printed circuit board drawing number and serial number of the installation history data (528 of FIG. 45) and the construction product data (571 of FIG. 50B) An example of the installation history data is shown in (b) of FIG. 53. Also, an example of the construction product table (which is not provided in FIG. 45 and is prepared separately through key input and so forth) is shown in (c) of FIG. 53. In the step 571, the printed circuit board number and the printed board serial number including the specific parts (the parts name IC11, in the shown case) are found from the construction product table, and then the installation history data of the corresponding printed circuit board is searched.

Then, the used number of the subject parts is aggregated. Also, by subtracting the delivery data from the current data, the operation hours are derived (572). The used number of parts can be derived based on the construction product table of (c) of FIG. 53 and the installation history data (b) of FIG. 53. The delivery date is stored in the installation history data. Furthermore, with respect to each part, the component hour is aggregated (573). In the shown example, the component hour (H) of the parts name "IC11" is 9999.

FIG. 52 shows the process for calculating the actual failure ratio. The failure ratio E can be derived by dividing the failure occurrence number M of each part derived through the process of FIG. 50A by the component hour H derived by the process of FIG. 50B (574 of FIG. 51). The above-mentioned processes are repeated for respective part (575). The result of a calculation is displayed as shown in FIG. 52, for example.

Through the process as set forth above, the actual failure ratio and the failure ratio of respective printed circuit boards can be derived on the basis of failure occurring in the field. Also, the actual failure ratio of the parts can be derived on the basis of the construction product table of the printed circuit board.

As can be appreciated herefrom, according to the shown embodiment, the actual failure ratio of the parts and the products can be accurately obtained. Also, the data thus obtained can be used as a reference for derivation of the storage amount of the maintenance parts upon termination of production of the equipment, and for modification of the system for reception and inspection of the parts thereupon. In addition, since the shown embodiment does not require a manual operation for performing an investigation and thus can shorten the period required for checking the propagation range to significantly reduce the service time for maintenance or repair.

A still further embodiment of the equipment production management system according to the present invention will be discussed herebelow, The following embodiment is based on substantially the same concept as the foregoing embodiments and performs the preparation of a shipping list and determines whether the product equipment is available for shipping or not on the basis of the production history data file, the serial number modification data file, the storage data file, and the design modification data file.

Accordingly, for the shown embodiment, the customer's order data file is not essential. However, use of the customer order data file may make the system more effective.

In the prior art, in production and shipping of the equipment, such as communication equipment, e.g. exchanges, information processing equipment by assembling parts on the printed circuit boards and installing the assembled printed circuit boards to the shelves, the functions and scales of each individual equipments can be differentiated from each other because of various demands of the customer for the design condition and because of the presence of a plurality of options. Also, design modification for the circuit and so forth is very complicated and cumbersome work. In the conventional process, all of the necessary printed boards are initially prepared and delivered to the assembling station. Then, at the assembling station, a manual operation is performed with reference to the paper drawings to check the installation position of each printed circuit board to install in the shelf. After completion, a written record is prepared to store the assembling data. Also, a written shipping list is also necessary. Upon shipping, a check is performed to check whether the subject equipment has been subject to design modification or not and adapted to the modified design, in a manual operation. Said manual operation is inefficient and time consuming.

Figure 54A:
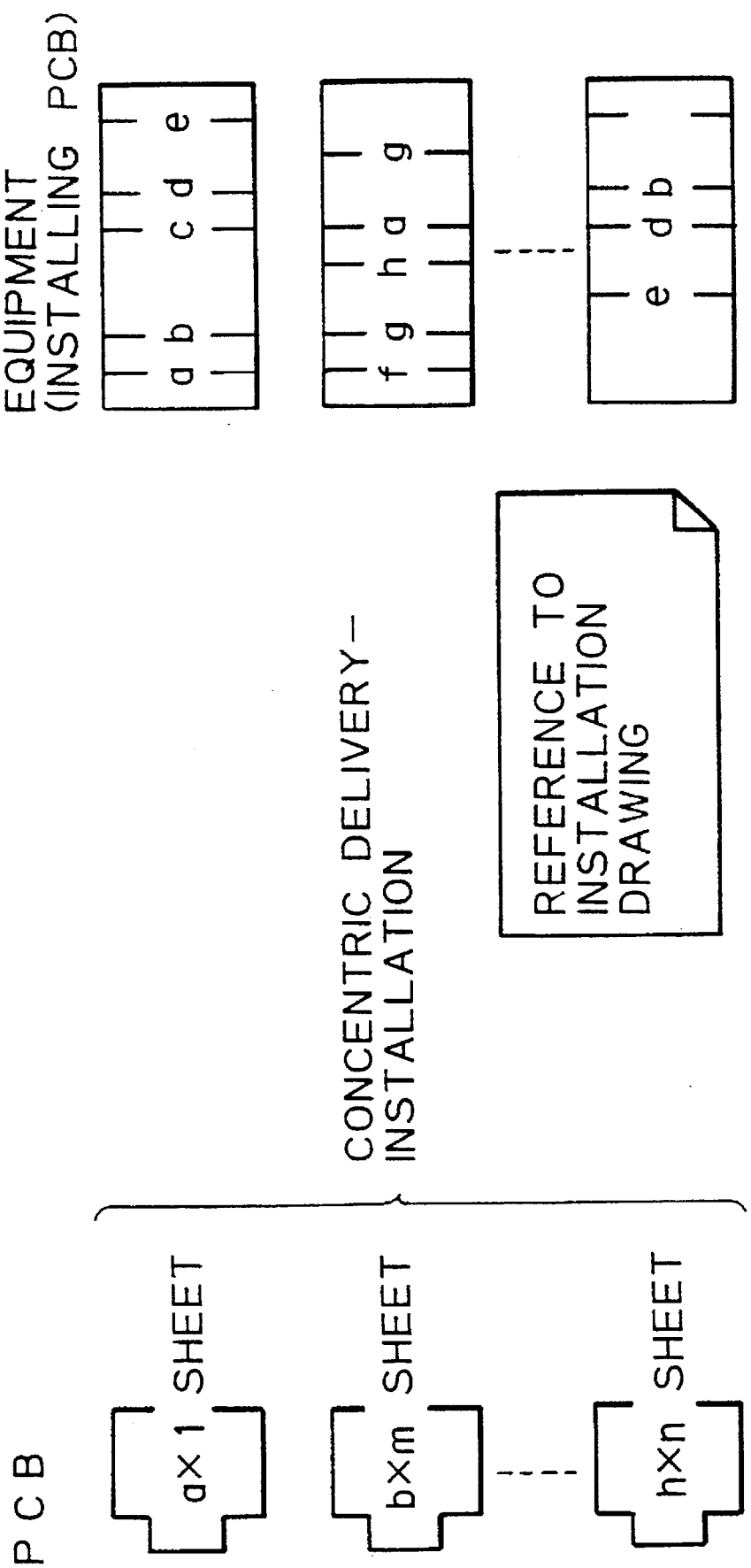
FIGS. 54(A), 54(B) and 54(C) are explanatory illustrations showing one example of a conventional process in the production of equipment using printed boards as parts.
Figure 54:
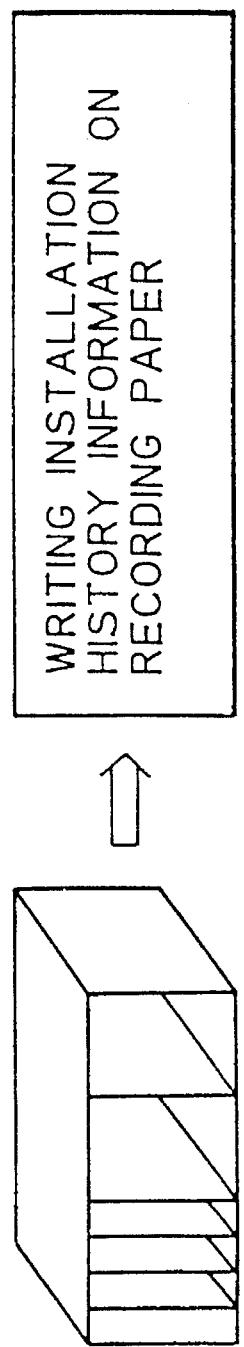
Figure 54:
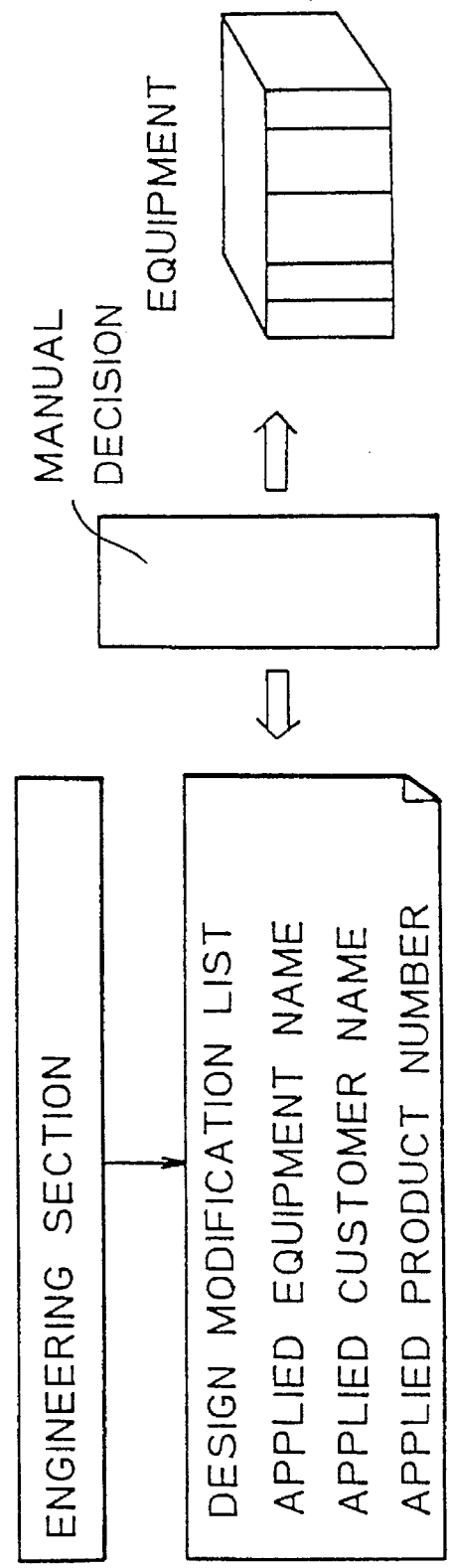

In the case of the conventional process of production of the electronic equipment (for example, exchange) constituted of a plurality of printed circuit boards, production is performed through the process as shown in FIG. 54.

(1) Delivery of Printed Circuit Board

The printed circuit board, on which a plurality of elementary parts, such as integrated circuits (ICs) form the equipment by being installed in the shelf. Therefore, the completed printed circuit boards are stored in the completed printed circuit board storage and later delivered to the production station.

When the received printed circuit boards is checked upon reception in the storage to check whether the necessary printed circuit boards for assembling the equipments are prepared or not on the basis of the installation drawings, a substantial time for checking should be required. To avoid this, in the conventional process, storage management has been performed to wait for the necessary number of respective types of printed boards defined by an order that includes a plurality of equipment, and delivery of the printed circuit board is started only when all types of necessary printed circuit boards for a plurality of equipment in the order become ready for delivery.

(2) Installation of Printed Circuit Board and Confirmation Therefor

Conventionally, installation of the printed circuit board to the shelf is performed with reference to the installation drawing as shown in the right side of A of FIG. 54. Also, a checking operation for the installed printed circuit board is performed with reference to the installation operation.

(3) Printed Circuit Board Installation History Information

After completion of the equipment test, the installation positions, serial numbers and production number of the printed circuit boards are visually checked and recorded on paper, as shown in B of FIG. 54. Furthermore, when data is established for the installation results, key input operation of the information based on the record becomes necessary.

(4) Preparation of Shipping List

Upon shipping the equipment to the customer, the contents of the printed circuit boards installed in the equipments are written on a shipping list.

(5) Upon shipping, it becomes necessary to check whether the equipment including the printed circuit boards installed therein can be shipped to the customer or not. Conventionally, a check is performed on the basis of the design modification list in the form of a written list as shown C in FIG. 54, to determine whether the modified printed circuit board is included or not.

In the conventional process set forth above, the following problems are encountered.

In the storage management, since delivery cannot be initiated until all of the printed circuit boards for all of the ordered equipment contained in a single order become ready for delivery, an uneven work load (concentration of work load after initiation of delivery) occurs at the later production stages. Also, because of established custom set forth above, it becomes difficult to respond to a short term order.

Since installation and confirmation of the printed circuit board is performed manually, printing of the drawings and distribution of printed drawings become necessary. Furthermore, because performed manualy, errors may occur and degrade installation quality (installation at the wrong position or so forth).

Since recording of the printed circuit board installation history is performed manually, a reading error of the information can occur, and, in addition, the manual recording operation is very labor intensive. Furthermore, in order to establish data, an additional key input operation should be required.

Upon preparation of the shipping list, it is possible to cause an error in writing on the list. The preparation of the shipping list in a manual operation results in a substantial work load whey shipping.

Since a judgement to determine whether the equipment can be shipped or not based on the design modification list, equipment for which the modified printed circuit board is not installed can be overlooked.

The shown embodiment provides an automated process and management of information for delivery from the automatic storage, installation to the equipment, recording of the installation history, and shipping preparation and determination.

FIG. 55 shows the construction of the embodiment of the equipment production management system according to the present invention, in which only the construction of the floor control unit 3 of FIG. 7 is illustration for the simplicity of disclosure.

In FIG. 55, the reference numeral 3 denotes the floor control unit that receives equipment installation data and/or design modification data from the central control means 1 in the production center, collect information from respective stages of production process and supplied necessary data, 600 denotes a production line including the printed circuit board storage, production of the printed circuit board and shipping. The center side central control means 1 performs an installation design for the equipment, design modification and so forth in response to the order from the customer and generates various data.

In the floor control unit 3, the reference numeral 610 denotes a design modification data file, 611 denotes the equipment installation data file, 612 denotes printed circuit board storage data file, 613 denotes the printed circuit board installation history data file, 614 denotes a equipment base delivery section, 615 is an equipment installation processing section for controlling installation of the printed circuit board to the equipment, 616 denotes an installation history information collection processing section, 617 denotes a shipping list preparation section, 618 is a shipping decision section. In the production line 600, the reference 620 denotes the completed printed circuit board storage, 621 denotes an installation position confirmation means, 622 denotes a shipping list, 623 denotes a shipping decesion means. This representation was established so that the floor control unit performs a process of delivery of the printed circuit board, installation, collection of the installation history information, preparation of the shipping list and making a decision for shipping on the basis of the equipment installation data, the design modification data generated in the engineering center and the storage data of the completed printed circuit board storage.

In the central control means, various design operations for the equipment in response to the order from the customer to store the equipment installation data (installation data of the arrangements of respective printed circuit boards to be installed in the equipment) in the equipment installation data file 631, and to store the printed circuit board data subjecting the design modification in the design modification data file. These files 630 and 5\631 are transferred to the floor control unit 3 in the production center and stored in similar files 610 and 611.

In the completed printed circuit board storage 620 of the production line 600, the received printed circuit boards that are completed by assembling various elementary components, are stored. The reception and delivery data are fed to the floor control unit 3 and stored in the printed circuit board storage data file by updating the contents thereof.

The equipment base delivery processing section 614 in the floor control unit 3, compares the contents of the printed circuit board storage data file 612 and the equipment installation data file 611 to detect that the equipment unit (all of the printed circuit boards required for forming single equipment) are stored in the storage. When the ready state of the equipment unit is detected, the command is given to the completed circuit board storage 620 for delivery of the equipment unit of the printed circuit boards. By this, the printed circuit boards are delivered, and an assembling operation using the delivered printed circuit boards is performed.

The equipment installation processing section 615 of the floor control unit 3 outputs the installation positions to the installation position confirming means 621 in the production line on the basis of the installation position of each printed circuit board stored in the equipment installation data file 611. By this, the installation is performed for forming the equipment (automatically or manually). In this production line 600, when installation of the printed circuit board is performed, or alternatively the installation results are confirmed, the installation history information collection processing section 616 of the floor control unit 3 is activated to receive the printed circuit board installation command information (data file 611) or the installation information provided by the installation results confirmation and store the same in the printed circuit board installation history file 613.

When the equipment is completed, the shipping list preparation section 617 of the floor control unit 3 is activated to prepare the shipping list 622 using the data in the printed circuit board installation history data file 613. Furthermore, with respect to the completed equipment, the shipping judgement section 618 performs a check to determine whether the customer base shipping is possible or not. In this case, when comparing the design modification data stored in the design modification data file and the printed circuit board installation history data file, confirmation of the serial number on a customer basis is performed. When the serial number is inconsistent, shipping is stopped and replacement of the printed circuit board is performed. Also, for the production process, the design modification inclusion command (installation position designation and so forth) is performed.

Figure 56A:
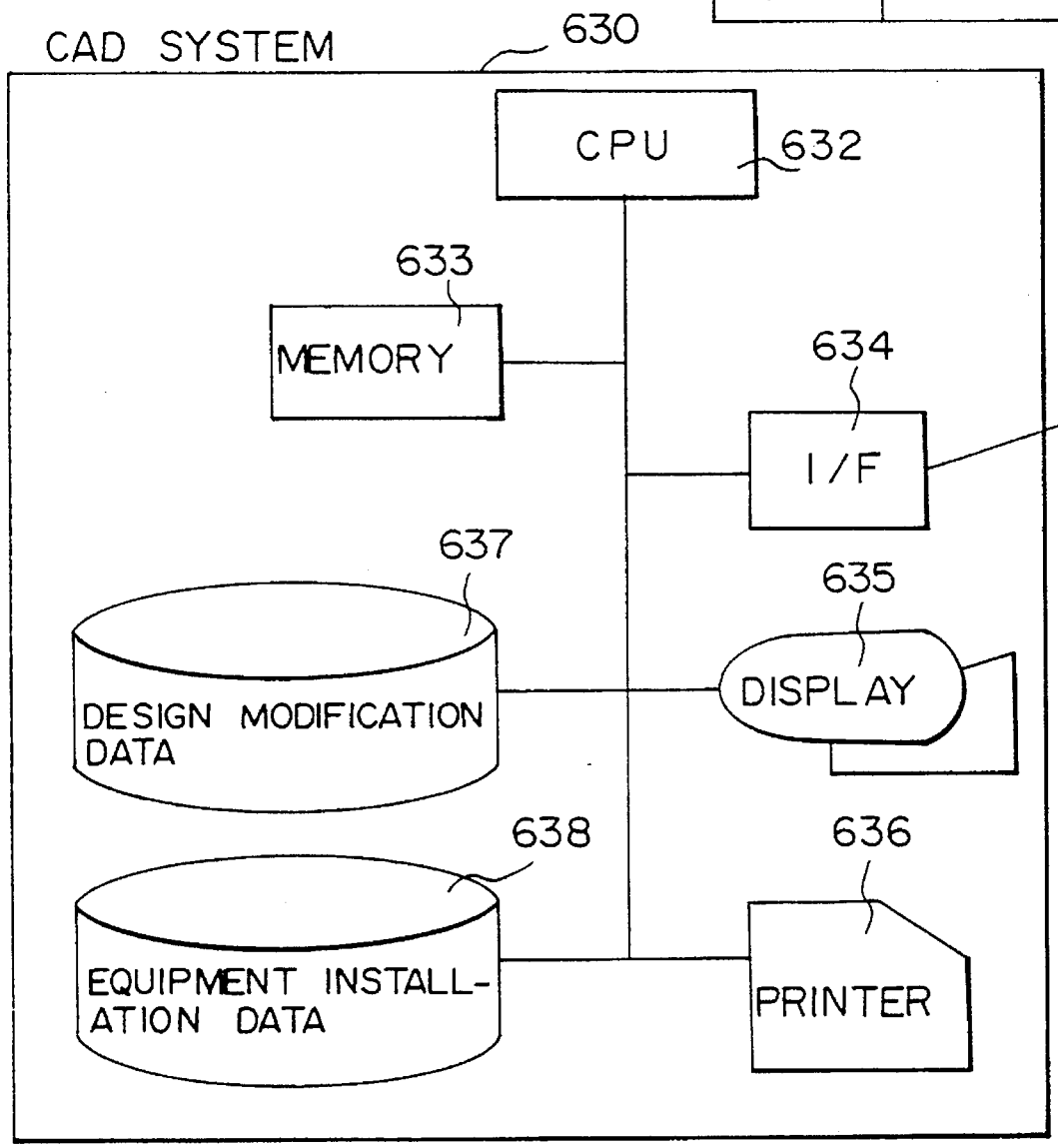
FIG. 56 is a diagram illustrating connected drawings including FIGS. 56A and 56B which are schematic block diagrams showing hardware construction of the fourth embodiment of the management system.
Figure 56B:
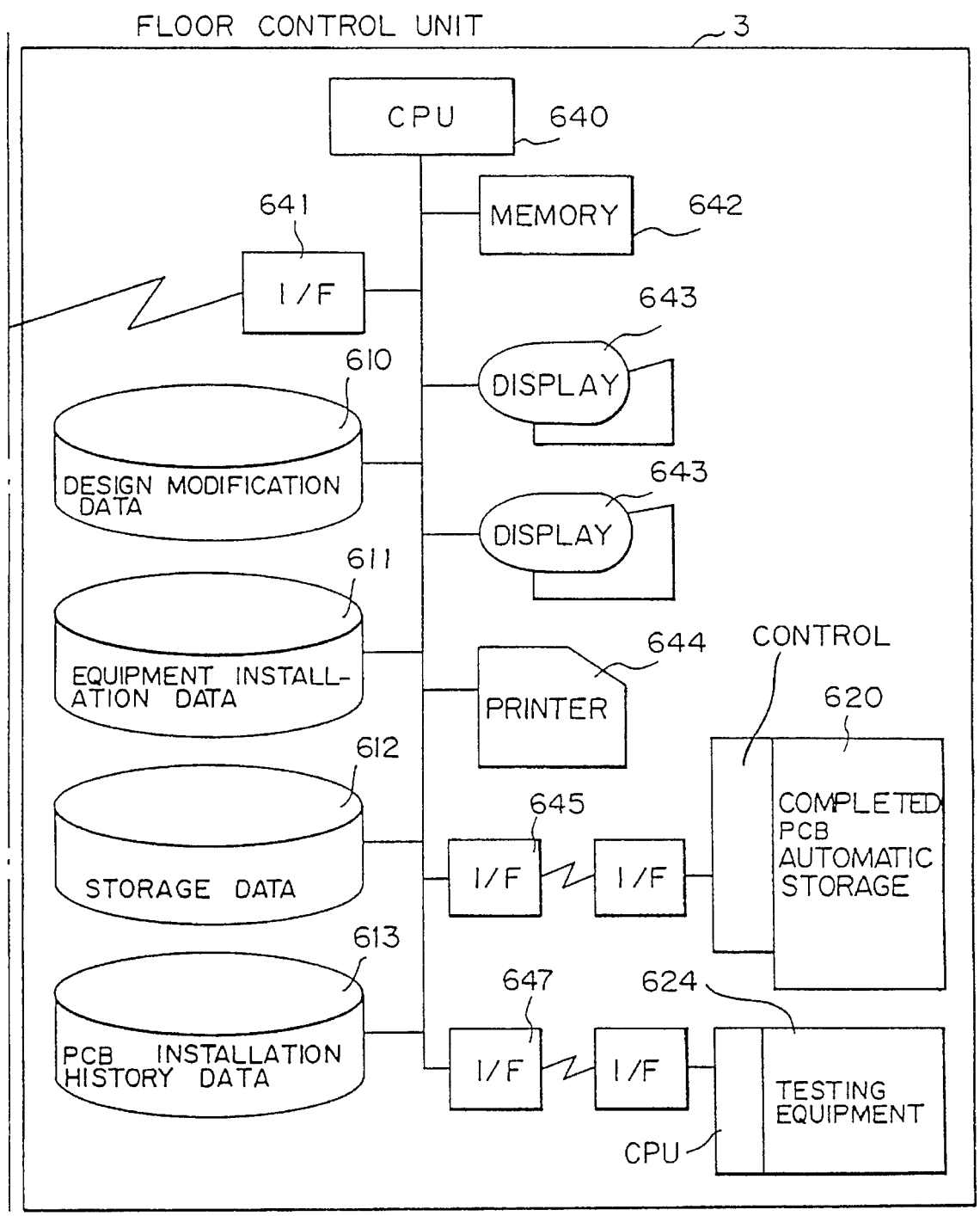

In FIG. 56, the reference numeral 3 denotes the floor control unit 3, 610 to 613 denotes the data files as shown in FIG. 55 with the same reference numerals, 640 denotes CPU (central processing unit), 641 denotes an interface (I/F) for performing data transfer with the CAD system, 642 denotes a memory (program and data), 643 denotes the terminal unit with a display unit, 644 denoted the printer, 645 denotes an interface (I/F) for communication with the control section of the production line side completed printed circuit board automatic storage 620, 647 denotes an interface (I/F) for communication with testing equipment 648 at the production line side.

The reference numeral 630 denotes the CAD system, 637 and 638 denotes data files shown in FIG. 55 with the same reference numerals. Furthermore, the reference numeral 632 denotes CPU (central processing unit, 633 denotes the memory, 634 denotes the interface (I/F) for data communication with the floor control unit 3, 635 denotes the terminal unit with the display unit and 636 denotes the printer.

Figure 57B:
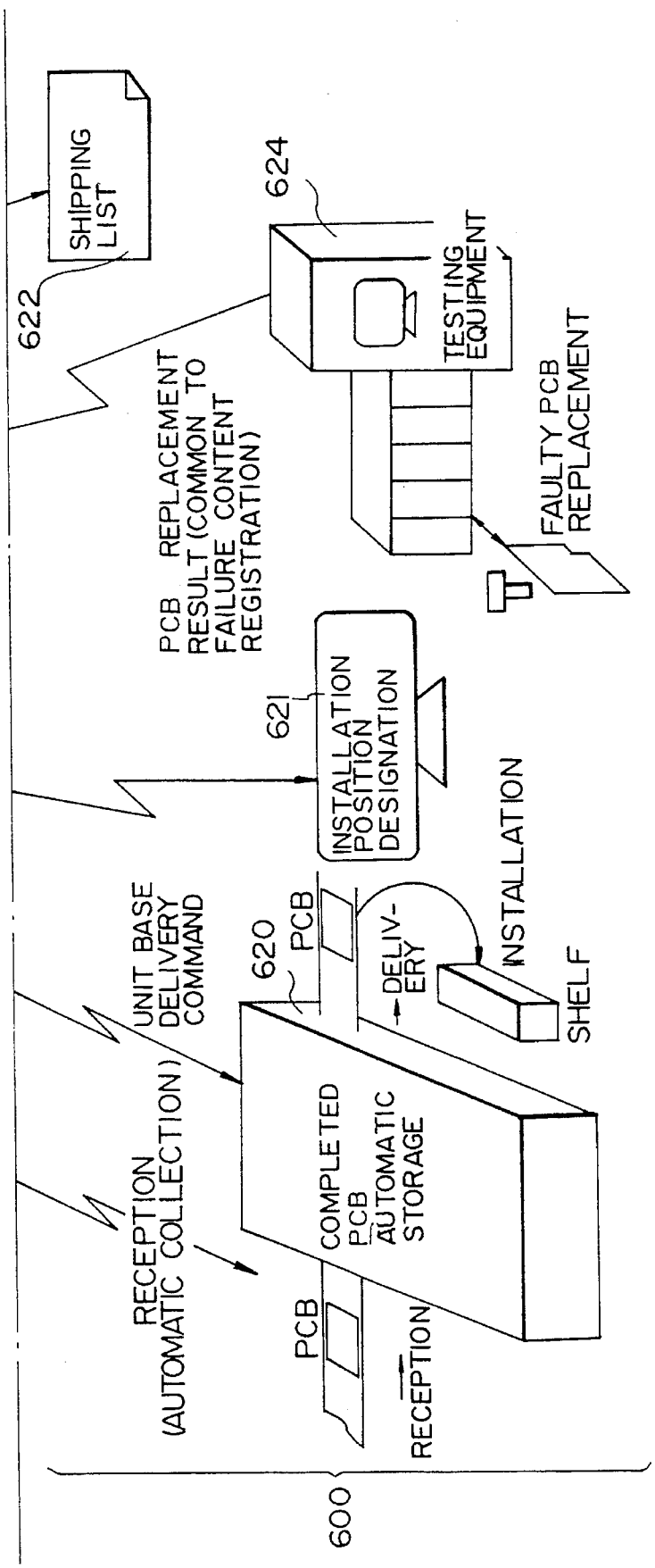
FIG. 57 is a drawing illustrating connected drawings including FIGS. 57A and 57B which are explanatory illustrations showing a concept of operation of the fourth embodiment of the management system.

FIG. 57 shows the schematic illustration showing a concept of operation of the shown embodiment of the system. In FIG. 57, the reference numeral 3 denotes the floor control unit, 620 denotes the production line, 630 denotes CAD system, respectively corresponding to the common components of FIG. 55. In the production line 600, the completed printed circuit board automatic storage 620, the terminal unit 621 (corresponding to one of 643 of FIG. 56) having the display unit for outputting the installation position command, and the testing equipment 624 for performing a test of the equipment are provided.

The printed circuit board reception data is automatically collected in the printed circuit board storage data file. The process of the floor control unit 3 to determines whether the necessary printed circuit boards are ready for delivery for assembling the equipment, and commands delivery. The command is given to the completed printed circuit board automatic storage 620.

When the installation position command is given from the floor control unit 3, the display of the terminal unit 621 displays the contents of the command. In the case that an automatic installation device (not shown) is used, automatic installation is performed for the printed circuit boards to respective installation positions identified by the installation position command.

After installation, the installation position is confirmed and entry is made for confirmation through the terminal unit 621 with the key board. Then, the printed circuit board installation history data is stored in the printed circuit board installation history data file 613. It should be noted that the process for collection of the installation history information can also be performed through the testing equipment that performs an equipment test.

The testing equipment performs a test to detect a failure in the printed circuit board. When a faulty printed circuit board is detected, it is replaced with a normal printed circuit board. At this time, the result of replacement is entered to the floor control unit 3 and the printed circuit board history data file 613 is updated. After completion of the test, the shipping list is output using the data in the printed circuit board installation history data file 613.

The testing equipment 624 also checks whether the completed equipment employs the printed circuit boards consistent with the order of the customer, and whether the printed circuit boards having content adapted to the design modification are included. If the result is not good, replacement of the printed circuit board is performed and the printed circuit board installation history data file is updated. When all conditions are satisfied, shipping of the equipment is allowed.

The process for realizing the foregoing functions and data structure to be used for respective processes will be discussed herebelow.

Figure 58:
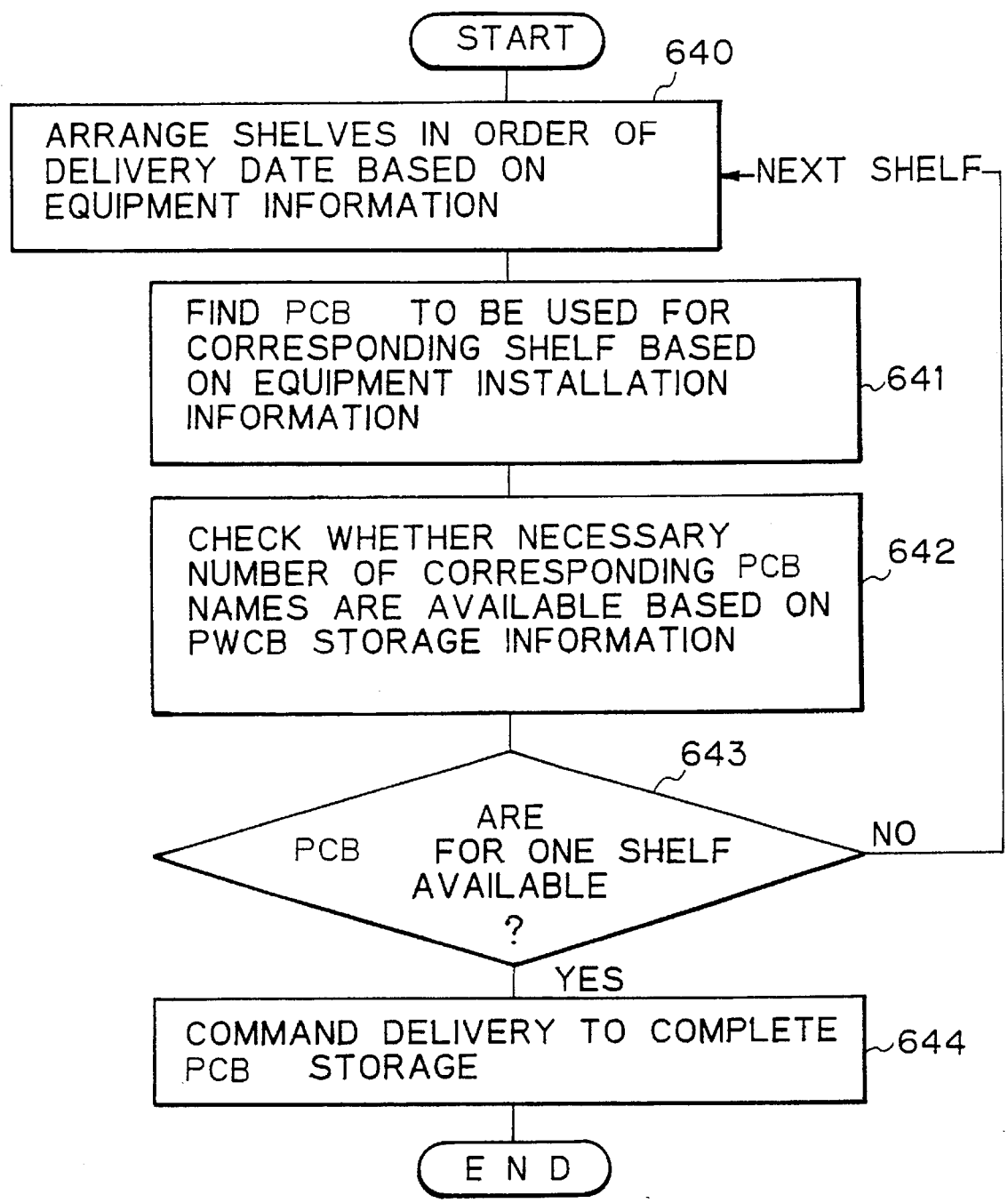
FIG. 58 is a flowchart showing a process for parts delivery in a unit of equipment according to the present invention.

FIG. 58 is a flowchart showing a process for equipment base delivery, FIG. 59 is an example of the output data in the delivery process, FIG. 60 are examples of input data employed for the process of FIG. 58.

The process of FIG. 58 is performed by the CPU 640 and the memory 641 of the floor control unit 3 of FIG. 56. The shown flowchart represents the process for delivery of the printed circuit board on the basis of the equipment information (which is not included in FIG. 56 and prepared on the basis of the equipment installation data file 611) to be used in the production process for installing the printed circuit board to form the equipment.

Initially, on the basis of the equipment information, the shelves are arranged in order to target shipping data (640 of FIG. 58). The example of the equipment information is shown in (c) of FIG. 60, which includes the shelf name, shelf drawing number, target shipping data and other data. In view of the target shipping data, priority is given for the shelf having an earlier shipping date to arrange the shelf in order. (In case of the automatic installation, the corresponding shelf is taken out.)

Next, based on the equipment installation information (equipment installation data file 611 of FIG. 56), the printed circuit boards to be used for the selected shelf are detected (641). The example of the equipment installation information is shown in (b) of FIG. 60. In the shown example, the equipment installation information (shelf drawing number, the product number, designation of delivery, installation positions of respective printed circuit boards and so forth) of the shelf having shelf name of "SLCSHA" selected in the step 640 is stored. From this, all of the printed circuit boards to be installed are picked up.

Next, on the printed circuit board storage information (printed circuit board storage data file 612 of FIG. 56), a check is performed to determine whether the necessary number of printed circuit boards having the printed circuit board names are selected in the step 641 (642). The example of the printed circuit board storage information is shown in (a) of FIG. 60. In this example, it is indicated that one of the printed circuit board included in (b) of FIG. 60 is stored as stock.

A judgement is made to determine whether the necessary number of printed circuit boards for one shelf is present or not (643). If the necessary number of printed circuit boards is not available, the process is moved to step 640 for the next shelf. When all necessary printed circuit boards are available, a delivery is commanded for the completed printed circuit board automatic storage (620 of FIGS. 56 and 57).

An example of the output data is shown in FIG. 59. FIG. 59A is an example of the output data of the equipment information ((c) of FIG. 60 for the shelf intended to form the equipment, and FIG. 59B is the example of the output data representative of the printed circuit boards for which delivery is commanded for the completed printed circuit board automatic storage.

Figure 61:
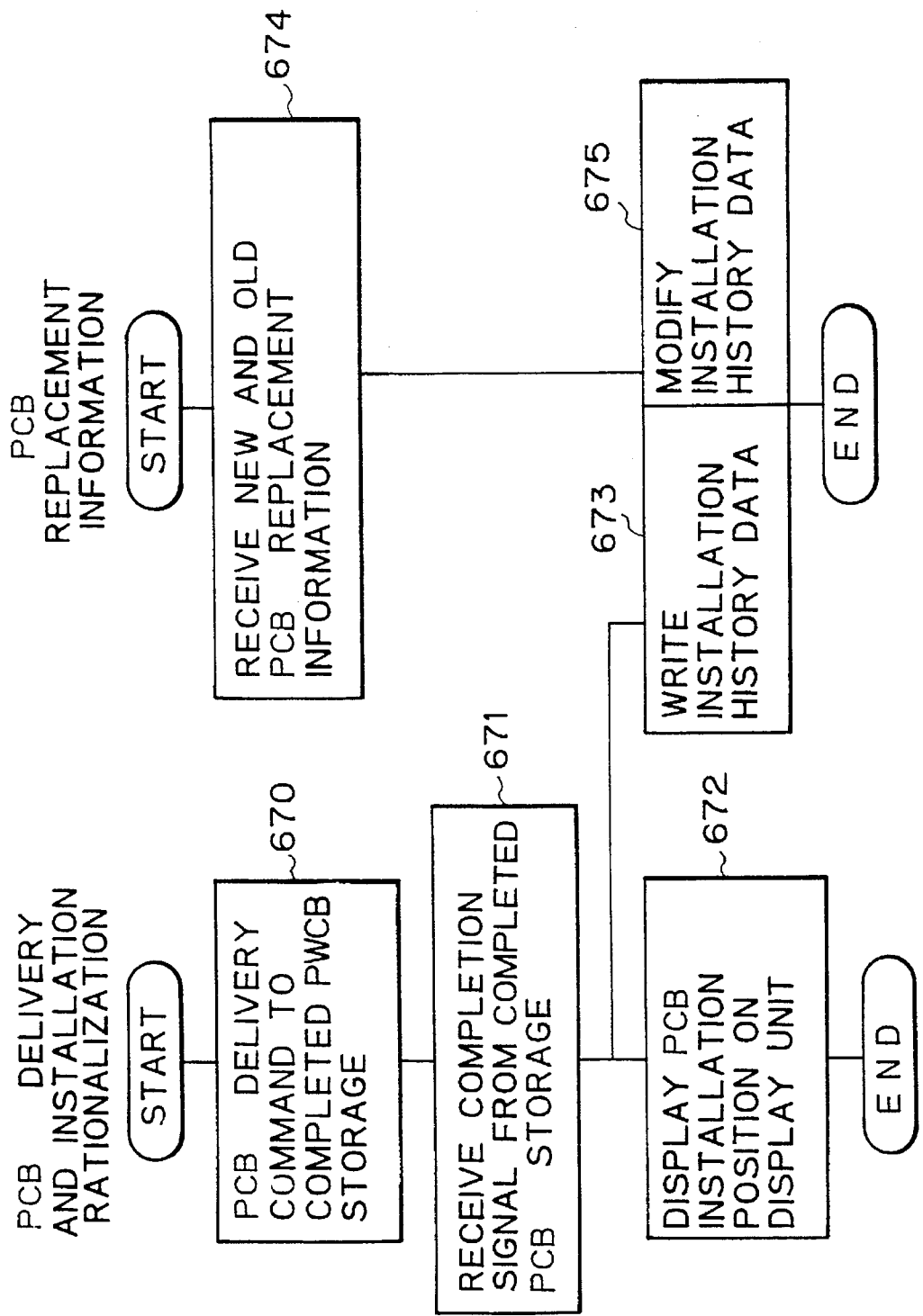
FIG. 61 is a flowchart showing a process of PCB mounting history including a process of parts delivery and replacement.

FIG. 61 is a flowchart of another process for printed circuit board installation history including replacement of the installed printed circuit boards. FIG. 62 is an example of the output data of the process of FIG. 61, and FIG. 63 are examples of input data used for the process of FIG. 61.

The process of FIG. 61 is differentiated from that of FIG. 58, in which delivery of the printed circuit boards is commanded for each individual printed circuit board instead of commanding delivery for all necessary printed circuit boards on an equipment basis. In this system, each printed circuit board necessary for forming the equipment is designated and delivery thereof is commanded individually to perform installation.

In the printed circuit board delivery process, delivery of the printed circuit board is commanded for the completed printed circuit board storage (670 of FIG. 61). The process will be discussed with respect to data of FIG. 63. When the shelf (equipment) to be produced is determined on the basis of the equipment information as shown in (d) of FIG. 63, necessary printed circuit boards are determined on the basis of the equipment installation information (the equipment installation information of FIG. 56) shown in (b) of FIG. 63. A reference is made to the storage information (printed circuit board storage data file 612 of FIG. 56) shown in (a) of FIG. 63 to check whether a necessary printed circuit board is available or not. If available, a delivery is commanded.

Next, a delivery completion signal is supplied from the completed printed circuit board automatic storage (620 of FIGS. 56 and 57). Then, the process is branched into two routes. In one of the routes, the printed circuit board installation position is displayed on the display unit of the terminal unit (672). At this time, the display of the installation position is performed by picking up the installation position information of the printed circuit board included in the equipment installation information shown in (b) of FIG. 63. On the other hand, in the other process, the installation history data (printed circuit board installation history data file 613 of FIG. 56) is written in (673).

The process for replacement of the printed circuit board in FIG. 61 is performed when failure of the printed circuit board is detected by the equipment testing or when the printed circuit board not adapted to the design modification is detected, and thus replacement of the printed circuit board is performed. In such a case, the printed circuit board that is already installed is removed and a new printed circuit board is inserted. Therefore, information of new and old printed circuit boards are received from the production line (674). Then, the printed circuit board installation history data file (613 of FIG. 56) is also modified (675).

FIG. 62A shows one example of the output data of the command for the installation position of the delivered printed circuit board in response to the delivery command. FIG. 62B shows an example of the output data written in the printed circuit board installation history data file 613.

Figure 64:
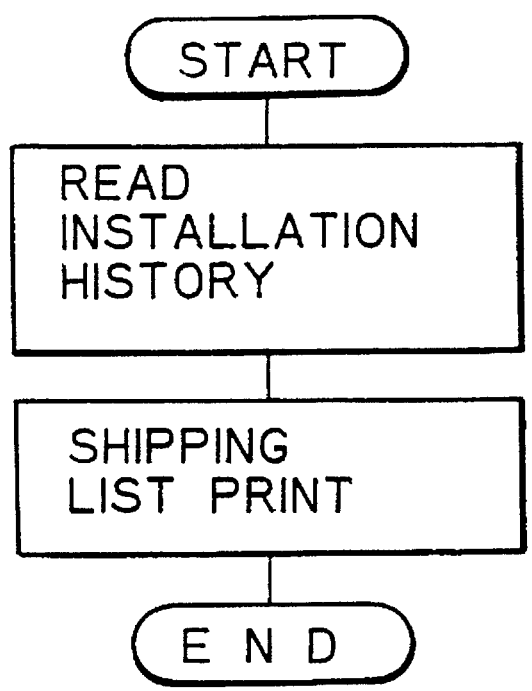
FIG. 64 is a flowchart showing a process for the preparation of a shipping list in the fourth embodiment.

FIG. 64 shows a flowchart of the process for preparation of the shipping list. FIG. 65 shows an example of the shipping list and FIG. 66 shows examples of input data used for preparation of the shipping list.

The process of FIG. 64 is performed for reading out the installation history, printing the shipping list through the printer (644 of FIG. 56) and then terminates the process. The content of the installation history data is the content stored in the printed circuit board installation history data file of FIG. 56. The example of the installation history data is shown in FIG. 12, and an example of the output data (shipping list) is shown in FIG. 66.

Figure 67:
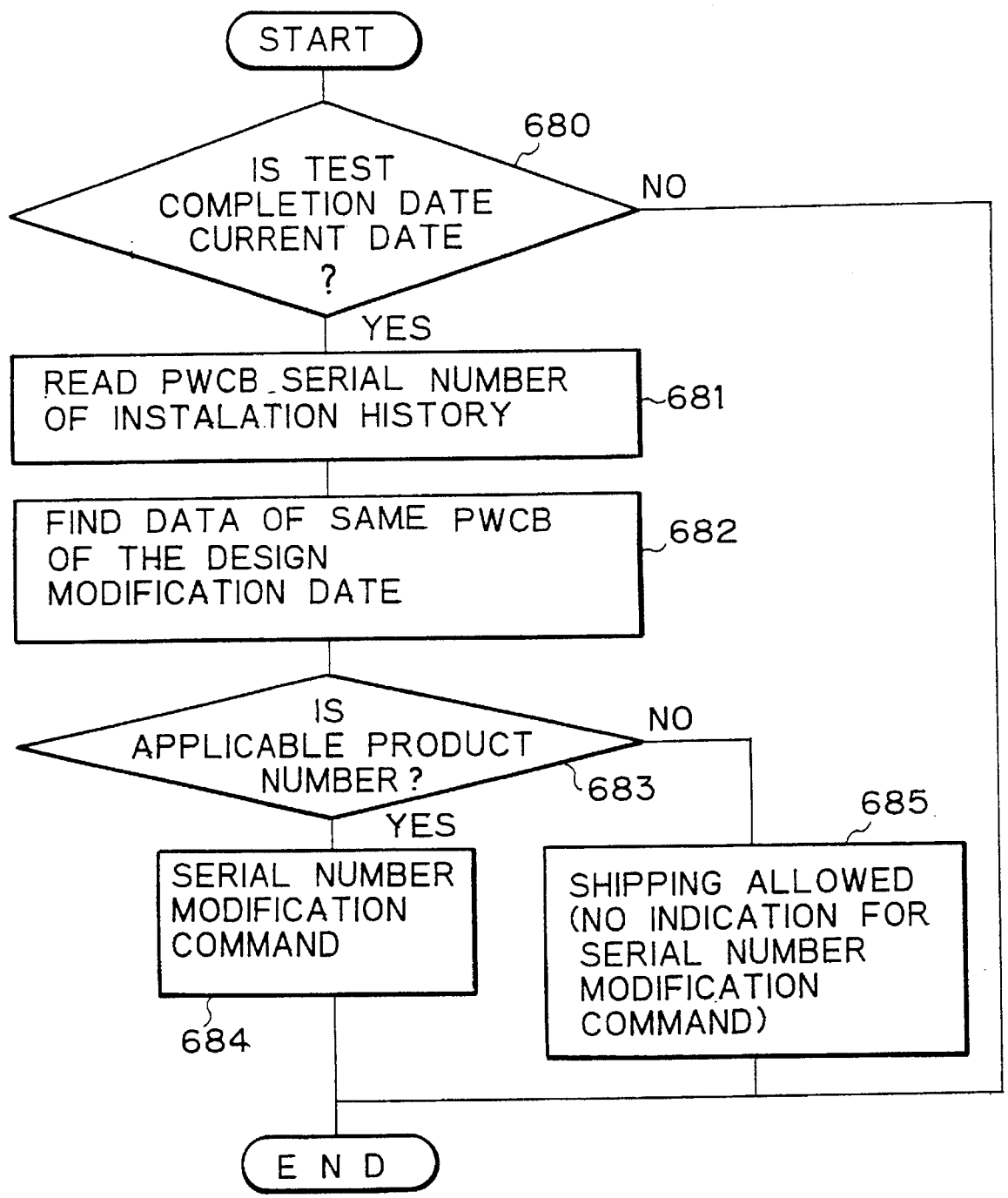
FIG. 67 is a flowchart showing a process for determining whether shipping can be done or not.

FIG. 67 is a flowchart showing a shipping process for determining whether shipping of the equipment is allowed or not. FIG. 68 is an example of the display content of the output data when the serial number is changed. FIGS. 69(*a*) and (*b*) are the examples of the input data used for a the process for shipping judgement.

In FIG. 67, initially, the test completion data is checked to determine whether the test completion date is the current date or past date (680 of FIG. 67). When the test completion date is the past date, the process goes END. On the other hand, when the test completion date is the current date, the serial number of the printed circuit boards is read out from the installation history (681). An example of the printed circuit board installation history data file (see 613 of FIG. 56) is shown in (a) of FIG. 69. In the shown example, the read serial number is "05B". Then, the data of the same printed circuit board is found in the design modification data (682). The example of the design modification data (see 610 of FIG. 56) is shown in (b) of FIG. 69, in which the printed circuit board having the same product number to that read out at step 681 is found.

Thereafter, a check is performed to determine whether the applied product number (the product number for which the serial number modification is applied) of the design modification data and the read product number of the installed printed circuit board are consistent or not. If consistent, modification of the serial number is commanded (684) and the process goes to the end. On the other hand, when inconsistent, a judgement is made and shipping is allowed (no serial number modification command is indicated) and the process goes to the end (685).

In the case of design modification data shown in (b) of FIG. 59, since the printed circuit board name, the old serial number and the applied product number is consistent with the data of the printed circuit board of (a) of FIG. 59, the serial number modification command is output. The content of display in this case is shown in FIG. 58. When such display is given, the old printed circuit board (the installation position is designated) already installed is removed and replaced with the new printed circuit board with a new serial number.

With the foregoing embodiment, the following effects can be achieved.

Since delivery of the printed circuit boards can be done in a non-concentric manner, the work load at the installation process can be unified and the period required for collecting necessary printed circuit boards can be shortened.

It becomes possible to reduce the work load for installing the printed circuit board on the equipment, and since no drawing is used, a load for preparation of the drawing can be eliminated.

It can reduce the work load for collecting printed circuit board installation history information and the accuracy of the history information can be increased.

It is further possible to eliminate the work load for preparation of the shipping list of the equipment and/or the printed circuit board to be delivered, and can reduce the possibility of error.

In addition, it is still further possible to eliminate the step confirming the serial numbers of the printed circuit boards to enhance accuracy. Furthermore, since the design modification can be included at an early timing, the printed circuit board replacement operation upon shipping becomes unnecessary.

Figure 70:
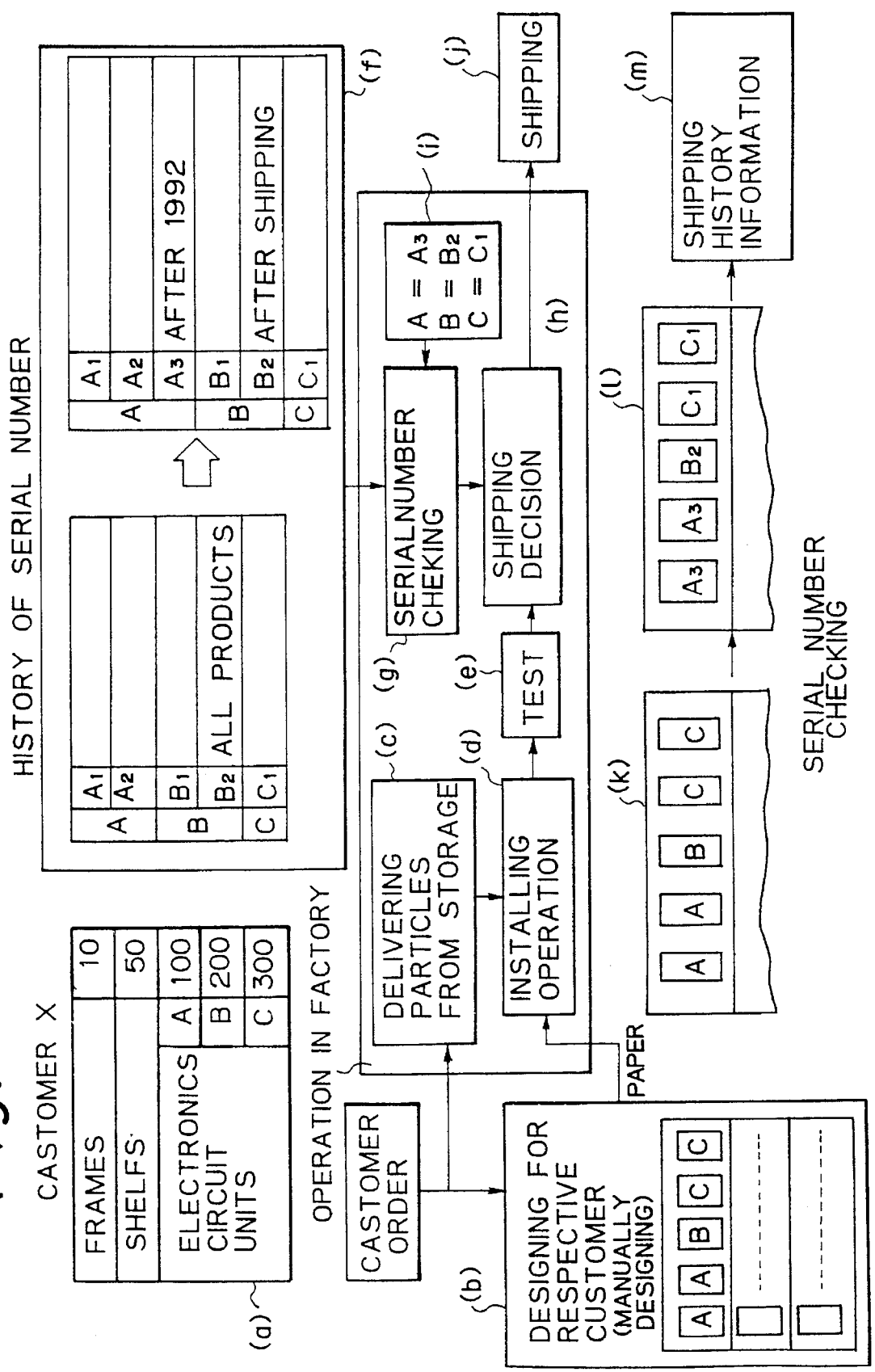
FIG. 70 shows an outline of the conventional management system for manufacture.

FIG. 70 shows an outline of the conventional system for controlling equipment producing process.

In which, all of the informations necessary to producing an intended product utilizing a lots of particles or equipments to be assembled into one intended product are controlled separately by each section who received such informations, respectively and no unified control for these informations exists.

Therefore, when an new order is received and several drawings for production process or facility designs or equipment installation drawings are required, many engineers work to complete these drawings or the lists of necessary informations from separately stocked data, respectively and check them to complete them manually.

For example, in FIG. 70, when a customer X ordered an equipment installed several particles assamblied therein as shown in an order sheet (a), a design sheet (b) is produced by manualy with paper and it is sent to a factory.

In the factory, all necessary particles to be assembled in the ordered equipment are searched in certain storage manually (c) and if some particles are not stocked in the storage then the particle is then ordered to an outside supplier from that time and thus the operation procedure for installing these particle will be delayed by several days or so.

When the installing operation (d) is finished, the equipment is tested (e) and a shipping decision whether this equipment can be shipped or not is carried out (h).

At this step, serial number of each one of the particles used therein is checked utilizing a history data of the serial number of each particles (f) and after that the equipment is shipped (j).

In this process, although the checking operation of each one of the particles is carried out, this information never feed-backed to any of the previous section involved in this production and thus when some modification is required in the equipment it is difficult to trace the fact that which portion of the equipment of which customer should be modified.

Figure 71A:
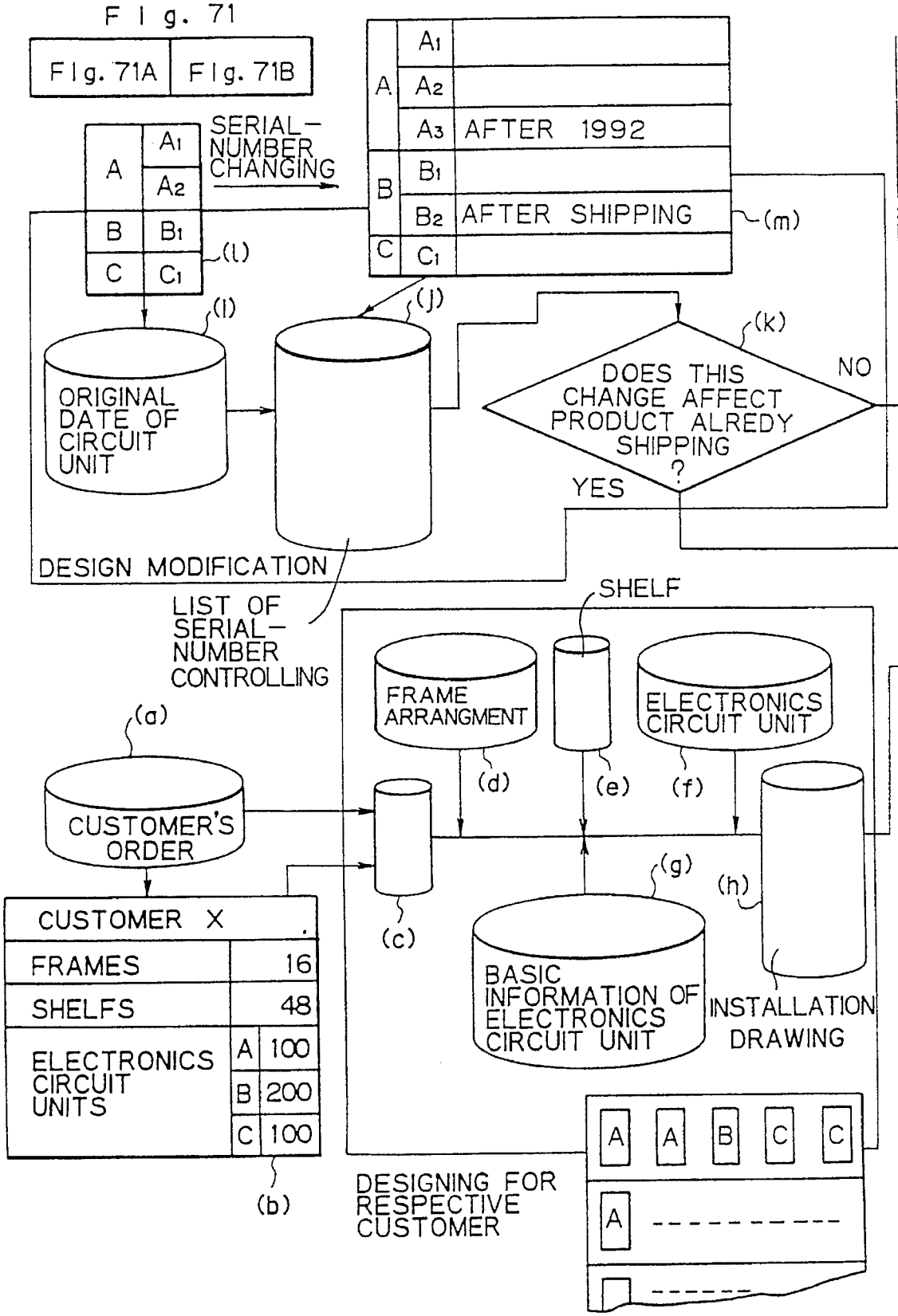
FIG. 71 is a diagram illustrating connected drawings including FIGS. 71A and 71B which show outlines of the management system for manufacture of the present invention.
Figure 71B:
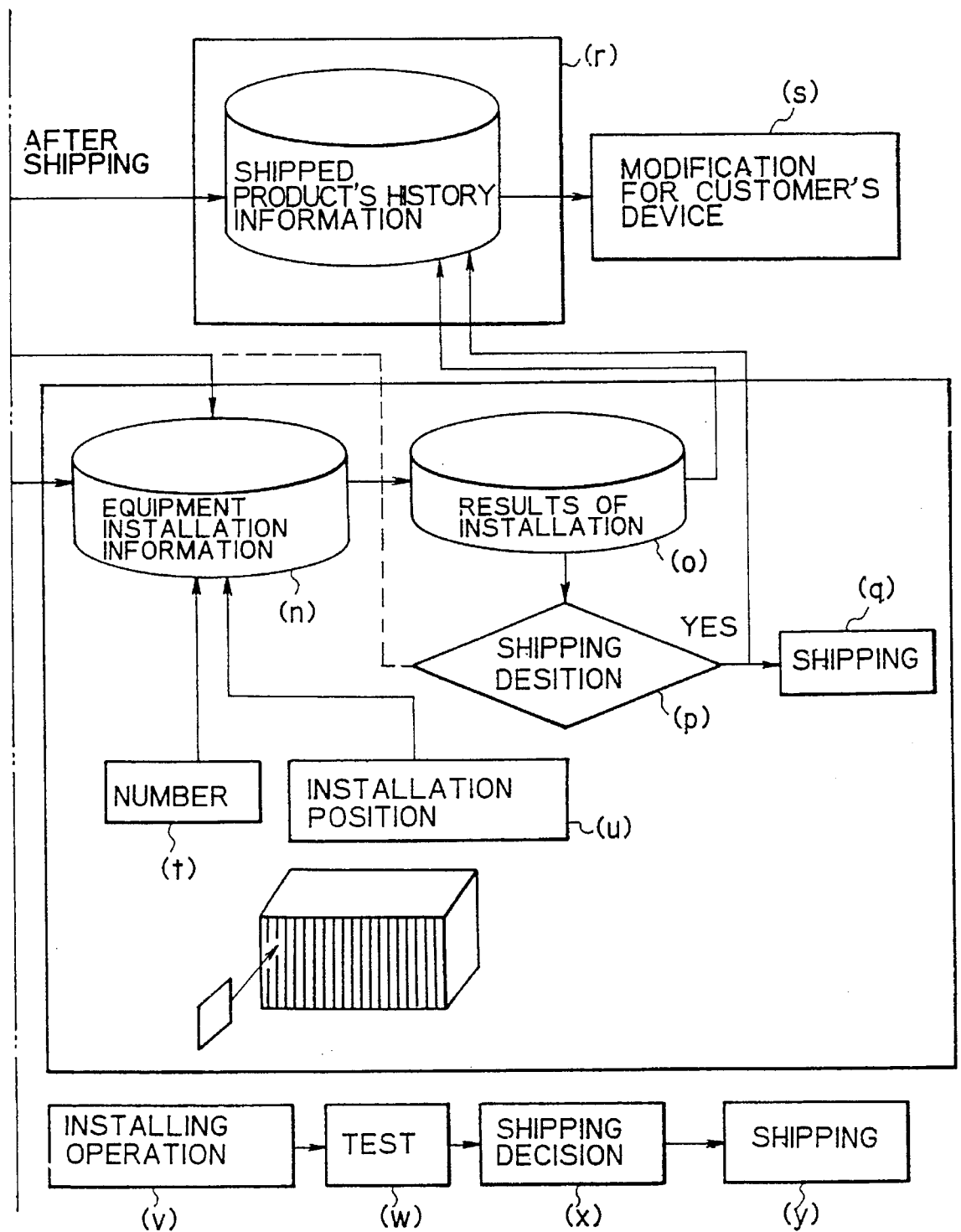

On the other hand, in FIG. 71 shows an outline of overall the management system for manufacturing equipment of the present invention in that all of informations necessary and used for producing an equipment ordered by a customer are controlled unified manner by a computer system, for example, and thus all necessary drawings for production process, facility designs and equipment installing designs can be produced automatically and preparation of all necessary particles installed in the equipment is carried out efficiently to thereby make sure to supply all of them at a factory intime for starting to produce the same.

For example, as shown in FIGS. 71A and B, when a customer X ordered an equipment installed several particles assamblied therein as shown in an order sheet (b), an installation drawing (h) is produced utilizing a computer system with informations of, for example, frame arrangement data (d), shelf data (e), electronics circuit unit data (f) and basic information of electronics circuit unit data (g) and it is sent to a factory by computerized telecommunication system or the like.

In the factory, all necessary particles to be assembled in the ordered equipment are searched in certain storage automatically (n) and therefore, all necessary particles installed in the equipment can be supplied at a factory simultaneously and intime for starting to produce the same to thereby the installing operation can be carried out efficiently.

After that based upon the result of the installation (o), the decision whether the equipment thus procuded can be shipped or not is carried out (p) and if the answer is YES then the equipment is shipped but the all information about the equipment are registered in a shipped product' history data base (r).

Furthermore, in the present invention, the serial number of each one of the particles used in the equipment is registered in a memory of this system (i) and (j) and when one of the serial number of a particle is changed, this information is feed-backed to the memories to make decisions for the equipment producing section and the shipping product controlling section whether the particles used now should be changed with new one or not or whether the particle already used therein has an mutual usability with the new one or not and further whether the particle used in the equipment already shipped to a certain customer should be changed or not, (k) with the shipped product' history data base (r).

As explained above, in the present invention, the manufacturing process of an equipment can be easily and unifiedly controlled to efficiently produce the equipment odered by respective customer utilizing all informations registered in a mamory in the computer system and further, aftercare operation of the equipment for each customer ca be speedy and timely and efficiently implemented.

We claim:

1. An equipment production management system for use in the assembly of part units from a plurality of mutually different types of elementary parts and for selectively combining a plurality of types of the part units to form equipment as a final product of a production process, said system comprising:

first means for producing a construction sequence of at least one of the parts units and for outputting construction information including said construction sequence;

second means for producing the at least one of the parts units by assembling a variety of the elementary parts in accordance with said construction information;

third means for storing the part units in a storage;

fourth means for producing the equipment by assembling necessary part units selected from said storage in accordance with said construction information output from said first means;

fifth means for shipping completed equipment;

an information inputting and outputting terminal;

a central control unit for managing at least a part of said first, second, third, fourth and fifth means in a unified manner and coupled to said information inputting and outputting terminal for inputting into and outputting from the central control unit terminal information, said central control unit including a customer base order data file, a design data file, a design know-how data file storing know-how data enabling production of an optimum system design with respect to said customer base order data file, an equipment installation design unit and an arithmetic processing unit, said equipment installation design unit including data file producing means for producing an equipment installation data file corresponding to an order received from a customer based on said customer base order data file, said design data file and said design know-how data file; and transfer means for transferring necessary information about said equipment installation data file to said first, second, third, fourth and fifth means to automatically perform at least one operation.

2. The system according to claim 1, wherein said system further comprises sixth means for designing an arrangement of said equipment.

3. An equipment production management system as set forth in claim 1, wherein said part unit is an electronic circuit printed board.

4. An equipment production management system as set forth in claim 1, wherein the equipment is communication equipment or a part thereof.

5. An equipment production management system as set forth in claim 4, wherein said part of the communication equipment is a unit, a shelf or a frame to be employed in the communication equipment.

6. The system according to claim 1, wherein said central control unit further includes a design modification data file and design modification information management means for responding to occurrence of modification of said design data file by storing modified information in said design modification data file, and said design modification information management means producing a basic modification information data file for storing basic modification information data associated with at least one of the part units or the equipment corresponding to the modification to enable said equipment installation design unit to check design content utilizing said data stored in said design modification data file.

7. The system according to claim 1, wherein said central control unit further comprises:

means for storing a design data file and a serial number information data file; and design modification information management means for responding to modification of said design data file by storing modified information in said serial number information data file, to thereby enable said equipment installation design unit to check design content utilizing serial number data stored in said serial number information data file.

8. An equipment production management system as set forth in claim 7, wherein said serial number information data file stores the modification information previously generated and currently modified design modification information.

9. The system according to claim 1, wherein an area in which at least one of said first to fifth means, used in said equipment production management system, is located in a remote region apart from said central control unit at a predetermined distance, and wherein the at least one of said first to fifth means located in said remote region apart from said central control unit is connected to said central control unit through a communications line.

10. An equipment production management system as set forth in claim 1, wherein said central control unit is provided with a history information management means and includes at least information relating to production history, design modification history or shipping history for the produced equipment.

11. The system according to claim 1, wherein said central control unit outputs control information, and wherein said equipment production management system further comprises equipment production line controlling means for controlling production of the equipment;

said equipment production line controlling means including at least production history storing means for storing production history data information of the equipment, design modification storing means for storing design modification data information, serial number storing means for storing serial number information data, reception/delivery storing means for storing reception/delivery information data of elementary parts, the part units made from said elementary parts of the equipment, installation storing means for storing customer-base equipment installation information data, and manufacturing storing means for storing manufacturing management information data, each of said production history, design modification, serial number, reception/delivery, installation and manufacturing storing means being connected to said central control unit, said equipment production line controlling means controlling production of the equipment utilizing at least one piece of desired information stored in any one of said production history, design modification, serial number, reception/delivery, installation and manufacturing storing means in response to the control information output from said central control unit.

12. An equipment production management system as set forth in claim 1, further comprising equipment production line controlling means, including a design modification data file for storing modification data and a design serial number information data file for storing serial number information, for issuing a command to perform said at least one operation by said first to fifth means in said production process based on said design modification data file, said design serial number information data file and said equipment installation data file and to collect production history information associated with some or all of the part units or the equipment to generate a production history data file, said production history data file being transferred to said central control unit.

13. An equipment production management system as set forth in claim 12, wherein said equipment production line controlling means compares the content of said production history data file with the contents of said design modification data file and said design serial number information data file to determine whether the produced part unit or said equipment is adapted to the design modification or serial number, and thus determines whether the equipment is available for shipment.

14. The system according to claim 1, wherein said equipment installation design unit of said central control unit further includes means for storing an equipment arranging data file, layout design means for selecting a standard layout from said design know-how data file for determining a layout arrangement associated with at least one of the part unit or the equipment corresponding to the order of the customer, and for outputting layout position data adapted to a condition corresponding to the order of the customer with a correction input operation by an operator, and logic assignment means for assigning number, installation position and arrangement position of respective part units and equipment for respective layout position data output from said layout design means by applying a predetermined logical assignment condition taking a wire connecting condition into account, and for storing the number, installation position and arrangement position in said equipment arranging data file.

15. An equipment production management system as set forth in claim 14, wherein said equipment installation design unit of said central control unit includes equipment mounting design means for selection of at least one of the elementary parts and the part units, calculation of a mounting amount or determining the mounting condition, performing a check and generating an equipment installation data file, and using an arrangement and mounting model of the at least one of the part units and the equipment from said design know-how information data file based on said equipment arrangement data file.

16. An equipment production management system as set forth in claim 15, wherein said equipment installation design unit of said central control unit further includes construction drawing design means for producing construction wiring drawings based on calculation of a cable length corresponding to cable connection information and connection position information and for producing a construction drawing estimate data file using basic data of cable design registered in said design know-how information data file based on said equipment arrangement data file.

17. An equipment production management system as set forth in claim 1, wherein said design data file in said central control unit includes at least one of a floor layout data file, an equipment arrangement data file, an equipment installation data file and a construction drawing estimate data file.

18. An equipment production management system as set forth in claim 1, wherein said central control unit further includes a production section, and serial number information management means for registering a new serial number in a serial number file when a serial number of at least one of the part units used in producing the equipment is changed, and for feeding the new serial number back to said production section to change the at least one operation pertaining to the new serial number.

19. An equipment production management system as set forth in claim 1, wherein said central control unit includes a shipping product controlling section, and serial number information management means for registering a new serial number in a serial number file when a serial number of at least one of the part units used in producing the equipment is changed, and for feeding the new serial number back to said shipping product controlling section to decide whether shipment of the equipment should be continued.

20. An equipment production management system as set forth in claim 1, wherein said central control unit includes at least one of a production section and a shipping product controlling section, and serial number information management means for registering a new serial number in a serial number file when a previous serial number of at least one of the part units used in producing the equipment is changed to indicate a new part unit, for comparing the new serial number and the previous serial number corresponding to the new serial number to make a decision whether the new part unit having the new serial number adversely affects the equipment to be produced or already produced and stored and, if the new part unit having the new serial number adversely affects the equipment, for feeding back revision information including the new serial number and the previous serial number corresponding to the new serial number to one of said production section and said shipping product controlling section to make a decision to change the at least one operation with the new serial number or to stop shipment of the equipment.

21. An equipment production management system as set forth in claim 20, the information about the change of the serial number of the part unit in said production section in the factory or said shipping product controlling section is registered in a shipped product's history information data file to keep them for future usage in said system.

22. An equipment production management system as set forth in claim 1, further comprising shipped product history information means for storing history information on shipped products, and wherein said central control unit includes serial number information management means for registering, when a previous serial number of at least one of the part units used in producing the equipment is changed, a new serial number in a serial number file and said shipped product history information means to indicate a new part unit, for comparing the new serial number and the previous serial number corresponding to the new serial number utilizing history information stored in said shipped product history information means to make a decision whether the new part unit having the new serial number adversely affects the equipment already shipped to the customer and if necessary indicating a modification operation to be carried out on the equipment already shipped to the customer.

23. An equipment production management system as set forth in claim 1, wherein said design data file in said central control unit includes at least one of a floor layout data file, an equipment arrangement data file, an equipment installation data file and a construction drawing estimate data file.

24. An equipment production management system as set forth in claim 2, wherein said central control unit includes a production section, and serial number information management means for registering a new serial number in a serial number file when a serial number of at least one of the part units used in producing the equipment is changed, and for feeding the new serial number back to said production section to change the at least one operation pertaining to the new serial number.

25. An equipment production management system as set forth in claim 2, wherein said central control unit includes a shipping product controlling section, and serial number information management means for registering a new serial number in a serial number file when a serial number of at least one of the part units used in producing the equipment is changed, and for feeding the new serial number back to said shipping product controlling section to decide whether shipment of the equipment should be continued.

26. An equipment production management system as set forth in claim 2, wherein said central control unit includes at least one of a production section and a shipping product controlling section, and serial number information management means for registering a new werial number in a serial number file when a previous serial number of at least one of the part units used in producing the equipment is changed to indicate a new part unit, for comparing the new serial number and the previous serial number corresponding to the new serial number to make a decision whether the new part unit having the new serial number adversely affects the equipment to be produced or already produced and stored and, if the new part unit having the new serial number adversely affects the equipment, for feeding back revision information including the new serial number and the previous serial number corresponding to the new part unit to one of said production section and said shipping product controlling section to make a decision to change the at least one operation with the new serial number or to stop shipment of the equipment.

27. An equipment production management system as set forth in claim 2, further comprising shipped product history information means for storing history information on shipped products, and wherein said central control unit includes serial number information management means for registering, when a previous serial number of at least one of the part units used in producing the equipment is changed, a new serial number in a serial number file and said shipped product history information means to indicate a new part unit, for comparing the new serial number and the previous serial number corresponding to the new serial number utilizing history information stored in said shipped product history information means to make a decision whether the new part unit having the new serial number adversely affects the equipment already shipped to the customer and if necessary indicating a modification operation to be carried out on the equipment already shipped to the customer.

* * * * *